United States Patent [19]

Hawkins et al.

[11] Patent Number: 4,946,391

[45] Date of Patent: Aug. 7, 1990

[54] ELECTRONIC ARITHMETIC LEARNING AID WITH SYNTHETIC SPEECH

[75] Inventors: William R. Hawkins; Steve Weinstein, both of Lubbock, Tex.

[73] Assignee: Texas Instruments Incorporated, Dallas, Tex.

[21] Appl. No.: 154,722

[22] Filed: May 30, 1980

[51] Int. Cl.[5] .............................................. G09B 19/02

[52] U.S. Cl. .................................... 434/201; 434/327; 434/308; 434/322; 364/718; 273/237

[58] Field of Search ............... 434/188, 201, 202, 169, 434/157, 176, 335; 364/410, 718, 723, 513, 710, 717; 179/15 M, 15 G

[56] References Cited

U.S. PATENT DOCUMENTS

| | | | |
|---|---|---|---|
| 3,371,321 | 2/1968 | Adams | 434/157 |
| 3,584,398 | 6/1971 | Meyer et al. | 434/201 |
| 3,925,909 | 12/1975 | Duncan | 434/201 |
| 3,947,976 | 4/1976 | Hafel | 434/201 |
| 3,974,575 | 8/1976 | Duncan | 434/201 |
| 4,010,556 | 3/1977 | Ellsworth et al. | 434/201 |
| 4,026,555 | 5/1977 | Kirschner et al. | 273/85 G |
| 4,047,008 | 9/1977 | Perkins | 364/717 |
| 4,051,605 | 10/1977 | Toal et al. | 434/201 |
| 4,060,848 | 11/1977 | Hyatt | 364/200 |
| 4,117,607 | 10/1978 | Gill | 434/201 |
| 4,179,584 | 12/1979 | Tanimoto et al. | 179/1 SM |
| 4,189,779 | 2/1980 | Brautingham | 364/718 |
| 4,247,895 | 1/1981 | Weber | 434/201 |
| 4,259,668 | 3/1981 | Nishimura et al. | 434/201 |
| 4,340,374 | 7/1982 | Culley | 434/201 |

OTHER PUBLICATIONS

*IEEE Spectrum;* "Voice Signals Bit-By-Bit"; Oct. 1973; pp. 28-34.

*The Journal of the Acustical Society of America;* Apr. 1971; pp. 637-650.

*Products That Think;* Available as of Nov. 1978; p. 41.

*Primary Examiner*—Edward M. Coven
*Assistant Examiner*—Jessica J. Harrison
*Attorney, Agent, or Firm*—William E. Hiller; N. Rhys Merrett; Mel Sharp

[57] ABSTRACT

An electronic handheld arithmetic learning aid which includes a speech synthesis device, a speaker driven by the speech synthesis device, a memory having digital data stored therein from which a plurality of mathematical problems may be derived for presentation to an operator for solution, and a controller for accessing selected portions of the digital data from the memory for input to the speech synthesizer device in presenting the mathematical problems to the operator in an audibly voiced manner via the speaker. In one aspect, at least some of the mathematical problems derivable from the memory involve respective sets of at least two individual numbers from which the operator is expected to determine a particular mathematical relation in providing a solution to the corresponding mathematical problem. In another aspect, the mathematical problems derivable from the digital data of the memory respectively involve the random selection of an unknown number which the operator is expected to identify by proposing a trial number. The memory further includes the solutions to these problems and digital speech data for enabling the speech synthesizer device to provide speech signals from which words posing the mathematical problems, the correct solutions thereto, and comments on operator inputs may be audibly voiced in human speech via the speaker as driven by the speech synthesizer device. The talking electronic arithmetic learning aid presents the mathematical problems in words and phrases as audibly voiced in synthesized speech to enhance the ability of the operator in perceiving mathematical problems in an audibly verbalized form.

32 Claims, No Drawings

ELECTRONIC ARITHMETIC LEARNING AID WITH SYNTHETIC SPEECH

BACKGROUND OF THE INVENTION

This invention relates to electronic learning aids, teaching machines and electronic training aids. More specifically, this invention relates to electronic learning aids, teaching machines and electronic training aids directed to mathematical problems and the solutions thereof, wherein means for producing synthesized speech is provided to present the mathematical problems in audibly voided words and phrases in a manner intended to facilitate the development of arithmetic skills in an operator, particularly the ability of the operator in perceiving mathematical problems in an audibly verbalized form.

Electronic learning aids for teaching subject matter of general character have been equipped with audio means, wherein the audio means is a prerecorded series of spoken messages relating to the subject matter on which the operator of the learning aid is to be tested. In such instances, the audio means often takes the form of a tape recorder. As to electronic learning aids specifically intended to improve arithmetic skills, heretofore such electronic arithmetic learning aids have relied upon a visual display to present arithmetic problems for solution by an operator. When some form of audible means has been associated with such electronic arithmetic learning aids, it typically comprised a sound generator for producing tones indicative of correct answers—rather than prerecorded speech.

Thus, previous electronic learning aids directed to the improvement of arithmetic skills have lacked the special appeal that audibilized speech in presenting arithmetic problems to be solved and the solutions thereto can provide to an operator.

The prior art suggests various techniques for synthesizing human speech from digital data. For instance, some of the techniques used are briefly described in "Voice Signals: Bit by Bit" at pages 28–34 of the October 1973 issue of IEEE Spectrum. An important technique for synthesizing human speech, and the technique used by the speech synthesizer chip of the electronic arithmetic learning aid described herein, is called linear predictive coding. For a detailed discussion of this technique, see "Speech Analysis and Synthesis of Linear Production of the Speech Wave" by B. S. Atal and Suzanne L. Hanauer which appears at pp. 637–50 of Volume 50, No. 2 (part 2) of the Journal of the Acoustical Society of America.

In U.S. patent application Ser. No. 905,328 filed May 12, 1978, now U.S. Pat. No. 4,209,844 issued June 24, 1980, a lattice filter for generating digital signals useful in producing synthesized human speech and capable of being implemented on a single semiconductor chip is described. The arithmetic learning aid described herein makes use of the lattice filter described in the aforementioned U.S. Pat. No. 4,209,844.

It is an object of the invention to provide an electronic arithmetic learning aid having a memory having digital data stored therein from which a plurality of mathematical problems may be derived from presentation to an operator for solution, wherein at least some of the mathematical problems involve respective sets of at least two individual numbers from which the operator is expected to determine a particular mathematical relation in providing a solution to the corresponding mathematical problem, means for randomly selecting a plurality of numbers including at least first and second numbers corresponding to digital data as stored in the memory in deriving a mathematical problem for solution, presentation means for posing a particular mathematical relationship concerning the plurality of randomly selected numbers in presenting the mathematical problem to the operator for solution, operator input means for receiving an input from an operator indicative of a posed solution to the mathematical problem as presented by the presentation means, and digital logic means including comparator means for determining the accuracy of the input from the operator in relation to the correct solution to the presented mathematical problem. In a specific aspect, the presentation means is implemented as a speech synthesizer device and audio means operably associated therewith such that the mathematical problems are presented to the operator as audibly voiced words and phrases posing a particular mathematical relationship involving the relative magnitudes of the plurality of numbers are randomly selected by the random selection means.

It is another object of this invention to provide an electronic arithmetic learning aid having a memory in which digital data of the character previously described is stored in operable association with a speech synthesizer and audio means such that a mathematical problem is audibly voiced to the operator as a posed mathematical relationship concerning whether one randomly selected number group including at least one individual number is greater than or less than other randomly selected number groups.

It is another object of this invention to provide an electronic arithmetic learning aid for testing the ability of an operator to identify an unknown number, whereby the unknown number is randomly selected by a random selection means from a memory having digital data stored therein from which mathematical problems respectively involving the random selection of an unknown number may be derived. The operator is expected to identify the unknown number by proposing a trial number via operator input means, the trial number being compared to the correct identity of the unknown number by a comparator means, and the results of the comparison being audibly announced to the operator by a speech synthesizer device and audio means operably associated therewith.

It is yet another object of this invention to test an operator's ability to determine the identity of an unknown number as randomly selected from memory in an electronic arithmetic learning aid, wherein the arithmetic learning aid is equipped with a comparator, a visual display and a speech synthesis device for comparing a trial number proposed by the operator in an effort to identify the unknown number and introduced via operator input means with the correct identity of the unknown number, wherein the visual display and the speech synthesis device both visually and audibly present the results of the comparison by providing an informational clue as to the identity of the correct number.

The foregoing objects are achieved as is now described. The words and arithmetic problems to be utilized by the electronic arithmetic learning aid are stored as digital codes in a memory device. This memory is preferably of the non-volatile type so that the data is not erased when power is disconnected from the arithmetic learning aid. In the specific operational embodiments according to the present invention, the memory has digital data stored therein from which a plurality of mathematical problems may be derived for presentation to an operator for solution. In one aspect, at least some of the mathematical problems involve respective sets of at least two individual numbers from which the operator is expected to determine a particular mathematical relation in providing a solution to the corresponding mathematical problem. In another aspect, the mathematical problems respectively involve the random selection of an unknown number which the operator is expected to identify by proposing a trial number. A speech synthesizer circuit is connected to the output of the memory for selectively converting some of the signals stored therein to speech signals from which audible speech stating arithmetic problems, the solutions thereto, and associated comments is generated. Several types of speech synthesis circuits are known and could be employed in the electronic arithmetic learning aid. In a disclosed embodiment of the electronic arithmetic learning aid, the speech synthesizer thereof is implemented as an integrated circuit on a single semiconductor chip and employs a linear predictive coding technique in synthesizing speech. A speaker is provided to convert output from the speech synthesizer to audible sounds. A keyboard and display, both of which preferably are capable of accommodating alphanumeric characters, are preferably provided. The display and keyboard are preferably coupled to the speech synthesis circuit and memory via digital logic means in the form of a controller circuit. In the embodiment disclosed, the controller circuit is an appropriately programmed microprocessor device. The controller circuit controls the memory to read out the digital signals corresponding to the words, phrases and arithmetic problems to be utilized, the words and phrases preferably being randomly selectable from a plurality of words stored therein. The digital signals representative of the words and phrases are converted to audible voiced words and phrases by means of the synthesizer circuit in combination with the speaker. The controller circuit is also effective to pose random arithmetic problems to the operator, either verbally via speech synthesis or by means of the display. The correct answer to a particular arithmetic problem is also stored, and may be compared with the proposed answer which is input by the operator at the keyboard. The operator may be informed audibly of the results of the comparison via the speech synthesis circuit and speaker. The arithmetic learning aid is installed in an easily portable case. The size of the speech synthesis chip included as a component thereof is on the order of 45,000 square mils using conventional MOS design rules and a convention P-MOS processing technique. Of course, using C-MOS processing would tend to increase the size of the chip somewhat.

In one operational embodiment of the electronic arithmetic learning aid according to the present invention, a plurality of numbers including at least first and second numbers corresponding to digital data as stored in the memory are randomly selected to derive a mathematical problem, and the operator is requested via the speech synthesis device and audio means operably associated therewith to determine whether the first randomly selected number is greater than or less than the second randomly selected number in presenting the randomly selected numbers as a mathematical problem to the operator for solution. In another operational embodiment, the operator is tested on his ability to determine the identity of a randomly selected unknown number corresponding to digital data as stored in the memory, wherein the operator inputs a trial number via the operator input means indicative of a proposed identification of the unknown number. The comparator of the electronic arithmetic learning aid in this operational embodiment thereof determines the appropriateness of the input received by the operator input means. Means coupled to the comparator produces an indication of the accuracy of the input from the operator as received by the operator input means in relation to the correct identity of the unknown number and causes the presentation means including a visual display and a speech synthesis device to both visually and audibly provide digital information as a clue bearing upon the identity of the unknown number. Specifically, the visual display and the speech synthesis device visually and audibly provide first and second digits, wherein the first digit is representative of the number of digits in the trial number that occur in the unknown number regardless of position, and the second digit is representative of the number of digits in the trial number that are correctly positioned as to sequence. Thereafter, the operator continues to input additional trial numbers via the operator input means as a proposed identification of the unknown number until it is correctly identified, with the visual display and the speech synthesis device presenting updated versions of the first and second digits reflective of subsequent trial numbers proposed by the operator via the operator input means.

BRIEF DESCRIPTION OF THE DRAWINGS

The novel features believed characteristic of the invention are set forth in the appended claims. The invention itself, however, as well as preferred modes of use, further objects and advantages thereof, will be best understood by reference to the following detailed description of an illustrative embodiment when read in conjunction with the accompanying drawings, wherein:

FIGS. 4*a* and 4*b* form a composite block diagram (when placed side by side) of the speech synthesis chip employed in the electronic arithmetic learning aid in accordance with the present invention;

Figure 10A:
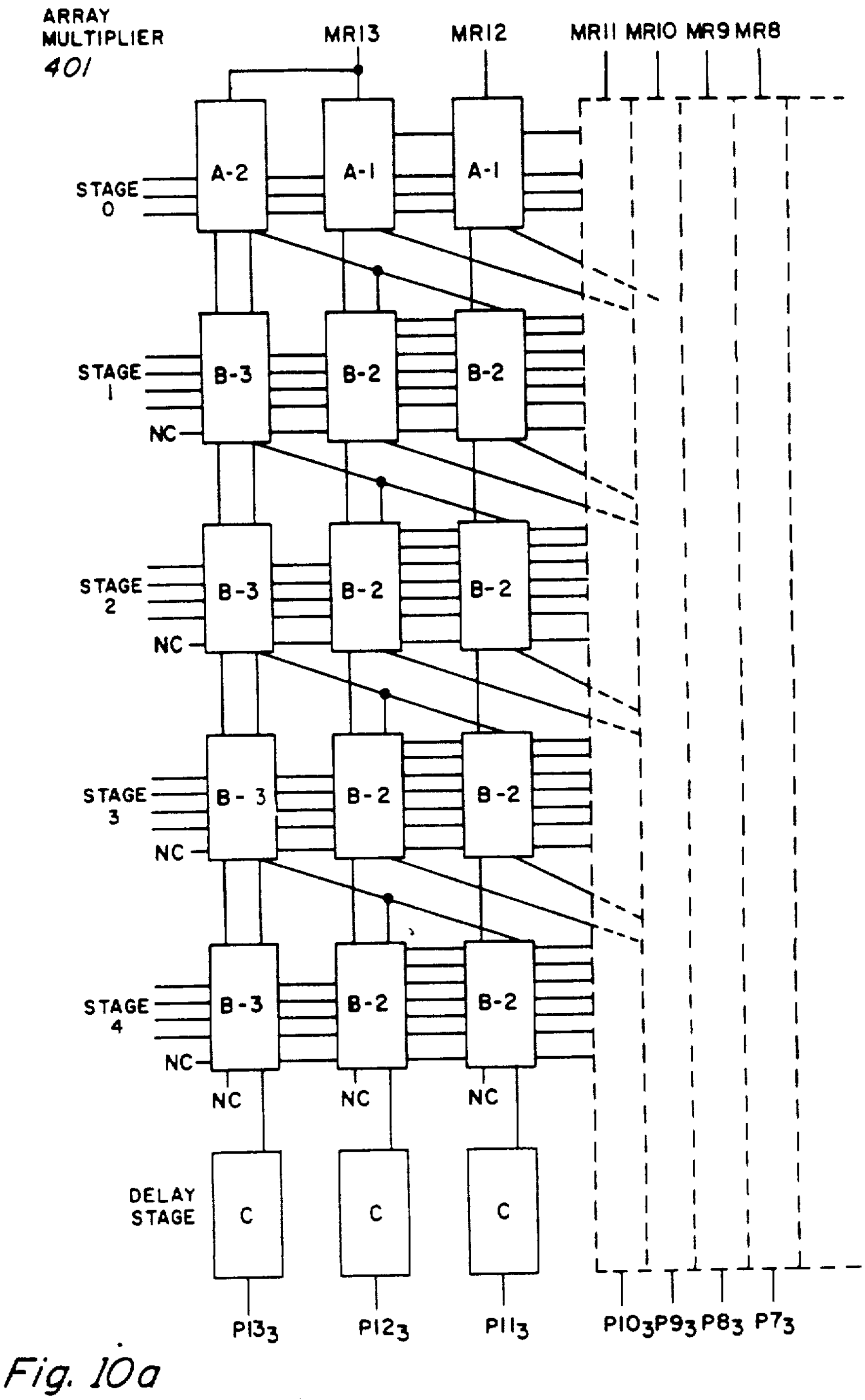
Figure 10B:
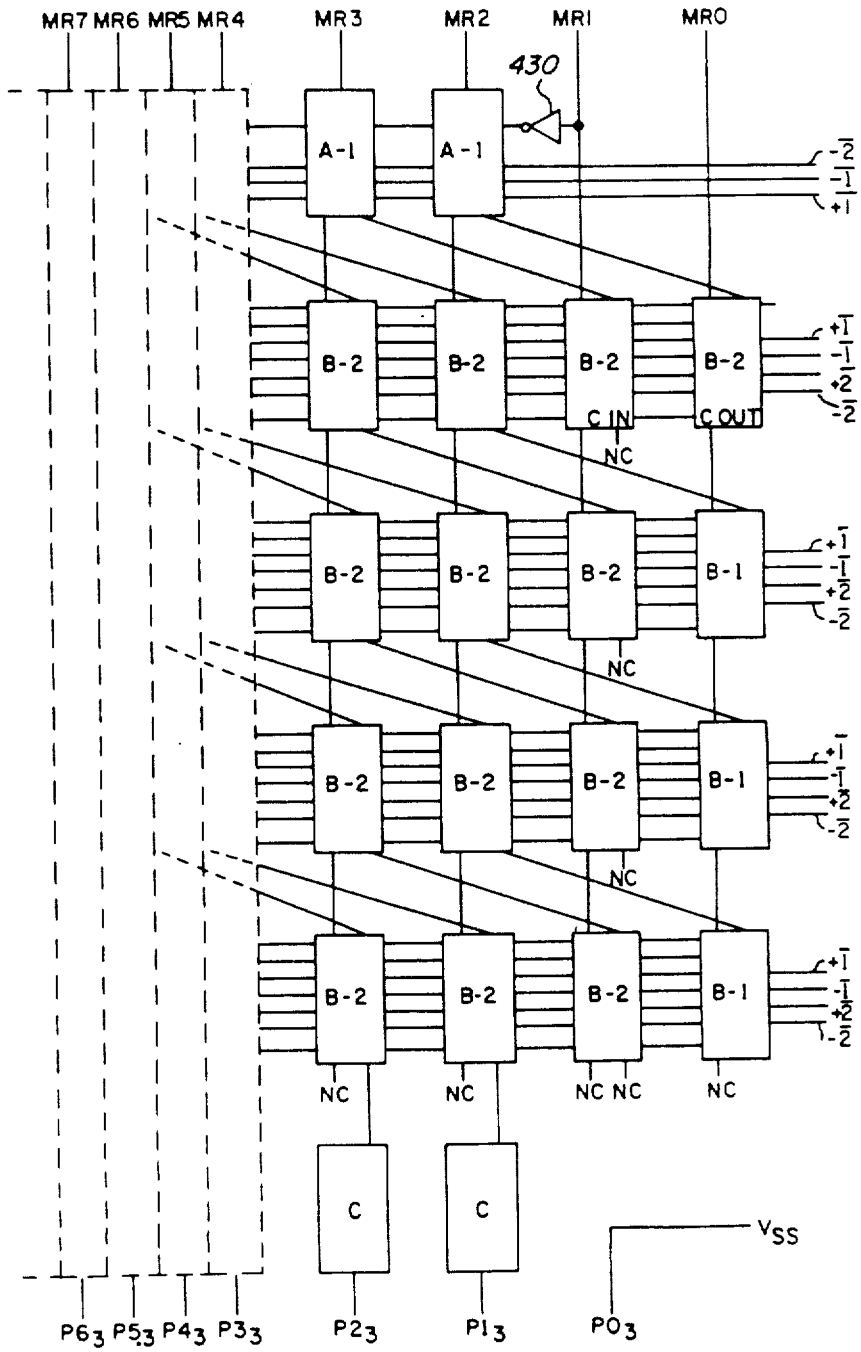
Figure 10C:
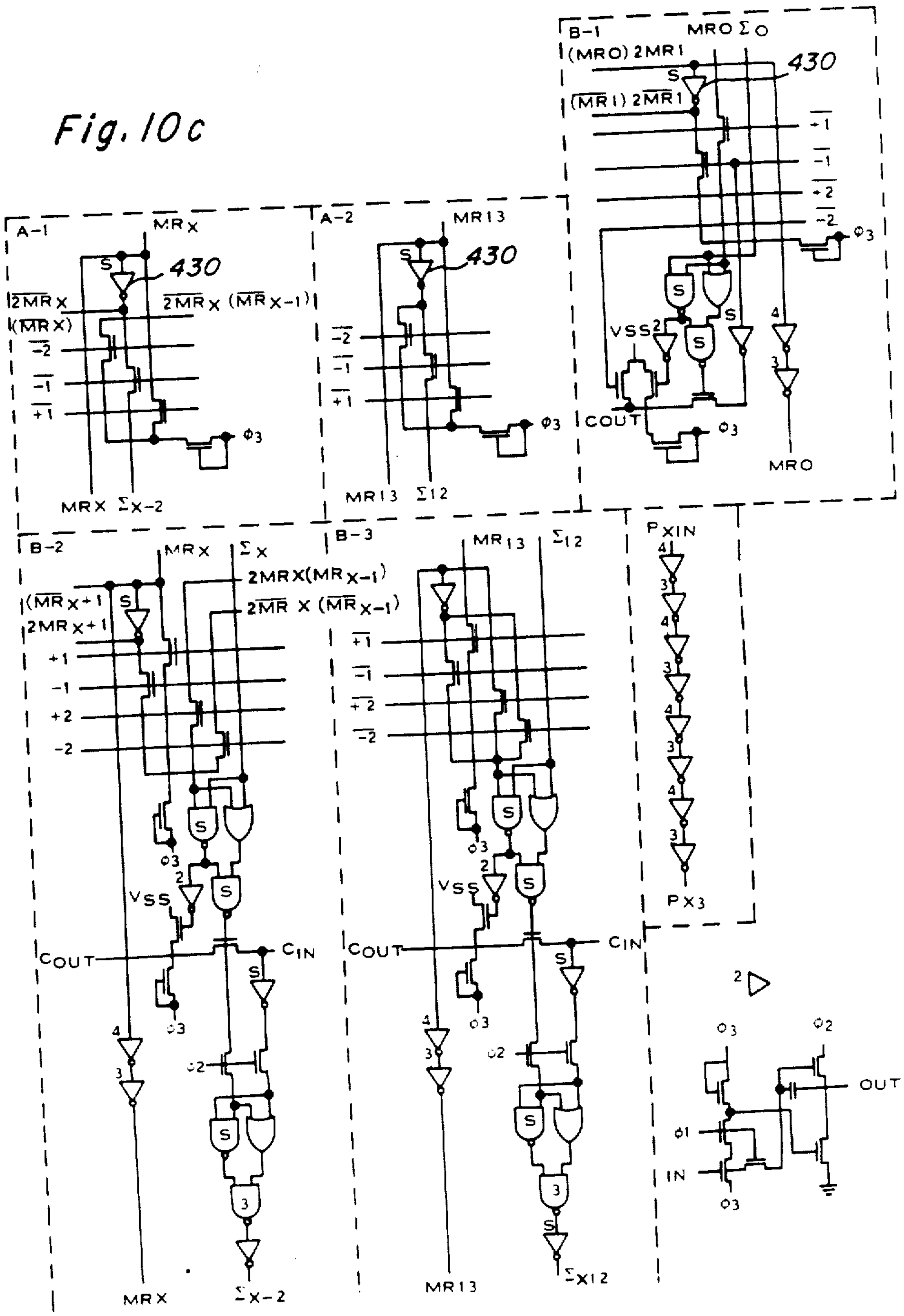
Figure 11A:
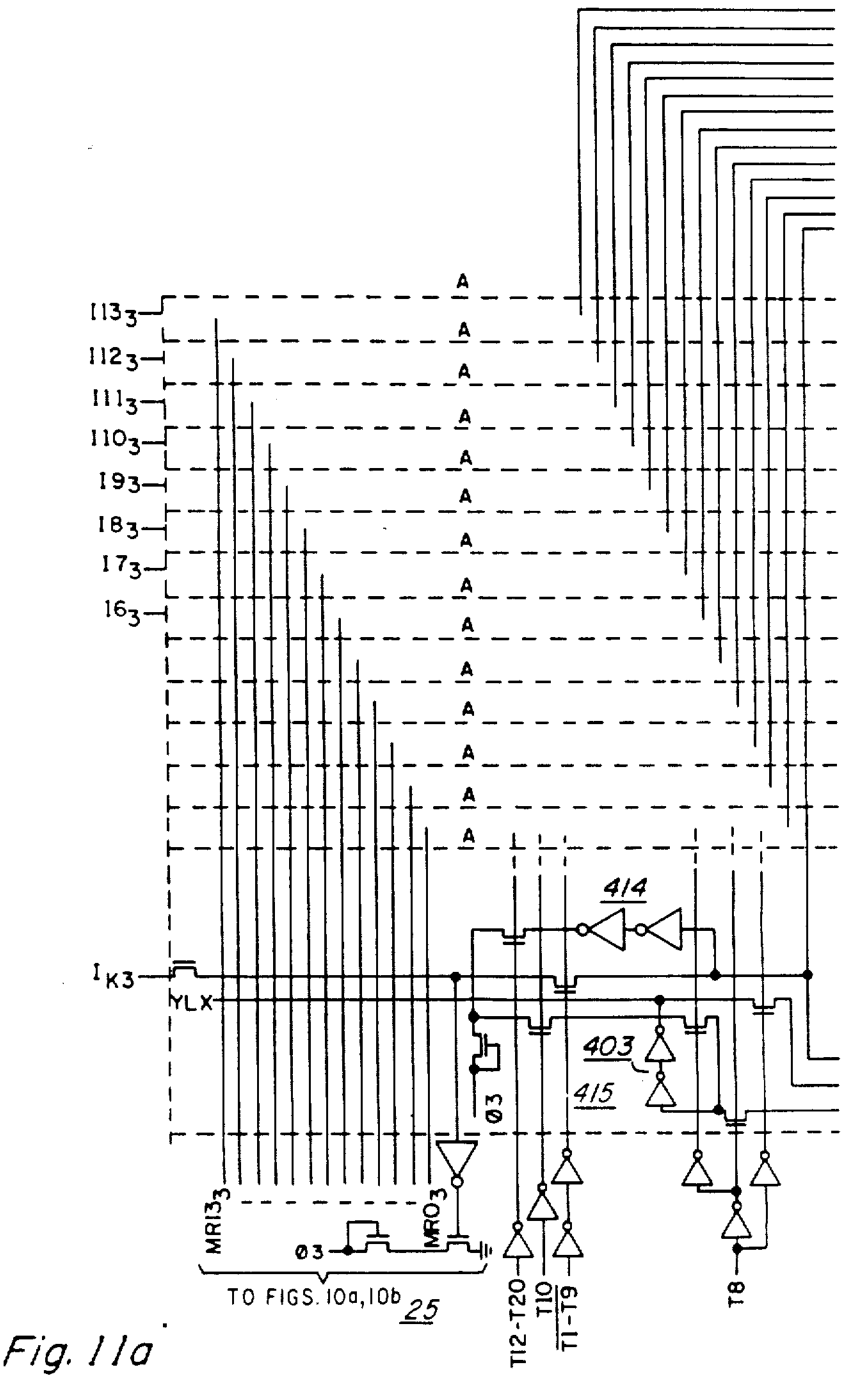
Figure 11B:
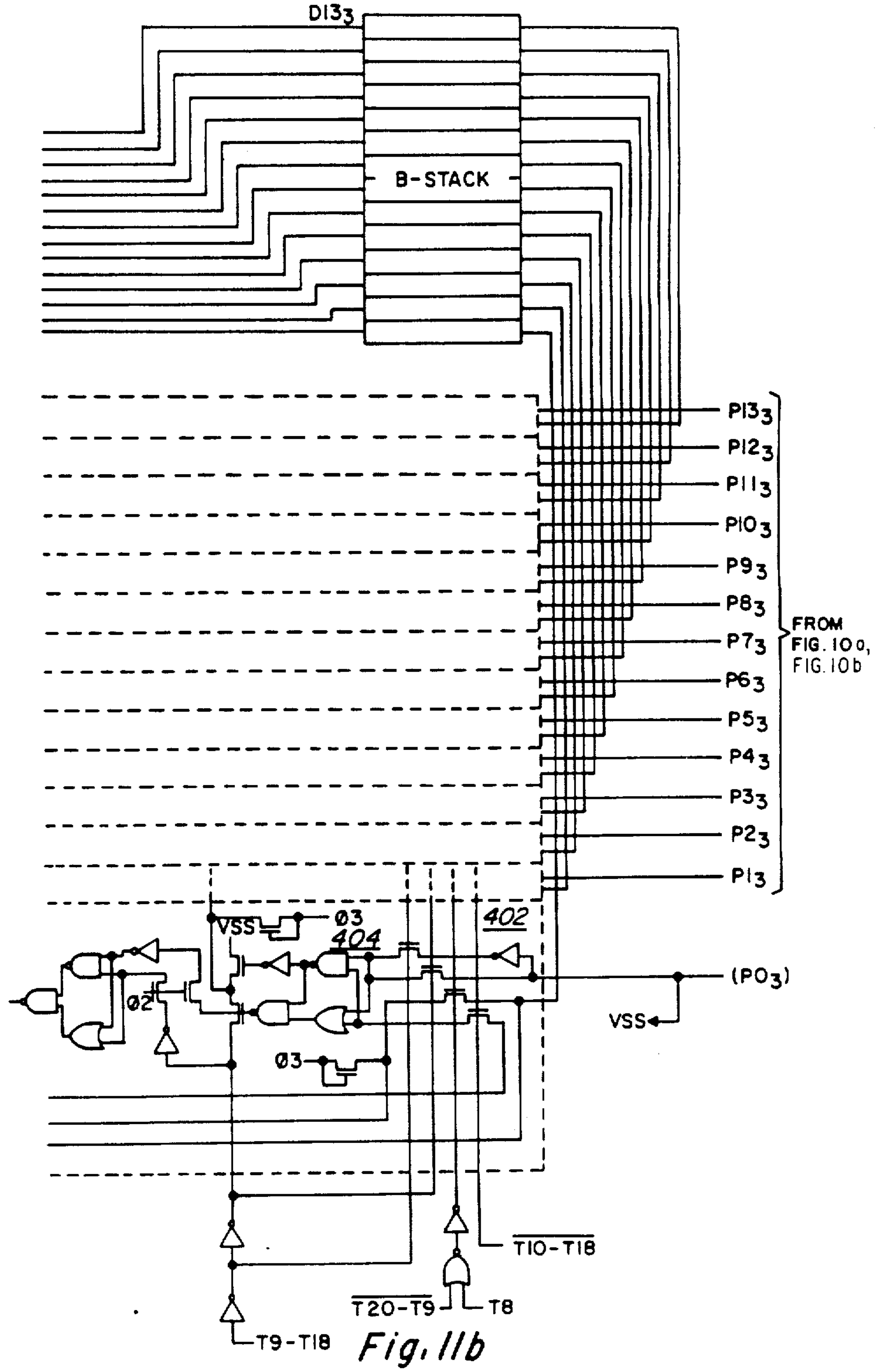
Figure 11C:
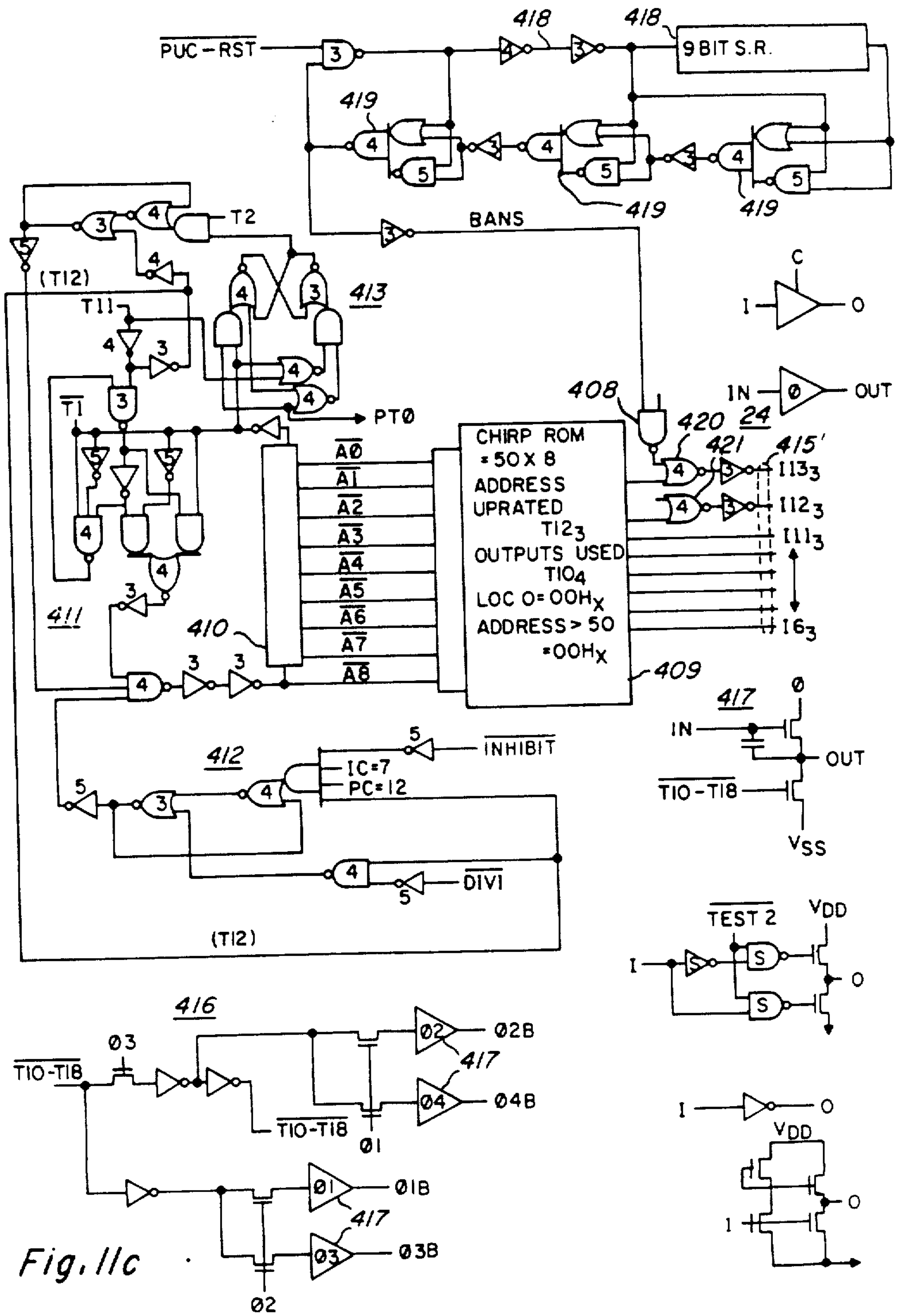
Figure 11D:
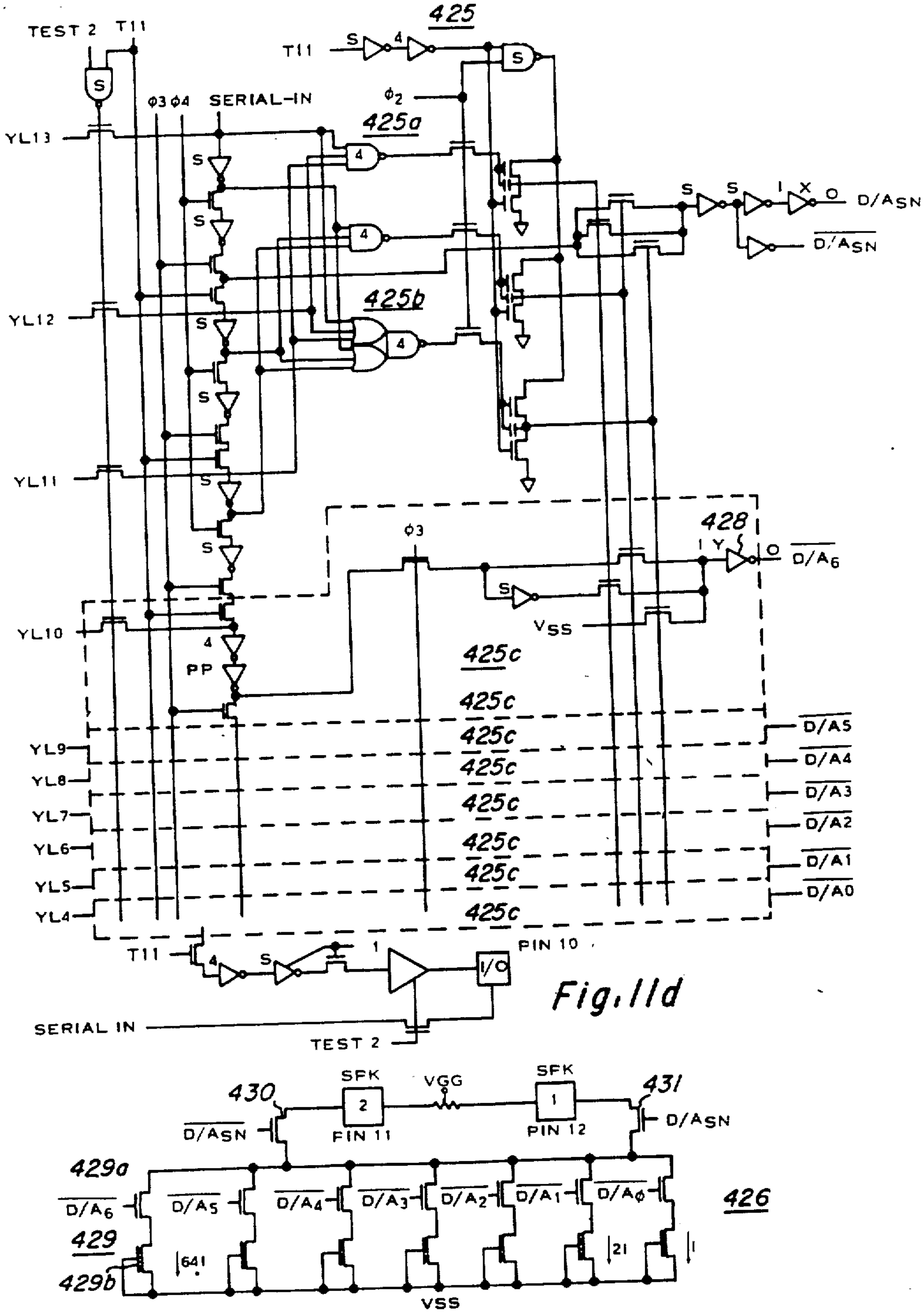
Figures 12A, 12B:
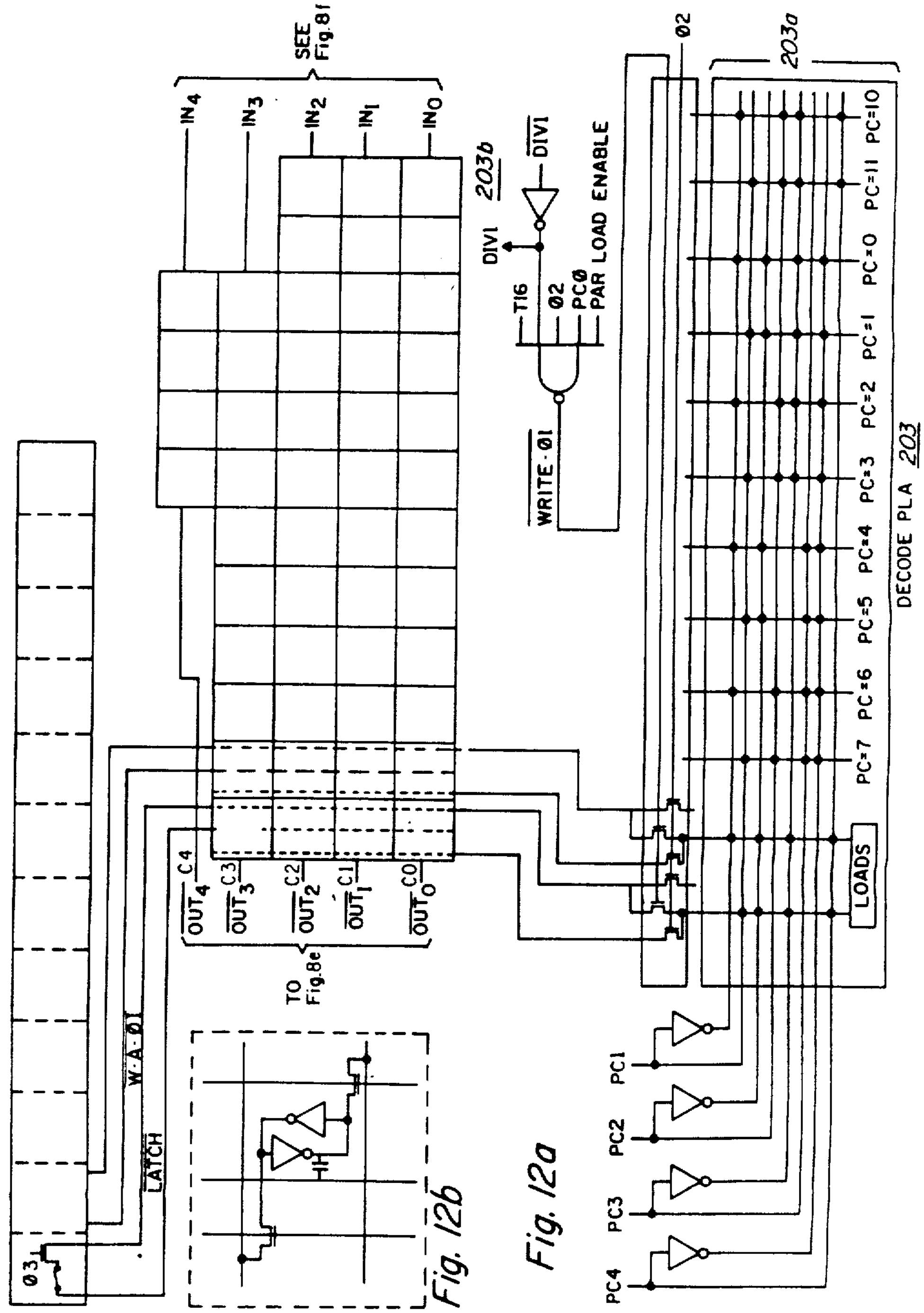
Figure 13A:
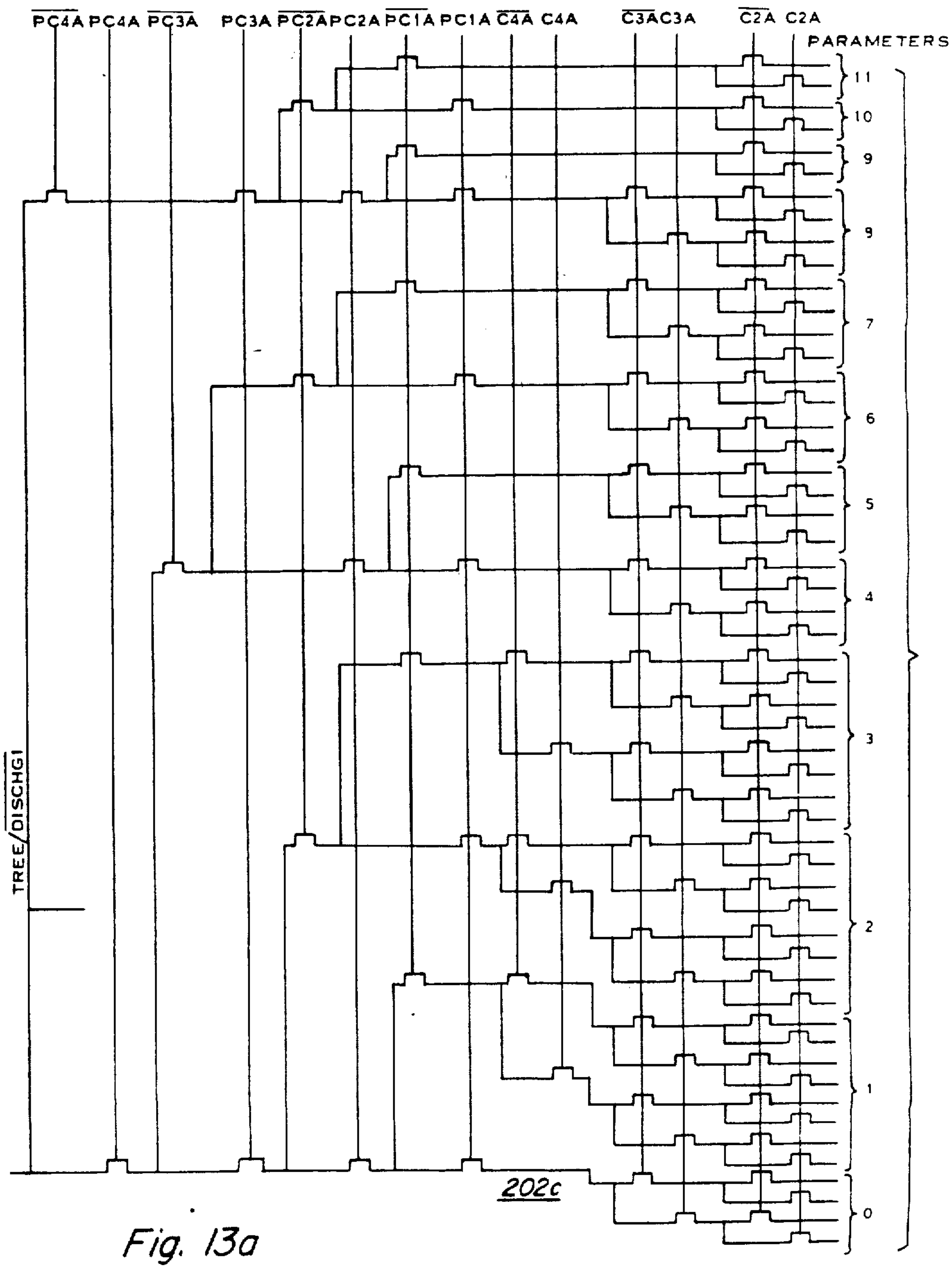
Figure 13B:
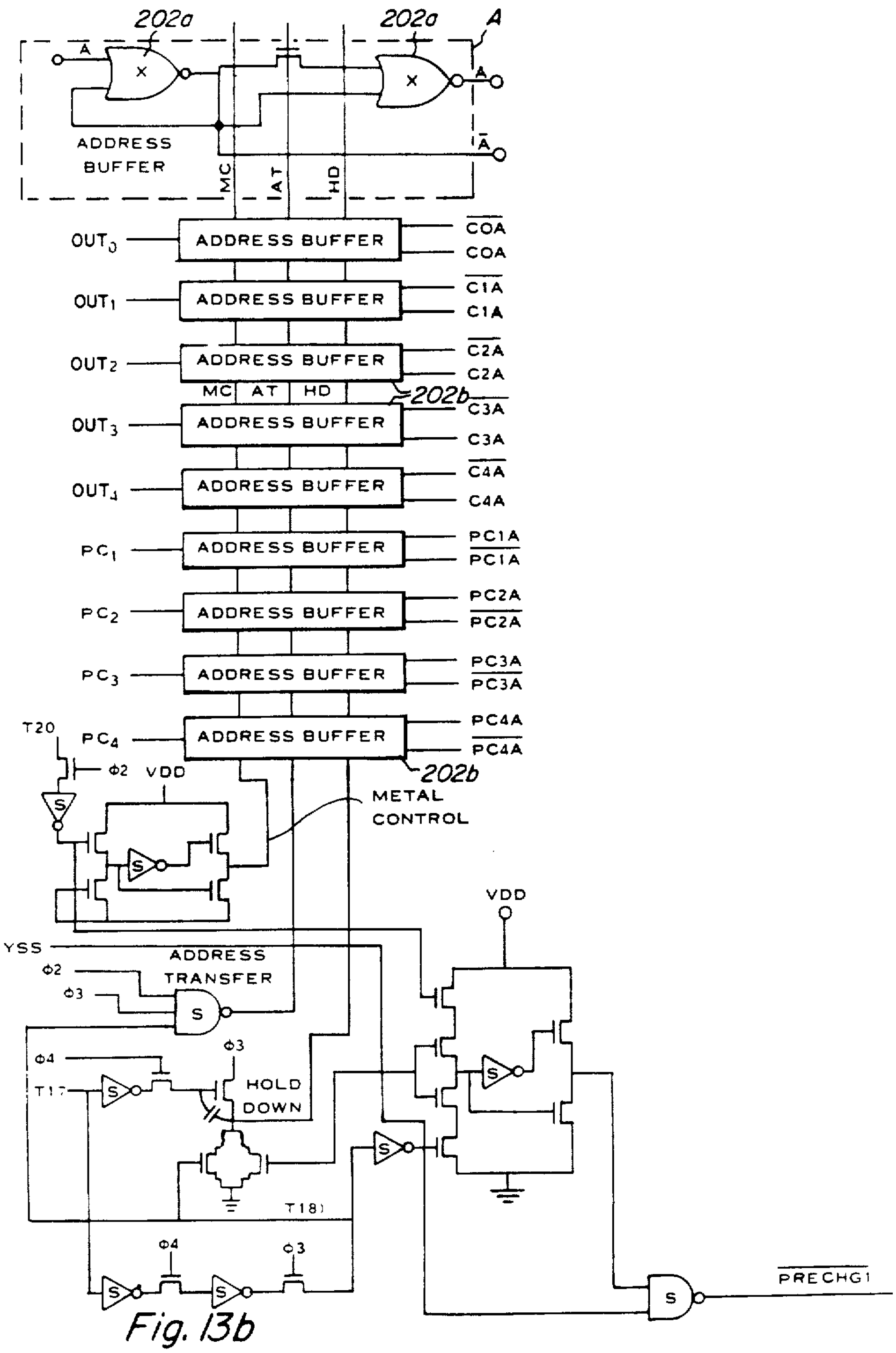
Figure 13C:
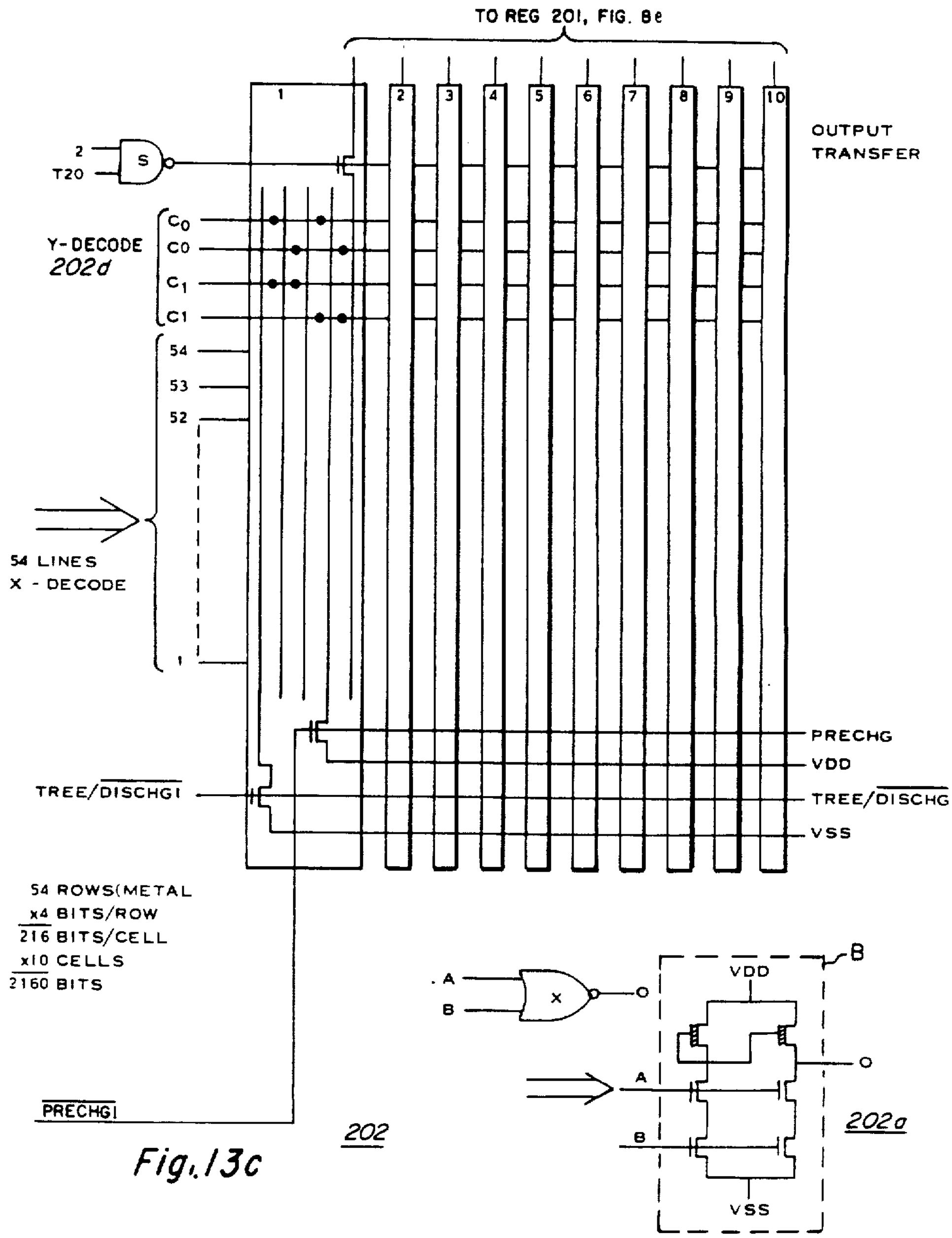
Figure 14A:
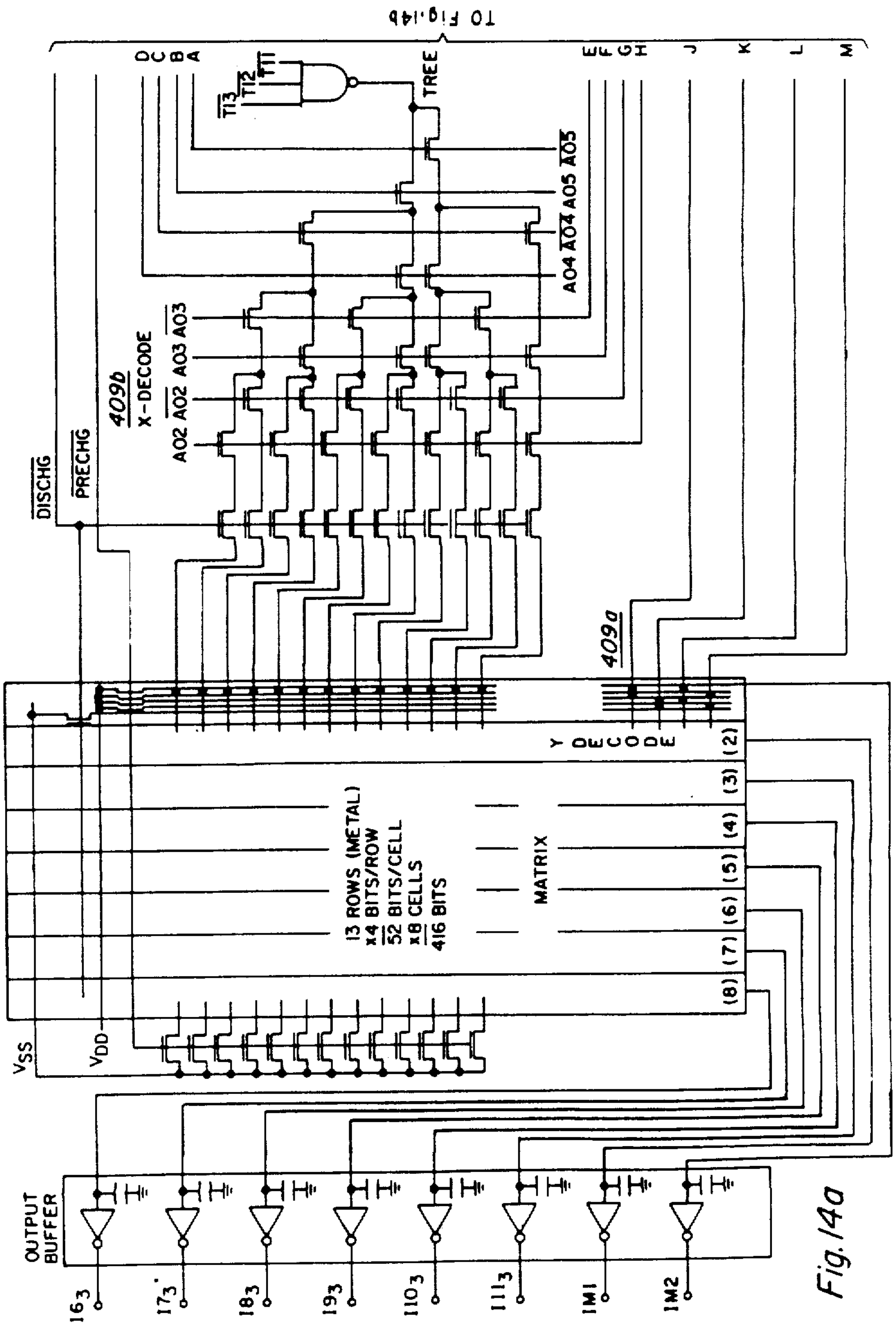
Figure 14B:
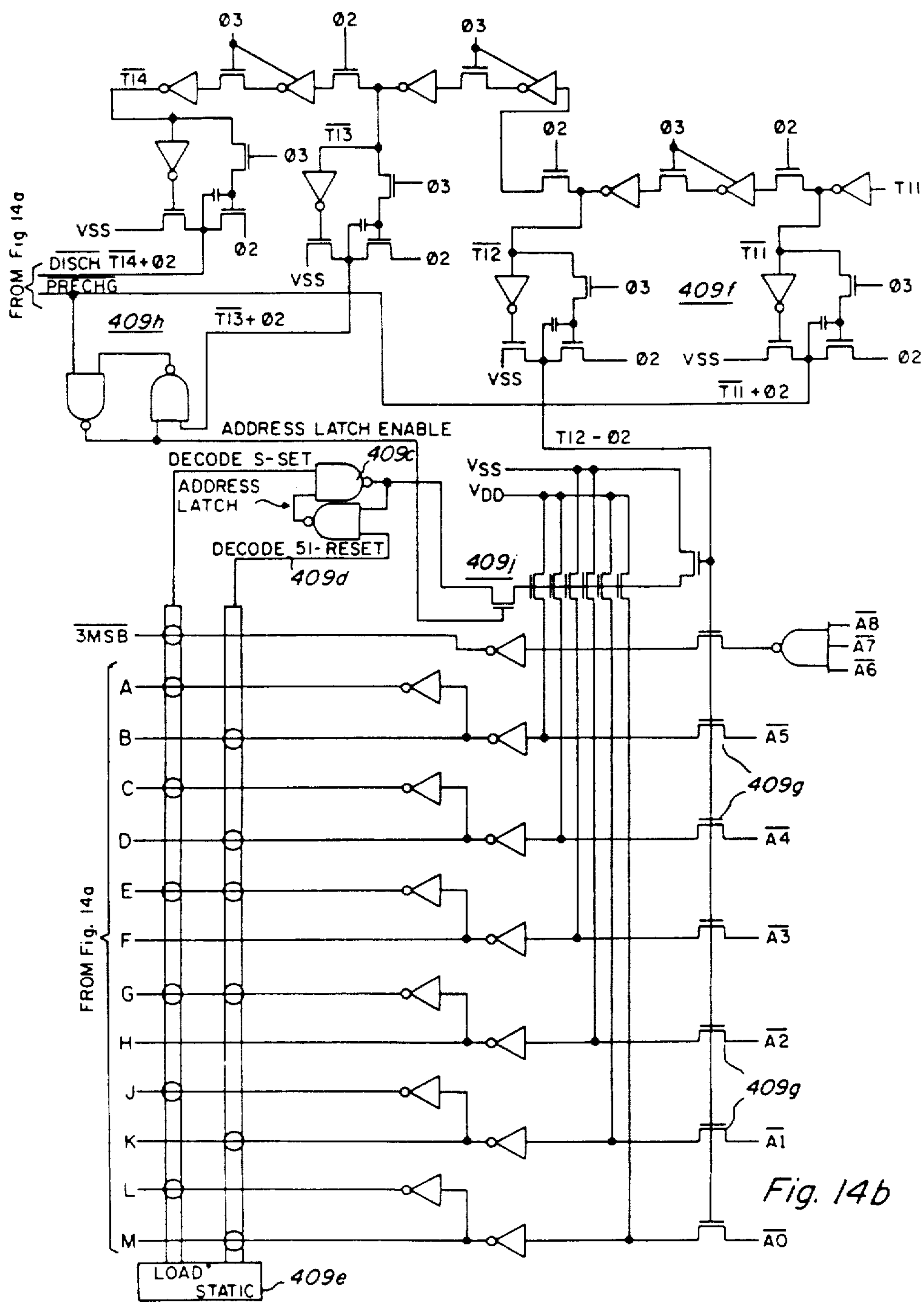
Figure 15A:
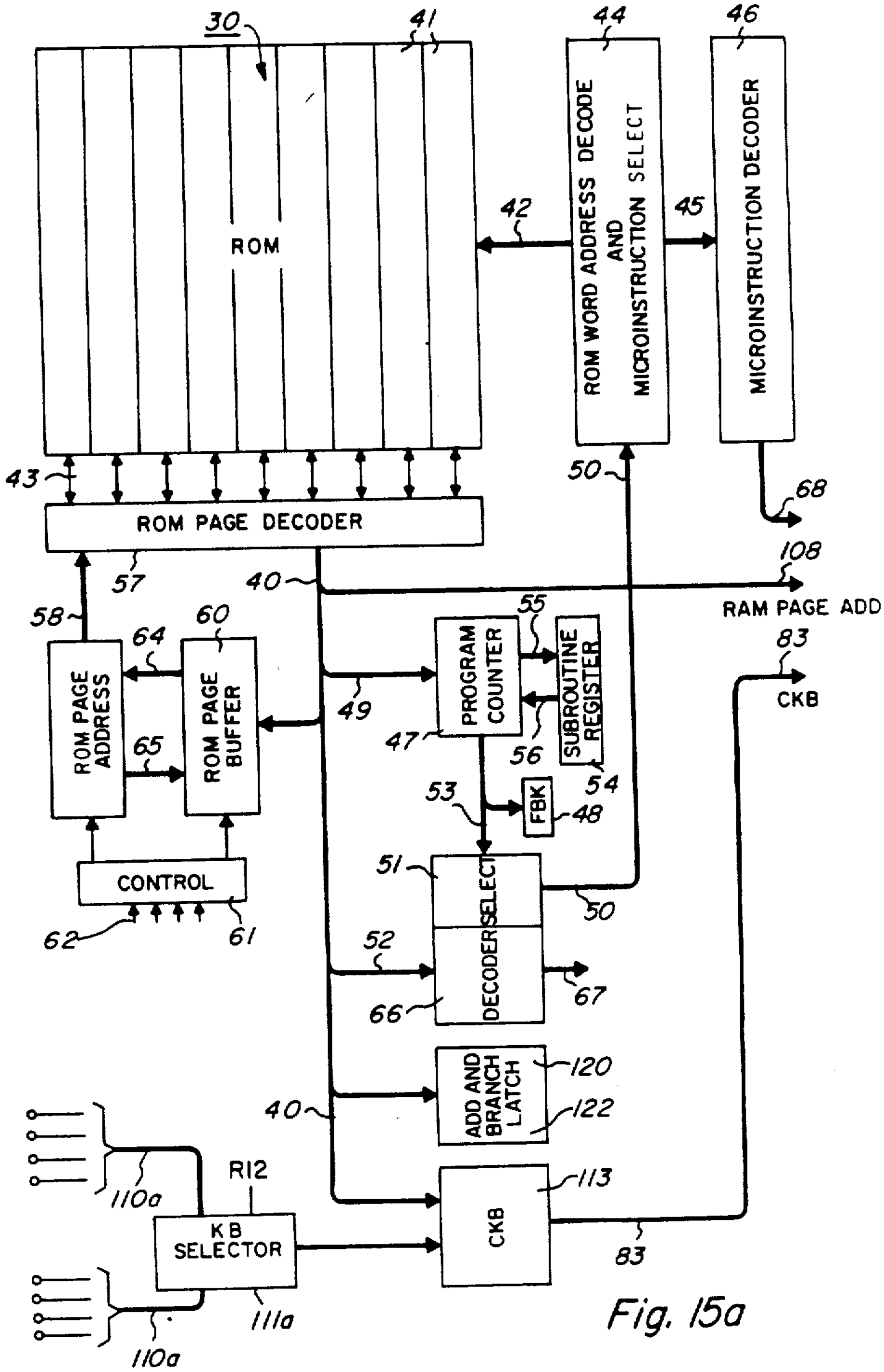
Figure 15B:
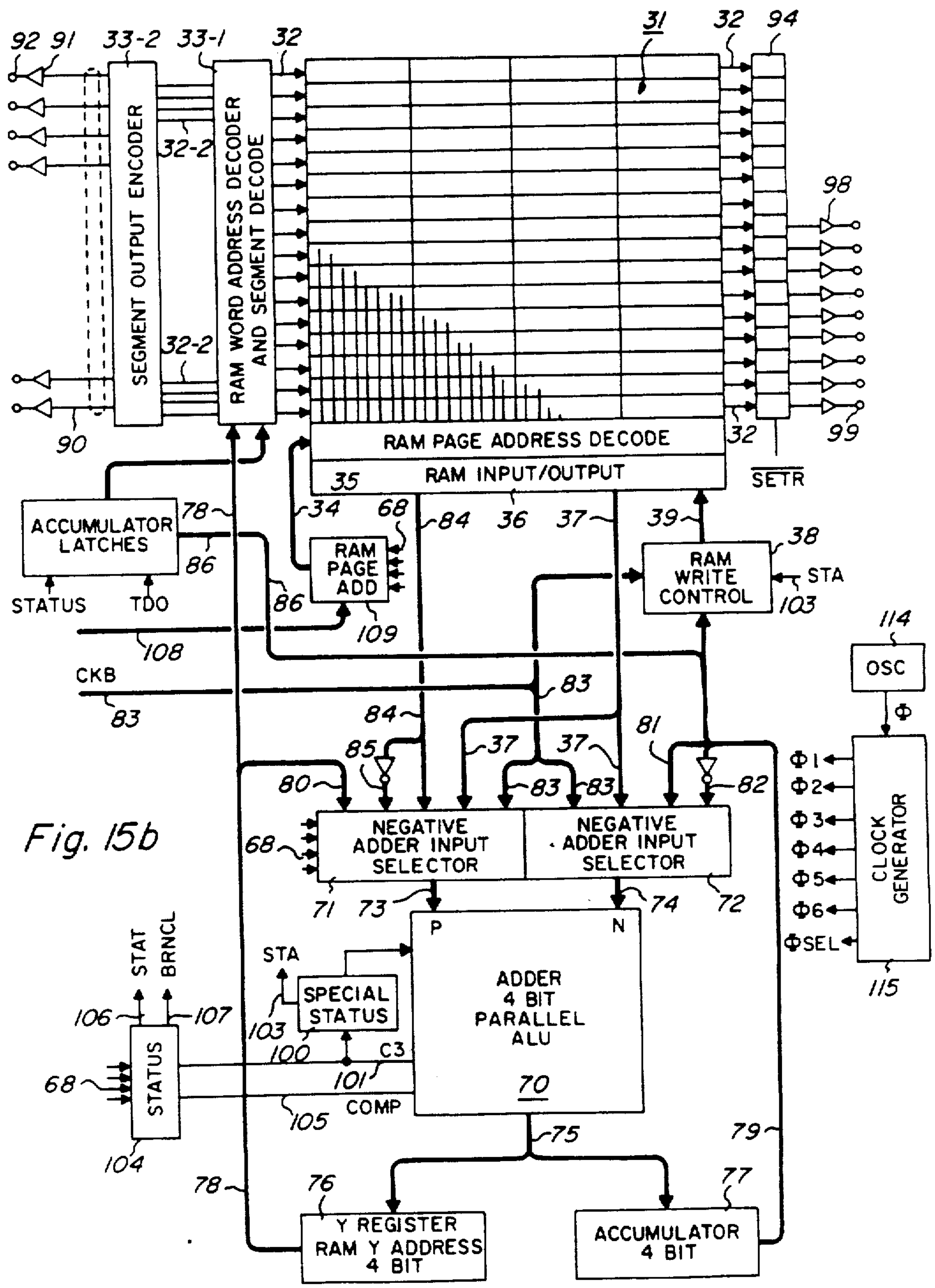
Figure 16A:
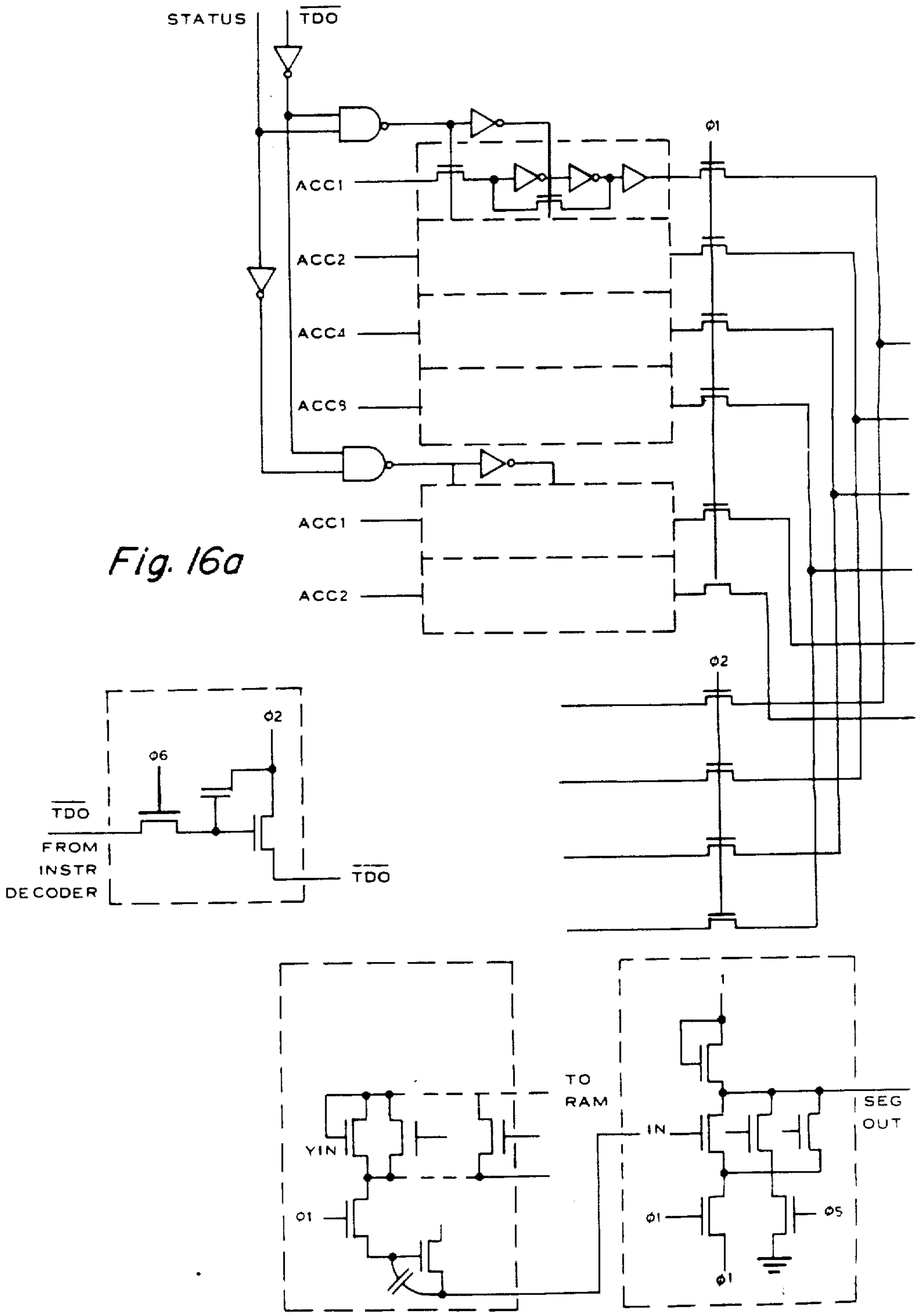
Figure 16B:
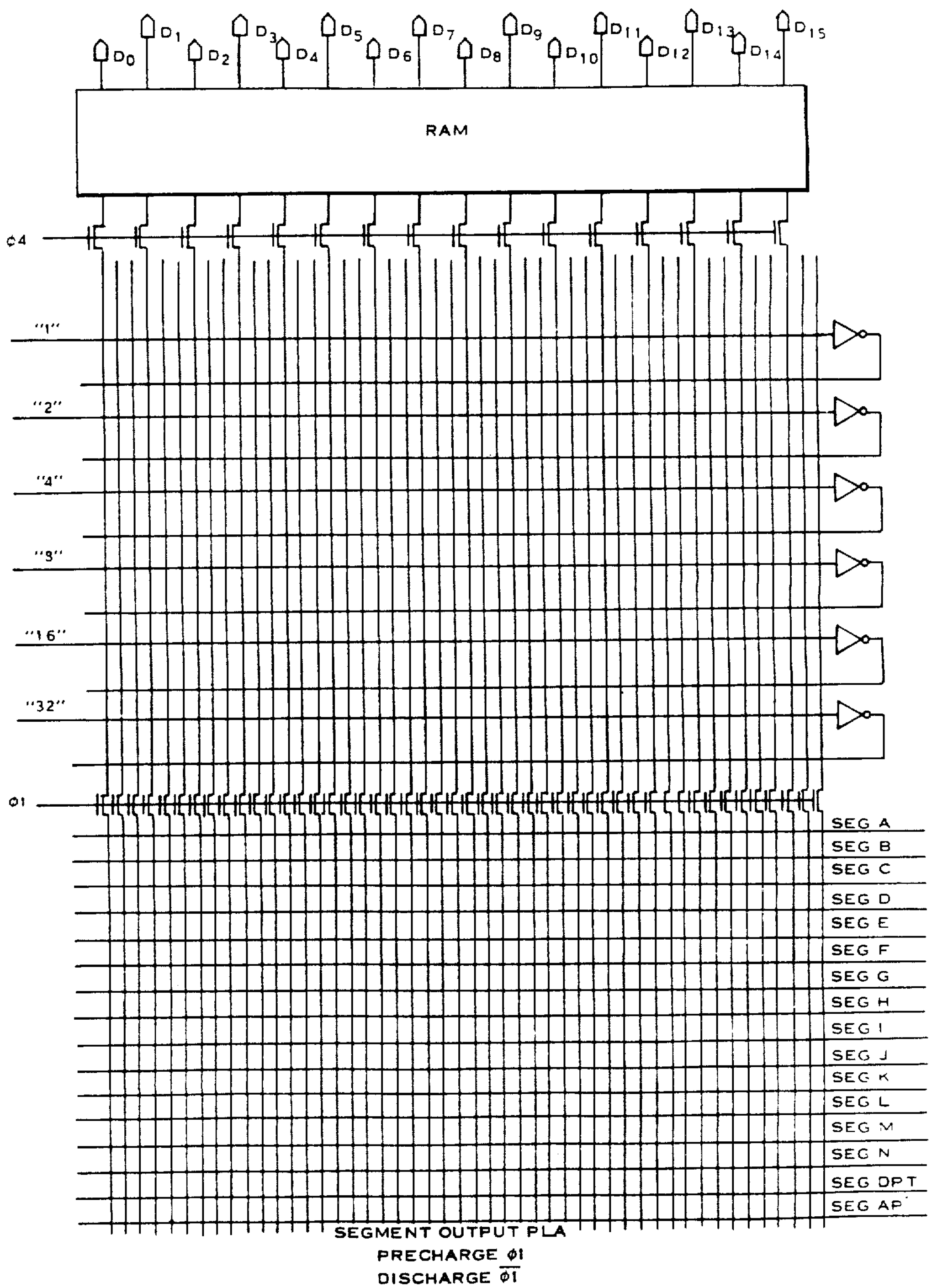
Figure 16C:
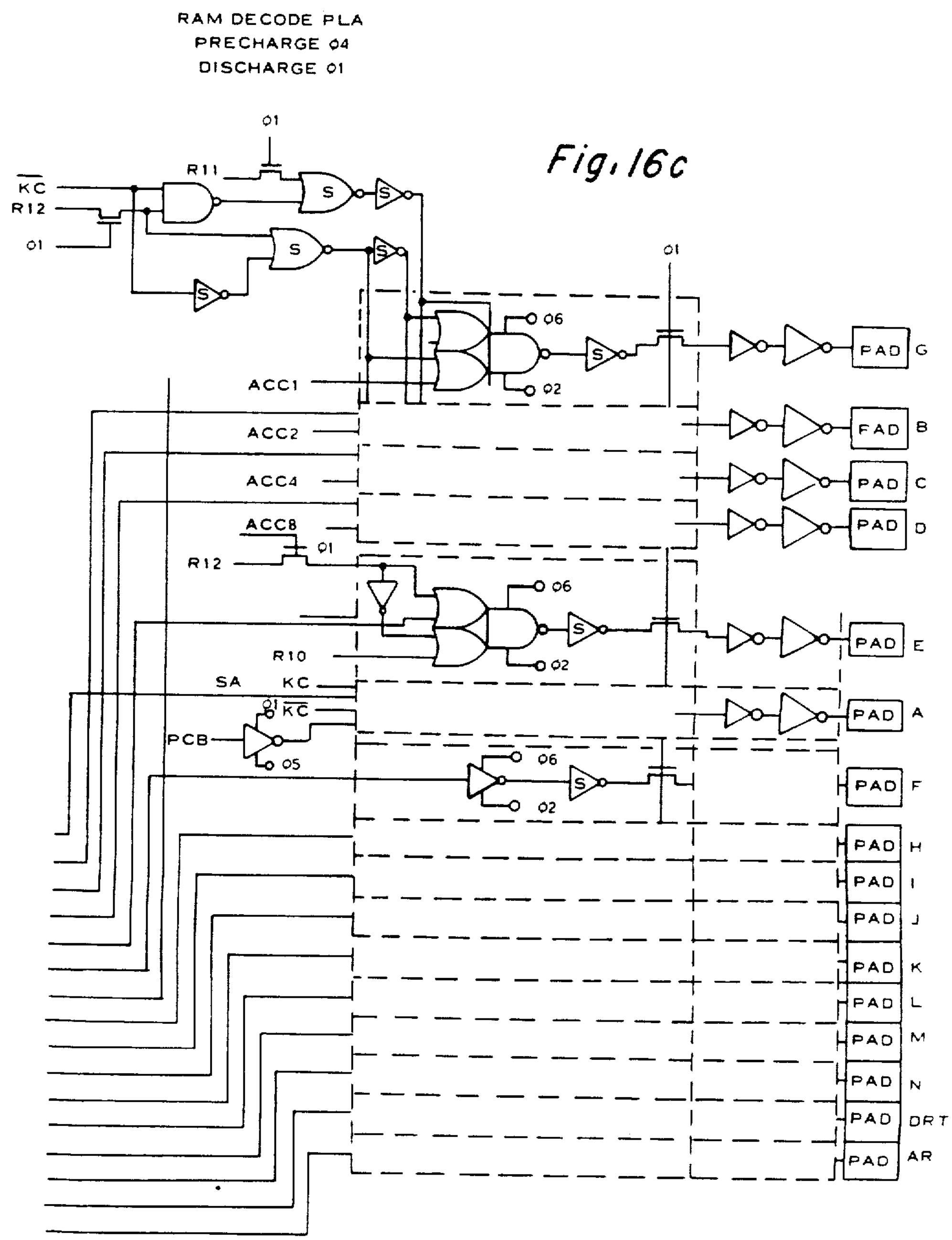
Figure 17:
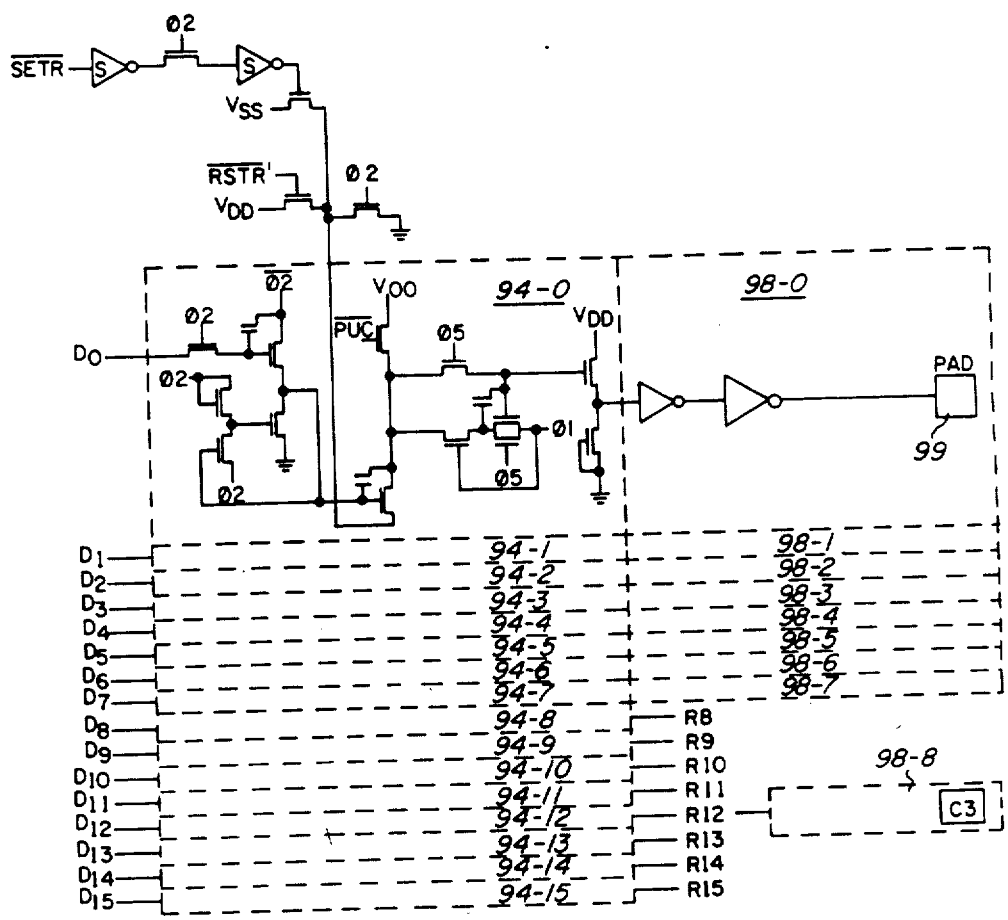
Figure 18:
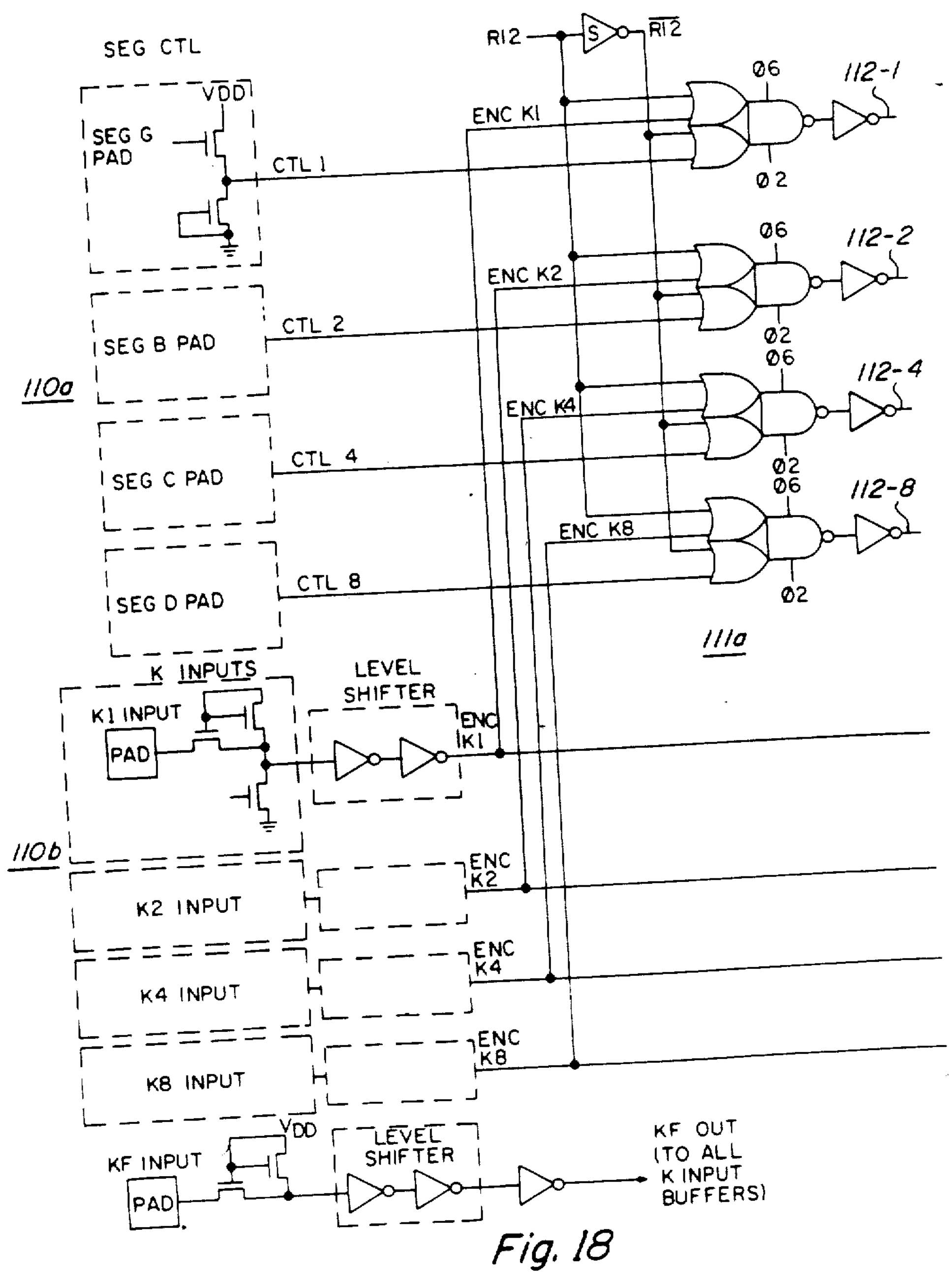
Figure 19:
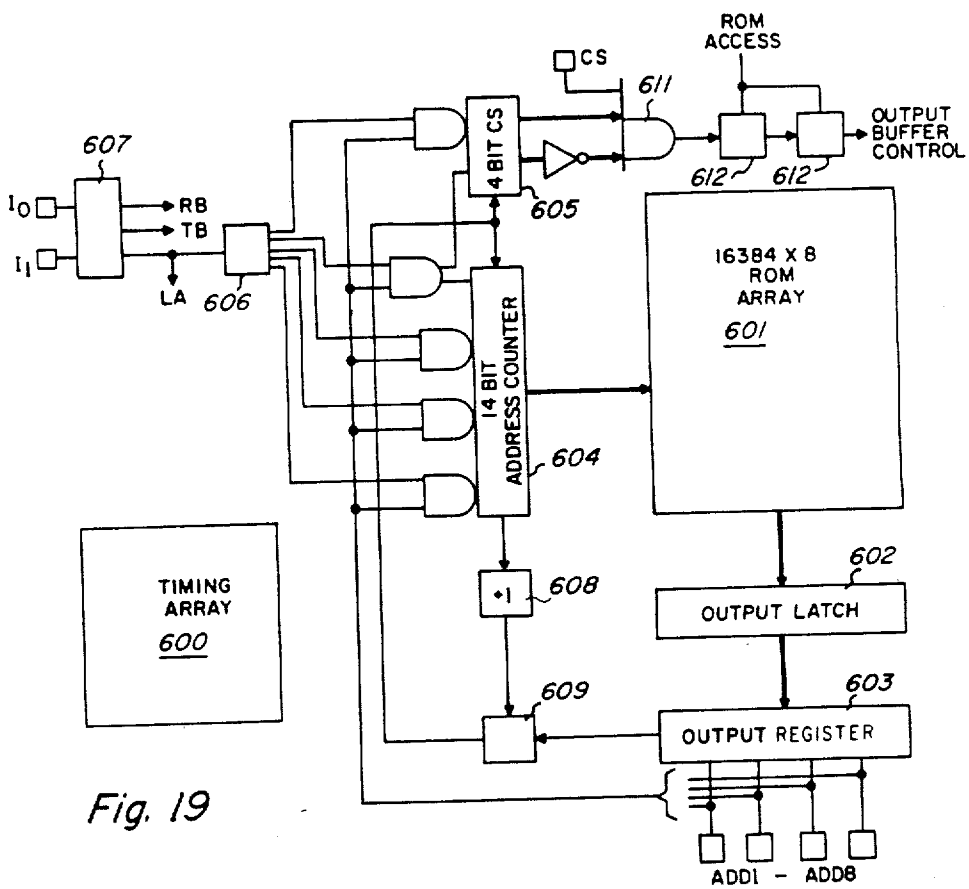
Figure 20A:
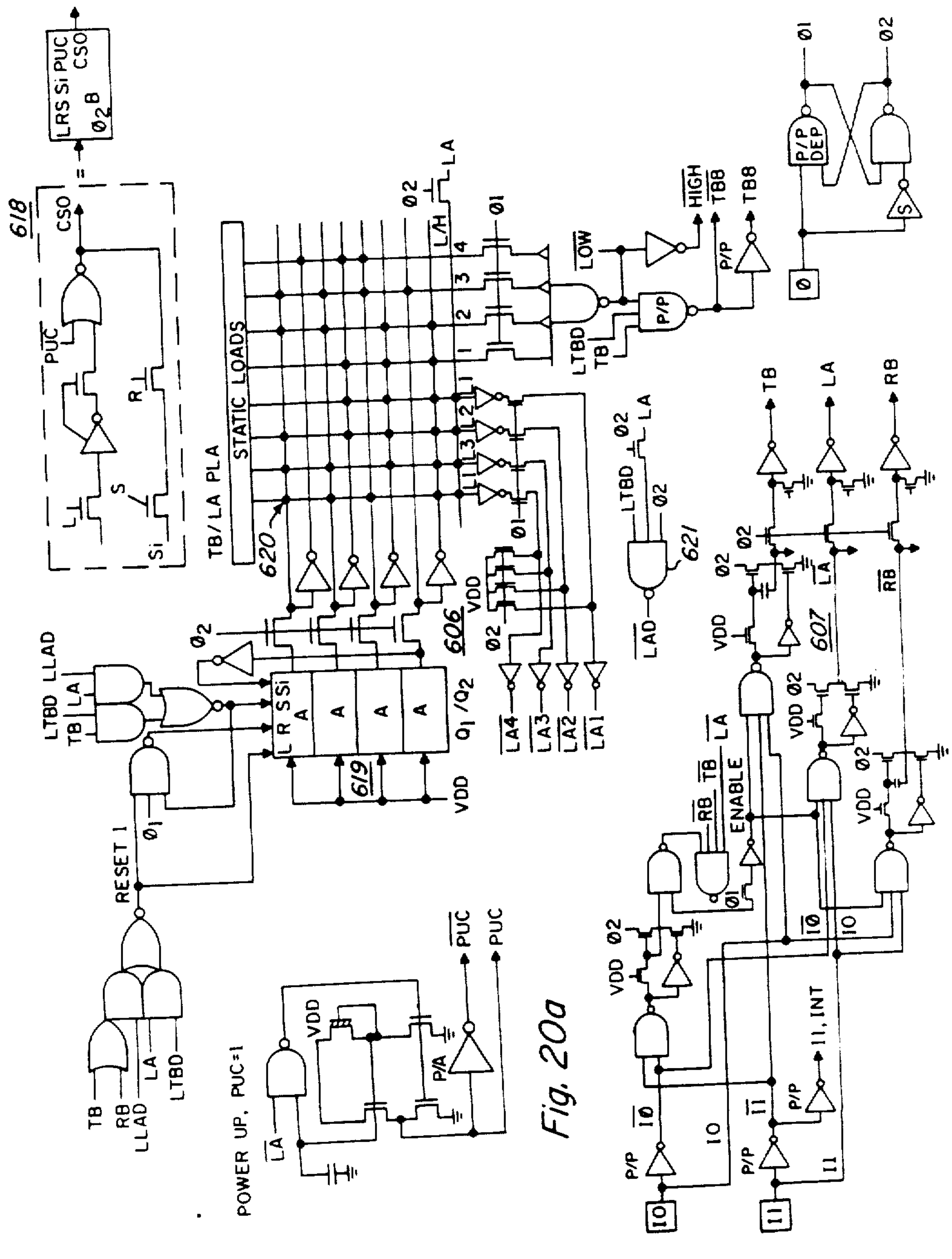
Figure 20B:
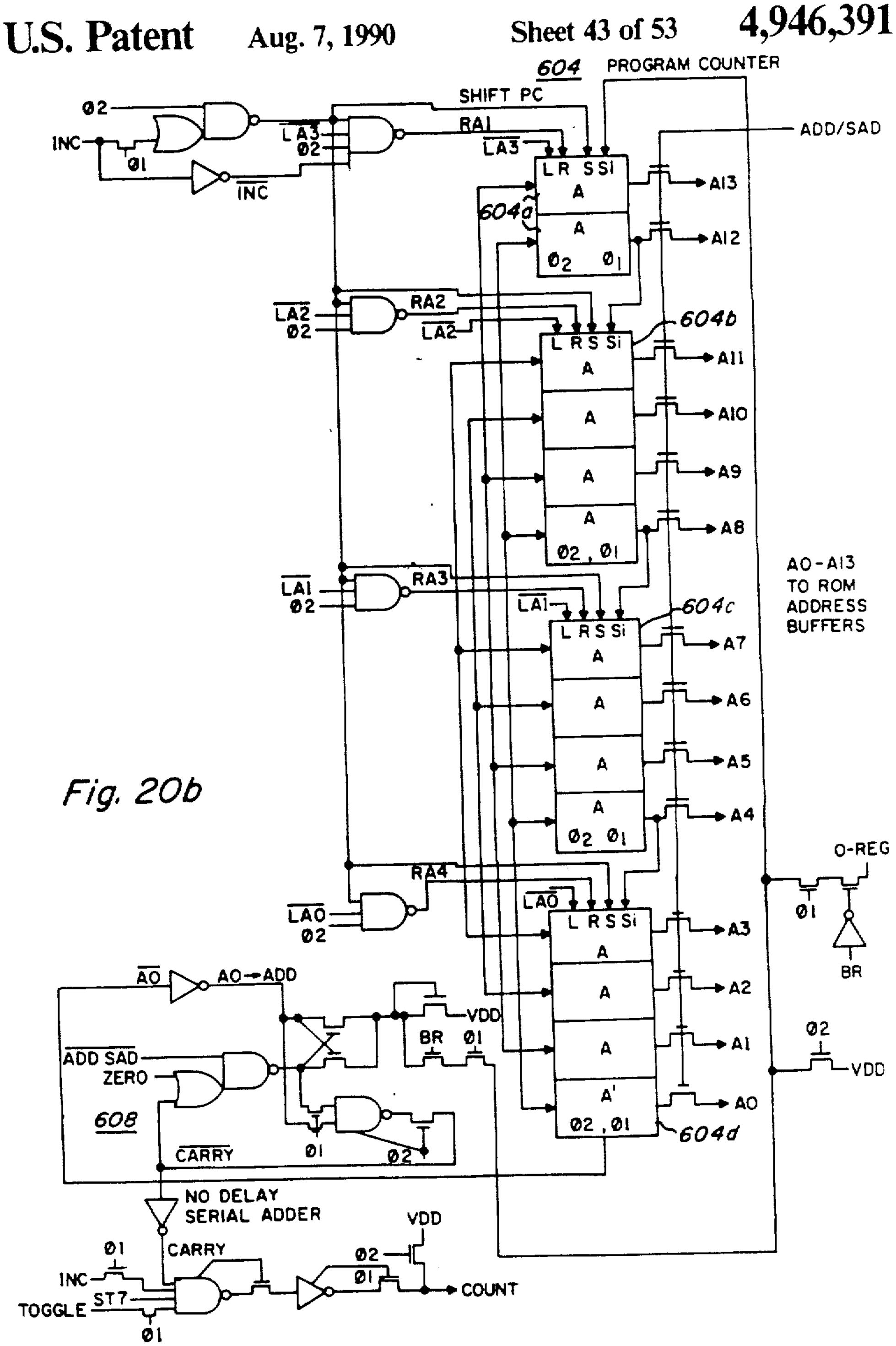
Figure 20C:
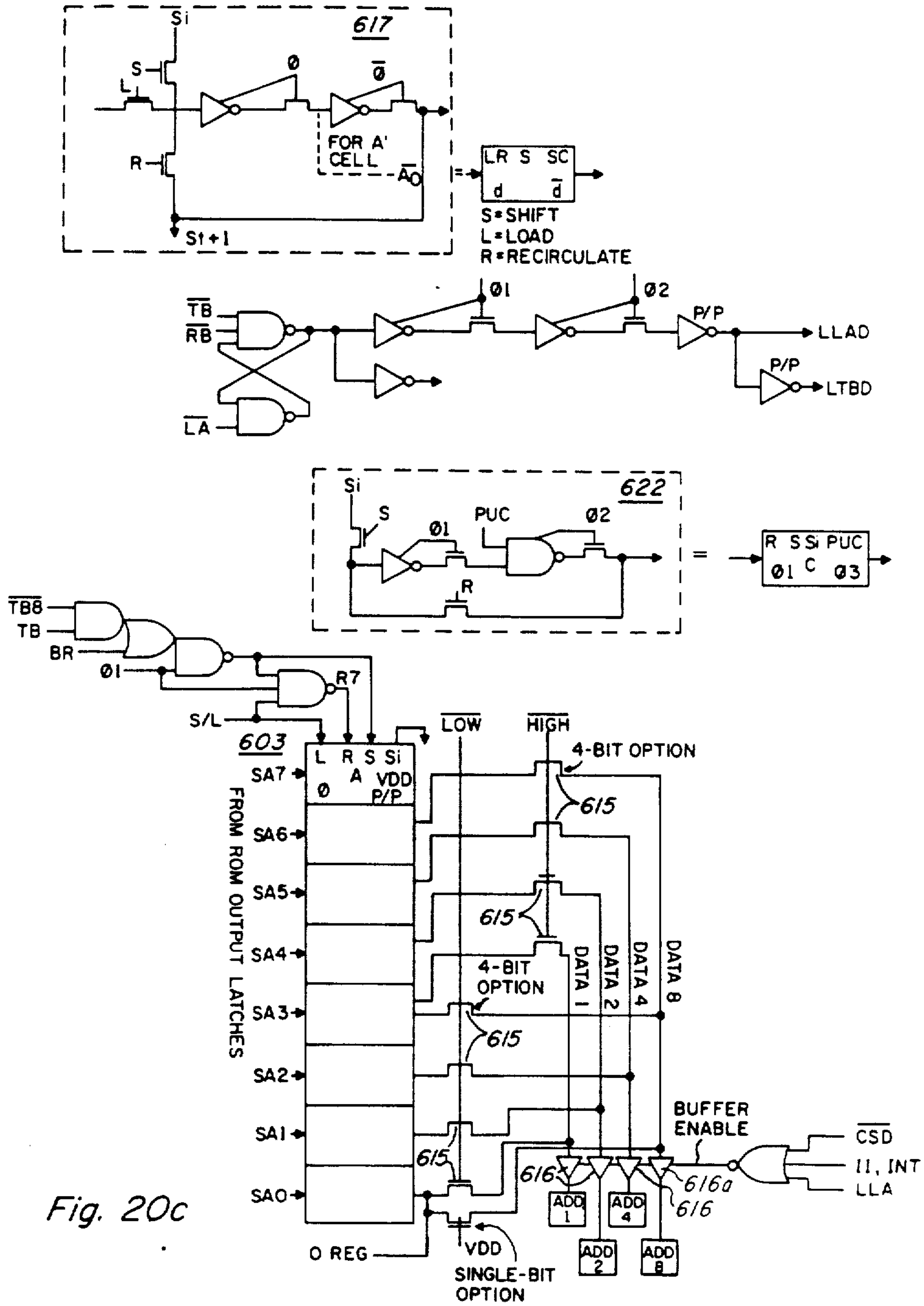
Figure 20D:
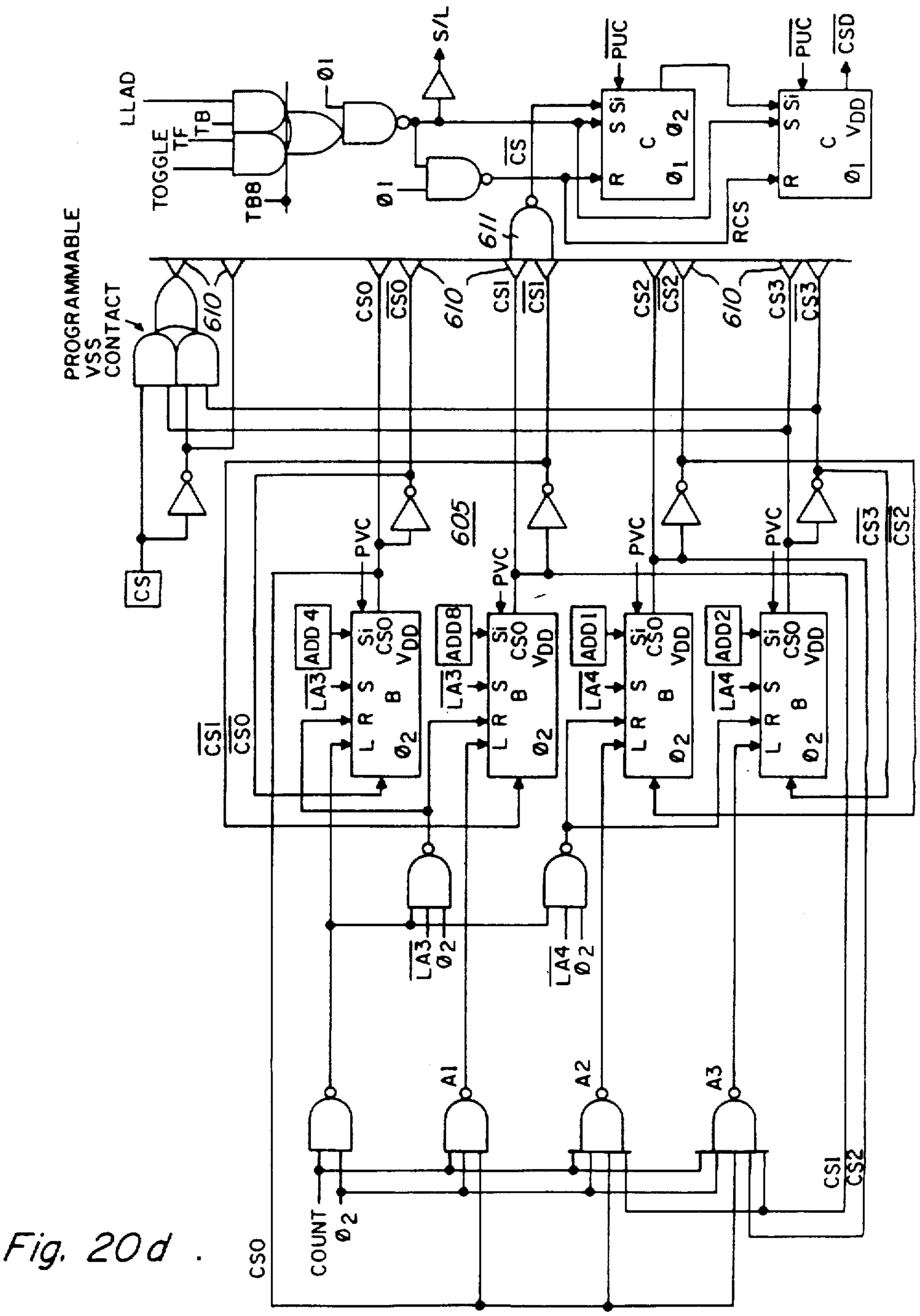
Figure 20E:
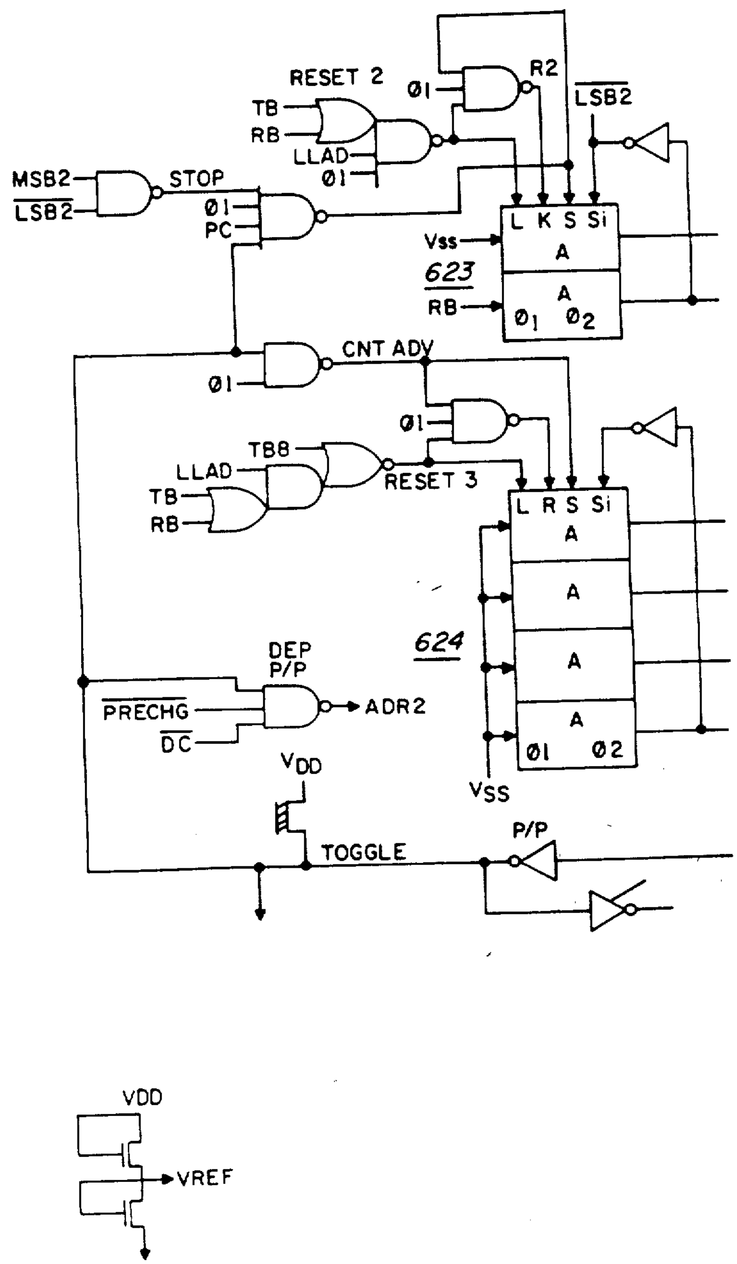
Figure 20F:
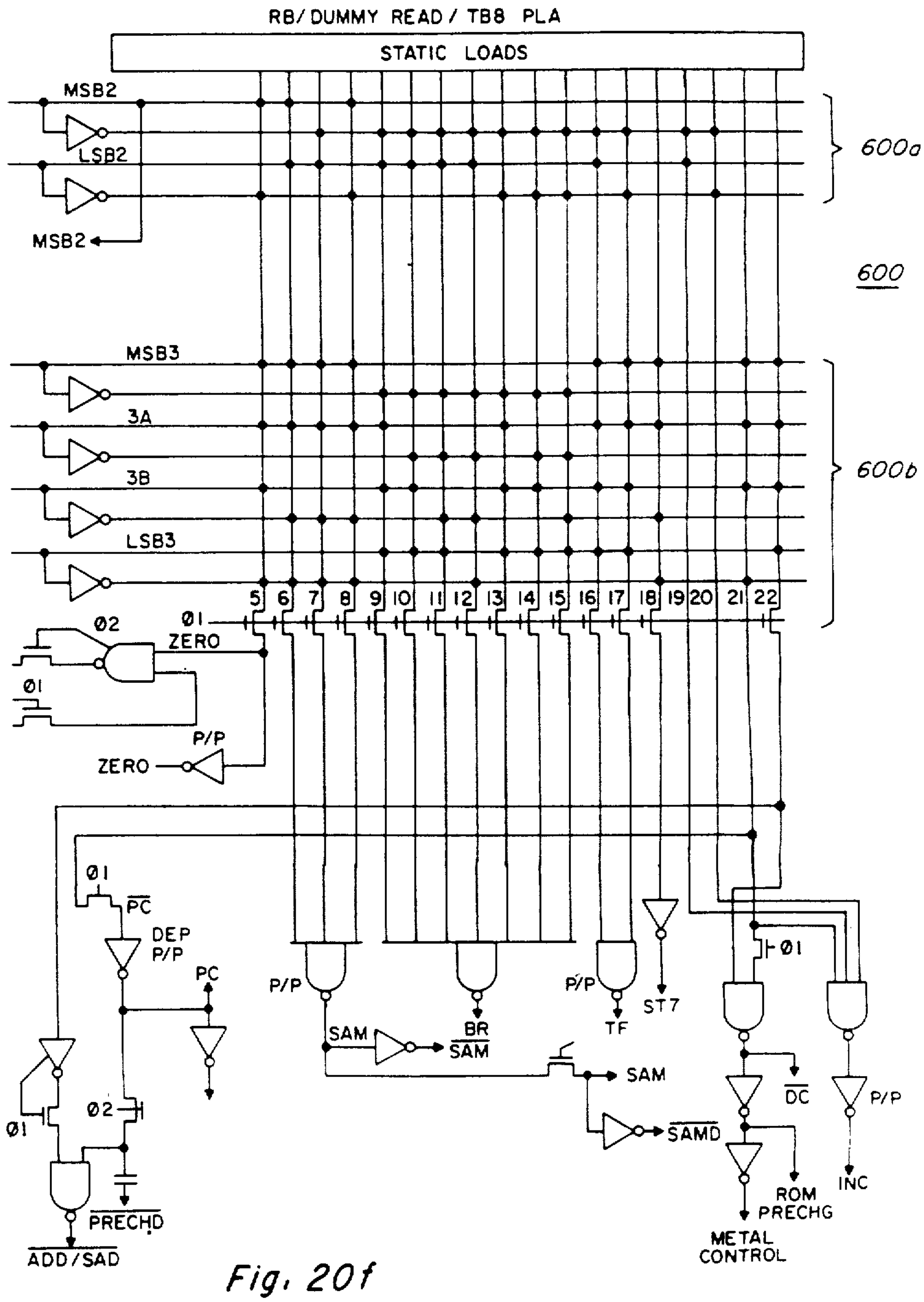
Figure 22:
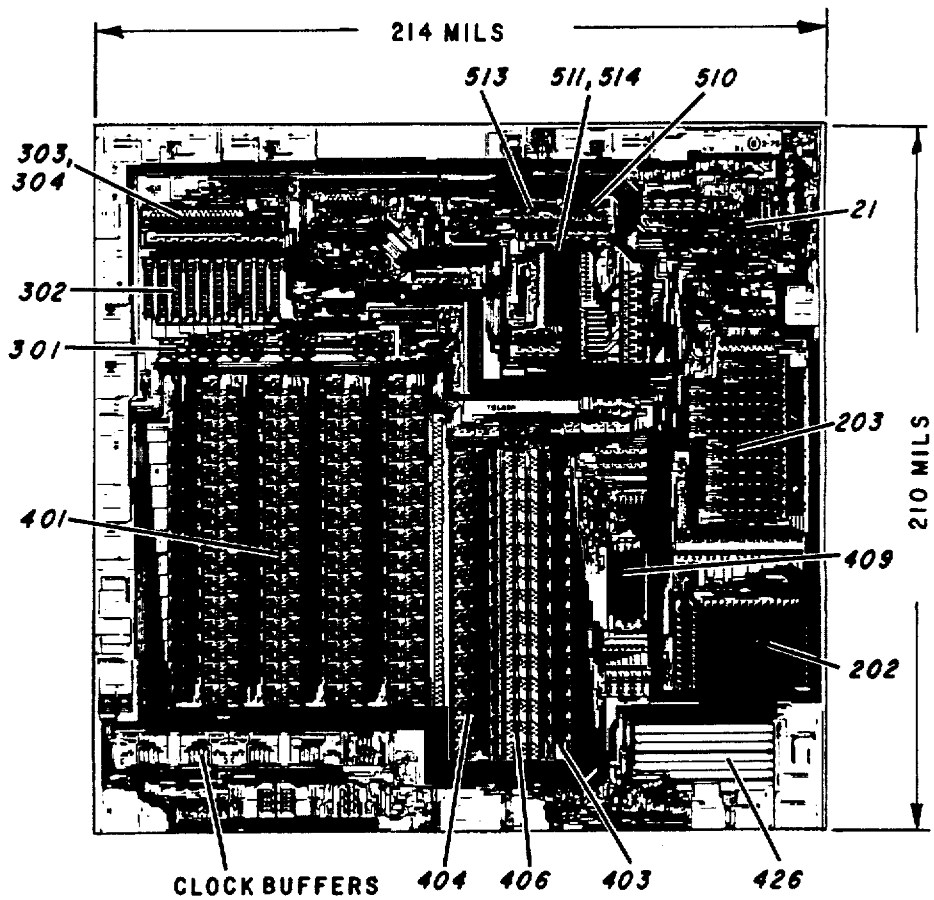
Figure 23A:
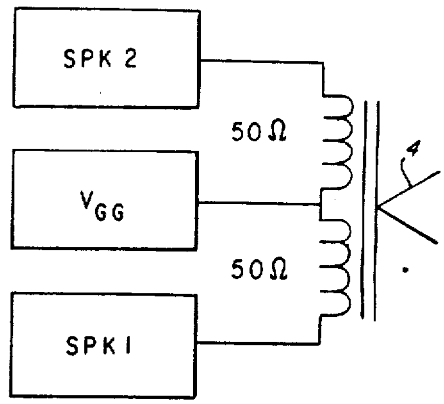
Figure 23B:
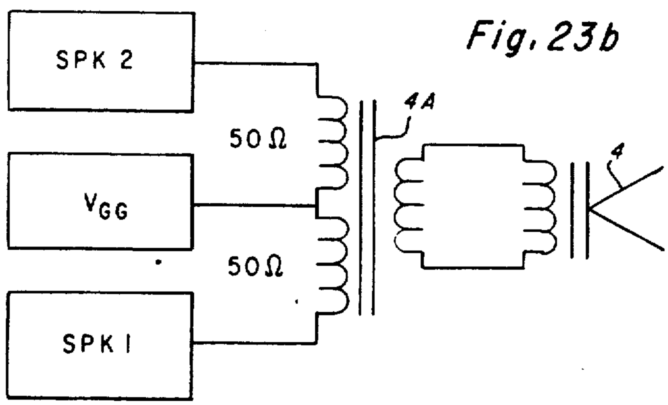
Figure 23C:
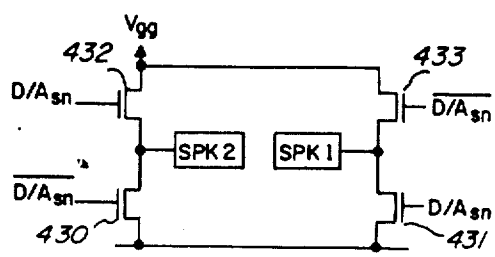

FIGS. *7a–7d* form a composite logic diagram of the synthesizer's timing circuits;

FIGS. *8a–8f* form a composite logic diagram of the synthesizer's ROM/Controller interface logics;

FIGS. *9a–9d* form a composite logic diagram of the interpolator logics;

FIGS. 10*a*–10*c* form a composite logic diagram of the array multiplier;

FIGS. 11*a*–11*d* form a composite logic diagram of the speech synthesizer's lattice filter and excitation generator; FIGS. 12*a* and 12*b* are schematic diagrams of the parameter RAM;

FIGS. 13*a*–13*c* are schematic diagrams of the parameter ROM;

FIGS. 14a–14b form a composite diagram of the chirp ROM;

FIGS. 15a–15b form a composite block diagram of a microprocessor which may be utilized as the controller;

FIGS. 16a–16c form a composite logic diagram of the segment decoder of the microprocessor;

FIG. 17 depicts the digit output buffers and digit registers of the microprocessor;

FIG. 18 depicts the KB selector circuit of the microprocessor;

FIG. 19 is a block diagram of a ROM employed as a memory of the electronic arithmetic learning aid;

FIGS. 20a–20f form a composite logic diagram of the control logic for the ROM of FIG. 19;

FIGS. 21a–21d form a composite logic diagram of the X and Y address decoders and the array of memory cells;

FIG. 22 is a plan view of the synthesizer chip herein described, showing the metal mask or metal pattern, enlarged about fifty times; and FIGS. 23a–23c depict embodiments of the speaker system.

GENERAL DESCRIPTION

Figure 1:
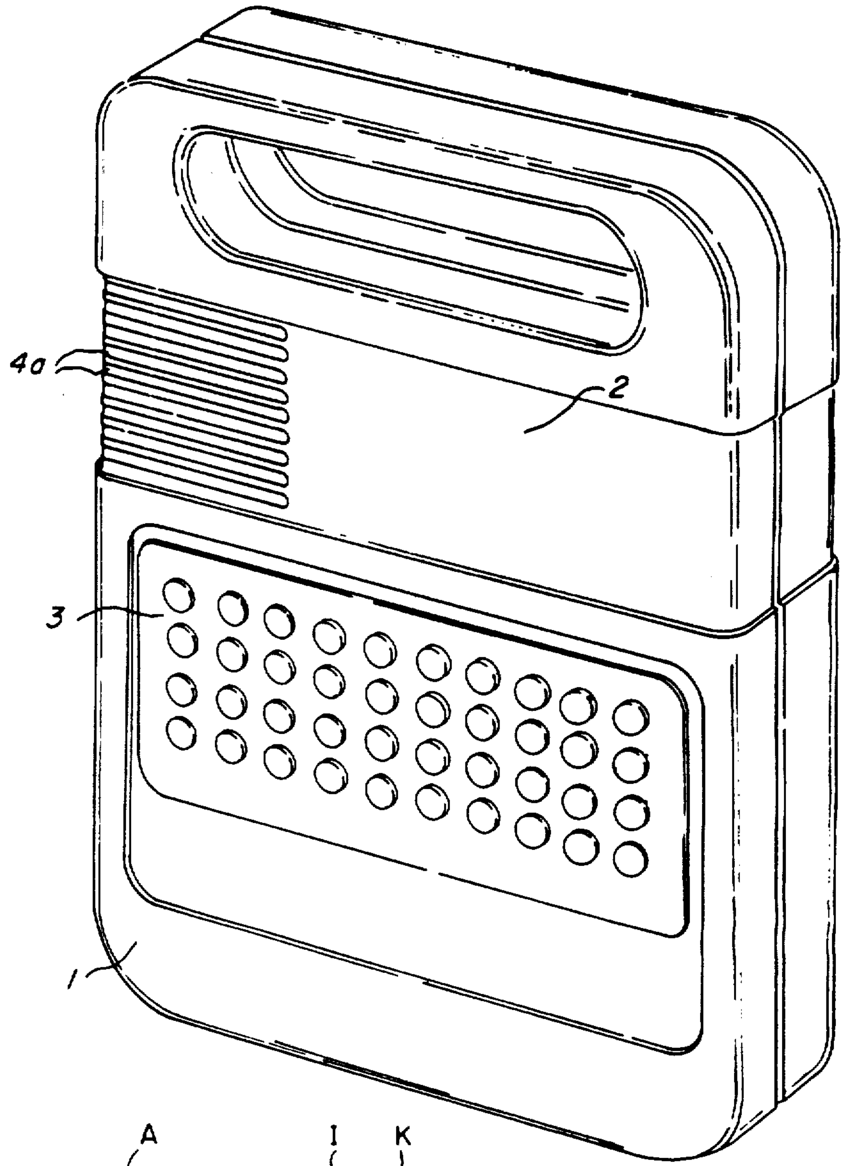
FIG. 1 is a front view of an electronic arithmetic learning aid in accordance with the present invention.

FIG. 1 is a front view of an electronic arithmetic learning aid of the type which embodies the present invention. The arithmetic learning aid includes a case 1 which encloses electronic circuits preferably implemented on integrated circuits (not shown in this figure). These circuits are coupled to a display 2, a keyboard 3 and a speaker 4 or other voice coil means (also not shown in FIG. 1). However, the openings 4a are shown behind which speaker 4 is preferably mounted. The display is preferably of the vacuum fluorescent type in the embodiment to be described; however, it will be appreciated by those skilled in the art that other display means, such as arrays of light emitting diodes, liquid crystal devices, electrochromic devices, gas discharge devices, plasma displays or cathode ray tube displays may be used, if desired. Also, in this embodiment, as a matter of design choice, the display has ten character positions. The keyboard 3 of the arithmetic learning aid which embodies the present invention has twenty eight key switch positions, ten of which are used to input the numbers into the learning aid. Of the remaining eighteen key switch positions, five are utilized for mode keys including solve it/on, word problems, greater than/less than, write it and number stumper, another four for arithmetic operation modes addition, subtraction, multiplication and division and the remaining nine are utilized in mode operations (off, go, enter, mix it, repeat, greater than, less than, clear and a decimal point.) The words spoken by the arithmetic learning aid, as well as the arithmetic problems and solutions, are stored as digital information in one or more Read-Only Memories.

The arithmetic learning aid depicted in FIG. 1 may be battery powered or powered from a source of external electrical power, as desired. The case is preferably made from injection molded plastic and the keyboard switches may be provided by arrays of key switches of the type disclosed in U.S. Pat. No. 4,005,293, or arrays of integrated membrane type switches or touch capacitive switches.

Of course, other types of case materials or switches alternatively may be used.

Having described the outward appearance of the arithmetic learning aid, the modes in which the arithmetic learning aid may operate will be first described followed by a description of the block diagrams and detailed logic diagrams of the various electronic circuits used to implement the arithmetic learning aid of FIG. 1.

MODES OF OPERATION

The first mode, the "solve it" mode, is the default mode and is entered by pressing the solve it/on key. The "solve it" mode, provides a problem solving drill in the four basic arithmetic operations (addition, subtraction, multiplication and division). The randomly selected problems are usually displayed and voiced audibly. A proposed solution is entered via the keyboard and finalized by depressing the enter key. A correct response will initiate a praise phrase and a new problem. An incorrect response will cause the problem to be repeated. Drill in a specific operation may be selected by depressing a particular operator key or the mix it key will cause the learning aid to randomly select problems from each of the arithmetic operations. Multiple levels of difficulty are selectable to increase skill. An example of the "solve it" mode may be seen in Table I.

The "word problems" mode is utilized to strengthen the operator's recognition of various commonly used verbal expressions of mathematical concepts. In the "word problem" mode the machine verbally presents word problems, such as "Eight less than ten equals?" As in the "solve it" mode, the entry of a correct response will initiate a pulse phrase and a new problem. An incorrect response will cause the problem to be repeated. An example of the word problem mode can be seen in Table II.

The "greater than/less than" mode is utilized to aid in developing the operator's understanding of number relationships by displaying two numbers and asking the operator to determine whether the first is greater than or less than the second by depressing an appropriate key. Only two answers are possible and all other keys are ignored. Again, as in previous modes, a correct response will initiate a praise phrase and a new problem. An incorrect response will cause the problem to repeat. An example of the "greater than/less than" mode can be seen in Table III.

The "write it" mode provides the operator with practice in writing numbers which are presented orally. A particular number is audibly pronounced and the operator enters the number via the numeric keys. When the audibly pronounced number is entered and finalized by the enter key, the control mechanism compares the entered number with the audibly pronounced number. As before, a correct response will initiate a praise phrase and a new problem. An example of the "write it" mode may be seen in Table IV.

The final mode of operation, the "number stumper" mode utilizes an unknown number to teach logic and strategy. A number is randomly selected by the control mechanism. The operator selects a trial number to attempt to determine the unknown random number. After the trial number is entered, the learning aid responds with two digits. The first digit is representative of the number of digits in the trial number that occur in the unknown number, and are positioned in the correct sequence. The second digit indicates the number of digits in the trial number which occur in the unknown number, regardless of position. Repetitive attempts by the operator to discern the unknown number will train the operator in both logic and strategy.

An example of the "number stumper" mode can be seen in Table V.

DISPLAY

Figure 2:
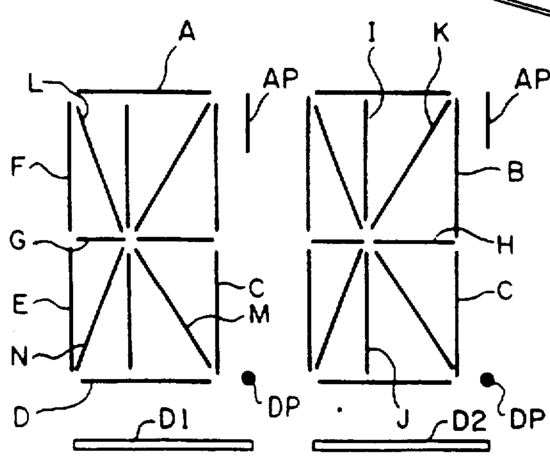
FIG. 2 depicts the segment details of the display.
Figure 3:
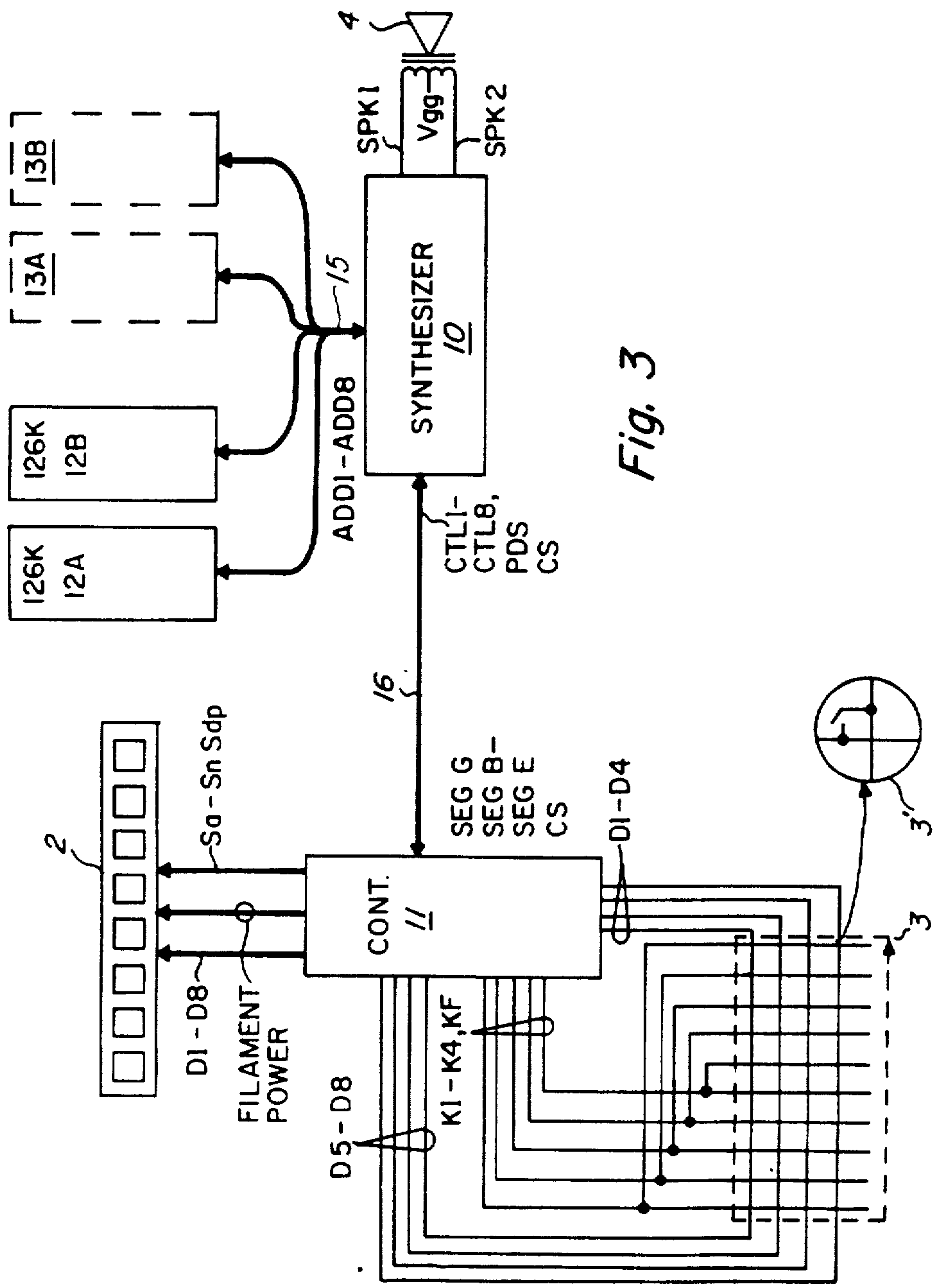
FIG. 3 is a block diagram of the major components preferably making up the electronic arithmetic learning aid.

Referring now to FIG. 2, there is shown a preferred arrangement of the segments of display 2. Display 2 is provided with a plurality of character positions (preferably ten character positions although eight character positions are shown in FIG. 3 for purposes of illustration) each of which is provided by a sixteen segment character which has fourteen segments arranged somewhat like a "British flag" with an additional two segments for an apostrophe and a decimal point. In FIG. 2, segments A–N are arranged more or less in the shape of the "British flag" while segment AP provides an apostrophe and segment DP provides a decimal point. Segment conductors Sa through Sn, Sdp and Sap are respectively coupled to segments A through N, DP and AP in the character positions of display 2. Also, for each character position, there is a common electrode, labeled as D1–D8. When display 2 is provided by a vacuum fluorescent display device, the segment electrodes are provided anodes in the vacuum fluorescent display device, while each common electrode is preferably provided by a grid associated with each character position. By appropriately multiplexing signals on the segment conductors (Sa–Sn, Sdp and Sap) with signals on the character common electrodes (D1–D8) the display may be caused to show the various letters of the alphabet, a period, and a apostrophe and various numerals. For instance, by appropriately energizing segment conductors A, B, H, G, E and D when character common electrode D1 is appropriately energized, the numeral "2" is actuated in the first character position of display 2. Further, by appropriate strobing segment conductors A, B, C, D, H and G when character common electrode D2 is appropriately energized, the numeral "3" is caused to be actuated in the second character position of display 2. It should be evident to those skilled in the art that the letters of the alphabet as well as the apostrophe, period and other numerals may be formed by appropriate energization of appropriate segment conductors and common electrodes. In operation, the character common electrodes D1–D8 are sequentially energized with an appropriate voltage potential as selected segment conductors are energized to their appropriate voltage potential to produce a display of characters at display 2. Of course, the segment electrodes could alternatively be sequentially energized as the digit electrodes are selectively energized in producing a display at display 2.

BLOCK DIAGRAM OF THE ARITHMETIC LEARNING AID

FIG. 3 is a block diagram of the major components making up the disclosed embodiment of an electronic arithmetic learning aid. The electronics of the disclosed arithmetic learning aid may be divided into three major functional groups, one being a controller 11, another being a speech synthesizer 10, and another being a read-only-memory (ROM) 12. In the embodiment disclosed, these major electronic functional groups are each integrated on separate integrated circuit chips except for the ROM functional group which is integrated onto two integrated circuit chips. Thus, the speech synthesizer 10 is preferably implemented on a single integrated circuit denoted by the box labeled 10 in FIG. 3 while the controller is integrated on a separate integrated circuit denoted by a box 11 in FIG. 3. The word list for the learning aid including the words and phrases to be used in stating arithmetic problems is stored in the ROM functional group 12, which also stores both the correct solutions to the arithmetic problems and comments associated with the appropriateness of a proposed answer as well as frames of digital coding which are converted by speech synthesizer 10 to an electrical signal which drives speaker or other voice coil means 4. In the embodiment disclosed, ROM functional group 12 is preferably provided with 262,144 bits of storage. As a matter of design choice, the 262,144 bits of data are divided between two separate read-only-memory chips, represented in FIG. 3 at numerals 12A and 12B. The memory capability of ROM functional group 12 is a design choice; however, using the data compression features which are subsequently discussed with reference to FIG. 6, the 262,144 bits of read-only-memory may be used to store on the order of 250 words of spoken speech including praise phrases and correction phrases as well as various tones.

Of course, the number of chips from which the arithmetic learning aid is implemented is a design choice and as large scale integration techniques are improved (using electron beam etching and other techniques), the number of integrated circuit chips may be reduced from four to as few as a single chip.

Synthesizer chip 10 is interconnected with the read-only memories via data path 15 and is interconnected with controller 11 via data path 16. The controller 11, which may be provided by an appropriately programmed microprocessor type device, preferably actuates display 2 by providing segment information on segment conductors Sa–Sn, Sdp and Sap along with character position information on connectors D1–D8. In the embodiment herein disclosed, controller 11 preferably also provides filament power to display 2 when a vacuum fluorescent device is used therefor. Of course, if a liquid crystal, electrochromic, light emitting diode or gas discharge display were used such filament power would not be required. Controller 11 also scans keyboard 3 for detecting key depressions thereat. Keyboard 3 has a plurality of switch positions which are shown in representative form in FIG. 3, the switch locations occurring where the conductors cross within the dashed line at numeral 3 in FIG. 3. As previously indicated, twenty-eight key switch positions are provided by the keyboard 3 in a preferred embodiment of the electronic arithmetic learning aid. A switch closure causes the conductors shown as crossing in FIG. 3 to be coupled together. At numeral 3' the switch occurring at a crossing of conductors at numeral 3 is shown in detail. In addition to actuating display 2 and sensing key depression at keyboard 3, controller 11 also performs such functions as providing addresses for addressing ROMs 12A and 12B (via synthesizer 10), and other such functions which will become apparent. Addresses from controller 11 are transmitted to ROMs 12A and 12B by synthesizer 10 because, as will be seen, synthesizer 10 preferably is equipped with buffers capable of addressing a plurality of read-only-memories. Preferably, only one of the pairs of ROMs will output information in response to this addressing because of a chip select signal which is transmitted from synthesizer 10 to all the Read-Only-Memories. Controller 11, in this embodiment, transmits addresses to the ROMs via synthesizer 10 so that only synthesizer 10 output buffers need be sized to transmit addresses to a plurality of ROMs simultaneously. Of course, controller 11 output buffers could also be sized to transmit information to a plurality of read-only-memories simultaneously and thus in certain embodiments it may be desirable to also couple controller 11 directly to the ROMs.

As will be seen, synthesizer chip 10 synthesizes human speech or other sounds according to frames of data stored in ROMs 12A–12B or 13A–13B. The synthesizer 10 employs a digital lattice filter of the type described in U.S. Pat. No. 4,209,844. U.S. Pat. No. 4,209,844 is hereby incorporated herein by reference. As will also be seen, synthesizer 10 also includes a digital to analog (D to A) converter for converting the digital output from the lattice filter to analog signals for driving speaker 4 or other voice coil means with those analog signals. Synthesizer 10 also includes timing, control and data storage and data compression systems which will be subsequently described in detail.

SYNTHESIZER BLOCK DIAGRAM

FIGS. **4*a* and 4*b* form a composite block diagram of the synthesizer 10. Synthesizer 10 is shown as having six major functional blocks, all but one of which are shown in greater detail in block diagram form in FIGS. 4*a* and 4*b*. The six major functional blocks are timing logic 20; ROM-Controller interface logic 21; parameter loading, storage and decoding logic 22; parameter interpolator 23; filter and excitation generator 24 and D to A and output section 25. Subsequently, these major functional blocks will be described in detail with respect to FIGS. 5, 6, 7*a*–7*d*, 8*a*–8*f*, 9*a*–9*d*, 10*a*–10*c* and 11*a*–11*d***.

ROM/CONTROLLER INTERFACE LOGIC

Referring again to FIGS. **4*a* and 4*b*, ROM/Controller interface logic 21 couples synthesizer 10 to read-only-memories 12A and 12B and to controller 11. The control 1–8 (CTL1–CTL8), chip select (CS) and processor data clock (PDC) pins are coupled, in this embodiment, to the controller while the address 1–8 (ADD1–ADD8) and instruction 0–1 (I0–I1) pins are connected to ROMs 12A and 12B (as well as ROMs 13A–13B, if used). ROM/Controller interface logic 21 sends address information from controller 11 to the Read-Only-Memories 12A–12B and preferably returns digital information from the ROMs back to the controller 11; logic 21 also brings data back from the ROMs for use by synthesizer 10 and initiates speech. A Chip Select (CS) signal enables tristate buffers, such as buffers 213, and a three bit command latch 210. A Processor Data Clock (PDC) signal sets latch 210 to hold the data appearing at CTL1–CTL4 pins from the controller. Command latch 210 stores a three bit command from controller 11, which is decoded by command decoder 211. Command decoder 211 is responsive to eight commands which are: speak (SPK) or speak slowly (SPKSLW) for causing the synthesizer to access data from the Read-Only-Memory and speak in response thereto either at a normal rate or a slow rate; a reset (RST) command for resetting the synthesizer to zero; a test talk (TSTTALK) so that the controller can ascertain whether or not the synthesizer is still speaking; a load address (LA) where four bits are received from the controller chip at the CTL1–CTL8 pins and transferred to the ROMs as an address digit via the ADD1–ADD8 pins and associates buffers 214; a read and branch (RB) command which causes the Read-Only-Memory to take the contents of the present and subsequent address and use that for a branch address; a read (RE) command which causes the Read-Only-Memory to output one bit of data on ADD1, which data shifts into a four bit data input register 212; and an output command which transfers four bits of data in the data input register 212 to controller 11 via buffers 213 and the CTL1–CTL8 pins. Once the synthesizer 10 has commenced speaking in response to a SPK or SPKSLW command it continues speaking until ROM interface logic 21 encounters a RST command or an all ones gate 207 (see FIGS. 8*a*–8*f*) detects an "energy equal to fifteen" code and resets talk latch 216 in response thereto. As will be seen, an "energy equal to 15" code is used as the last frame of data in a plurality of frames of data for generating words, phrases or sentences. The LA, RE and RB commands decoded by decoder 211 are re-encoded via ROM control logic 217** and transmitted to the read-only-memories via the instruction (I0–I1) pins.

The processor Data Clock (PDC) signal serves other purposes than just setting latch 210 with the data on CTL1–CTL4. It signals that an address is being transferred via CTL1–CTL8 after an LA or output command has been decoded or that the TSTTALK test is to be performed and outputted on pin CTL8. A pair of latches **218*a* and 218*b* (FIGS. 8*a*–8*f*) associated with decoder 211 disable decoder 211** when the aforementioned LA, TSTTALK and OUTPUT commands have been decoded and a subsequent PDC occurs so that the data then on pins CTL1–CTL8 is not decoded.

A TALK latch 216 is set in response to a decoded SPK or SPKSLW command and is reset: (1) during a power up clear (PUC) which automatically occurs whenever the synthesizer is energized; (2) by a decoded RST command or (3) by an "energy equals fifteen" code in a frame of speech data. The TALKD output is delayed output to permit all speech parameters to be inputed into the synthesizer before speech is attempted. The slow talk latch 215 is set in response to a decoded SPKSLW command and reset in the same manner as latch 216. The SLOWD output is similarly a delayed output to permit all the parameters to be inputted into the synthesizer before speech is attempted.

PARAMETER LOADING, STORAGE AND DECODING LOGIC

The parameter loading, storage and decoding logic 22 includes a six bit long parameter input register 205 which receives serial data from the read-only-memory via pin ADD1 in response to a RE command outputted to the selected read-only-memory via the instruction pins. A coded parameter random access memory (RAM) 203 and condition decoders and latches 208 are connected to receive the data inputted into the parameter input register 205. As will be seen, each frame of speech data is inputted in three to six bit portions via parameter input register 205 to RAM 203 in a coded format where the frame is temporarily stored. Each of the coded parameters stored in RAM 203 is converted to a ten bit parameter by parameter ROM 202 and temporarily stored in a parameter output register 201.

As will be discussed with respect to FIG. 6, the frames of data may be either wholly or partially inputted into parameter input register 205, depending upon the length of the particular frame being inputted. Condition decoders and latches 208 are responsive to particular portions of the frame of data for setting repeat, pitch equal zero, energy equal zero, old pitch and old energy latches. The function of these latches will be discussed subsequently with respect to FIGS. **8*a*–8*f*. The condition decoders and latches 208 as well as various timing signals are used to control various interpolation control gates 209. Gates 209 generate an inhibit signal when interpolation is to be inhibited, a zero parameter signal when the parameter is to be zeroed and a parameter load enable signal which, among other things, permits data in parameter input register 205 to be loaded into the coded parameter RAM 203**.

PARAMETER INTERPOLATION

The parameters in parameter output register 201 are applied to the parameter interpolator functional block 23. The inputted K1–K10 speech parameters, including speech energy are stored in a K-stack 302 and E10 loop 304, while the pitch parameter is stored in a pitch register **30*b*. The speech parameters and energy are applied via recoding logic 301 to array multiplier 401 in the filter and excitation generator 24. As will be seen, however, when a low parameter is loaded into parameter output register 201 it is not immediately inserted into K-stack 302 or E10 loop 304 or register 305 but rather the corresponding value in K-stack 302, E10 loop 304 or register 305 goes through eight interpolation cycles during which a portion of the difference between the present value in the K-stack 302, E10 loop 304 or register 305 and the target value of that parameter in parameter output register 201 is added to the present value in K-stack 302, E10 loop 304 or register 305**.

Essentially the same logic circuits are used to perform the interpolation of pitch, energy and the K1–K10 speech parameters. The target value from the parameter output register 201 is applied along with the present value of the corresponding parameter to a subtractor 308. A selector 307 selects either the present pitch from pitch logic 306 or present energy or K coefficient data from KE10 transfer register 303, according to which parameter is currently in parameter output register 201, and applies the same to subtractor 308 and a delay circuit 309. As will be seen, delay circuit 309 may provide anywhere between zero delay to three bits of delay. The output of delay circuit 309 as well as the output of subtractor 308 is supplied to an adder 310 whose output is applied to a delay circuit 311. When the delay associated with delay circuit 309 is zero the target value of the particular parameter in parameter output register 201 is effectively inserted into K-stack 302, E10 loop 304 or pitch register 305, as is appropriate. The delay in delay circuit 311 is three to zero bits, being three bits when the delay in the delay circuit 309 is zero bits, whereby the total delay through selector 307, delay circuits 309 and 311, adder 310 and subtractor 308 is constant. By controlling the delays in delay circuits 309 and 311, either all, $\frac{1}{2}$, $\frac{1}{4}$ or $\frac{1}{8}$ of the difference outputted from subtractor 308 (that being the difference between the target value and the present value) is added back into the present value of the parameter. By controlling the delays in the fashion set forth in Table VI, a relatively smooth eight step parameter interpolation is accomplished.

U.S. Pat. No. 4,209,844 discusses with reference to FIG. 7 thereof a speech synthesis filter wherein speech coefficients K1–K9 are stored in the K-stack continuously, until they are updated, while the K10 coefficient and the speech energy (referred to by the letter A in U.S. Pat. No. 4,209,844) are periodically exchanged. In parameter interpolator 23, speech coefficients K1–K9 are likewise stored in stack 302, until they are updated, whereas the energy parameter and the K10 coefficient effectively exchange places in K-stack 302 during a twenty time period cycle of operations in the filter and excitation generator 24. To accomplish this function, E10 loop 304 stores both the energy parameter and the $K_{10}$ coefficient and alternately inputs the same into the appropriate location in K-stack 302. KE10 transfer register 303 is either loaded with the K10 or energy parameter from E10 loop 304 or the appropriate K1–K9 speech coefficient from K-stack 302 for interpolation by logics 307–311.

As will be seen, recoding logic 301 preferably performs a Booth's algorithm on the data from K-stack 302, before such data is applied to array multiplier 401. Recoding logic 301 thereby permits the size of the array multiplier 401 to be reduced compared to the array multiplier described in U.S. Pat. No. 4,209,844.

FILTER AND EXCITATION GENERATOR

The filter excitation generator 24 includes the array multiplier 401 whose output is connected to a summer multiplexer 402. The output of summer multiplexer 402 is coupled to the input of summer 404 whose output is coupled to a delay stack 406 and multiplier multiplexer 415. The output of the delay stack 406 is applied as an input to summer multiplexer 402 and to Y latch 403. The output of Y latch 403 is coupled to an input of multiplier multiplexer 415 and is applied as an input to truncation logic 425. The output of multiplier multiplexer 415 is applied as an input to array multiplier 401. As will be seen filter and excitation generator 24 make use of the lattice filter described in U.S. Pat. No. 4,209,844. Various minor interconnections are not shown in FIG. **4*b* for sake of clarity, but which will be described with reference to FIGS. 10*a*–10*c*, 11*a*–11*d*. The arrangement of the foregoing elements generally agrees with the arrangement shown in FIG. 7 of U.S. Pat. No. 4,209,844; thus array multiplier 401 corresponds to element 30', summer multiplexer 402 corresponds to elements 37*b*', 37*c*' and 37*d*', gates 414 (FIGS. 11*a*–11*d*) correspond to element 33', delay stack 406 corresponds to elements 34' and 35', Y latch 403 corresponds to element 36' and multiplier multiplexer 415 corresponds to elements 38*a*', 38*b*', 38*c*' and and 38*d*'**.

The voice excitation data is supplied from unvoiced/-voice gate 408. As will be subsequently described in greater detail, the parameters inserted into parameter input register 205 are supplied in a compressed data format. According to the data compression scheme used, when the coded pitch parameter is equal to zero in input register 205, it is interpreted as an unvoiced condition by condition decoders and latches 208. Gate 408 responds by supplying randomized data from unvoiced generator 407 as the excitation input. When the coded pitch parameter is of some other value, however, it is decoded by parameter ROM 202, loaded into parameter output register 201 and eventually inserted into pitch register 305, either directly or by the interpolation scheme previously described. Based on the period indicated by the number in pitch register 305, voiced excitation is derived from chirp ROM 409. As discussed in U.S. Pat. No. 4,209,844, the voiced excitation signal may be an impulse function or some other repeating function such as a repeating chirp function. In this embodiment, a chirp has been selected as this tends to reduce the "fuzziness" from the speech generated (because it apparently more closely models the action of the vocal cords than does a impulse function) which chirp is repetitively generated by chirp ROM 409. Chirp ROM 409 is addressed by counter latch 410, whose address is incremented in an add one circuit 411. The address in counter latch 410 continues to increment in add one circuit 411, recirculating via reset logic 412 until magnitude comparator 413, which compares the magnitude of the address being outputted from add one circuit 411 and the contents of the pitch register 305, indicates that the value in counter latch 410 then compares with or exceeds the value in pitch register 305, at which time reset logic 412 zeroes the address in counter latch 410. Beginning at address zero and extending through approximately fifty addresses is the chirp function in chirp ROM 409. Counter latch 410 and chirp ROM 409 are set up so that addresses larger than fifty do not cause any portion of the chirp function to be outputted from chirp ROM 409 to UV gate 408. In this manner the chirp function is repetitively generated on a pitch related period during voiced speech.

SYSTEM TIMING

Figure 5:
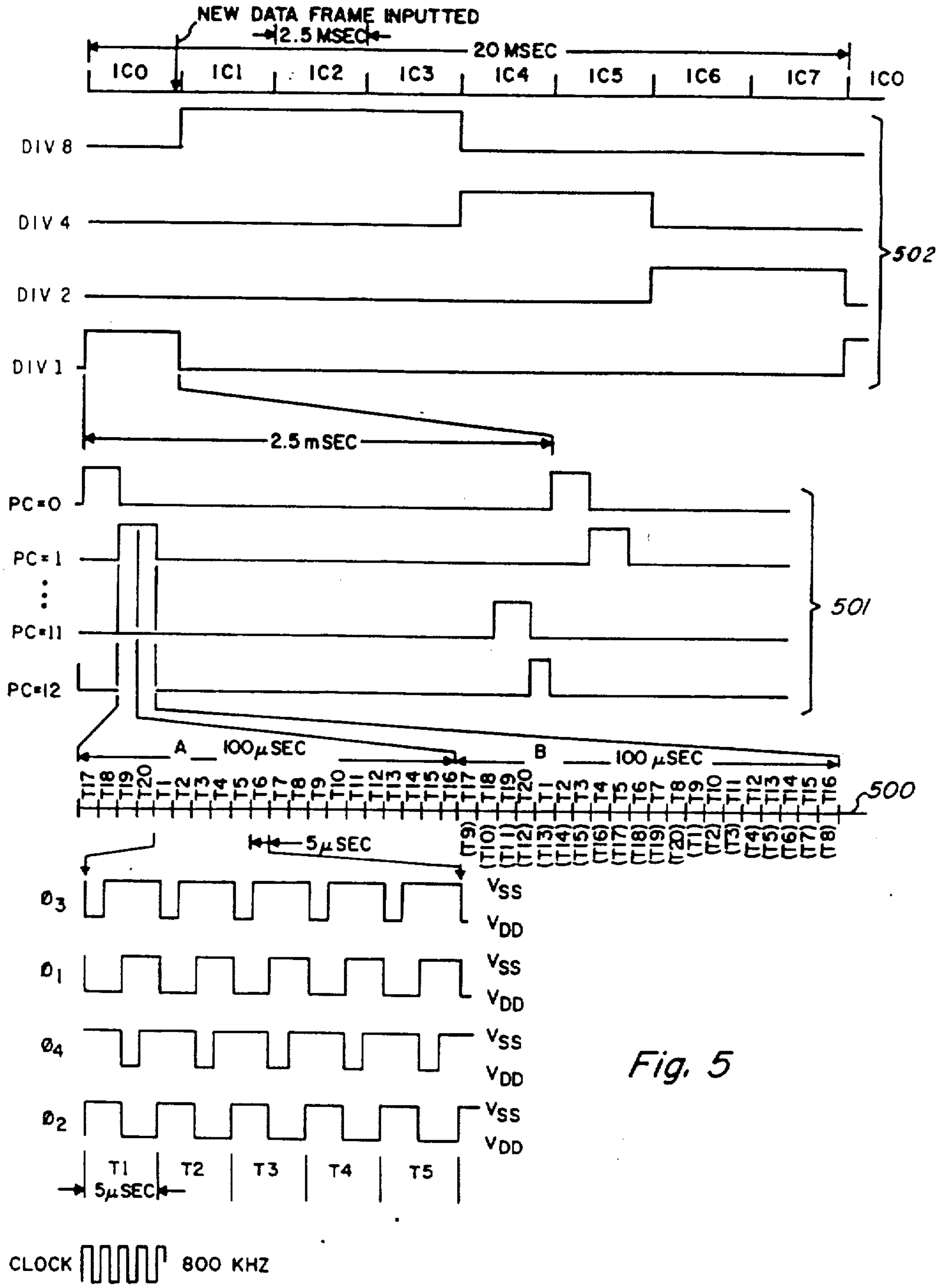
FIG. 5 is a timing diagram of various timing signals preferably used on the synthesizer.

FIG. 5 depicts the timing relationships between the occurrences of the various timing signals generated on synthesizer chip 10. Also depicted are the timing relationships with respect to the time new frames of data are inputted to synthesizer chip 10, the timing relationship with respect to the interpolations performed on the inputted parameters, the timing relations with respect to the foregoing with the time periods of the lattice filter and the relationship of all the foregoing to the basic clock signals.

The synthesizer is preferably implemented using precharged, conditional discharge type logics and therefore FIG. 5 shows clocks $\phi$1–$\phi$4 which may be appropriately used with such precharge-conditional discharge logic. There are two main clock phases ($\phi$1 and $\phi$2) and two discharge clock phases ($\phi$3 and $\phi$4). Phase $\phi$3 goes low during the first half of phase $\phi$1 and serves as a precharge therefor. Phase $\phi$4 goes low during the first half of phase $\phi$2 and serves as a precharge therefore. A set of clocks $\phi$1–$\phi$4 is required to clock one bit of data and thus corresponds to one time period.

The time periods are labeled T1–T20 and each preferably has a time period on the order of five microseconds. Selecting a time period on the order of five microseconds permits, as will be seen, data to be outputted from the digital filter at a ten kilohertz rate (i.e., at a 100 microsecond period) which provides for a frequency response of five kilohertz in the D to A output section 25 (FIG. **4*b*). It will be appreciated by those skilled in the art, however, that depending on the frequency response which is desired and depending upon the number of Kn speech coefficients used, and also depending upon the type of logics used, that the periods or frequencies of the clocks and clock phases shown in FIG. 5** may be substantially altered, if desired.

As is explained in U.S. Pat. No. 4,209,844, one cycle time of the lattice filter in filter excitation generator 24, preferably comprises twenty time periods, T1–T20. For reasons not important here, the numbering of these time periods differs between this application and U.S. Pat. No. 4,209,844. To facilitate an understanding of the differences in the numbering of the time periods, both numbering schemes are shown at the time period time line 500 in FIG. 5. At time line 500, the time periods T1–T20 which are not enclosed in parentheses identify the time periods according to the convention used in this application. On the other hand, the time periods enclosed in parentheses identify the time periods according to the convention used in U.S. Pat. No. 4,209,844. Thus, time period T17 is equivalent to time period (T9).

At numeral 501 is depicted the parameter count (PC) timing signals. In this embodiment there are thirteen PC signals, PC=0 through PC=12. The first twelve of these, PC=0 through PC=11 correspond to times when the energy, pitch, and K1–K10 parameters, respectively, are available in parameter output register 201. Each of the first twelve PC's comprise two cycles, which are labeled A and B. Each such cycle starts at time period T17 and continues to the following T17. During each PC the target value from the parameter output register 201 is interpolated with the existing value in K-stack 302 in parameter interpolator 23. During the A cycle, the parameter being interpolated is withdrawn from the K-stack 302, E10 loop 304 or pitch register 305, as appropriate, during an appropriate time period. During the B cycle the newly interpolated value is reinserted in the K-stack (or E10 loop or pitch register). The thirtheenth PC, PC=12, is provided for timing purposes so that all twelve parameters are interpolated once each during a 2.5 millisecond interpolation period.

As was discussed with respect to the parameter interpolator 23 of FIG. **4*b* and Table VI, eight interpolations are performed for each inputting of a new frame of data from ROMs 12A–12B into synthesizer 10. This is seen at numeral 502 of FIG. 5 where timing signals DIV 1, DIV 2, DIV 4 and DIV 8 are shown. These timing signals occur during specific interpolation counts (IC) as shown. There are eight such interpolation counts, IC0–IC7. New data is inputted from the ROMs 12A–12B into the synthesizer during IC0. These new target values of the parameters are then used during the next eight interpolation counts, IC1 through IC0; the existing parameters in the pitch register 305 K-stack 302 and E10 loop 304 are interpolated once during each interpolation count. At the last interpolation count, IC0, the present value of the parameters in the pitch register 305, K-stack 302 and E10 loop 304 finally attain the target values previously inputted toward the last IC0 and thus new target values may then again be inputted as a new frame of data. Inasmuch as each interpolation count has a period of 2.5 milliseconds, the period at which new data frames are inputted to the synthesizer chip is 20 microseconds or equivalent to a frequency of 50 hertz. The DIV 8 signal corresponds to those interpolation counts in which one-eighth of the difference produced by subtractor 308 is added to the present values in adder 310 whereas during DIV 4 one-fourth of the difference is added in, and so on. Thus, during DIV 2, $\frac{1}{2}$ of the difference from subtractor 308 is added to the present value of the parameter in adder 310 and lastly during DIV 1 the total difference is added in adder 310**. As has been previously mentioned, the effect of this interpolation scheme can be seen in Table VI.

PARAMETER DATA COMPRESSION

It has been previously mentioned that new parameters are inputted to the speech synthesizer at a 50 hertz rate. It will be subsequently seen that in parameter interpolator 23 and excitation generator 24 (FIG. **4*b*) the pitch data, energy data and $K_1$-Kn parameters are stored and utilized as ten bit digital binary numbers. If each of these twelve parameters were updated with a ten bit binary number at a fifty hertz rate from an external source, such as ROMs 12A and 12B, this would require a $12\times10\times50$ or 6,000 hertz bit rate. Using the data compression techniques which will be explained, this bit rate required for synthesizer 10** is reduced to on the order of 1,000 to 1,200 bits per second. And more importantly, it has been found that the speech compression schemes herein disclosed do not appreciably degrade the quality of speech generated thereby in comparison to using the data uncompressed.

Figure 6:
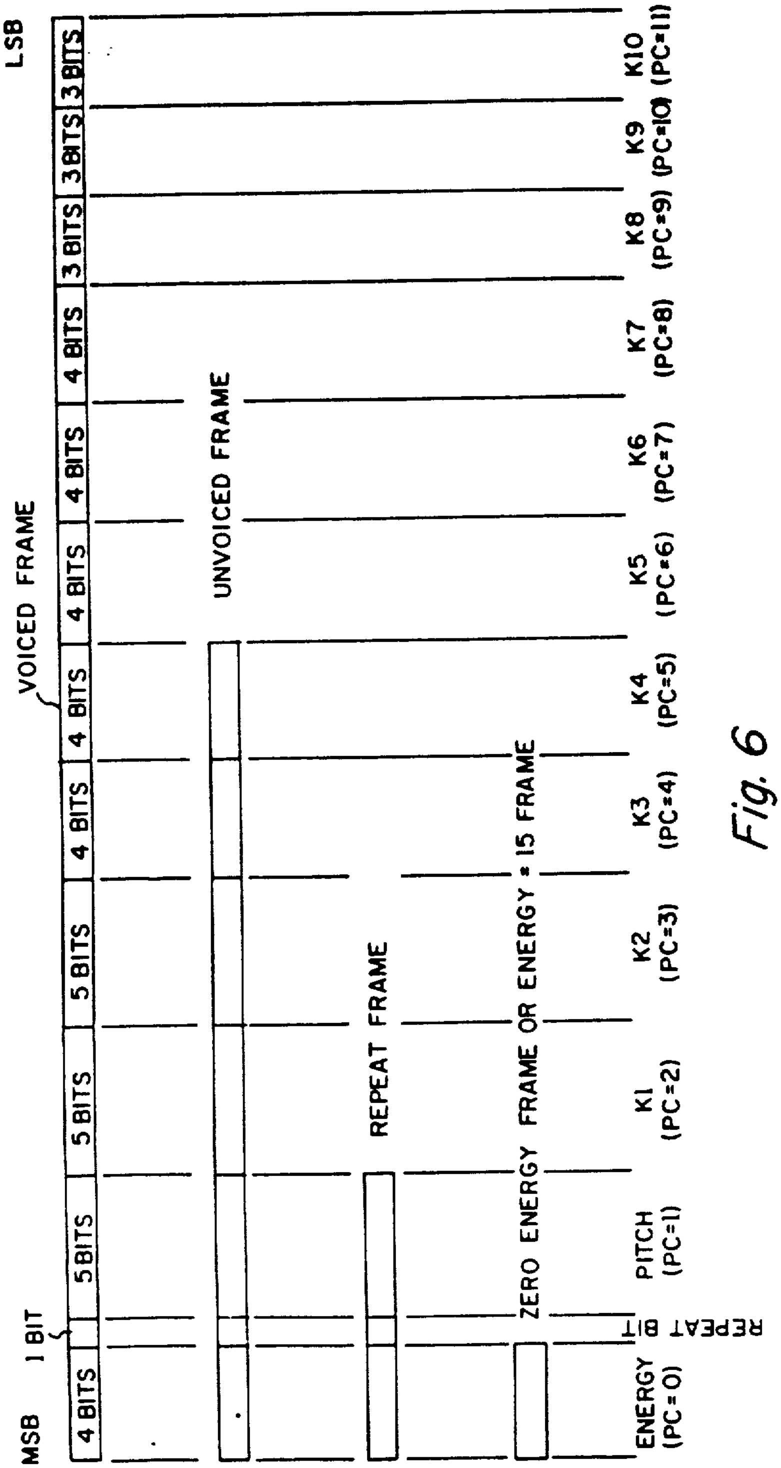
FIG. 6 pictorially shows the data compression scheme preferably used to reduce the data rate required by the synthesizer.
Figure 7A:
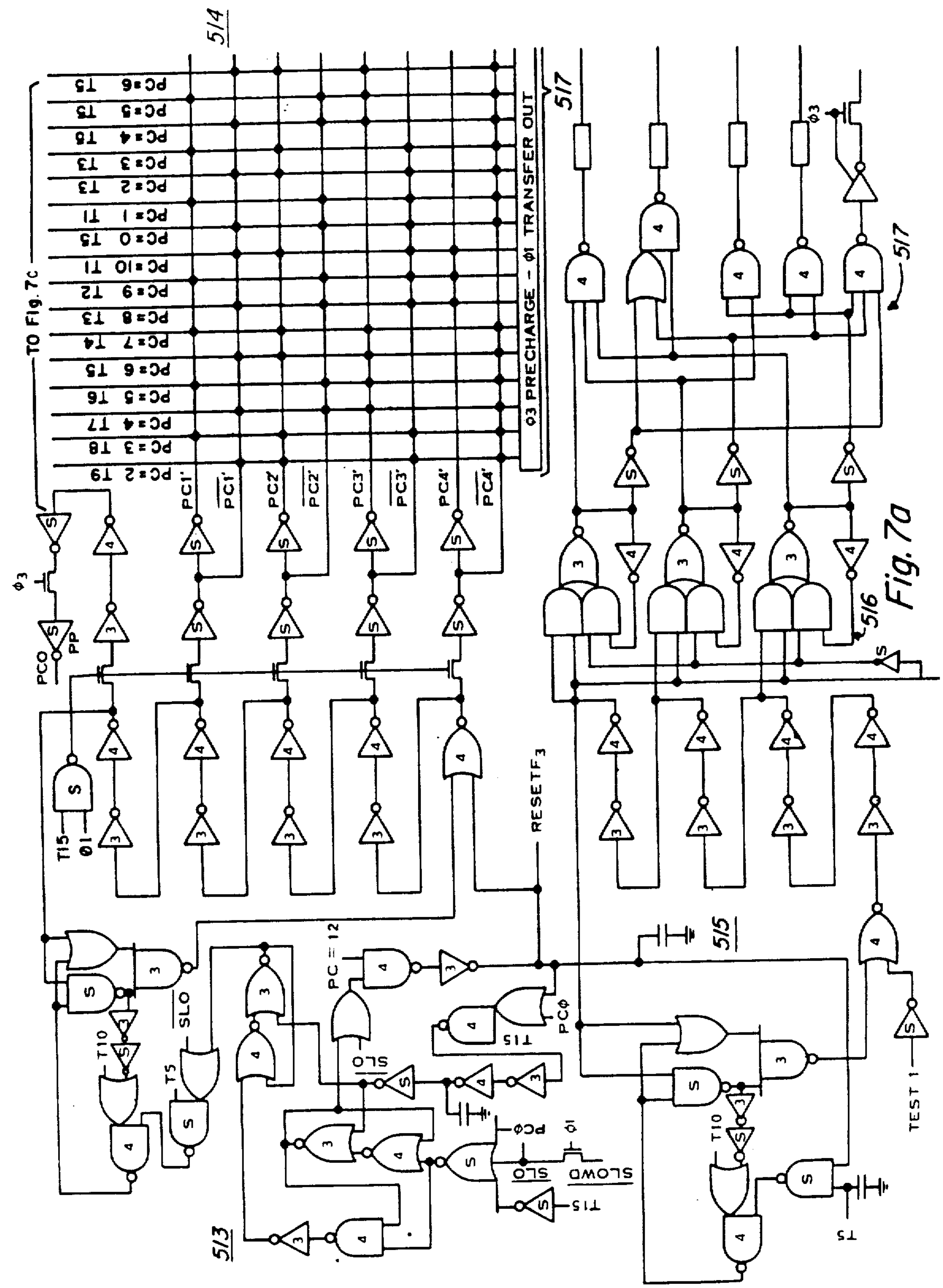
Figure 7B:
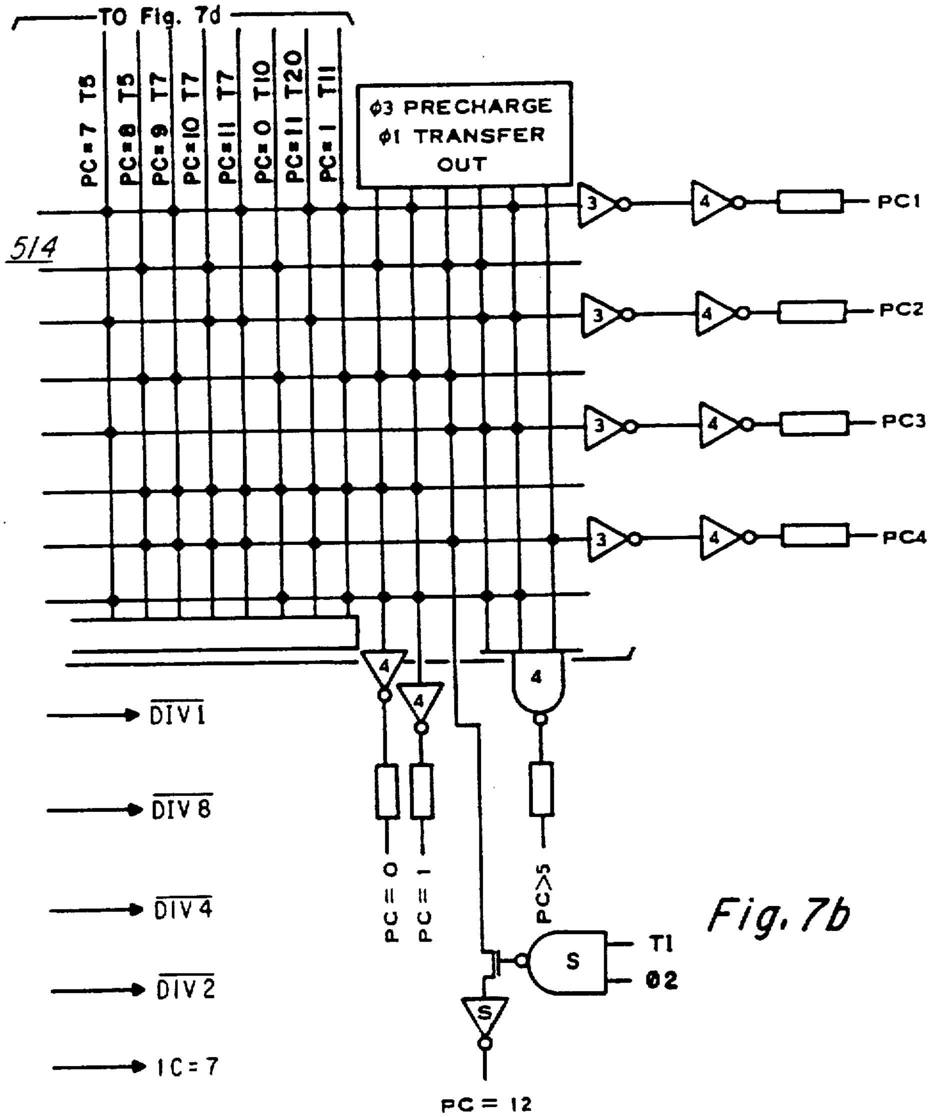
Figure 7C:
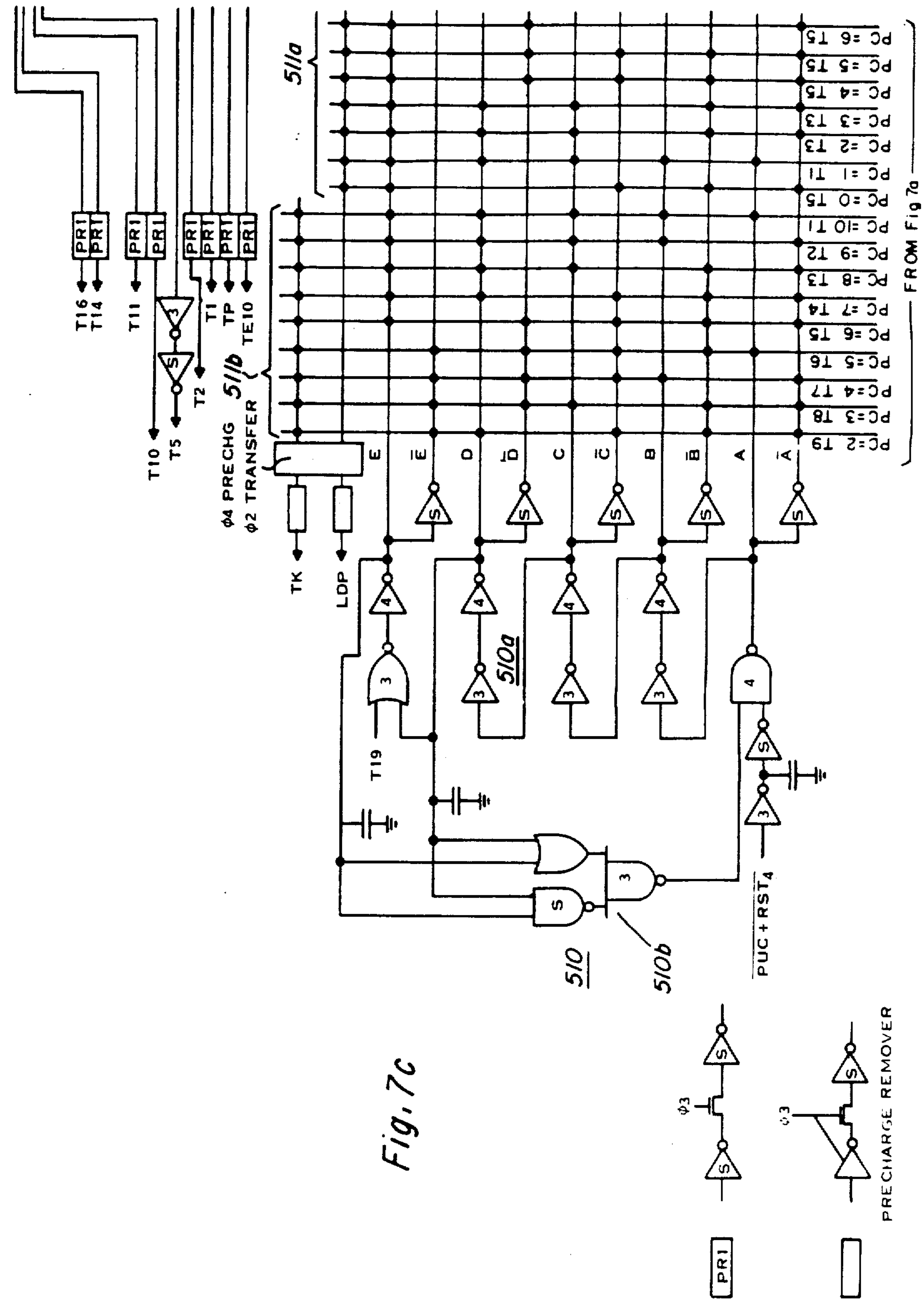
Figure 7D:
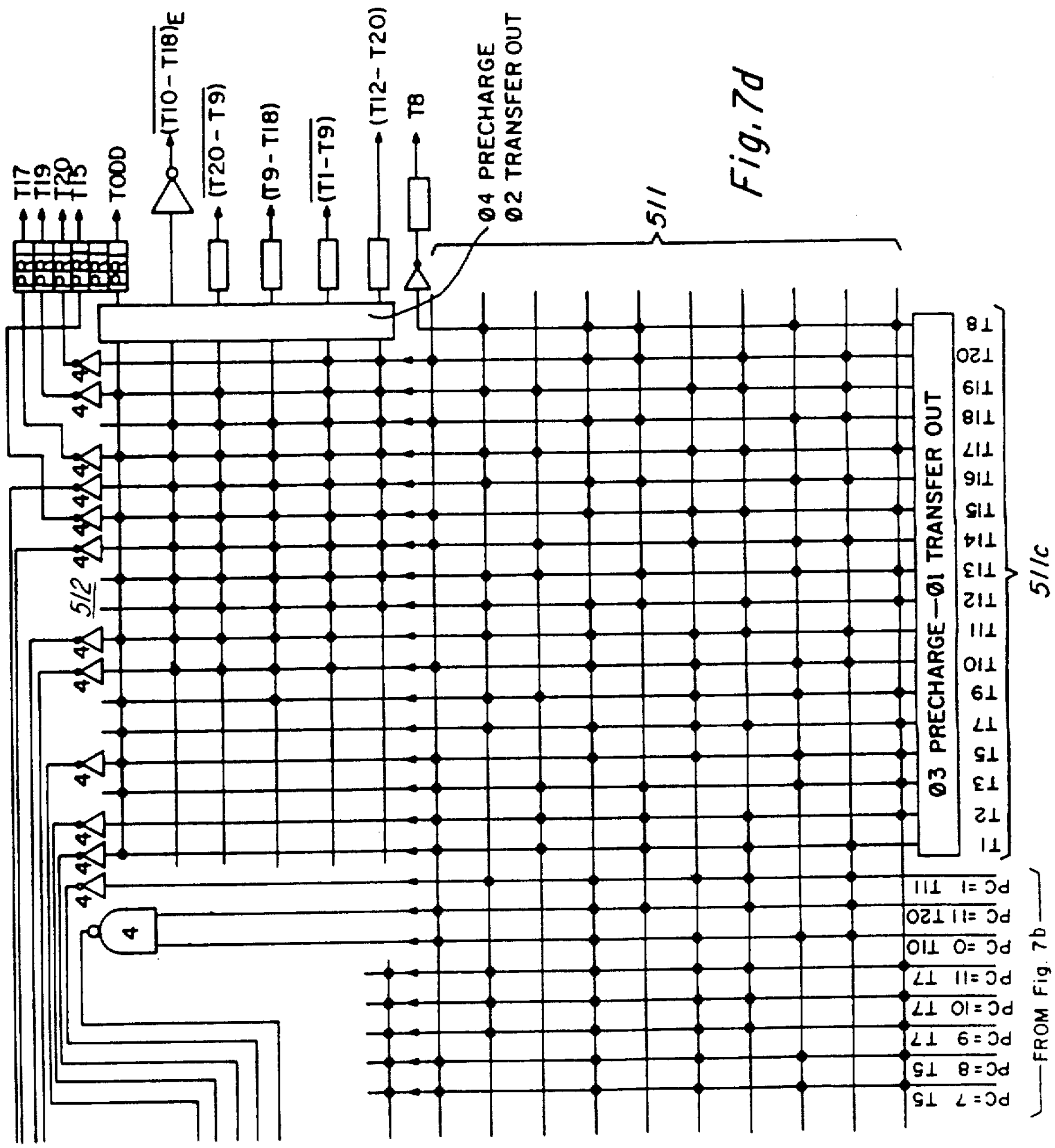

The data compression scheme used is pictorially shown in FIG. 6. Referring now to FIG. 6, it can be seen that there is pictorially shown four different lengths of frames of data. One, labeled voiced frame, has a length of 49 bits while another entitled unvoiced frame, has a length of 28 bits while still another called "repeat frame" has a length of ten bits and still another which may be alternately called zero energy frame or energy=15 frame has the length of but four bits. The "voiced frame" supplies four bits of data for a coded energy parameter as well as coded four bits for each of five speech parameters K3 through K7. Five bits of data are reserved for each of three coded parameters, pitch, K1 and K2. Additionally, three bits of data are provided for each of three coded speech parameters K8–K10 and finally another bit is reserved for a repeat bit.

In lieu of inputting ten bits of binary data for each of the parameters, a coded parameter is inputted which is converted to a ten bit parameter by addressing parameter ROM 202 with the coded parameter. Thus, coefficient K1, for example, may have any one of thirty-two different values, according to the five bit code for K1, each one of the thirty-two values being a ten bit numerical coefficient stored in parameter ROM 202. Thus, the actual values of coefficients K1 and K2 may have one of thirty-two different values while the actual values of coefficients K3 through K7 may be one of sixteen different values and the values of coefficients K8 through K10 may be one of eight different values. The coded pitch parameter is five bits long and therefore may have up to thirty-two different values. However, only thirty-one of these reflect actual pitch values, a pitch code of 00000 being used to signify an unvoiced frame of data. The coded energy parameter is four bits long and therefore would normally have sixteen available ten bit values; however, a coded energy parameter equal to 0000 indicates a silent frame such as occur as pauses in and between words, sentences and the like. A coded energy parameter equal to 1111 (energy equals fifteen), on the other hand, is used to signify the end of a segment of spoken speech, thereby indicating that the synthesizer is to stop speaking. Thus, of the sixteen codes available for the coded energy parameter, fourteen are used to signify different ten bit speech energy levels.

Coded coefficients K1 and K2 have more bits than coded coefficients K3–K7 which in turn have more bits than coded coefficients K8 through K10 because coefficient K1 has a greater effect on speech than K2 which has a greater effect on speech than K3 and so forth through the lower order coefficients. Thus given the greater significance of coefficients K1 and K2 than coefficients K8 through K10, for example, more bits are used in coded format to define coefficients K1 and K2 than K3–K7 or K8–K10.

Also it has been found that voiced speech data needs more coefficients to correctly model speech than does unvoiced speech and therefore when unvoiced frames are encountered, coefficients K5 through K10 are not updated, but rather are merely zeroed. The synthesizer realizes when an unvoiced frame is being outputted because the encoded pitch parameter is equal to 00000.

It has also been found that during speech there often occur instances wherein the parameters do not significantly change during a twenty millisecond period; particularly, the K1–K10 coefficients will often remain nearly unchanged. Thus, a repeat frame is used wherein new energy and new pitch are inputted to the synthesizer, however, the K1–K10 coefficients previously inputted remain unchanged. The synthesizer recognizes the ten bit repeat frame because the repeat bit between energy and pitch then comes up whereas it is normally off. As previously mentioned, there occur pauses between speech or at the end of speech which are preferably indicated to the synthesizer; such pauses are indicated by a coded energy frame equal to zero, at which time the synthesizer recognizes that only four bits are to be sampled for that frame. Similarly, only four bits are sampled when an "energy equals fifteen" frame is encountered. Using coded values for the speech in lieu of actual values, alone would reduce the data rate to $48\times50$ or 2400 bits per second. By additionally using variable frame lengths, as shown in FIG. 6, the data rate may be further reduced to on the order of one thousand to twelve hundred bits per second, depending on the speaker and on the material spoken.

The effect of this data compression scheme can be seen from Table VII where the coding for the word "HELP" is shown. Each line represents a new frame of data. As can be seen, the first part of the word "HELP", "HEL", is mainly voiced while the "P" is unvoiced. Also note the pause between "HEL" and "P" and the advantages of using the repeat bit. Table VIII sets forth the encoded and decoded speech parameter. The 3, 4 or 5 bit code appears as a hexadecimal number in the left-hand column, while the various decoded parameter values are shown as ten bit, two's complement numbers expressed as hexadecimal numbers in tabular form under the various parameters. The decoded speech parameter is stored in ROM 203. The repeat bit is shown in Table VII between the pitch and K parameters for sake of clarity; preferably, according to the embodiment of FIG. 6, the repeat bit occurs just before the most significant bit (MSB) of the pitch parameter.

SYNTHESIZER LOGIC DIAGRAMS

The various portions of the speech synthesizer of FIGS. 4a and 4b will now be described with reference to FIGS. 7a through 14b which, depict, in detail, the logic circuits implemented on a semiconductor chip, for example, to form the synthesizer 10. The following discussion, with reference to the aforementioned drawings, refers to logic signals available at many points in the circuit. It is to be remembered that in P channel MOS devices a logical zero corresponds to a negative voltage, that is, Vdd, while a logical one refers to a zero voltage, that is, Vss. It should be further remembered that P-channel MOS transistors depicted in the aforementioned figures are conductive when a logical zero, that is, a negative voltage, is applied at their respective gates. When a logic signal is referred to which is unbarred, that is, has no bar across the top of it, the logic signal is to be interpreted as "TRUE" logic; that is, a binary one indicates the presence of the signal (Vss) whereas a binary zero indicates the lack of the signal (Vdd). Logic signal names including a bar across the top thereof are "FALSE" logic; that is, a binary zero (Vdd voltage) indicates the presence of the signal whereas a binary one (Vss voltage) indicates that the signal is not present. It should also be understood that a numeral three in clocked gates indicates that phase Φ3 is used as a precharge whereas a four in a clocked gate indicates that phase Φ4 is used as a precharge clock. An "S" in the gate indicates that the gate is statically operated.

TIMING LOGIC DIAGRAM

Referring now to FIGS. *7a–7d*, they form a composite, detailed logic diagram of the timing logic for synthesizer 10. Counter 510 is a pseudorandom shift counter including a shift register **510*a* and feed back logic 510*b*. The counter 510 counts into pseudorandom fashion and the TRUE and FALSE outputs from shift register 510*a* are supplied to the input section 511 of a timing PLA. The various T time periods decoded by the timing PLA are indicated adjacent to the output lines thereof. Section 511*c* of the timing PLA is applied to an output timing PLA 512 generating various combinations and sequences of time period signals, such as T odd, $\overline{T10}$–$\overline{T18}$, and so forth. Sections 511*a* and 511*b* of timing PLA 511** will be described subsequently.

The parameter count in which the synthesizer is operating is maintained by a parameter counter 513. Parameter counter 513 includes an add one circuit and circuits which are responsive to SLOW and SLOW D. In SLOW, the parameter counter repeats the A cycle of the parameter count twice (for a total of three A cycles) before entering the B cycle. That is, the period of the parameter count doubles so that the parameters applied to the lattice filter are updated and interpolated at half the normal rate. To assure that the inputted parameters are interpolated only once during each parameter count during SLOW speaking operations each parameter count comprises three A cycles followed by one B cycle. It should be recalled that during the A cycle the interpolation is begun and during the B cycle the interpolated results are reinserted back into either K-stack 302, E10 loop 304 or pitch register 305, as appropriate. Thus, merely repeating the A cycle has no effect other than to recalculate the same value of a speech parameter but since it is only reinserted once back into either K-stack 302, E10 loop 304 or pitch register 305 only the results of the interpolation immediately before the B cycle are retained.

Inasmuch as parameter counter 513 includes an add one circuit, the results outputted therefrom, PC1–PC4, represent in binary form, the particular parameter count in which the synthesizer is operating. Output PC0 indicates in which cycle, A or B, the parameter count is. The parameter counter outputs PC1–PC4 are decoded by timing PLA 514. The particular decimal value of the parameter count is decoded by timing PLA 514 which is shown adjacent to the timing PLA 514 with nomenclature such as PC=0, PC=1, PC=7 and so forth. The relationship between the particular parameters and the value of PC is set forth in FIG. 6. Output portions **511*a* and 511*b* of timing PLA 511 are also interconnected with outputs from timing PLA 514 whereby the Transfer K (TK) signal goes high during T9 of PC=2 or T8 of PC=3 or T7 of PC=4 and so forth through T1 of PC=10. Similarly, a LOAD Parameter (LDP) timing signal goes high during T5 of PC=0 or T1 of PC=1 or T3 of PC=2 and so forth through T7 of PC=11. As will be seen, signal TK is used in controlling the transfer of data from parameter output register 201 to subtractor 308, which transfer occurs at different T times according to the particular parameter count the parameter counter 513 is in to assure that the appropriate parameter is being outputted from KE10 transfer register 303. Signal LDP is, as will be seen, used in combination with the parameter input register to control the number of bits which are inputted therein according to the number of bits associated with the parameter then being loaded according to the number of bits in each coded parameter as defined in FIG. 6**.

Interpolation counter 515 includes a shift register and an add one circuit for binary counting the particular interpolation cycle in which the synthesizer 10 is operating. The relationship between the particular interpolation count in which the synthesizer is operating and the DIV1, DIV2, DIV4 and DIV8 timing signals derived therefrom is explained in detail with reference to FIG. 5 and therefore additional discussion here would be superfluous. It will be noted, however, that interpolation counter 515 includes a three bit latch 516 which is loaded at TI. The output of three bit latch 516 is decoded by gates 517 for producing the aforementioned DIV1 through DIV8 timing signals. Interpolation counter 515 is responsive to a signal RESETF from parameter counter 513 for permitting interpolation counter 515 to increment only after PC=12 has occurred.

ROM/CONTROLLER INTERFACE LOGIC DIAGRAM

Turning now to FIGS. **8*a*–8*f*, which form a composite diagram, there is shown a detailed logic diagram of ROM/Controller interface logic 21. Parameter input register 205 is coupled, at its input to address pin ADD1. Register 205 is a six bit shift register, most of the stages of which are two bits long. The stages are two bits long in this embodiment inasmuch as ROMs 12A and 12B output, as will be seen, data at half the rate at which data is normally clocked in synthesizer 10. At the input of parameter input register 205 is a parameter input control gate 220 which is responsive to the state of a latch 221. Latch 221 is set in response to LDP, PC0 and DIV1 all being a logical one. It is reset at T14 and in response to parameter load enable from gate 238 being a logical zero. Thus, latch 221 permits gate 220 to load data only during the A portion (as controlled by PC0) of the appropriate parameter count and at an appropriate T time (as controlled by LDP) of IC0 (as controlled by DIV1) provided parameter load enable is at a logical one. Latch 221 is reset by T14 after the data has been inputted into parameter register 205**.

The coded data in parameter input register 205 is applied on lines IN0–IN4 to coded parameter RAM 203, which is addressed as PC1–PC4 to indicate which coded parameter is then being stored. The contents of register 205 is tested by all one's gate 207, all zeroes gate 206 and repeat latch **208*a*. As can be seen, gate 206 tests for all zeroes in the four least significant bits of register 205 wheres gate 207 tests for all ones in those bits. Gate 207 is also responsive to PC0, DIV1, T16 and PC=0 so that the zero condition is only tested during the time that the coded energy parameter is being loaded into parameter RAM 203. The repeat bit occurs in this embodiment immediately in front of the coded pitch parameter; therefore, it is tested during the A cycle of PC=1. Pitch latch 208*b* is set in response to all zeroes in the coded pitch parameter and is therefore responsive to not only gate 206 but also the most significant bit of the pitch data on line 222 as well as PC=1. Pitch latch 208*b*** is set whenever the loaded coded pitch parameter is a 00000 indicating that the speech is to be unvoiced.

Energy=0 latch 208c is responsive to the output of gate 206 and PC=0 for testing whether all zeroes have been inputted as the coded energy parameter and is set in response thereto. Old pitch latch 208d stores the output of the pitch=0 latch 208b from the prior frame of speech data while old energy latch 208e stores the output of energy=0 latch 208c from the prior frame of speech data. The contents of old pitch latch 208d and pitch=0 latch 208b are compared in comparison gates 223 for the purpose of generating an INHIBIT signal. As will be seen, the INHIBIT signal inhibits interpolations and this is desirable during changes from voiced to unvoiced or unvoiced to voiced speech so that the new speech parameters are automatically inserted into K-stack 302, E10 loop 304 and pitch register 305 as opposed to being more slowly interpolated into those memory elements. Also, the contents of old energy latch 208e and energy=0 latch 208c is tested by NAND gate 224 for inhibiting interpolation for a transition from a non-speaking frame to a speaking frame of data. The outputs of NAND gate 224 and gates 223 are coupled to a NAND gate 235 whose output is inverted to INHIBIT by an inverter 236. Latches 208a–208c are reset by gate 225 and latches 208d and 208e are reset by gate 226. When the excitation signal is unvoiced, the K5–K10 coefficients are set to zero, as aforementioned. This is accomplished, in part, by the action of gate 237 which generates a ZPAR signal when pitch is equal to zero and when the parameter counter is greater than five, as indicated by PC 5 from PLA 514.

Also shown in FIGS. 8a–8f is a command latch 210 which comprises three latches 210a, b, and c which latch in the data at CTL2, 4 and 8 in response to a processor data clock (PDC) signal in conjunction with a chip select (CS) signal. The contents of command latch 210 is decoded by command decoder 211 unless disabled by latches 218a and 218b. As previously mentioned, these latches are responsive to decoded LA, output and TTALK commands for disabling decoder 211 from decoding what ever data happens to be on the CTL2–CTL8 pins when subsequent PDC signals are received in conjunction with the LA, output and TTALK commands. A decoded TTALK command sets TTALK latch 219. The output of TTALK latch 219, which is reset by a Processor Data Clock Leading Edge (PDCLE) signal or by an output from latch 218b, controls along with the output of latch 218a NOR gates 227a and b. The output of NOR gate 227a is a logical one if TTALK latch 219 is set, thereby coupling pins CTL1 to the talk latch via tristate buffer 228 and inverters 229. Tristate latch 228 is shown in detail in FIG. 8d. NOR gate 227b, on the other hand, outputs a logical one if an output code has been detected, setting latch 228a and thereby connecting pins CTL1 to the most significant bit of data input register 212.

Data is shifted into data input register 212 from address pin 8 in response to a decoded read command by logics 230. RE, RB and LA instructions are outputted to ROM via instruction pins $I_0$–$I_1$ from ROM control logic 217 via buffers 214c. The contents of data input register 212 is outputted to CTL1–CTL4 pins via buffers 213 and to the aforementioned CTL1 pin via buffer 228 when NOR gate 227b inputs a logical one. CTL1–CTL4 pins are connected to address pins ADD-1–ADD4 via buffers 214a and CTL8 pin is connected to ADD8 pin 8 via a control buffer 214b which is disabled when addresses are being loaded on the ADD1–ADD8 pins by the signal on line 231.

Figure 8A:
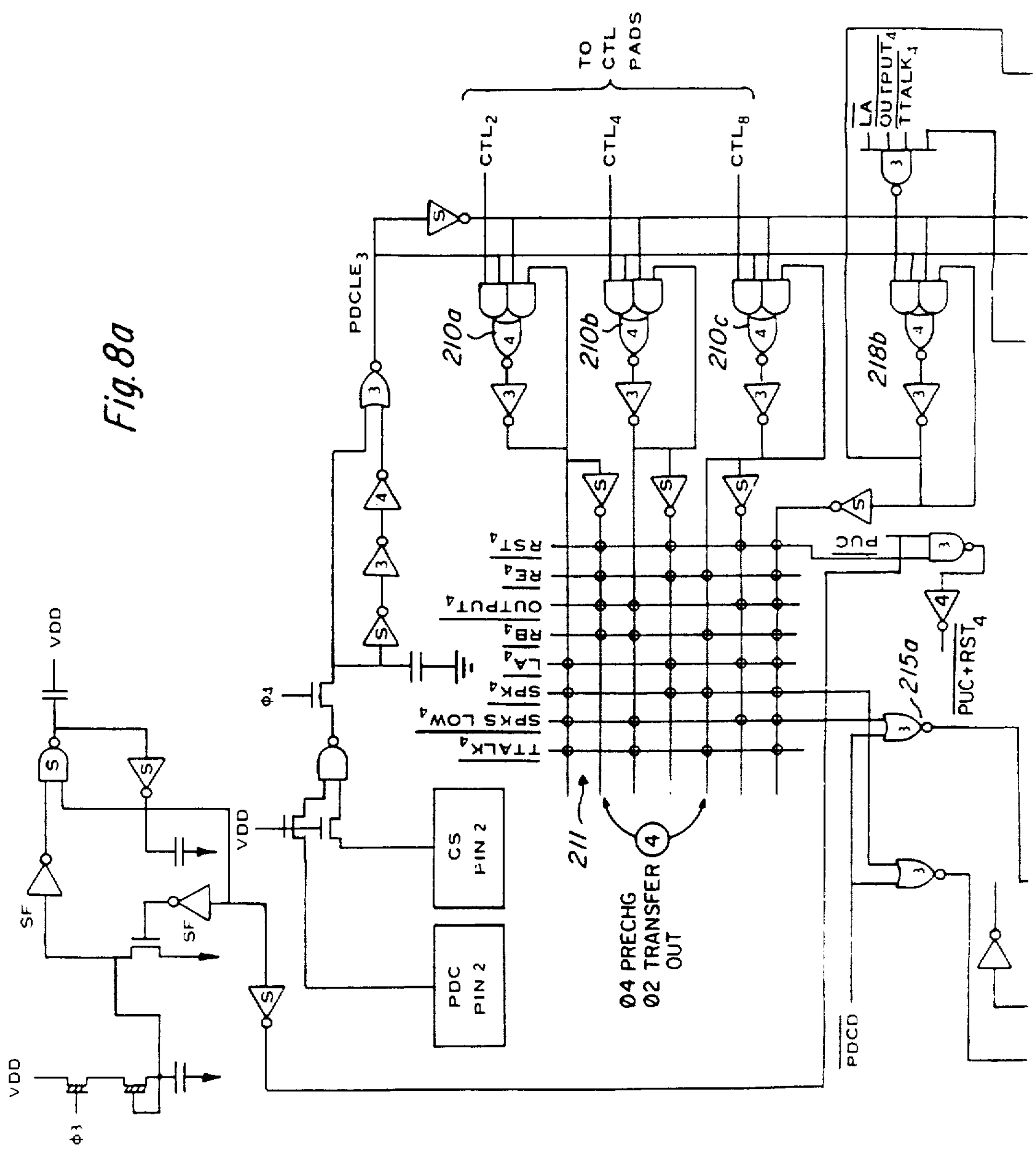
Figure 8B:
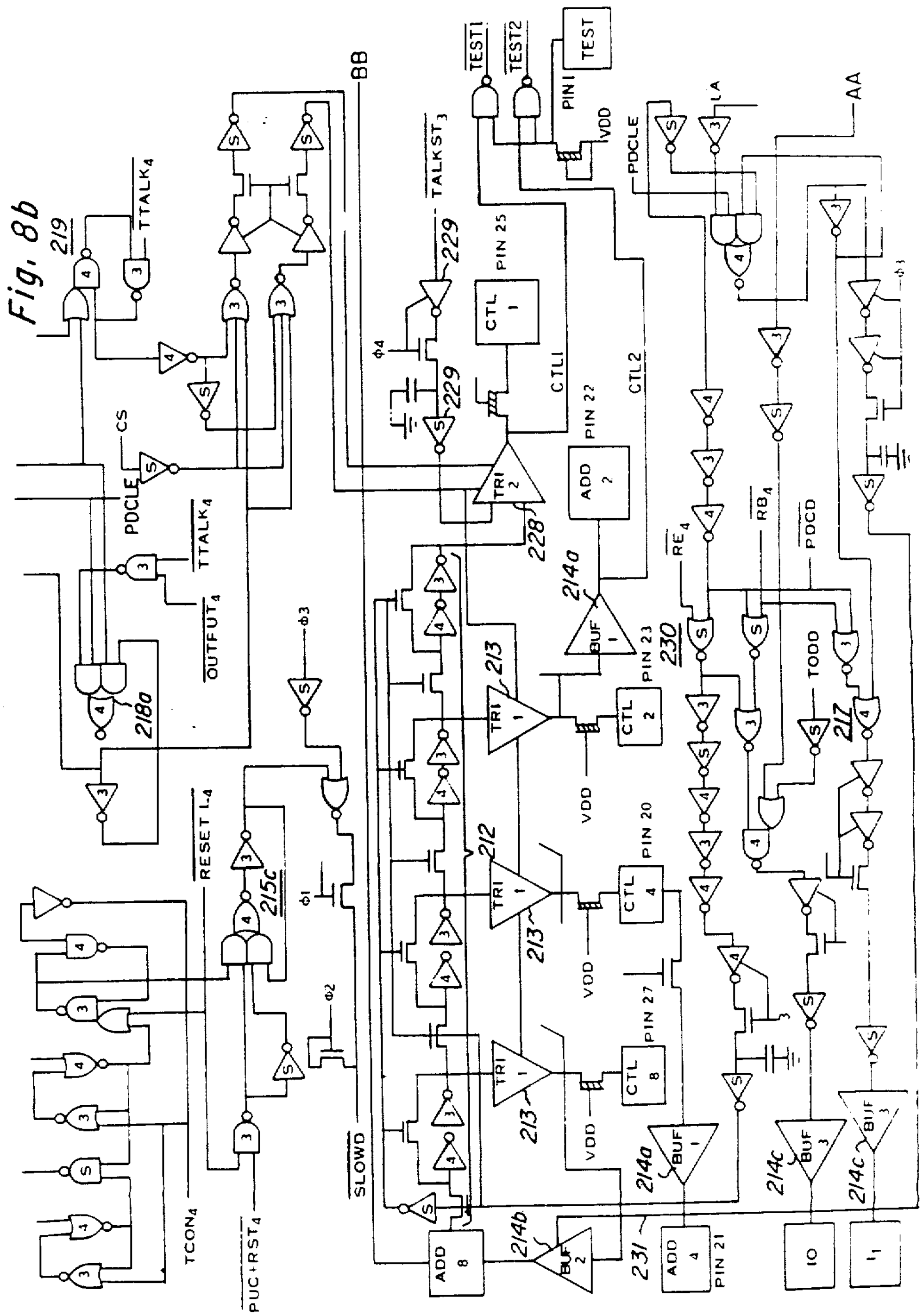
Figure 8C:
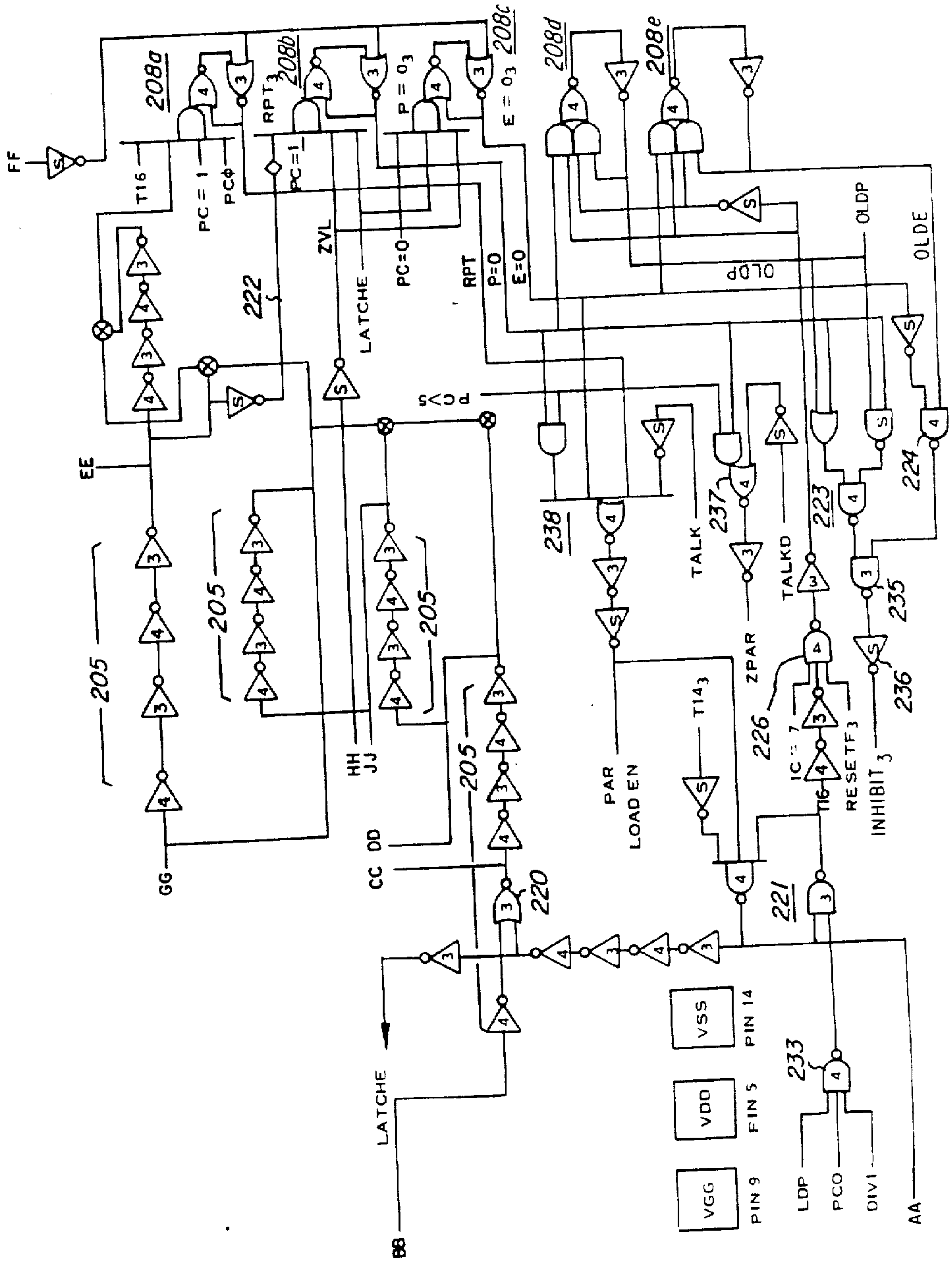
Figure 8D:
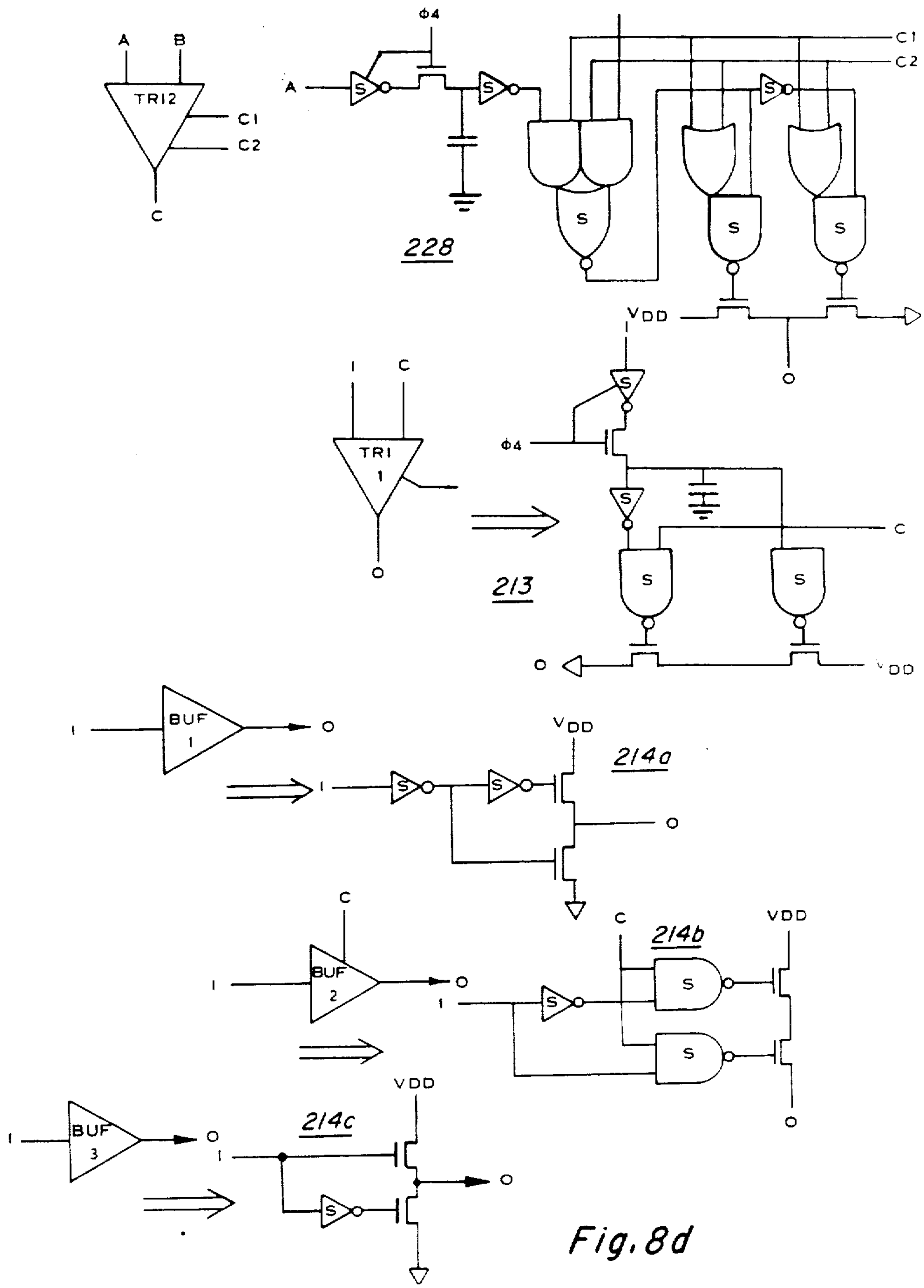
Figure 8E:
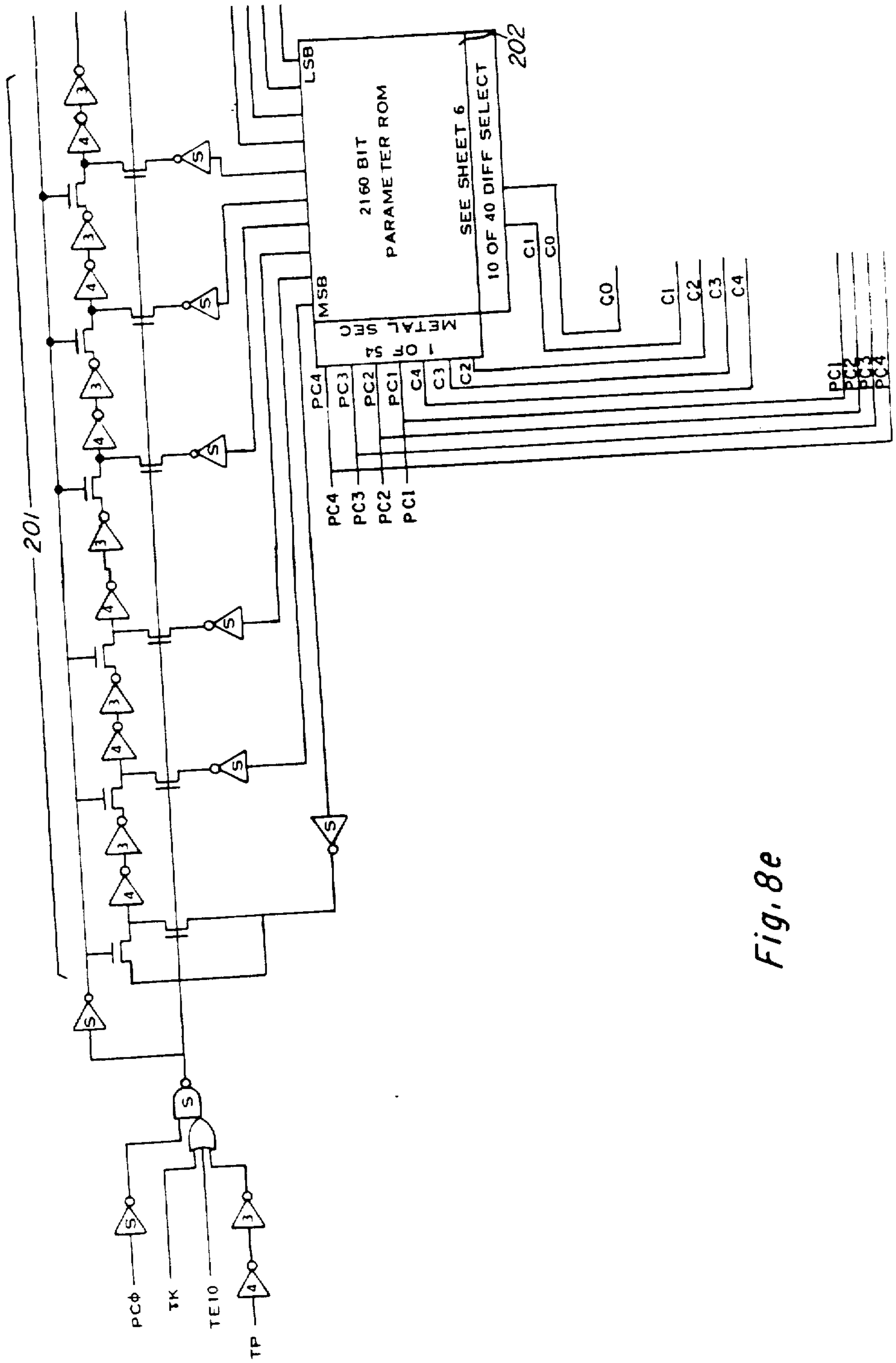
Figure 8F:
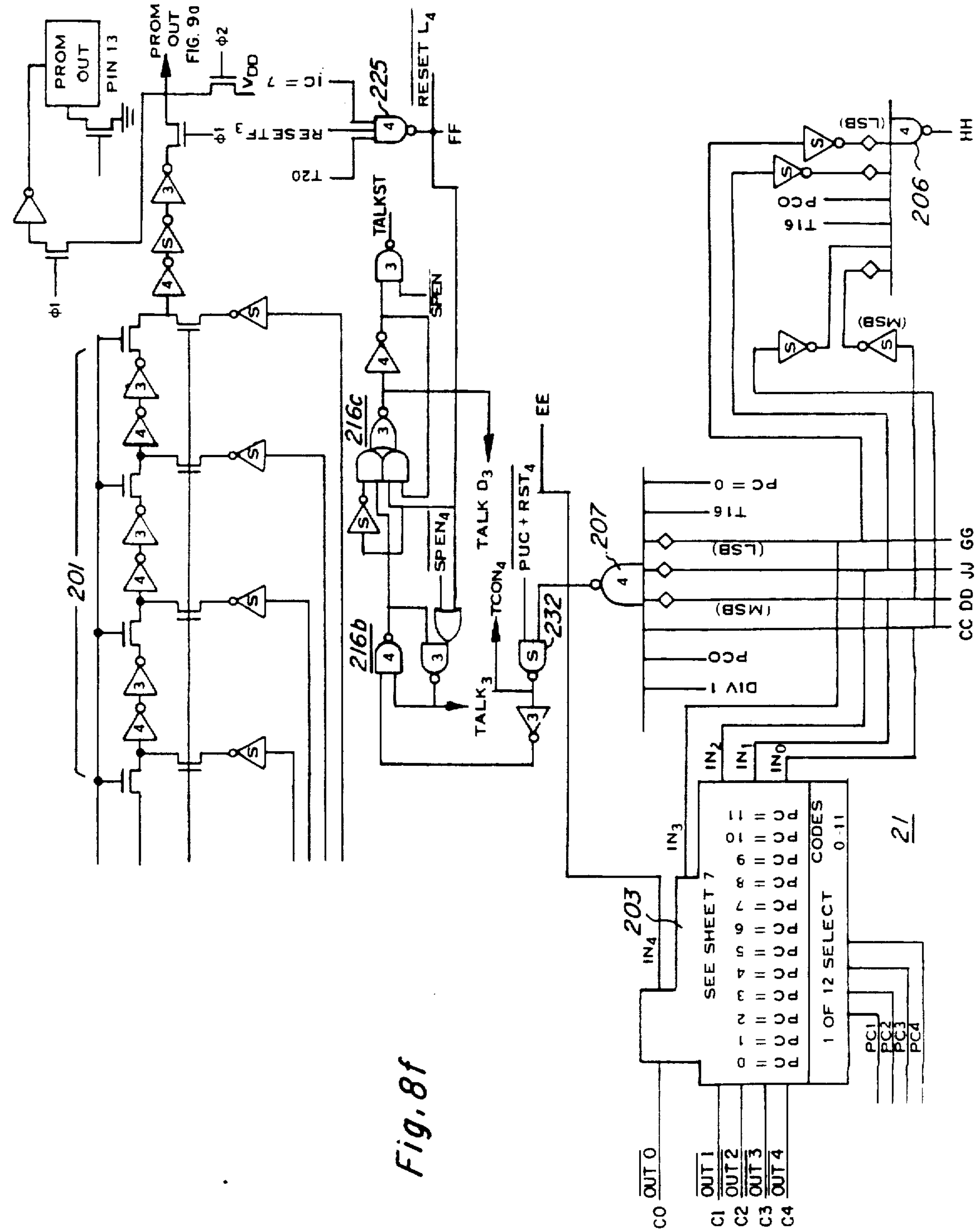

The Talk latch 216 shown in FIG. 8f preferably comprises three latches 216a, 216b and 216c. Latch 216a is set in response to a decoded SPK command and generates, in response thereto, a speak enable (SPEN) signal. As will be seen, SPEN is also generated in response to a decoded SPKSLOW command by latch 215a. Latch 216b is set in response to speak enable during IC7 as controlled by gate 225. Latches 216a and 216b are reset in response to (1) a decoded reset command, (2) an energy equals fifteen code or (3) on a power-up clear by gate 232. Talk delayed latch 216c is set with the contents of latch 216b at the following IC7 and retains that data through eight interpolation counts. As was previously mentioned, the talk delayed latch permits the speech synthesizer to continue producing speech data for eight interpolation cycles after a coded energy=0 condition has been detected setting latch 208c. Likewise, slow talk latch 215 is implemented with latches 215a, 215b and 215c. Latch 215a enables the speak enable signal while latches 215b and 215c enable the production of the SLOWD signal in much the same manner as latches 216b and 216c enable the production of the TALKD signal.

Considering now, briefly, the timing interactions for inputting data into parameter input register 205, it will be recalled that this is controlled chiefly by a control gate 220 in response to the state of a parameter input latch 221. Of course, the state of the latch is controlled by the LDP signal applied to gate 233. The PC0 and DIV1 signals are applied to gate 233 to assure that the parameters are loaded during the A cycle of a particular parameter count during IC0. The particular parameter and the parameter T-Time within the parameter count is controlled by LDP according to the portion 511a of timing PLA 511 (FIGS. 7a–7d). The first parameter inputted (Energy) is four bits long and therefore LDP is initiated during time period T5 (as can be seen in FIGS. 7a–7d). During parameter count 1, the repeat bit and pitch bits are inputted, this being six bits which are inputted according to LDP which comes up at time period T1. Of course, there are four time periods difference between T1 and T5 but only two bits difference in the length of the inputted information. This occurs because it takes two time periods to input each bit into parameter input register 205 (which has two stages per each inputted bit) due to the fact that ROMs 12A–12B are preferably clocked at half the rate at that which synthesizer 10 is clocked. By clocking the ROM chips at half the rate, that the synthesizer 10 chip is clocked simplifies the addressing of the read-only-memories in the aforesaid ROM chips and yet, as can be seen, data is supplied to the synthesizer 10 in plenty of time for performing numerical operations thereon. Thus, in section 511a of timing PLA 511, LDP comes up at T1 when the corresponding parameter count indicates that a six bit parameter is to be inputted, comes up at T3 when the corresponding parameter count indicates that a five bit parameter is to be inputted, comes up at T5 when the corresponding parameter count indicates that a four bit parameter is to be inputted and comes up at time period T7 when the corresponding parameter count (e.g. parameter counts 9, 10, and 11 which correspond to a three bit coded parameter) indicates that a three bit parameter is to be inputted. ROMs 12A–12B are signaled that the addressed parameter ROM is to output information when signaled via $I_0$ instruction pin, ROM control logic 217 and line 234 which provides information to ROM control logic 217 from latch 221.

PARAMETER INTERPOLATOR LOGIC DIAGRAM

Referring now to FIGS. *9a–9d*, which form a composite diagram the parameter interpolator logic 23 is shown in detail. K-stack 302 comprises ten registers each of which store ten bits of information. Each small square represents one bit of storage, according to the convention depicted at numeral 330. The contents of each shift register is arranged to recirculate via recirculation gates 314 under control of a recirculation control gate 315. K-stack 302 stores speech coefficients K1–K9 and temporarily stores coefficient K10 or the energy parameter generally in accordance with the speech synthesis apparatus of FIG. 7 of U.S. Pat. No. 4,209,844. The data outputted from K-stack 302 to recoding logic 301 at various time periods is shown in Table IX. In Table III of U.S. Pat. No. 4,209,844 is shown the data outputted from the K-stack of FIG. 7 thereof. Table IX of this patent differs from Table III of the aforementioned patent because of (1) recoding logic 301 receives the same coefficient on lines 32-1 through 32-4, on lines 32-5 and 32-6, on lines 32-7 and 32-8 and on lines 32-9 and 32-10 because, as will be seen, recoding logic 301 responds to two bits of information for each bit which was responded to by the array multiplier of the aforementioned U.S. Patent; (2) because of the difference in time period nomenclature as was previously explained with reference to FIG. 5; and (3) because of the time delay associated with the recoding logic 301.

Recoding logic 301 couples K-stack 302 to array multiplier 401 (FIGS. 10*a*–10*c*). Recoding logic 301 includes four identical recoding stages 312*a*–312*d*, only one of which, 312*a*, is shown in detail. The first stage of the recoding logic, 313, differs from stages 312*a*–312*d* basically because there is, of course, no carry, such as occurs on input A in stages 312*a*–312*d*, from a lower order stage. Recoding logic outputs $\overline{+2}$, $\overline{-2}$, $\overline{+1}$ and $\overline{-1}$ to each stage of a five stage array multiplier 401, except for stage zero which receives only $\overline{-2}$, $\overline{+1}$ and $\overline{-1}$ outputs. Effectively recoding logic 301 permits array multiplier to process, in each stage thereof, two bits in lieu of one bit of information, using Booth's algorithm. Booth's algorithm is explained in "Theory and Application of Digital Signal Processing", published by Prentice-Hall 1975, at pp. 517–18.

The K10 coefficient and energy are stored in E10 loop 304. E10 loop preferably comprises a twenty stage serial shift register; ten stages 904*a* of E10 loop 304 are preferably coupled in series and another ten stages 304*b* are also coupled in series but also have parallel outputs and inputs to K-stack 302. The appropriate parameter, either energy of the K10 coefficient, is transferred from E10 loop 304 to K-stack 302 via gates 315 which are responsive to a NOR gate 316 for transferring the energy parameter from E10 loop 304 to K-stack 302 at a time period T10 and transferring coefficient K10 from E10 loop 304 to K-stack 302 at time period T20. NOR gate 316 also controls recirculation control gate 315 for inhibiting recirculation in K-stack 302 when data is being transferred.

KE10 transfer register 303 facilitates the transferring of energy or the K1–K10 speech coefficients which are stored in E10 loop 304 or K-stack 302 to subtractor 308 and delay circuit 309 via selector 307. Register 303 has nine stages provided by paired inverters and a tenth stage being effectively provided by selector 307 and gate 317 for facilitating the transfer of ten bits of information either from E10 loop 304 or K-stack 302. Data is transferred from K-stack 302 to register 303 via transfer gates 318 which are controlled by a Transfer K (TK) signal generated by decoder portion 511*b* of timing PLA 511 (FIGS. *7a–7d*). Since the particular parameter to be interpolated and thus shifted into register 303 depends upon the particular parameter count in which the synthesizer is operating and since the particular parameter available to be outputted from K-stack 302 is a function of particular time period the synthesizer is operating in, the TK signal comes up at T9 for the pitch parameter, T8 for the K1 parameter, T7 for the K2 parameter and so forth, as is shown in FIGS. *7a–7d*. The energy parameter or the K10 coefficient is clocked out of E10 loop 304 into register 303 via gates 319 in response to a TE10 signal generated by a timing PLA 511. After each interpolation, that is during the B cycle, data is transferred from register 303 into (1) K-stack 302 via gates 318 under control of signal TK, at which time recirculation gates 314 are turned off by gate 315, or (2) E10 loop 304 via gates 319.

A ten bit pitch parameter is stored in a pitch register 305 which includes a nine stage shift register as well as recirculation elements 305*a* which provide another bit of storage. The pitch parameter normally recirculates in register 305 via gate 305*a* except when a newly interpolated pitch parameter is being provided on line 320, as controlled by pitch interpolation control logics 306. The output of pitch register 305 (PT0) or the output from register 303 is applied by selector 307 to gate 317. Selector 307 is also controlled by logics 306 for normally coupling the output of register 303 to gate 317 except when the pitch is to be interpolated. Logics 306 are responsive for outputting pitch to subtractor 308 and delay 309 during the A cycle of PC=1 and for returning the interpolated pitch value on line 320 on the B cycle of PC=1 to register 305. Gate 317 is responsive to a latch 321 for only providing pitch, energy or coefficient information to subtractor 308 and delay circuit 309 during the interpolation. Since the data is serially clocked, the information may be started to be clocked during an A portion and PC0 may switch to a logical one sometime during the transferring of the information from register 303 or 305 to subtractor 308 or delay circuit 309, and therefore, gate 317 is controlled by an A cycle latch 321, which latch is set with PC0 at the time a transfer coefficient (TK) transfer E10 (TE10) or transfer pitch (TP) signal is generated by timing PLA 511.

Figure 9A:
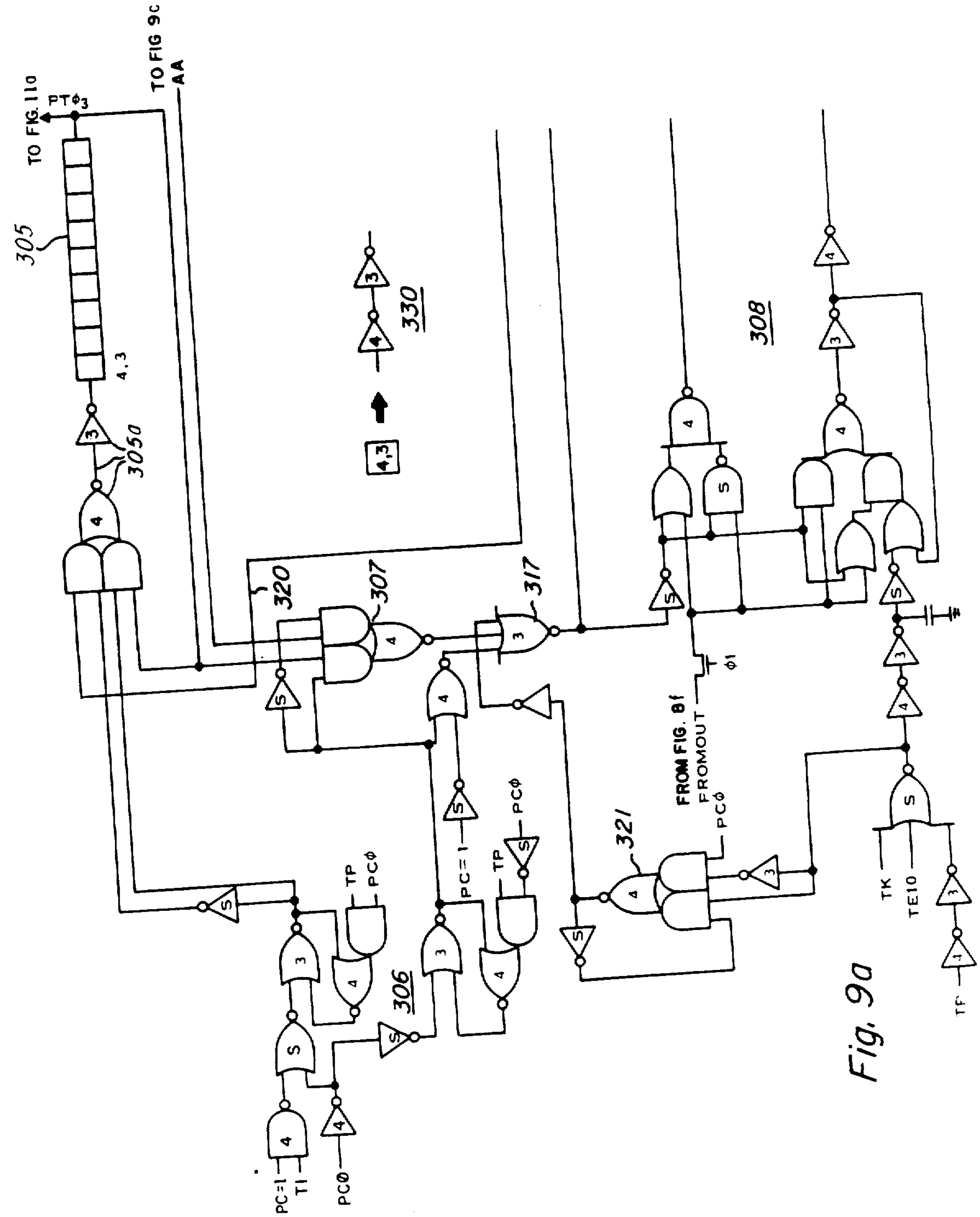
Figure 9B:
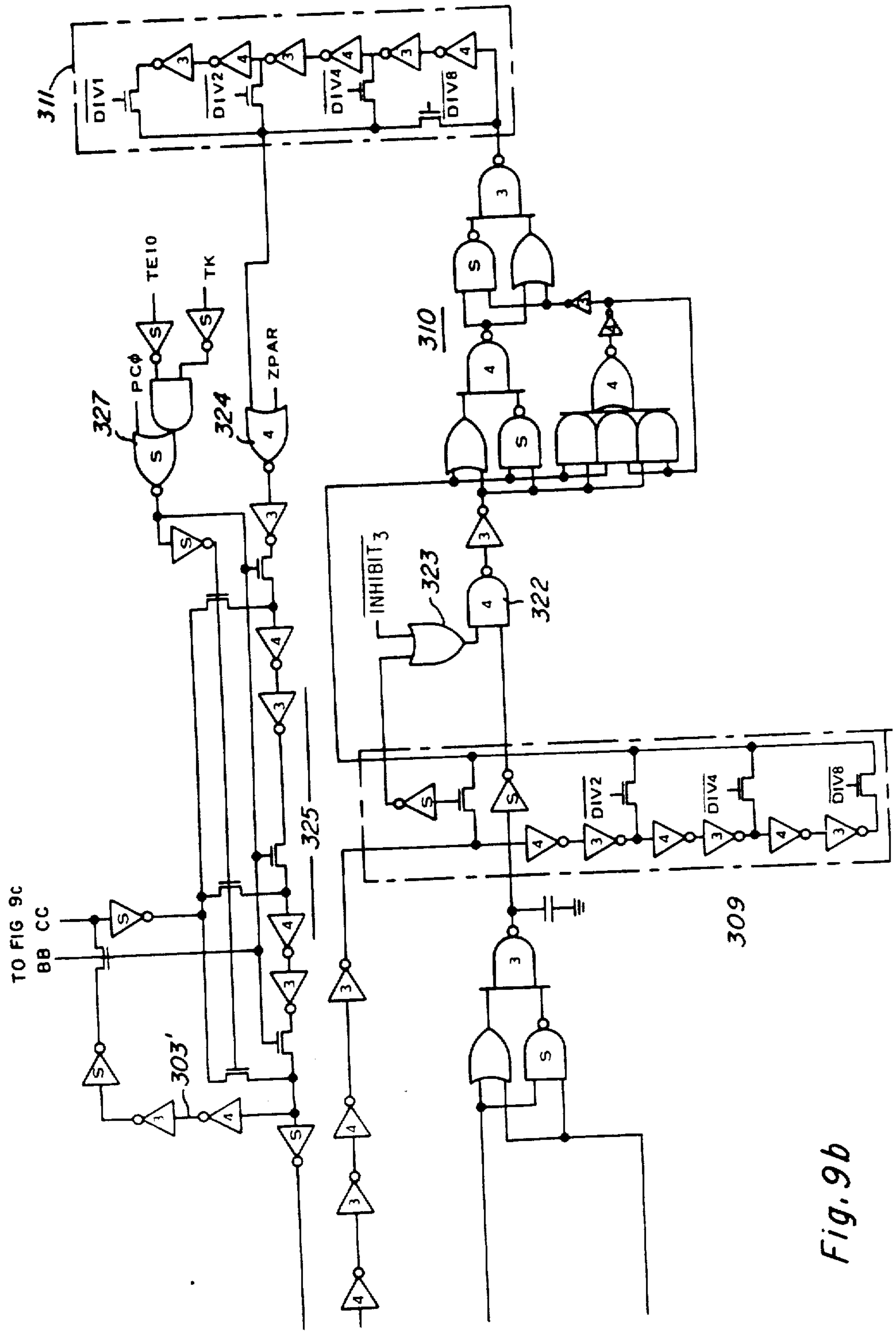
Figure 9C:
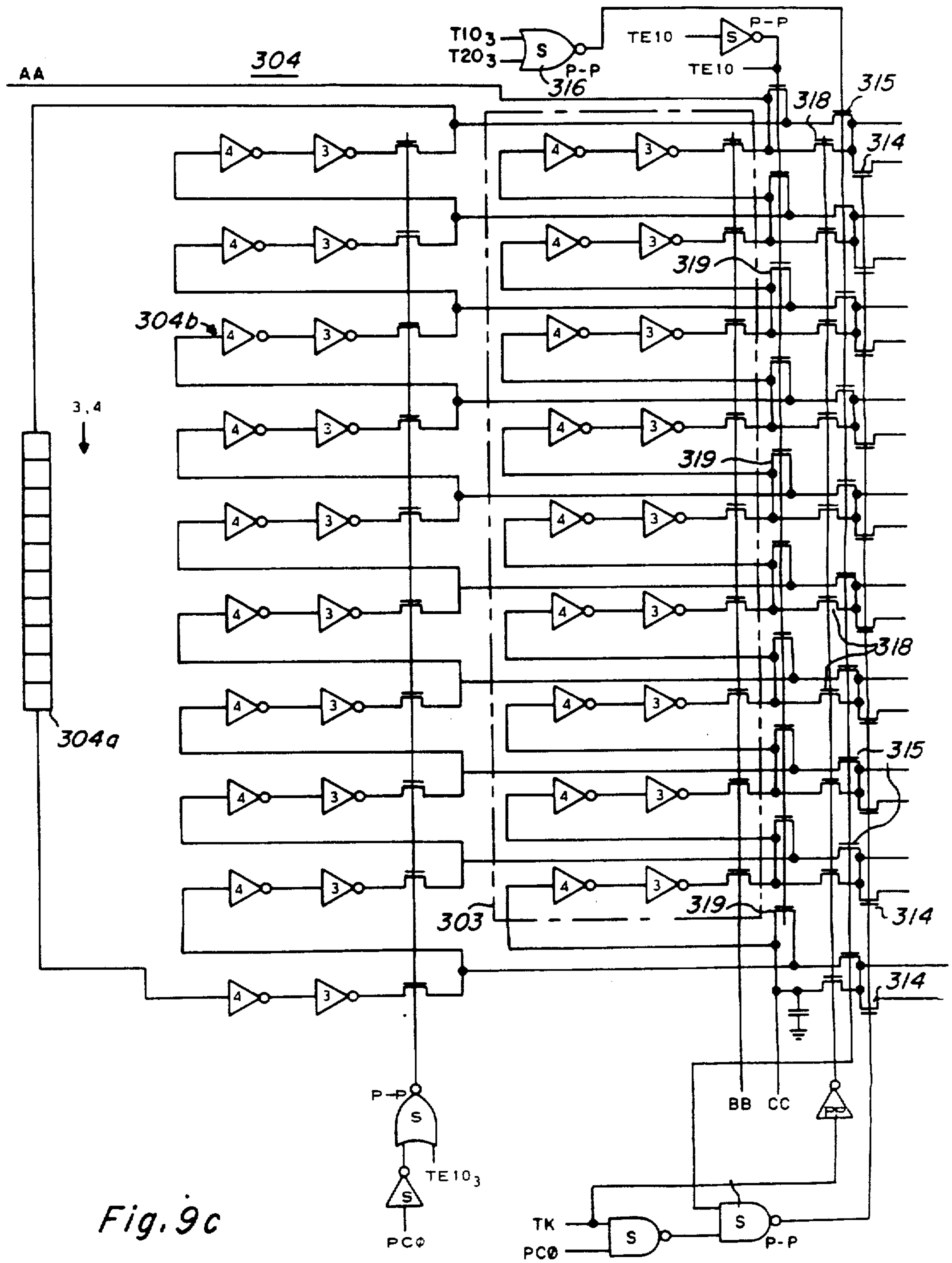

The output of gate 317 is applied to subtractor 308 and delay circuit 309. The delay in delay circuit 309 depends on the state of DIV1–DIV8 signals generated by interpolation counter 515 (FIG. *7a*). Since the data exits gate 317 with the least significant bit first, by delaying the data in delay circuit 309 a selective amount, and applying the output to adder 310 along with the output of subtractor 308, the more delay there is in circuit 309, the smaller the effective magnitude of the difference from subtractor 308 which is subsequently added back in by adder 310. Delay circuit 311 couples adder 310 back into registers 303 and 305. Both delay circuits 309 and 311 can insert up to three bits of delay and when delay circuit 309 is at its maximum, delay circuit 311 is at its minimum delay and vice-versa. A NAND gate 322 couples the output of subtractor 308 to the input of adder 310. Gate 322 is responsive to the output of an OR gate 323 which is in turn responsive to INHIBIT from inverter 236 (FIGS. 8*c* and 9*b*). Gates 322 and 323 act to zero the output from subtractor 308 when the INHIBIT signal comes up unless the interpolation counter is at IC0 in which case the present values in K-stack 302, E10 loop 304 and pitch register 305 are fully interpolated to their new target values in a one step interpolation. When an unvoiced frame (FIG. 6) is supplied to the speech synthesis chip, coefficients K5–K10 are set to zero by the action of gate 324 which couples delay circuit 311 to shift register 325 whose output is then coupled to gates 305*a* and 303'. Gate 324 is responsive to the zero parameter (ZPAR) signal generated by gate 237 (FIGS. 8*c* and 9*b*).

Gate 326 disables shifting in the 304*b* portion of E10 loop 304 when a newly interpolated value of energy or K10 is being inputted into portion 304*b* from register 303. Gate 327 controls the transfer gates coupling the stages of register 303, which stages are inhibited from serially shifting data therebetween when TK or TE10 goes high during the A cycle, that is, when register 303 is to be receiving data from either K-stack 302 or E10 loop 304 as controlled by transfer gates 318 or 319, respectively. The output of gates 327 is also connected to various stages of shift register 325 and to a gate coupling 303' with register 303. Whereby up to the three bits which may trail the ten most significant bits after an interpolation operation may be zeroed.

ARRAY MULTIPLIER LOGIC DIAGRAM

FIGS. 10*a*–10*c* form a composite logic diagram of array multiplier 401. Array multipliers are sometimes referred to as Pipeline Multipliers. For example, see "Pipeline Multiplier" by Granville E. Ott, published by the University of Missouri.

Figure 9D:
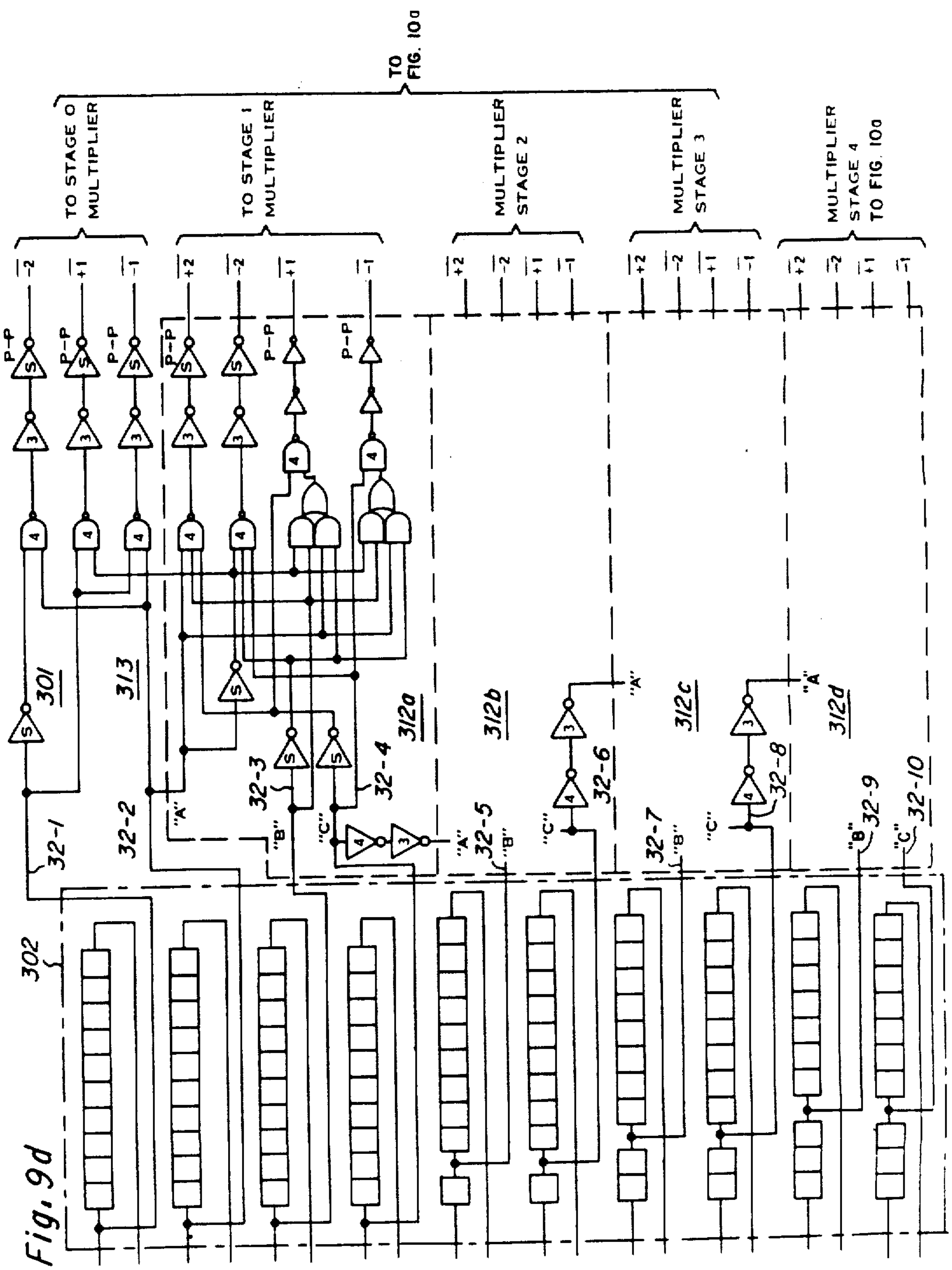

Array multiplier 401 has five stages, stage 0 through stage 4, and a delay stage. The delay stage is used in array multiplier 401 to give it the same equivalent delay as the array multiplier shown in U.S. Pat. No. 4,209,844. The input to array multiplier 401 is provided by signals $MR_0$–$MR_{13}$, from multiplier multiplexer 415. $MR_{13}$ is the most significant bit while $MR_0$ is the least significant bit. Another input to array multiplier are the aforementioned +2, −2, +1 and −1 outputs from recoding logic 301 (FIG. 9*d*). The output from array multiplier 401, $P_{13}$-$P_0$, is applied to summer multiplexer 402. The least signficant bit thereof, P0, is in this embodiment always made a logical one because doing so establishes the mean of the truncation error as zero instead of $-\frac{1}{2}$ LSB which value would result from a simple truncation of a two's complement number.

Array multiplier 401 is shown by a plurality of box elements labeled A-1, A-2, B-1, B-2, B-3 or B-C. The specific logic elements making up these box elements are shown in FIG. 10*c* in lieu of repetitively showing these elements and making up a logic diagram of array multiplier 401, for simplicity sake. The A-1 and A-2 block elements make up stage zero of the array multiplier and thus are each responsive to the $\overline{-2}$, $\overline{+1}$ and $\overline{-1}$ signals outputted from decoder 313 and are further responsive to MR2–MR13. When multipliers occur in array multiplier 401, the most significant bit is always maintained in the left most column elements while the partial sums are continuously shifted toward the right. Inasmuch as each stage of array multiplier 401 operates on two binary bits, the partial sums, labeled Σn, are shifted to the right two places. Thus no A type blocks are provided for the MR0 and MR1 data inputs to the first stage. Also, since each block in array multiplier 401 is responsive to two bits of information from K-stack 302 received via recoding logic 301, each block is also responsive to two bits from multiplier multiplexer 415, which bits are inverted by inverters 430, which bits are also supplied in true logic to the B type blocks.

FILTER AND EXCITATION GENERATOR LOGIC DIAGRAM

FIGS. 11*a*–11*d* form a composite, detailed logic diagram of lattice filter and excitation generator 24 (other than array multiplier 401) and output section 25. In filter and excitation generator 24 is a summer 404 which is connected to receive at one input thereof either the true or inverted output of array multiplier 401 (see FIGS. 10*a*–10*c*). on lines P0–P13 via summer multiplexer 402. The other input of adder 404 is connected via summer multiplexer 402 to receive either the output of adder 404 (atT10–T18), the output of delay stack 406 on lines 440–453 at T20-T7 and T9), the output of Y-latch 403 (at T8) or a logical zero from Φ3 precharge gate 420 (at T19 when no conditional discharge is applied to this input). The reasons these signals are applied at these times can be seen from FIG. 8 of the aforementioned U.S. Pat. No. 4,209,844; it is to be remembered of course, that the time period designations differ as discussed with reference to FIG. 5 hereof.

The output of adder 404 is applied to delay stack 406, multiplier multiplexer 415, one period delay gates 414 and summer multiplexer 402. Multiplier multiplexer 415 includes one period delay gates 414 which are generally equivalent to one period delay 34' of FIG. 7 in U.S. Pat. No. 4,209,844. Y-latch 403 is connected to receive the output of delay stack 406. Multiplier multiplexer 415 selectively applies the output from Y-latch 403, one period delay gates 414, or the excitation signal on bus 415' to the input MR0–MR13 of array multiplier 401. The inputs D0–D13 to delay stack 406 are derived from the outputs of adder 404. The logics for summer multiplexer 402, adder 404, Y-latch 403, multiplier multiplexer 415 and one period delay circuit 414 are only shown in detail for the least significant bit as enclosed by dotted line reference A. The thirteen most significant bits in the lattice filter also are provided by logics such as those enclosed by the reference line A, which logics are denoted by long rectangular phantom line boxes labeled "A". The logics for each parallel bit being processed in the lattice filter are not shown in detail for sake of clarity. The portions of the lattice filter handling bits more significant than the least significant bit differ from the logic shown for elements 402, 403, 404, 415, and 414 only with respect to the interconnections made with truncation logics 425 and bus 415' which connects to UV gate 408 and chirp ROM 409. In this respect, the output from UV gate 408 and chirp ROM 409 is only applied to inputs I13-I6 and therefore the input labeled $I_x$ within the reference A phantom line is not needed for the six least significant bits in the lattice filter. Similarly, the output from the Y-latch 403 is only applied for the ten most significant bits, $YL_{13}$ through $YL_4$, and therefore the connection labeled YLx within the reference line A is not required for the four least significant bits in the lattice filter.

Delay stack 406 comprises 14 nine bit long shift registers, each stage of which comprise inverters clocked on Φ4 and 101 3 clocks. As is discussed in U.S. Pat. No. 4,209,844, the delay stack 406 which generally corresponds to shift register 35' of FIG. 7 of the aforementioned patent, is only shifted on certain time periods. This is accomplished by logics 416 whereby Φ1B–Φ4B clocks are generated from T10–T18 timing signal from PLA 512 (FIGS. 7a–7d). The clock buffers 417 in circuit 416 are also shown in detail in FIG. 11c.

Delay stack 406 is nine bits long whereas shift register 35' in FIG. 7 of U.S. Pat. No. 4,209,844 was eight bits long; this difference occurs because the input to delay stack 406 is shown as being connected from the output of adder 404 as opposed to the output of one period delay circuit 414. Of course, the input to delay stack 406 could be connected from the outputs of one period delay circuit 414 and the timing associated therewith modified to corespond with that shown in U.S. Pat. No. 4,209,844.

The data handled in delay stack 406, array multiplier 401, adder 404, summer multiplexer 402, Y-latch 403, and multiplier multiplexer 415 is preferably handled in two's complement notation.

Unvoiced generator 407 is a random noise generator comprising a shift register 418 with a feedback term supplied by feedback logics 419 for generating pseudorandom terms in shift register 418. An output is taken therefrom and is applied to UV gate 408 which is also responsive to OLDP from latch 208d (FIG. 8c). Old pitch latch 208d controls gate 408 because pitch=0 latch 208b changes state immediately when the new speech parameters are inputted to register 205. However, since this occurs during interpolation count IC0 and since, during an unvoiced condition the new values are not interpolated into K-stack 302, E10 loop 304 and pitch register 305 until the following ICO, the speech excitation value cannot change from a periodic excitation from chirp ROM 409 to a random excitation from unvoiced generator 407 until eight interpolation cycles have occurred. Gate 420 nors the output of gate 408 into the most significant bit of the excitation signal, $I_{13}$, thereby effectively causing the sign bit to randomly change during unvoiced speech. Gate 421 effectively forces the most significant bit of the excitation signal, $I_{12}$, to a logical one during unvoiced speech conditions. Thus the combined effect of gates 408, 420 and 421 is to cause a randomly changing sign to be associated with a steady decimal equivalent value of 0.5 to be applied to the lattice filter and Filtering Excitation Generator 24.

During voiced speed, chirp ROM 409 provides an eight bit output on lines $I_6$–$I_{13}$ to the lattice filter. This output comprises forty-one successively changing values which, when graphed, represent a chirp function. The contents of ROM 409 are listed in Table X; ROM 409 is set up to invert its outputs and thus the data is stored therein in complemented format. The chirp function value and the complemented value stored in the chirp ROM are expressed in two's complement hexadecimal notation. ROM 409 is addressed by an eight bit register 410 whose contents are normally updated during each cycle through the lattice filter by add one circuit 411. The output of register 410 is compared with the contents of pitch register 305 in a magnitude comparator 413 for zeroing the contents of 410 when the contents of register 410 become equal to or greater than the contents of register 305. ROM 409, which is shown in greater detail in FIGS. 14a–14b, is arranged so that addresses greater than 110010 cause all zeros to be outputted on lines $I_{13}$–$I_6$ to multiplier multiplexer 415. Zeros are also stored in address locations 41–51. Thus, the chirp may be expanded to occupy up to address location fifty, if desired.

RANDOM ACCESS MEMORY LOGIC DIAGRAM

Referring now to FIGS. 12a–12b, there is shown a composite detailed logic diagram of RAM 203. RAM 203 is addressed by address on PC1–PC4, which address is decoded in a PLA 203a and defines which coded parameter is to be inputted into RAM 203. RAM 203 stores the twelve coded parameters, the parameters having bit lengths varying between three bits and five bits according to the coding scheme described with reference to FIG. 6. Each cell, reference B, of RAM 203 is shown in greater detail in FIG. 12b. Read/Write control logic 203b is responsive to T1, DIV1, PC0 and parameter load enable for writing into the RAM 203 during the A cycle of each parameter count during interpolation count zero when enabled by parameter load enable from logics 238 (FIG. 8c). Data is inputted to RAM 203 on lines IN0–IN4 from register 205 as shown in FIGS. 8c and 8f and data is outputted on lines C0–C4 to ROM 202 as is shown in FIGS. 8e and 8f.

PARAMETER READ-ONLY-MEMORY LOGIC DIAGRAM

In FIGS. 13a–13c, there is shown a logic diagram of ROM 202. ROM 202 is preferably a virtual ground ROM of the type disclosed in U.S. Pat. No. 3,934,233. Address information from RAM 203 and from parameter counter 513 are applied to address buffers 202b which are shown in detail at reference A. The NOR gates 202a used in address buffers 202b are shown in detail at reference B. The outputs of the address buffers 202b are applied to an X-decoder 202c or to a Y-decoder 202d. The ROM is divided into ten sections labeled reference C, one of which is shown in greater detail. The outline for output line from each of the sections is applied to register 201 via inverters as shown in FIGS. 8e and 8f. X-decoder selects one of fifty-four X-decode lines while Y-decoder 202d tests for the presence or nonpresence of a transistor cell between an adjacent pair of diffusion lines, as is explained in greater detail in the aforementioned U.S. Pat. No. 3,934,233. The data preferably stored in ROM 202 of this embodiment is listed in Table VIII.

CHIRP READ-ONLY-MEMORY LOGIC DIAGRAM

FIGS. 14a–14b form a composite diagram of chirp ROM 409. ROM 409 is addressed via address lines $\overline{A_0}$–$\overline{A_8}$ from register 410 (FIG. 11c) and output information on lines $I_6$–$I_{11}$ to multiplier multiplexer 415 and lines $I_{m1}$ and $I_{m2}$ to gates 421 and 420, all which are shown in FIGS. 11a–11d. As was previously discussed with reference to FIGS. 11a and 11b, chirp ROM outputs all zeros after a predetermined count is reached in register 410, which, in this case is the count equivalent to a decimal 51. ROM 409 includes a Y-decoder 409a which is responsive to the address on lines $\overline{A_0}$ and $\overline{A_1}$ (and $A_0$ and $A_1$) and an X-decoder 409b which is responsive to the address on lines $\overline{A_2}$ through $\overline{A_5}$ (and $A_2$–$A_5$).

ROM 409 also includes a latch 409c which is set when decimal 51 is detected on lines $\overline{A_0}$–$\overline{A_5}$ according to line 409c from a decoder 409e. Decoder 409e also decodes a logical zero on lines $\overline{A_0}$–$\overline{A_8}$ for resetting latch 409c. ROM 409 includes timing logics 409f which permit data to be clocked in via gates 409g at time period T12. At this time decoder 409e checks to determine whether either a decimal 0 or decimal 51 is occurring on address lines $\overline{A_0-A_8}$. If either condition occurs, latch 409*c*, which is a static latch, is caused to flip.

An address latch 409*h* is set at time period T13 and reset at time period T11. Latch 409*h* permits latch 409*c* to force a decimal 51 onto lines $\overline{A_0-A_5}$ when latch 409*c* is set. Thus, for addresses greater than 51 address register 410, the address is first sampled at time period T12 to determine whether it has been reset to zero by reset logic 412 (FIG. 11*c*) for the purpose of resetting latch 409*c* and if the address has not been reset to zero then whatever address has been inputted on lines $\overline{A_0-A_8}$ is written over by logics 409*j* at T13. Of course, at location 51 in ROM 409 will be stored all zeros on the output lines I6–I11, IM1 and IM2. Thus by the means of logics 409*c*, 409*h* and 409*j* addresses of a preselected value, in this case a decimal 51, are merely tested to determine whether a reset has occurred but are not permitted to address the array of ROM cells via decoders 409*a* and 409*b*. Addresses between a decimal 0 and 50 address the ROM normally via decoders 409*a* and 409*b*. The ROM matrix is preferably of the virtual ground type described in U.S. Pat. No. 3,934,233. As aforementioned, the contents of ROM 409 are listed in Table X. The chirp function is located at addresses 00–40 while zeros are located at addresses 41–51.

TRUNCATION LOGIC AND DIGITAL-TO-ANALOG CONVERTER

Turning again to FIGS. 11*a*–11*d*, the truncation logic 425 and Digital-to-Analog (D/A) converter are shown in detail. Truncation logic 425 includes circuitry for converting the two's complement data on $YL_{13}$–$YL_{14}$ to sign magnitude data. Logics 425*a* test the MSB from Y-latch 403 on line $YL_{13}$ for the purpose of generating a sign bit and for controlling the two's complement to sign magnitude conversion accomplished by logics 425*c*. The sign bit is supplied in true and false logic on lines D/Asn and $\overline{D/Asn}$ to D/A converter 426.

Logics 425*c* convert the two's complement data from Y-latches 403 in lines $YL_{10}$–$YL_4$ to simple magnitude notation on lines $\overline{D/A_6}$–$\overline{D/A_0}$. Only the logics 425*c* associated with YL10 are shown in detail for sake of simplicity.

Logics 425*b* sample the $YL_{12}$ and $YL_{11}$ bits from the Y-latches 403 and perform a magnitude truncation function thereon by forcing outputs $\overline{D/A_6}$ through $\overline{D/A_0}$ to a logical zero (i.e., a value of one if the outputs were in true logic) whenever either $YL_{12}$ or $YL_{11}$ is a logical one and $YL_{13}$ is a logical zero, indicating that the value is positive or either $YL_{12}$ or $YL_{11}$ is a logical zero and $YL_{13}$ is a logical one, indicating that the value is negative (and complemented, of course). Whenever one of these conditions occurs, a logical zero appears on line 427 and Vss is thereby coupled to the output buffer 428 in each of logics 425*c*. The magnitude function effectively truncates the more significant bits on $YL_{11}$ and $YL_{12}$. It is realized that this is somewhat unorthodox truncation), since normally the less significant bits are truncated in most other circuits where truncation occurs. However, in this circuit, large positive or negative values are effectively clipped. More important digital speech information, which has smaller magnitudes, is effectively amplified by a factor of four by this truncation scheme.

The outputs $\overline{D/A_6}$–$\overline{D/A_0}$, along with $\overline{D/Asn}$ and D/Asn, are coupled to D/A converter 426. D/A converter 426 preferably has seven MOS devices 429 coupled to the seven lines $\overline{D/A_6}$ through $\overline{D/A_0}$ from truncation logics 425. Devices 429 are arranged, by controlling their length to width rations, to pass different amounts of electrical current, the device 429 coupled to $\overline{D/A_6}$ passing twice as much current (when on) as the device 429 coupled to $\overline{D/A_5}$. Likewise the device 429 coupled to $\overline{D/A_5}$ is capable of passing twice as much current as the device 429 coupled to $\overline{D/A_4}$. This two to one current passing capability similarly applies to the remaining devices 429 coupled to the remaining lines $\overline{D/A_3}$–$\overline{D/A_0}$. Thus, device 429 coupled to $\overline{D/A_1}$, is likewise capable of passing twice as much current as the device 429 coupled to $\overline{D/A_2}$. All devices 429 are connected in parallel, one side of which is preferably coupled to Vss and the other side is preferably coupled to either side of the speaker 4 via transistors 430 and 431. Transistor 430 is controlled by $\overline{D/Asn}$ which is applied to its gates; transistor 431 is turned off and on in response to D/Asn. Thus, either transistor 430 or 431 is on depending on the state of the sign bit, D/Asn. The voice coil of speaker 4 preferably has a 100 ohm impedance and has a center tap connected to Vgg as shown in FIG. 23*a*. Thus, the signals on lines $\overline{D/A_6}$–$D/A_0$ control the magnitude of current flow through the voice coil while the signals on lines D/Asn and $\overline{D/Asn}$ control the direction of that flow.

Alternatively to using a center-tapped 100 ohm voice coil, a more conventional eight ohm speaker may be used along with a transformer having a 100 ohm center tapped primary (connected to Vgg and transistors 430 and 431) and an eight ohm secondary (connected to the speaker's terminals) as shown in FIG. 23*b*. In yet another embodiment, the center tap may be eliminated altogether by utilizing transistors 432 and 433 as shown in FIG. 23*c*, which are not used in the embodiments utilizing the center tapped transformer or voice coil.

It should now be appreciated by those skilled in the art that D/A converter 426 not only converts digital sign magnitude information on lines $\overline{D/A_6}$–$\overline{D/A_0}$ and D/Asn-$\overline{D/Asn}$ to an analog signal, but has effectively amplified this analog signal to sufficient levels to permit a speaker to be driven directly from the MOS synthesis chip 10 (or via the aforementioned transformer, if desired). Of course, those skilled in the art will appreciate that simple D/A converters, such as that disclosed here, will find use in other applications in addition to speech synthesis circuits.

THE SPEECH SYNTHESIZER CHIP

Figure 4B:
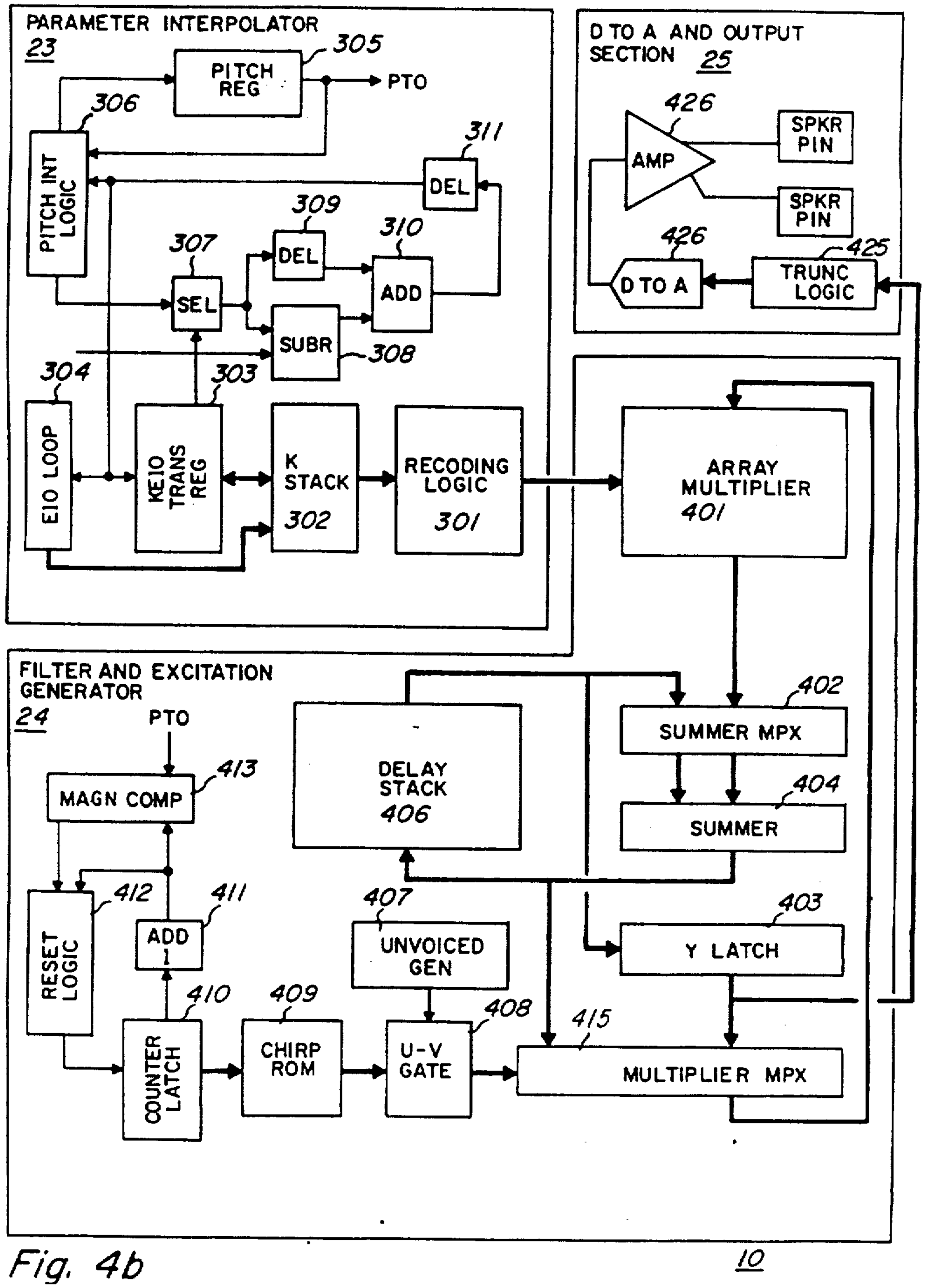

In FIG. 22 a greatly enlarged plan view of a semiconductor chip which contains the entire system of FIGS. 4*a* and 4*b* is illustrated. The chip is only about two hundred fifteen mils (about 0.215 inches) on a side. In the example shown, the chip is manufactured by the P-channel metal gate process using the following design rules: metal line width 0.25 mil; metal line spacing 0.25 mil; diffusion line width 0.15 mil; and diffusion line spacing 0.30 mil. Of course, as design rules are tightened with the advent of electron beam mask production or slice writing, and other techniques, it will be possible to further reduce the size of the synthesizer chip. The size of the synthesizer chip can, of course also be reduced by not taking advantage of some of the features preferably used on the synthesizer chip.

The total active area of speech synthesizer chip 10 is approximately 45,000 square mils.

It will also be appreciated by those skilled in the art, that other MOS manufacturing techniques, such as N- channel, complementary MOS (CMOS) or silicon gate processes may alternatively be used.

The various parts of the system are labeled with the same reference numerals previously used in this description.

CONTROLLER LOGIC DIAGRAMS

The controller used in the learning aid is preferably a microprocessor of the type described in U.S. Pat. No. 4,074,355, with modifications which are subsequently described. U.S. Pat. No. 4,074,355 is hereby incorporated herein by reference. It is to be understood, of course, that other microprocessors, as well as future microprocessors, may well find use in applications such as the speaking arithmetic learning aid described herein.

The microprocessor of U.S. Pat. No. 4,074,355 is an improved version of an earlier microprocessor described in U.S. Pat. No. 3,991,305. One of the improvements concerned the elimination of digit driver devices so that arrays of light emitting diodes (LED's) forming a display could be driven directly from the microprocessor. As a matter of design choice, the display used with this arithmetic learning aid is preferably a vacuum fluorescent (VF) display device. Those skilled in the art will appreciate that when LED's are directly driven, the display segments are preferably sequentially actuated while the display's common character position electrodes are selectively actuated according to information in a display register or memory. When VF displays are utilized, on the other hand, the common character position electrodes are preferably sequentially actuated while the segments are selectively actuated according to information in the display register or memory. Thus, the microprocessor of U.S. Pat. No. 4,074,355 is preferably altered to utilize digit scan similar to that used in U.S. Pat. No. 3,991,305.

The microprocessor of U.S. Pat. No. 4,074,355 is a four bit processor and to process alphanumeric information, additional bits are required. By using six bits, which can represent $2^6$ or 64 unique codes, the twenty-six characters of the alphabet, ten numerals as well as several special characters can be handled with ease. In lieu of converting the microprocessor of U.S. Pat. No. 4,074,355 directly to a six bit processor, it was accomplished indirectly by software pairing the four bit words into eight bit bytes and transmitting six of those bits to the display decoder.

Referring now to FIGS. **15*a*–15*b***, which form a composite block diagram of the microprocessor preferably used in the arithmetic learning aid, it should be appreciated that this block diagram generally corresponds with the block diagram of FIGS. *7a* and *7b* of U.S. Pat. No. 4,074,355; several modifications to provide the aforementioned features of six bit operation and VF display compatibility are also shown. The numbering shown in FIGS. **15*a* and 15*b*** generally agrees with that of U.S. Pat. No. 4,074,355. The modifications will now be described in detail.

Referring now to the composite diagram formed by FIGS. **16*a*–16*c*, which replace FIG. 13 of U.S. Pat. No. 4,074,355, there can be seen the segment decoder and RAM address decoder 33-1 which decodes RAMY for addressing RAM 31 or ACC1–ACC8 for decoding segment information. Decoder 33-1 generally corresponds to decoder 33 in the aforementioned U.S. patent. The segment information is re-encoded into particular segment line information in output section 32-2 and outputted on bus 90 to segment drivers 91. Six bits of data from the processor's four bit accumulator 77 are decoded in decoder 33-1 as is now described. First, four bits on bus 86 are latched into accumulator latches 87-1 through 87-8 on a TDO (Transfer Data Out) instruction when status is a logical one. Then, two bits on bus 86 (from lines 86-1 and 86-2) are latched into accumulator latches 87-16 and 86-32, respectively, on another TD0 instruction when status is a logical zero. Then the six bits in latches 87-1 through 87-32 are decoded in decoder 33-1. Segment drivers 91 may preferably be of one of three types, 91A, 91B or 91C as shown in FIGS. 16*a*–16*c*. The 91A type driver permits the data on ACC-1–ACC8 to be communicated externally via pins SEG G, SEG B, SEG C and SEG D. The 91B type driver coupled to pin SEG E permits the contents of digit register 94-10 to be communicated externally when digit register 94-12 is set. The 91*c*** type driver coupled to pin SEG A permits the contents of the program counter to be outputted during test operations.

The digit buffers registers and TD0 latches of FIG. 14 of U.S. Pat. No. 4,074,355 are also preferably replaced with the digit buffers registers of FIG. 17 herein inasmuch as (1) the DDIG signal is no longer used and (2) the digit latches (elements 97 in U.S. Pat. No. 4,074,355) are no longer used. For simplicity's sake, only one of the digit output buffer registers 94 is shown in detail. Further, since in the illustrated embodiment of the arithmetic learning aid, display 2 is shown with eight character positions, eight output buffers 98-0 through 98-7 connect $D_0$–$D_7$ to the common electrodes of display 2 via registers 94-0 through 94-7 as shown in FIG. 17. An additional output buffer 98-8 communicates the contents of register 94-12, which is the chip select signal, to synthesizer 10.

To facilitate bi-directional communication with synthesizer 10, the microprocessor of U.S. Pat. No. 4,074,355 is preferably modified to permit bi-directional communication on pins SEG G, SEG B, SEG C and SEG D. Thus, in FIG. 18, these SEG pins are coupled to the normal K lines, 112-1 through 112-8, via an input selector **111*a* for inputting information when digit register 94-12 (R12) is set. Further, these pins are also coupled to ACC1–ACC8 via segment drivers 91A when digit registers 94-12 (R12) and 94-11 (R11) are set for outputting information in accumulator 77**.

Thus, when digit latch 94-12 (which communicates the chip select signal externally) is set, SEG E is coupled to R10 (digit register 94-10) for communicating the PDC signal to synthesizer 10. Also, ACC1–ACC8 is outputted on SEG G and SEG B-SEG D, during the time R12 and R11 are set. When R11 is a logical 0, i.e., is reset, segment drivers 91A are turned off and data may be read into CKB circuit 113 for receiving data from ROMs 12A–12B via synthesizer 10, for instance. FIG. 18 replaces the keyboard circuit 111 shown in FIG. 22 of U.S. Pat. No. 4,064,554.

Preferably, pins SEG G and SEG-B-SEG D are coupled to CTL–CTL8 pins of synthesizer 10, while pin SEG E is coupled to the PCD pin of synthesizer 10.

In Table XI is listed the set of instructions which may be stored in the main Read-Only-Memory 30 of FIGS. **15*a*–15*b* to provide controller 11. Referring now to Table XI, there are several columns of data which are, reading from left to right: STMT (Statement Number), PC (Program Counter), CODE, PLOC (Physical Location), TITLE, and DEST (Destination). In U.S. Pat. No. 4,074,355, it can be seen that main Read-Only-Memory 30 is addressed with a seven bit address in program counter 47 and a four bit address in a buffer 60. The address in buffer 60 is referred to as a page address in the main Read-Only-Memory. The instructions listed on Table XI, ROM Page 0, correspond to page zero in the microprocessor while the instructions listed in Table XI, ROM Page 1, are those on page one and so forth through to the instructions in Table XI, ROM Page 15**, which are stored on page fifteen in the microprocessor.

The program counter 47 of the aforementioned microprocessor is comprised of a feedback shift register and therefore counts in a pseudorandom fashion, thus the addresses in the PC column of Table XI which are expressed as a hexadecimal number, exhibit such pseudorandomness. If the instruction starting at page zero were read sequentially from the starting position in the program counter (00) then the instruction would be read out in the order shown in Table XI. In the STMT column is listed a sequentially increasing decimal number associated with each source statement and its instruction and program counter address as well as those lines in which only comments appear. When an instruction requiring either a branch or call is to be performed, the address to switch the program counter will jump and the page number to which the buffer will jump, if required, is reflected by the binary code comprising the instruction or instructions performing the branch or call. For sake of convenience, however, the DEST column indicates the statement number in Table XI to which the branch or call will be made. For example, the instruction at statement 107 is a branch instruction, with a branch address of 3E in hexadecimal. To facilitate finding the 3E address in the program counter, the DEST column directs the reader to statement 92 where the 3E address is located.

READ-ONLY-MEMORY LOGIC DIAGRAMS

Any one of Read-Only-Memories 12A and 12B or 13A and 13B is shown in FIGS. 19, *20a–20f*, and *21a–21d*. FIG. 19 is a block diagram of any one of these ROMs. FIGS. *20a–20f* form a composite logic diagram of the control logic for the ROMs while FIGS. *21a–21d* form a composite logic diagram of the X and Y address decoders and pictorially show the array of memory cells.

Referring now to FIG. 19, the ROM array 601 is arranged with eight output lines, one output line from each section of 16,384 bits. The eight output lines from ROM array 601 are connected via an output latch 602 to an eight bit output register 603. The output register 603 is interconnected with pins ADD1–ADD8 and arranged either to communicate the four high or low order bits from output register 603 via the four pins ADD1-ADD8 or alternatively to communicate the bit serially from output register 603 via pin ADD1. The particular alternative used may be selective according to mask programmable gates.

ROM array 601 is addressed via a 14 bit address counter 604. The address counter 604 has associated therewith a four bit chip select counter 605. Addresses in address counter 604 and chip select counter 605 are loaded four bits at a time from pins ADD1-ADD8 in response to a decoded Load Address (LA) command. The first LA command loads the four least significant bits in address counter 604 (bits $A_0$–$A_3$), and subsequent LA commands load the higher order bits, ($A_4$–$A_7$, $A_8$–$A_{11}$ and $A_{12}$–$A_{13}$). During the fourth LA cycle the $A_{12}$ and $A_{13}$ bits are loaded at the same time the CS0 and CS1 bits in chip select counter 605 are loaded. Upon the fifth LA command the two most significant bits in chip select counter 605 are loaded from ADD1 and ADD2. A counter 606 counts consecutively received LA commands for indicating where the four bits on ADD1–ADD8 are to be inputted into counters 604 and/or 605.

Commands are sent to the ROM chip via $I_0$ and $I_1$ pins to a decoder 607 which outputs the LA command a TB (transfer bit) and a RB (read and branch) command.

Address register 604 and chip select register 605 have an add-one circuit 608 associated therewith for incrementing the address contained therein. When a carry occurs outside the fourteen bit number stored in address register 604 the carry is carried into chip select register 605 which may enable the chip select function if not previously enabled or disable the chip select function if previously enabled, for example. Alternatively, the eight bit contents of output register 603 may be loaded into address register 604 by means of selector 609 in response to an RB command. During an RB command, the first byte read out of array 601 is used as the lower order eight bits while the next successive byte is used for the higher order six bits in counter 604.

The output of chip select register 605 is applied via programmable connectors 610 to gate 611 for comparing the contents of chip select counter 605 with a preselected code entered by the programming of connectors 610. Gate 611 is also responsive to a chip select signal on the chip select pin for permitting the chip select feature to be based on either the contents of the four bit chip select register 605 and/or the state of the chip select bit on the CS pin. The output of gate 611 is applied to two delay circuits 612, the output of which controls the output buffers associated with outputting information from output register 603 to pins ADD1–ADD8. The delay imposed by delay circuits 612 effects the two byte delay in this embodiment, because the address information inputted on pins ADD1–ADD8 leads the data outputted in response thereto by the time required to access ROM array 601. The CS pin is preferably used in the embodiment of the arithmetic learning aid disclosed herein.

A timing PLA 600 is used for timing the control signals outputted to ROM array 601 as well as the timing of other control signals.

Referring now to the composite drawing formed by FIGS. *20a–20f*, output register 603 is formed by eight "A" bit latches, an exemplary one of which is shown at 617. The output of register 603 is connected in parallel via a four bit path controlled on $\overline{\text{LOW}}$ or $\overline{\text{HIGH}}$ signals to output buffers 616 for ADD1–ADD4 and *616a* for ADD8. Buffers 616 and *616a* are shown in detail in FIGS. *21c* and *21d*.

Gates 615 which control the transferring of the parallel outputs from register 603 via in response to $\overline{\text{LOW}}$ and $\overline{\text{HIGH}}$ are preferably mask level programmable gates which are preferably not programmed when this chip is used with the arithmetic learning aid described herein. Rather the data in register 603 is communicated serially via programmable gate 614 to buffer *616a* and pin ADD8. The bits outputted to ADD1–ADD8 in response to a $\overline{\text{HIGH}}$ signal are driven from the third through sixth bits in register 603 rather than the fourth through seventh bits inasmuch as a serial shift will normally be accomplished between a $\overline{\text{LOW}}$ and $\overline{\text{HIGH}}$ signal.

Address register 604 comprises fourteen of the bit latches shown at 617. The address in address 604 on lines $A_0$–$A_{13}$ is communicated to the ROM X and Y address buffers shown in FIGS. 21c and 21d. Register 604 is divided into four sections 604a–604d, the 604d section loading four bits from ADD1–ADD8 in response to an $\overline{\text{LA0}}$ signal, the 604c section loading four bits from ADD1–ADD8 in response to an $\overline{\text{LA1}}$ signal and likewise for section 604b in response to an $\overline{\text{LA2}}$ signal. Section 604a is two bits in length and loads the ADD1 and ADD2 bits in response to an $\overline{\text{LA3}}$ signal. The chip select register 605 comprise four B type bit latches of the type shown at 618. The low order bits, CS0 and CS1 are loaded from ADD4 and ADD8 in response to an $\overline{\text{LA3}}$ signal while the high order bits CS2 and CS3 are loaded from ADD1 and ADD2 on an $\overline{\text{LA4}}$ signal. The $\overline{\text{LA0}}$–$\overline{\text{LA4}}$ signals are generated by counter 606. Counter 606 includes a four bit register 619 comprised of four A bit latches 617. The output of the four bit counter 619 is applied to a PLA 620 for decoding the $\overline{\text{LA1}}$–$\overline{\text{LA4}}$ signals. The $\overline{\text{LA0}}$ signal is generated by a NAND gate 621. As can be seen, the $\overline{\text{LA0}}$ signal comes up in response to an LA signal being decoded immediately after a TB signal. The gate 621 looks for a logical one on the LA signal and a logical one on an LTBD (latched transfer bit delay) signal from latch 622. Decoder 607 decodes the $I_0$ and $I_1$ signals applied to pins $I_0$ and $I_1$ for decoding the TB, LA and RB control signals. The signals on the $I_0$ and $I_1$ pins are set out in Table XIV. Latch circuit 622 is responsive to LA, RB and TB for indicating whether the previously received instruction was either an LA or a TB or RB command.

In addition to counting successive LA commands, four bit counter 619 and PLA 620 are used to count successive TB commands. This is done because in this embodiment each TB command transfers one bit from register 603 on pin ADD8 to the synthesizer chip 10 and output register 603 is loaded once each eight successive TB commands. Thus, PLA 620 also generates a TB8 command for initiating a ROM array addressing sequence. The timing sequence of counter 619 and PLA 620 is set forth in Table XV. Of course, the $\overline{\text{LA1}}$–$\overline{\text{LA4}}$ signal is only generated responsive to successive LA commands while the TB8 signals only generate in response to successive TB commands.

Figure 21A:
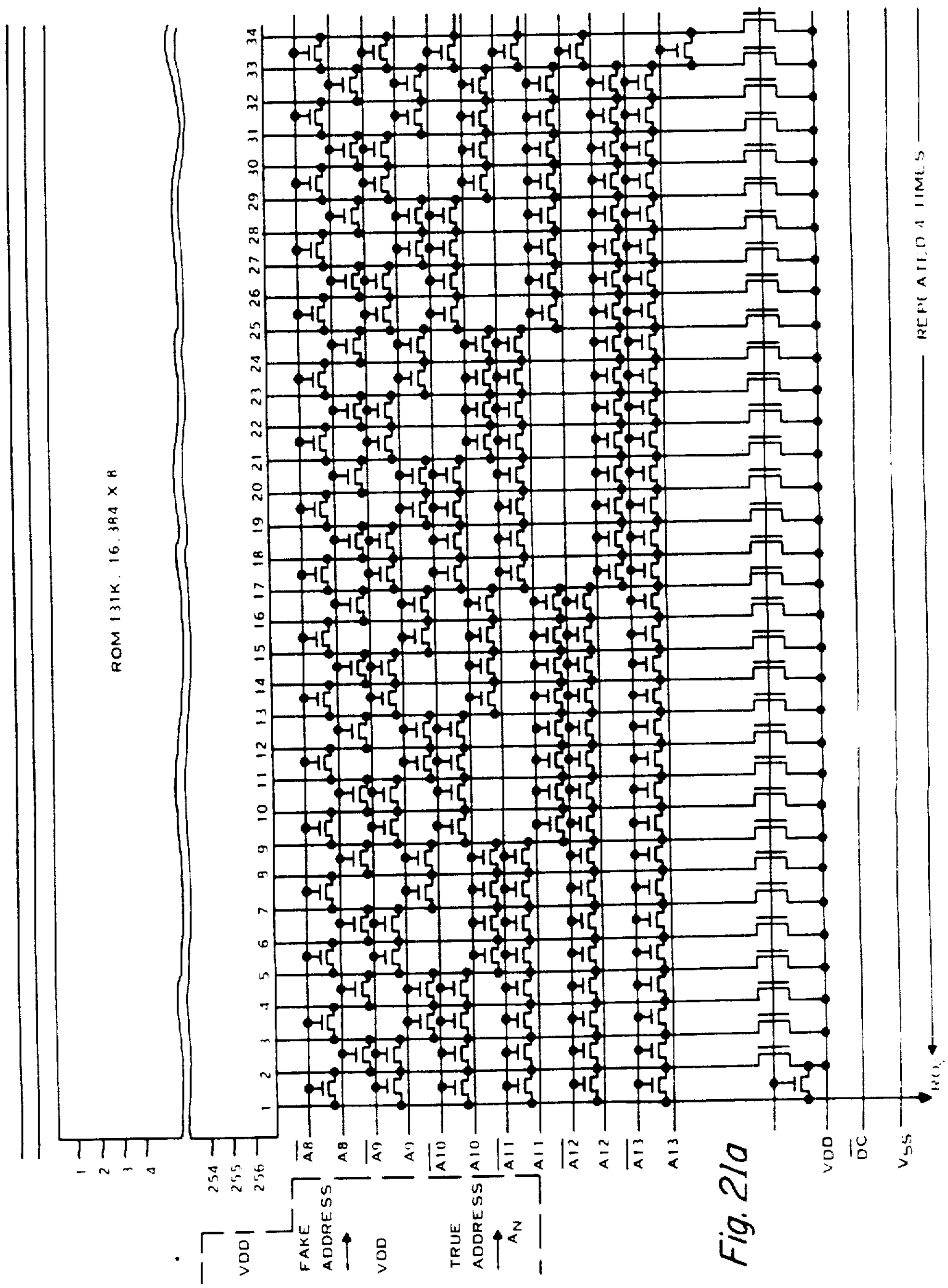
Figure 21B:
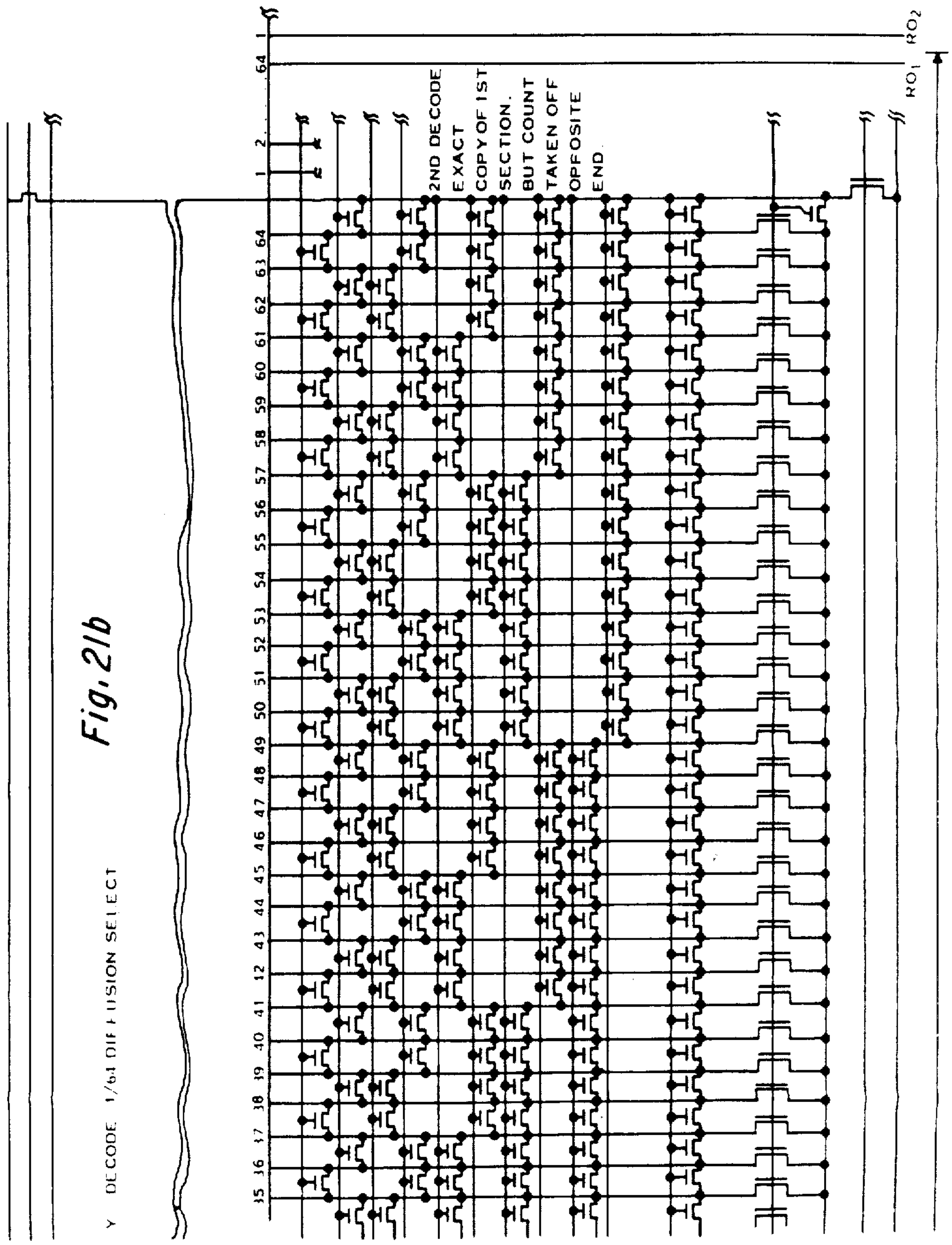
Figure 21C:
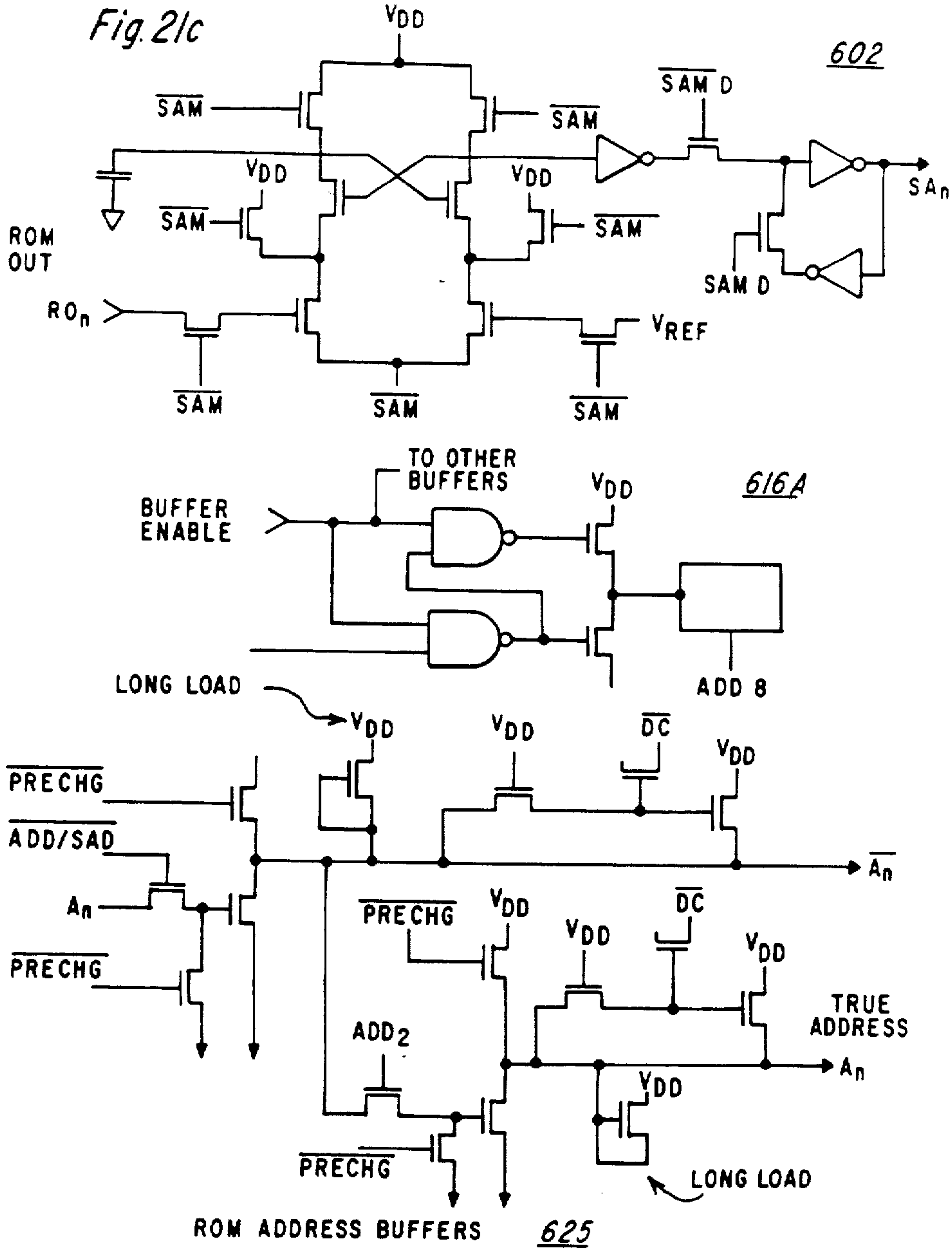
Figure 21D:
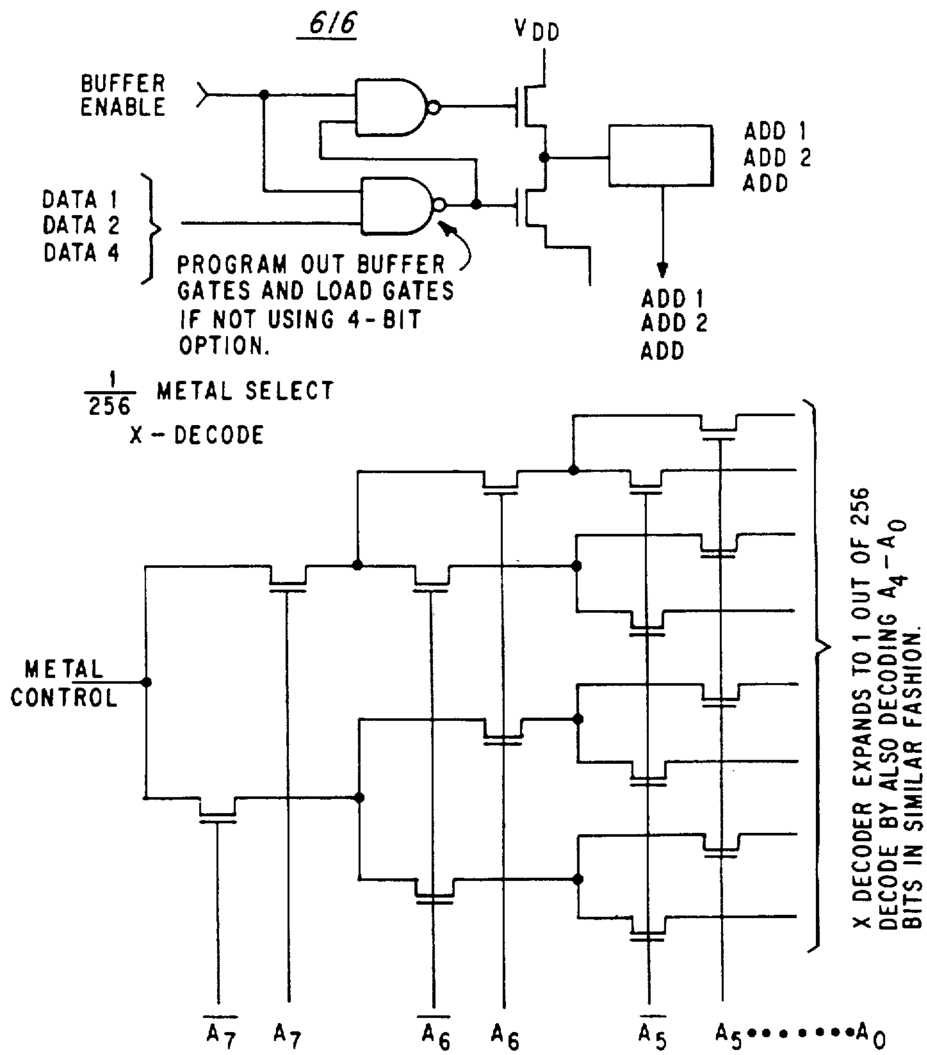

Add-one circuit 608 increments the number in program counter 604 in response to a TB command or an RB command. Since two successive bytes are used as a new address during an RB cycle, the card address and the present address incremented by one must be used to generate these two bytes. The output of add-one circuit 608 is applied via selector 609 for communicating the results of the incrementation back to the input of counter 604. Selector 609 permits the bits in output register 603 to be communicated to program counter 604 during an RB cycle as controlled by signal BR from array 600. Add-one circuit 608 is also coupled via COUNT to chip select counter 605 for incrementing the number stored therein whenever a CARRY would occur outside the fourteen bits stored in program counter 604. The output of chip select counter 605 is applied via programmable gate 610 to gate 611. The signal on the CS pin may also be applied to gate 611 or compared with the contents of CS3. Thus, gate 611 can test for either (1) the state of the CS signal, (2) a specific count in counter 605 or (3) a comparison between the state on the chip select and the state of CS3 or (4) some combination of the foregoing, as may be controlled by those knowledgeable in the art according to how programmable links 610 are programmed during chip manufacture. The output of gate 611 is applied via two bit latches of the C type, which are shown at 622. Timing array 600 controls the timing of ROM sequencing during RB and TB sequences. Array 600 includes PLA sections 600a and 600b and counters 623 and 624. Counter 623 is a two bit counter comprising two A type bit latches shown at 617. Counter 623 counts the number of times a ROM access is required to carry out a particular instruction. For instance, a TB command requires one ROM access while an RB command requires three ROM accesses. Counter 624, which comprises four "A" type bit latches of the type shown at 617, counts through the ROM timing sequence for generating various control signals used in accessing ROM array 601. The timing sequence for a TB command is shown in Table XII which depicts the states in counter 623 and 624 and the signals generated in response thereto. A similar timing sequence for an RB command is shown in Table XIII. The various signals generated by PLA 600a and 600b will now be briefly described. The BR signal controls the transfer of two serial bits from the output register 603 to the program counter 604. The TF signal controls the transfer of eight bits from the sense amp output latch 602 (FIGS. 1a and 21c) to output register 603 on lines SA0–SA7. INC controls the serial incrementing of the program counter, two bits for each INC signal generated. PC is the precharge signal for the ROM array and normally exists for approximately ten microseconds. The DC signal discharges the ROM 601 array and preferably lasts for approximately ten microseconds for each DC signal. This particular ROM array uses approximately seventy microseconds to discharge and thus seven DC signals are preferably generated during each addressing sequence. SAM gates the data outputted from the ROM into the sense amp output latch 602 while SAD sets the address lines by gating the address from the program counter into the ROM address buffers 625 (FIG. 21c).

ALTERNATIVE EMBODIMENTS

Although the invention has been described with reference to a specific embodiment, this description is not meant to be construed in a limiting sense. Various modifications of the disclosed embodiment as well as alternative embodiments of the invention will become apparent to persons skilled in the art upon reference to the description of the invention. It is therefore contemplated that the appended claims will cover any such modifications or embodiments that fall within the true scope of the invention.

TABLE I

The following sequence is an example of the solve it activity mode:

| KEY | DISPLAY | |
|---|---|---|
| ON | + = [1] | TONES - "SOLVE IT" (PAUSE) |
| | + = [1] | "LEVEL ONE" |
| 2 | + = [2] | "LEVEL TWO" |
| 3 | + = [3] | "LEVEL THREE" |
| 1 | + = [1] | "LEVEL ONE" |
| ON | + = [1] | "LEVEL ONE" |
| ON | + = [1] | "LEVEL ONE" |
| ON | + = [1] | "LEVEL ONE" |
| GO | 5 + 6 = | "FIVE PLLS SIX IS WHAT?" |
| 1 | 1 | |
| 1 | 11 | |
| ↑ | 11 | "ELEVEN, THAT'S CORRECT." |
| | | "TRY, |
| | 4 + 5 = | FOUR PLUS FIVE IS WHAT?" |

TABLE I-continued

The following sequence is an example of the solve it activity mode:

| KEY | DISPLAY | |
|---|---|---|
| 8 | 8 | |
| ↑ | | "WRONG, TRY AGAIN, |
| | 4 + 5 = | FOUR PLUS FIVE IS WHAT?" |
| 1 | 1 | |
| 0 | 10 | |
| ↑ | | "THAT'S INCORRECT. THE CORRECT |
| | 9 | ANSWER IS NINE." (WAIT FOR GO) |
| ON | + = [1] | "SOLVE IT" (PAUSE) |
| | + = [1] | "LEVEL ONE" |
| ON | + = [1] | "LEVEL ONE" |
| 2 | + = [2] | "LEVEL TWO" |
| — | — [2] | "LEVEL TWO" |

TABLE II

The following sequence is an example of the word problems activity mode:

| KEY | DISPLAY | SPEAKER |
|---|---|---|
| ON | + = [1] | TONES "SOLVE IT" (PAUSE) |
| | + = [1] | "LEVEL ONE" |
| PROBLEMS | PROBLEMS | TONES "WORD PROBLEMS" (PAUSE) |
| | PROBLEMS | "LEVEL 1" |
| 2 | PROBLEMS | "LEVEL 2" |
| 3 | PROBLEMS | "LEVEL 3" |
| 1 | PROBLEMS | "LEVEL 1" |
| | | "WHAT IS THE SUM OF THREE AND SEVEN?" |
| 1 | 1 | |
| 0 | 10 | |
| ↑ | 10 | "TEN. THAT'S CORRECT." |
| | | "TRY, |
| | | FIVE FROM SEVENTEEN EQUALS WHAT?" |
| 1 | 1 | |
| 2 | 12 | |
| ↑ | 12 | "TWELVE. THAT'S RIGHT." |
| | | "NOW TRY . . . " |
| CONTINUING THIS EXAMPLE ASSUMING LEVEL 2. | | |
| | | "WHAT IS THE PRODUCT OF FOUR AND SIX?" |
| | — | |
| 2 | 2 | |
| 4 | 24 | |
| ↑ | 24 | "TWENTY-FOUR. YOU'RE CORRECT. |
| | | TRY, HOW MANY TIMES DOES THREE |
| | — | GO INTO TWENTY-ONE?" |
| 7 | 7 | |
| ↑ | 7 | "SEVEN. YOU'RE RIGHT. TRY . . . |
| CONTINUING THIS EXAMPLE ASSUMING LEVEL 3. | | |
| | | "A RECTANGLE IS SIX UNITS LONG AND |
| | | THREE UNITS WIDE. WHAT IS THE |
| | AREA?" | |
| | — | |
| 1 | 1 | |
| 8 | 18 | "EIGHTEEN. THAT'S RIGHT." |
| | "NOW TRY......" | |
| | | "NOW TRY . . . " |

TABLE III

The following sequence is an example of the greater than/less than activity mode:

| KEY | DISPLAY | SPEAKER |
|---|---|---|
| ON | + = [1] | TONES "SOLVE IT" (PHASE) |
| | + = [1] | "LEVEL ONE" |
| >< | >< | "GREATER THAN, LESS THAN" |
| | >< | "LEVEL 1" |
| 2 | >< | "LEVEL 2" |
| GO | 320_400 | "THREE HUNDRED TWENTY IS GREATER THAN OR LESS THAN FOUR HUNDRED" |
| < | 320 < 400 | |
| ↑ | 320 < 400 | "THREE HUNDRED TWENTY IS LESS THAN FOUR HUNDRED. THAT'S CORRECT." (PAUSE) |
| | 300_502 | "TRY THREE HUNDRED IS GREATER THAN OR LESS THAN FIVE HUNDRED TWO" |
| > | 300 > 502 | |
| ↑ | 300_502 | "THAT'S INCORRECT. THE CORRECT |
| | 300 < 502 | ANSWER IS: THREE HUNDRED IS LESS THAN FIVE HUNDRED TWO" (WAIT FOR GO) |
| GO | 467_876 | "NOW TRY . . . " |
| NOW CONTINUING THE EXAMPLE ASSUMING LEVEL 3. | | |

TABLE III-continued

The following sequence is an example of the greater than/less than activity mode:

| KEY | DISPLAY | SPEAKER |
|---|---|---|
| GO | 35 + 70_100 | "THIRTY FIVE PLUS SEVENTY IS GREATER THAN OR LESS THAN ONE HUNDRED: |
| > | 35 + 70 > 100 | |
| ↑ | 35 + 70 > 100 | "THIRTY FIVE PLUS SEVENTY IS GREATER THAN ONE HUNDRED. THAT'S RIGHT. NEXT TRY, |
| | 3.97_10.2 | THREE AND NINETY SEVEN HUNDREDTHS IS GREATER THAN OR LESS THAN TEN AND TWO TENTHS" |
| < | 3.97 < 10.2 | |
| ↑ | 3.97 < 10.2 | "THREE AND NINETY SEVEN HUNDREDTHS IS LESS THAN . . . |

TABLE IV

The following sequence is an example of the write it activity mode:

| KEY | DISPLAY | SPEAKER |
|---|---|---|
| ON | + = [1] | TONES "SOLVE IT" (PAUSE) |
| | + = [1] | "LEVEL ONE" |
| 24 | WRITE IT | "WRITE IT" (PAUSE) |
| | WRITE IT | "LEVEL 1" |
| 2 | WRITE IT | "LEVEL 2" |
| 1 | WRITE IT | "LEVEL 1" |
| GO | _ | "THREE HUNDRED ONE" |
| 3 | 3 | |
| 0 | 30 | |
| 1 | 301 | |
| ↑ | 301 | "THREE HUNDRED ONE THAT'S CORRECT" |
| | _ | "TRY SIXTY FOUR" |
| 6 | 6 | |
| 5 | 65 | |
| ↑ | _ | "WRONG, TRY AGAIN, |
| | _ | SIXTY FOUR" |
| 6 | 6 | |
| 3 | 63 | |
| ↑ | _ | "THAT'S INCORRECT, THE CORRECT ANSWER IS |
| | 64_ | SIXTY FOUR" (WAIT FOR GO) |
| GO | _ | (ETC) . . . |
| NOW CONTINUING THIS EXAMPLE ASSUMING LEVEL 3. | | |
| GO | _ | "SEVENTY FIVE AND THREE HUNDRED TWENTY FIVE THOUSANDTHS." |
| 7 | 7 | |
| 5 | 75 | |
| . | 75. | |
| 3 | 75.3 | |
| 2 | 75.32 | |
| 5 | 75.325 | |
| ↑ | 75.325 | "SEVENTY FIVE AND THREE HUNDRED TWENTY FIVE THOUSANDTHS. THAT'S CORRECT." |

TABLE V

The following sequence is an example of the number stumper acitivity mode:

| KEY | DISPLAY | SPEAKER |
|---|---|---|
| ON | + = [1] | TONES "SOLVE IT" (PAUSE) |
| | + = [1] | "LEVEL ONE" |
| STUMPER | STUMPER | "NUMBER STUMPER" (PAUSE) |
| | STUMPER | "LEVEL 1" |
| 3 | STUMPER | "LEVEL 3" |
| GO | ____ | (ASSUME 1243) |
| 1 | 1___ | |
| 2 | 12__ | |
| 3 | 123_ | |
| 4 | 1234 | |
| ↑ | 1234 4 2 | "NUMBER RIGHT: FOUR; NUMBER IN WRONG PLACE: TWO." |
| 1 | 1___ 4 | |
| 3 | 13__ 4 2 | |
| C | ____ 4 2 | |
| 1 | 1___ 4 2 | |
| 2 | 12__ 4 2 | |

TABLE V-continued

The following sequence is an example of the number stumper acitivity mode:

| KEY | DISPLAY | SPEAKER |
|---|---|---|
| 4 | 124_ 4 2 | |
| 3 | 1243 4 2 | |
| ↑ | 1243 4 0 | TONES "YOU'VE GOT MY NUMBER. (PAUSE) YOUR SCORE IS TWO." (WAIT FOR GO) |
| OR AFTER 15 INCORRECT GUESSES: | | |
| 2 | 2___ | |
| 3 | 23__ | |
| 4 | 234_ | |
| 5 | 2345 | |
| ↑ | 2345 3 3 | "NUMBER RIGHT: THREE, NUMBER IN WRONG PLACE: TWO |
| | 1243 16 | (PAUSE) SIXTEEN TRIES, THE NUUMBER IS ONE, TWO, FOUR, THREE (WAIT FOR GO) |

TABLE VI

The synthesizer 10 includes interpolation logics to accomplish a nearly linear interpolation of all twelve speech parameters at eight points within each frame, that is, once each 2.5 msec. The parameters are interpolated one at a time as selected by the parameter counter. The interpolation logics calculate a new value of a parameter from its present value (i.e. the value currently stored in the K-stack, pitch register or E-10 loop) and the target value stored in encoded form in RAM 203 (and decoded by ROM 202). The value computed by each interpolation is listed below.

Where $P_i$ is the present value of the parameter,
$P_{i+1}$ is the new parameter value
$P_t$ is the target value
$N_i$ is an integer determined by the interpolation counter The values of $N_i$ for specific interpolation counts and the values $\frac{P_i - P_o}{P_t - P_o}$ ($P_0$ is initial parameter value) are as follows:

| INTERPOLATION COUNT | $N_i$ | $\frac{P_i - P_o}{P_t - P_o}$ |
|---|---|---|
| 1 | 8 | 0.125 |
| 2 | 8 | 0.234 |
| 3 | 8 | 0.330 |
| 4 | 4 | 0.498 |
| 5 | 4 | 0.623 |
| 6 | 2 | 0.717 |
| 7 | 2 | 0.859 |
| 0 | 1 | 1.000 |

TABLE VII

"HELP"

TABLE VII-continued

```
ØØØØ                                                          )
Ø1ØØØØØØØØ1ØØ11Ø111Ø1ØØ1Ø111                                   |
Ø111ØØØØØ1                                                    |
11Ø11ØØ1ØØ1ØØØØ1Ø1ØØ1ØØØØ11ØØ1111ØØØ1Ø1Ø1ØØ1Ø1Ø1Ø              |
11Ø11ØØ111                                                    |
111Ø1ØØ111                                                    |
11Ø11Ø1ØØØØ11Ø1Ø11111Ø1Ø1Ø1Ø1ØØ1Ø1111ØØØ1ØØ1Ø11Ø1              |
11Ø11Ø1ØØØØ111ØØ1Ø111ØØØ11ØØ11Ø11ØØØØ1ØØ1ØØØ111Ø1              } HEL
11Ø11ØØ11Ø1ØØØ1Ø1Ø1ØØ11Ø1ØØ111111Ø11Ø1Ø1Ø1ØØØØ11Ø              |
1Ø111ØØ1Ø1                                                    |
1Ø1Ø1ØØ1ØØØ11Ø1ØØ1111ØØØ11ØØ1111Ø111ØØ1ØØØ1Ø1Ø11Ø              |
1ØØ11ØØØØ1                                                    |
1ØØ1Ø111Ø1                                                    |
1ØØØØ11Ø11                                                    |
ØØ1ØØ111ØØØØ1Ø1ØØ1Ø111Ø11ØØ1111ØØ1Ø1Ø111ØØ1Ø11Ø11              )

ØØØØ
ØØØØ
ØØØØ
Ø111ØØØØØØ1Ø1ØØØ1Ø111Ø111ØØØ      )
Ø111ØØØØØØ1ØØØ1Ø1Ø111Ø11Ø11Ø      |
Ø1Ø1ØØØØØ1                        } P
ØØ11ØØØØØØ1ØØ11ØØ1111Ø1ØØ11Ø      |
ØØ1ØØØØØØØ1ØØ1ØØØ1Ø11Ø11Ø1Ø1      )
ØØØØ
1111
```

ENERGY, PITCH, REPEAT, K1, K2, K3, K4, K5, K6, K7, K8, K9, K10

TABLE VIII

| CODE | E | P | KI | K2 | K3 | K4 | K5 | K6 | K7 | K8 | K9 | K10 |
|---|---|---|---|---|---|---|---|---|---|---|---|---|
| | | | | DECODED PARAMETERS | | | | | | | | |
| 00 | 000 | 000 | 20B | 288 | 269 | 2DE | 2C2 | 33F | 302 | 333 | 307 | 342 |
| 01 | 001 | 029 | 20E | 29B | 283 | 304 | 2E5 | 368 | 326 | 390 | 349 | 37B |
| 02 | 002 | 02B | 211 | 2B1 | 2A3 | 32F | 30B | 393 | 34C | 3F6 | 392 | 3B7 |
| 03 | 003 | 02D | 216 | 2C8 | 2C9 | 35D | 336 | 3BF | 374 | 05C | 3ED | 3F6 |
| 04 | 004 | 02F | 21B | 2E2 | 2F4 | 38E | 364 | 3EC | 39F | 0BB | 030 | 035 |
| 05 | 006 | 031 | 222 | 2FE | 326 | 3C2 | 395 | O1A | 3CB | 10D | 07E | 073 |
| 06 | 008 | 033 | 22B | 31D | 35E | 3F7 | 3C8 | 047 | 3F8 | 150 | 0C6 | 0AD |
| 07 | 00B | 035 | 235 | 33D | 39A | 02C | 3FD | 073 | 024 | 183 | 105 | 0E3 |
| 08 | 010 | 037 | 242 | 35F | 3D9 | 061 | 031 | 09E | 051 | | | |
| 09 | 017 | 03A | 251 | 384 | 019 | 093 | 065 | 0C6 | 07C | | | |
| 0A | 021 | 03C | 264 | 3A9 | 059 | 0C2 | 096 | 0EB | 0A5 | | | |
| 0B | 02F | 03F | 27B | 3CF | 095 | 0EE | 0C4 | 10E | 0CC | | | |
| 0C | 03F | 042 | 296 | 3F6 | 0C3 | 116 | 0EF | 12D | 0F0 | | | |
| 0D | 055 | 046 | 2B5 | 01D | 101 | 139 | 116 | 14A | 112 | | | |
| 0E | 072 | 049 | 2D9 | 044 | 12E | 158 | 139 | 163 | 130 | | | |
| OG | 000 | 04C | 303 | 06A | 155 | 173 | 158 | 179 | 14C | | | |
| 10 | | 04F | 331 | 08F | | | | | | | | |
| 11 | | 053 | 364 | 0B2 | | | | | | | | |

TABLE VIII-continued

| CODE | E | P | KI | K2 | K3 | K4 | K5 | K6 | K7 | K8 | K9 | K10 |
|---|---|---|---|---|---|---|---|---|---|---|---|---|
| | | DECODED PARAMETERS | | | | | | | | | | |
| 12 | | 057 | 39A | 0D4 | | | | | | | | |
| 13 | | 05A | 3D3 | 0F3 | | | | | | | | |
| 14 | | 05E | 00D | 110 | | | | | | | | |
| 15 | | 063 | 046 | 12B | | | | | | | | |
| 16 | | 067 | 07E | 144 | | | | | | | | |
| 17 | | 06B | 0B3 | 15A | | | | | | | | |
| 18 | | 070 | 0E4 | 16E | | | | | | | | |
| 19 | | 076 | 110 | 180 | | | | | | | | |
| 1A | | 07B | 137 | 190 | | | | | | | | |
| 1B | | 081 | 159 | 19E | | | | | | | | |
| 1C | | 086 | 176 | 1AB | | | | | | | | |
| 1D | | 08C | 18F | 1B6 | | | | | | | | |
| 1E | | 093 | 1A4 | 1C0 | | | | | | | | |
| 1F | | 099 | 1B5 | 1FA | | | | | | | | |

TABLE IX

DATA OUTPUTTED FROM K-STACK 302 TO RECODING LOGIC 301 BY TIME PERIODS

| K-STACK OUTPUT BIT | LINE | TIME PERIODS T8 | T9 | T10 | T11 | T12 | T13 | T14 | T15 | T16 | T17 |
|---|---|---|---|---|---|---|---|---|---|---|---|
| LSB | 32-1 | $K_2$ | $K_1$ | A | $K_9$ | $K_8$ | $K_7$ | $K_6$ | $K_5$ | $K_4$ | $K_3$ |
| | 32-2 | $K_2$ | $K_1$ | A | $K_9$ | $K_8$ | $K_7$ | $K_6$ | $K_5$ | $K_4$ | $K_3$ |
| | 32-3 | $K_2$ | $K_1$ | A | $K_9$ | $K_8$ | $K_7$ | $K_6$ | $K_5$ | $K_4$ | $K_3$ |
| | 32-4 | $K_2$ | $K_1$ | A | $K_9$ | $K_8$ | $K_7$ | $K_6$ | $K_5$ | $K_4$ | $K_3$ |
| | 32-5 | $K_3$ | $K_2$ | $K_1$ | A | $K_9$ | $K_8$ | $K_7$ | $K_6$ | $K_5$ | $K_4$ |
| | 32-6 | $K_3$ | $K_2$ | $K_1$ | A | $K_9$ | $K_8$ | $K_7$ | $K_6$ | $K_5$ | $K_4$ |
| | 32-7 | $K_4$ | $K_3$ | $K_2$ | $K_1$ | A | $K_9$ | $K_8$ | $K_7$ | $K_6$ | $K_5$ |
| | 32-8 | $K_4$ | $K_3$ | $K_2$ | $K_1$ | A | $K_9$ | $K_8$ | $K_7$ | $K_6$ | $K_5$ |
| | 32-9 | $K_5$ | $K_4$ | $K_3$ | $K_2$ | $K_1$ | A | $K_9$ | $K_8$ | $K_7$ | $K_6$ |
| MSB | 32-10 | $K_5$ | $K_4$ | $K_3$ | $K_2$ | $K_1$ | A | $K_9$ | $K_8$ | $K_7$ | $K_6$ |

| K-STACK OUTPUT BIT | LINE | TIME PERIODS T18 | T19 | T20 | T21 | T22 | T23 | T24 | T25 | T26 | T27 |
|---|---|---|---|---|---|---|---|---|---|---|---|
| LSB | 32-1 | $K_2$ | $K_1$ | A | $K_9$ | $K_8$ | $K_7$ | $K_6$ | $K_5$ | $K_4$ | $K_3$ |
| | 32-2 | $K_2$ | $K_1$ | A | $K_9$ | $K_8$ | $K_7$ | $K_6$ | $K_5$ | $K_4$ | $K_3$ |
| | 32-3 | $K_2$ | $K_1$ | A | $K_9$ | $K_8$ | $K_7$ | $K_6$ | $K_5$ | $K_4$ | $K_3$ |
| | 32-4 | $K_2$ | $K_1$ | A | $K_9$ | $K_8$ | $K_7$ | $K_6$ | $K_5$ | $K_4$ | $K_3$ |
| | 32-5 | $K_3$ | $K_2$ | $K_1$ | A | $K_9$ | $K_8$ | $K_7$ | $K_6$ | $K_5$ | $K_4$ |
| | 32-6 | $K_3$ | $K_2$ | $K_1$ | A | $K_9$ | $K_8$ | $K_7$ | $K_6$ | $K_5$ | $K_4$ |
| | 32-7 | $K_4$ | $K_3$ | $K_2$ | $K_1$ | A | $K_9$ | $K_8$ | $K_7$ | $K_6$ | $K_5$ |
| | 32-8 | $K_4$ | $K_3$ | $K_2$ | $K_1$ | A | $K_9$ | $K_8$ | $K_7$ | $K_6$ | $K_5$ |
| | 32-9 | $K_5$ | $K_4$ | $K_3$ | $K_2$ | $K_1$ | A | $K_9$ | $K_8$ | $K_7$ | $K_6$ |
| MSB | 32-10 | $K_5$ | $K_4$ | $K_3$ | $K_2$ | $K_1$ | A | $K_9$ | $K_8$ | $K_7$ | $K_6$ |

TABLE X

CHIRP ROM CONTENTS

| ADDRESS | CHIRP FUNCTION VALUE | STORED VALUE (COMPLEMENTED) |
|---|---|---|
| 00 | 00 | FF |
| 01 | 2B | D4 |
| 02 | D4 | 2B |
| 03 | 33 | CC |
| 04 | B3 | 4C |
| 05 | 12 | ED |
| 06 | 25 | DA |
| 07 | 14 | EB |
| 08 | 02 | FD |
| 09 | E2 | 1D |
| 10 | C6 | 39 |
| 11 | 03 | FC |
| 12 | 60 | 9F |
| 13 | 5B | A4 |
| 14 | 05 | FA |
| 15 | 0F | FO |
| 16 | 26 | D9 |
| 17 | FC | 03 |
| 18 | A6 | 59 |
| 19 | A5 | 5A |
| 20 | D6 | 29 |
| 21 | DD | 22 |
| 22 | DD | 22 |

TABLE X-continued

CHIRP ROM CONTENTS

| ADDRESS | CHIRP FUNCTION VALUE | STORED VALUE (COMPLEMENTED) |
|---|---|---|
| 23 | FD | 02 |
| 24 | 25 | DA |
| 25 | 2B | D4 |
| 26 | 23 | DC |
| 27 | 22 | DD |
| 28 | 0F | FO |
| 29 | FF | OO |
| 30 | F8 | 07 |
| 31 | EF | 10 |
| 32 | ED | 12 |
| 33 | EF | 10 |
| 34 | F7 | 08 |
| 35 | F7 | 08 |
| 36 | FA | 05 |
| 37 | 01 | FE |
| 38 | 04 | FB |
| 39 | 03 | FC |
| 40 | 01 | FE |

TABLE XI

```
T2074     ASSEMBLER FOR  270   CHIP VERS 00.04        03/31/80 (80.091) 10:41:44
                                                          ROM PAGE  0 PAGE 0002
 STMT  PC  CODE PLOC                                                   <DEST >
 0001                            TITLE     T2074     SPEAKANDMATH
 0002                            OPTION    ROM
 0003                            OPTION    XREF
 0004 ***********************************************************************
 0005 *        ROM MAP
 0006 *        X=          Y=
 0007 *        0           0-8       DISPLAY BUFFER MSD; BIT 3 SET-DECIMAL POINT
 0008 *        0           0-3       POSITION OF FIRST OPERAND IN SOLVE IT
 0009 *        0           4         POSITION OF OPERATION IN SOLVE IT
 0010 *        0           5-7       POSITION OF SECOND OPERAND IN SOLVE IT
 0011 *        0           8         POSITION OF EQUALS SIGN IN SOLVE IT
 0012 *        0           9         DISPLAY POINTER
 0013 *        0           10-12     RANDOM NUMBER
 0014 *        0           13        TIMEOUT COUNTER
 0015 *        0           14        DEBOUNCE COUNTER
 0016 *        0           15        DEBOUNCE COUNTER
 0017 *        1           0-8       DISPLAY BUFFER LSD
 0018 *        1           9         BIT 0-DECIMAL POINT FLAG
 0019 *                              BIT 1-MIXED OPERATION FLAG
 0020 *                              BIT 2-NUMBER OF TRIES
 0021 *                              BIT 3-GO FLAG
 0022 *        1           10-13     ROM ADDRESS
 0023 *        1           14        ROM ADDRESS POINTER
 0024 *        1           15        SELF TEST/DISPLAY PTR (NS)
 0025 *                              BIT 1-SELF TEST FLAG
 0026 *        1                     BIT 2-TWO SCAN DISPLAY
 0027 *        1                     BIT 3-JAMCODE BIT
 0028 *        2           0-15      LINK EDIT REGISTER
 0029 *        2           12-15     NOT USED IN SOLVE IT
 0030 *        3           0-15      LINK EDIT REGISTER
 0031 *        3           12-15     NOT USED IN SOLVE IT
 0032 *        4           0-15      LINK EDIT REGISTER
 0033 *        4           12-15     NOT USED IN SOLVE IT
 0034 *        5           0-15      LINK EDIT REGISTER
 0035 *        5           12-15     NOT USED IN SOLVE IT
 0036 *        6           0-8       ANSWER LSD
 0037 *        6           9         POSITION OF DECIMAL POINT IN ANSWER
 0038 *        6           10        # OF ENTRIES IN A LEVEL
 0039 *        7           0-8       SAVE DISPLAY FOR WRONG,TRY AGAIN AND REPEAT
 0040 *        7           1-3       RANDOM NUMBER
 0041 *        7           9         TEST TALK
 0042 *        7           10-11     KEY COUNTER
 0043 *        7           12        ANSWER BUFFER POINTER
 0044 *        7           13        TEMP STORAGE FOR MSD
 0045 *        7           14        LOADRESS FLAG
 0046 *        7           15        LOADRESS LOOP COUNTER/MEMADDR CTR
 0047 *        8           0******CHANGE*******RANDOM WORD ENTRY POINTER
 0048 *        8           0-3       ADD/MULTIPLY WORKSPACE
 0049 *        8           1-3       RANDOM NUMBER
 0050 *        8           4         MODE
 0051 *                              =0 SOLVE IT
 0052 *                              =8 WORD PROBLEMS
 0053 *                              =4 GREATER/LESS
 0054 *                              =2 WRITE IT
 0055 *                              =1 NUMBER STUMPER
 0056 *        8           5         FUNCTION
 0057 *                              =1 ADDITION
 0058 *                              =2 SUBTRACTION
 0059 *                              =4 MULTIPLICATION
 0060 *                              =8 DIVISION
 0061 *        8           6         LEVEL
 0062 *                              =0 LEVEL 1
 0063 *                              =1 LEVEL 2
 0064 *                              =2 LEVEL 3
 0065 *        8           7         # OF PROBLEMS/# IN PLACE(NS)
```

```
STMT  PC   CODE PLOC
0066 *          8       8          # IN WRONG PLACE (NS)
0067 *          8       9          # WRONG/SCORE (NS)
0068 *          8       10         BIT 0-NEW7 FLAG
0069 *          8       11         RETN$BCH FLAG
0070 *          8       12         BITS 0&1-LEAD IN PHRASES
0071 *                             BITS 2&3-PRAISE PHRASES
0072 *          8       13         K-LINE PTR
0073 *          8       14         R-LINE PTR
0074 *          8       3******CHANGE*******JAMCODE TEST BIT 0
0075 *                             LETTER TEST BIT 1
0076 *                             RPT TEST BIT 3
0077 *                  8******CHANGE*******LOCK BIT 0
0078 *                             GO FLAG BIT 1
0079 *                             STILL TALK BIT 3
0080 ***********************************************************************
0081 *          PLA TERMS
0082 *          00      0 & O
0083 *          01      1 & I
0084 *          02      2
0085 *          03      3
0086 *          04      4
0087 *          05      5 & S
0088 *          06      6
0089 *          07      7
0090 *          08      8
0091 *          09      9
0092 *          0A      ( & C
0093 *          0B      )
0094 *          0C      .
0095 *          0D      =
0096 *          0E      E
0097 *          0F      BLANK
0098 *          10      A
0099 *          11      B
0100 *          12      <
0101 *          13      D
0102 *          14      >
0103 *          15      F
0104 *          16
0105 *          17      G
0106 *          18      H
0107 *          19      J
0108 *          1A      K
0109 *          1B      L
0110 *          1C      M
0111 *          1D      N
0112 *          1E      P
0113 *          1F      ALL SEGMENTS ON--SELF TEST
0114 *          20      Q
0115 *          21      +
0116 *          22      -
0117 *          23      R
0118 *          24      X & X
0119 *          25      T
0120 *          26      U
0121 *          27      V
0122 *          28      /
0123 *          29      W
0124 *          2A      Y
0125 *          2B      Z
0126 *          2C
0127 *          2D
0128 *          2E      *
0129 *          2F      _
```

```
     PC   CODE PLOC
***********************************************************************
*
*                          KEYBOARD
*
*
*                     K1        K2        K4        K8        KF
*
*               ----------+---------+---------+---------+---------+-----
*               !
*       R0      !         0         3         6         9         .
*               !
*       R1      !         1         4         7
*               !
*       R2      !         2         5         8
*               !
*       R3      !                   ENT       GO        OFF
*               !
*       R4      !         CLR       <         >         RPT
*               !
*       R5      !         +         -         X         /         MIX
*               !
*       R6      !         NUM       WRITE     G/L       WORD      SOLVE
*               !         STUM       IT                 PROB      IT/ON
*               !
*
***********************************************************************
*                    KEYBOARD SCAN / DISPLAY ROUTINE
*
*          THIS ROUTINE DISPLAYS THE CONTENTS OF 'DISPLAY BUFFER' AND
*          CHECKS FOR A KEYPRESS.
*
     0000 0090 0001  DISP/KB  LDX        0
     0001 0043 0002           TCY        12
     0003 0036 0003           RSTR                  RESET CHIP SELECT
     0007 0060 0004           TCMIY      0          CLEAR 2-MSD'S OF TIMEOUT CTR
     000F 0060 0005           TCMIY      0
     001F 0006 0006           CLA                   DEBOUNCE=0
     003F 0091 0007  DSP1     LDX        8
     007F 0047 0008           TCY        14
     007E 0060 0009           TCMIY      0          RESET R-LINE PTR
     007D 0090 0010           LDX        0
     007B 002E 0011           TAMZA
     0077 004F 0012  DSP2     TCY        15
     006F 000D 0013           SETR                  TURN-ON FILAMENT
     005F 0098 0014           LDX        1
     003E 0028 0015           TAY
     007C 0029 0016           TMA                   GET LS 4 BITS FOR OUTPUT BUF
     0079 00B0 0017           TDO                   LSW; STATUS=1
     0073 0090 0018           LDX        0
     0067 0029 0019           TMA
     004F 0009 0020           MNEA                  SET STATUS=0
     001E 00B0 0021           TDO                   MSW; STATUS=0
     003D 000D 0022           SETR                  TURN ON NEW R-LINE
     007A 004F 0023           TCY        15
     0075 0036 0024           RSTR                  TURN OFF FILAMENT
*                                 INCREMENT RANDOM NUMBER GENERATOR /
     006B 0088 0025           BL         TIMEUP     TIMEOUT COUNTER       < 0286>
     0057 0100 0026
     002E 005F 0027  DISP/KB2 YNEC       15         TEST FOR TIME-OUT
     005C 0161 0028           BRANCH     DISP/KB1                         < 0192>
*   TIMEOUT IS APP. 4 TO 5 MINUTES.
     003B 004B 0029  OFF      TCY        13
     0070 0036 0030           RSTR                  TURN-OFF CALCULATOR
     0061 0091 0031  DISP/KB1 LDX        8
     0043 0047 0032           TCY        14
     0006 0032 0033           IMAC                  INCREMENT R-LINE POINTER
     000D 002F 0034           TAM
     001B 0028 0035           TAY
     0037 0004 0036           DYN                   Y=LAST R-LINE
```

```
STMT  PC   CODE PLOC
0198 006E 0036 0037          RSTR                RESET LAST R-LINE
0199 005D 00E1 0038          ALEC      8         SCAN COMPLETE?
0200 003A 0177 0039          BRANCH    DSP2      NO                   < 0172>
0201 0074 004F 0040          TCY       15
0202 0069 000D 0041          SETR                TURN-ON FILAMENT
0203 0053 0006 0042 DSPLYPNT CLA
0204 0026 00CB 0043          ACNAA     13        OC=DECIMAL POINT
0205 004C 00B0 0044          TDO                 STATUS=1;SENDS ACC TO OUTPUT
0206 0018 0070 0045          ACACC     0
0207 0031 00B0 0046          TDO                 STATUS=0;SENDS 2 LSB'S IF AC
0208 0062 004F 0047          TCY       15
0209 0045 0036 0048          RSTR                TURN-OFF FILAMENT
0210 000A 0041 0049          TCY       8
0211 0015 0090 0050          LDX       0
0212 002B 0023 0051 SET1     TBIT      3         DP?
0213 0056 01D4 0052          CALL      SETRLINE                       < 0282>
0214 002C 0004 0053          DYN
0215 0058 012B 0054          BRANCH    SET1                           < 0212>
0216 0030 0041 0055          TCY       8
0217 0060 0036 0056 RST1     RSTR
0218 0041 0004 0057          DYN
0219 0002 0160 0058          BRANCH    RST1                           < 0217>
0220 0005 0090 0059          LDX       0
0221 000B 0047 0060          TCY       14
0222 0017 0032 0061          IMAC                INCREMENT DEBOUNCE COUNTER
0223 002F 0163 0062          BRANCH    DSP4                           < 0228>
0224 005E 00E3 0063          ALEC      12
0225 003C 0171 0064          BRANCH    DSP3                           < 0227>
0226 0078 0163 0065          BRANCH    DSP4                           < 0228>
0227 0071 002F 0066 DSP3     TAM                 STORE
0228 0063 004F 0067 DSP4     TCY       15        X=0; INCREMENT DEBOUNCE
0229 0047 0032 0068          IMAC
0230 000E 0098 0069          LDX       1
0231 001D 0021 0070          TBIT      2
0232 003B 0121 0071          BRANCH    TDISPINC
0233 0076 00E5 0072          ALEC      10        DEBOUNCE
0234 006D 013F 0073          BRANCH    DSP1      CONTINUE DISPLAY IF< 0167>
0235 005B 009E 0074          LDX       7
0236 0036 0049 0075          TCY       9
0237 006C 008B 0076          LDP       13
0238 0059 0020 0077          TBIT      0         TEST TALK SET?
0239 0032 012C 0078          BRANCH    SPKREG+1  YES                  < 1820>
0240 0064 0080 0079          LDP       0
0241 0049 000E 0080          KNEZ                KEYDOWN?
0242 0012 0129 0081          BRANCH    DSP5      YES                  < 0246>
0243 0025 0006 0082          CLA                 NO
0244 004A 00CF 0083          ACNAA     15        ACC=14 FOR DEBOUNCE
0245 0014 013F 0084          BRANCH    DSP1                           < 0167>
0246 0029 0090 0085 DSP5     LDX       0
0247 0052 0047 0086          TCY       14
0248 0024 0023 0087          TBIT      3         DEBOUNCE >=8?
0249 0048 014E 0088          BRANCH    KEYDOWN   YES                  < 0256>
0250 0010 013F 0089          BRANCH    DSP1                           < 0167>
0251 0021 00E8 0090 TDISPINC ALEC      1         SCAN TWICE FOR
0252 0042 013F 0091          BRANCH    DSP1      ELECTRONIC TESTING   < 0167>
0253 0004 0083 0092          BL        DISPINC                        < 1667>
     0009 0141 0093
0254 0013 00EB 0094 KDWN     ALEC      13        X=0;CHECK DEBOUNCE COUNTER
0255 0027 0161 0095          BRANCH    DISP/KB1  NOT LONG ENOUGH      < 0192>
0256 004E 0060 0096 KEYDOWN  TCMIY     0         RESET DEBOUNCE COUNTER
0257 001C 0091 0097 KEYDON1  LDX       8
0258 0039 004B 0098          TCY       13        K-LINE POINTER
0259 0072 000A 0099          TKM
0260 0065 0033 0100          MNEZ                DOUBLE CHECK KEY DOWN
0261 004B 012D 0101          BRANCH    KD1                            < 0263>
0262 0016 0161 0102          BRANCH    DISP/KB1  KEY NOT DOWN         < 0192>
0263 002D 0047 0103 KD1      TCY       14        R-LINE POINTER
0264 005A 002A 0104          TMY
0265 0034 0036 0105          RSTR                RESET PRESENT R-LINE
```

```
STMT  PC   CODE PLOC
0266 0068 009E 0106           LDX     7          * INCREMENT KEY CTR
0267 0051 0045 0107           TCY     10         *
0268 0022 0086 0108           CALLL   CARRYON    * FOR USE IN RANDOM < 0968>
     0044 0190 0109
0269 0008 0043 0110           TCY     12         *
0270 0011 0060 0111           TCMIY   0          * TWO-DIGIT WRAP AROUND
0271 0023 0091 0112           LDX     8
0272 0046 0047 0113           TCY     14
0273 000C 0006 0114           CLA
0274 0019 0076 0115           ACACC   6          PUT 6 IN ACC
0275 0033 000E 0116           KNEZ               SEE IF KEY IS ON VSS
0276 0066 011A 0117           BRANCH  KD2        VSS                 < 0278>
0277 004D 0029 0118           TMA
0278 001A 002C 0119 KD2       TAMDYN             STORE 6 IF R=VSS, ACC=R-LINE
0279 0035 0029 0120           TMA
0280 006A 0047 0121           TCY     14
0281 0055 0084 0122           BL      KEYEVAL                        < 0408>
     002A 0100 0123
0282 0054 000D 0124 SETRLINE  SETR
0283 0028 00BF 0125 SETR2     RETN
0284 ********************00 LEFT********PAGE 0*********************************
0285                          ORGPG   1
0286 0000 0087 0001 TIMEUP    LDP     14         X=0
0287 0001 000E 0002           KNEZ               KEYDOWN?
0288 0003 0100 0003           BRANCH  TESTJAM1   YES                 < 1904>
0289 0007 0086 0004 TIMEUP1   LDP     6
0290 000F 0098 0005           LDX     1
0291 001F 004F 0006           TCY     15
0292 003F 0022 0007           TBIT    1          SELF-TEST FLAG?
0293 007F 0104 0008           BRANCH  ARNDCARY                       < 0971>
0294 007E 0090 0009           LDX     0
0295 007D 0045 0010           TCY     10
0296 007B 0110 0011           BRANCH  CARRYON                        < 0968>
0297 0077 0098 0012 CHECKGO   LDX     1          GO FLAG
0298 006F 0049 0013           TCY     9
0299 005F 0023 0014           TBIT    3          GO PRESSED?
0300 003E 012B 0015           BRANCH  NOP1       YES: GO +,-,X,/,* AR< 0335>I
0301 007C 0091 0016           LDX     8          K-LINE IN ACC
0302 0079 0042 0017           TCY     4
0303 0073 0033 0018           MNEZ               SOLVE IT?
0304 0067 012B 0019           BRANCH  NOP1                           < 0335>
0305 004F 0090 0020           LDX     0
0306 001E 0044 0021           TCY     2
0307 003D 0033 0022           MNEZ
0308 007A 016B 0023           BRANCH  DOIT                           < 0310>
0309 0075 012B 0024           BRANCH  NOP1                           < 0335>
0310 006B 0098 0025 DOIT      LDX     1
0311 0057 0049 0026           TCY     9
0312 002E 00E1 0027           ALEC    8          MIXED?
0313 005C 015D 0028           BRANCH  FUNC3      NO                  < 0322>
0314 0038 00A1 0029           SBIT    2          YES, SET MIXED OPERATION FLAG
0315 0070 007F 0030           ACACC   15
0316 0061 0098 0031 FUNC2     LDX     1
0317 0043 0044 0032           TCY     2
0318 0006 002F 0033           TAM                CHANGE FUNCTION IN DISPLAY
0319 000D 0090 0034           LDX     0
0320 001B 0064 0035           TCMIY   2
0321 0037 008F 0036           BL      LOADLVL                        < 2135>
     006E 0168 0037
0322 005D 00A5 0038 FUNC3     RBIT    2          RESET MIXED OPERATION FLAG
0323 003A 004A 0039           TCY     5
0324 0074 0091 0040           LDX     8
0325 0069 002F 0041           TAM                STORE FUNCTION
0326 0053 0161 0042           BRANCH  FUNC2                          < 0316>
0327 0026 0098 0043 DECPT     LDX     1
0328 004C 0049 0044           TCY     9
0329 0018 0020 0045           TBIT    0          DECIMAL POINT PRESSED?
0330 0031 012B 0046           BRANCH  NOP1       YES                 < 0335>
0331 0062 00A0 0047           SBIT    0          NO
```

```
STMT  PC   CODE PLOC
0332 0045 0090 0048            LDX      0
0333 000A 002A 0049            TMY
0334 0015 00A3 0050            SBIT     3
0335 002B 0080 0051  NOP1      BL       DISP/KB                              < 0164>
     0056 0100 0052
0336 002C 0043 0053  LEAD-IN   TCY      12
0337 0058 0082 0054            CALLL    TOGG4      1,2,4,8DOUBLE=2,4,8,   < 0734>
     0030 01A1 0055
0338 0060 008F 0056            CALLL    CLEARROM                             < 2146>
     0041 01CD 0057
0339 0002 002D 0058            TAMIYC
0340 0005 006F 0059            TCMIY    15
0341 000B 0068 0060            TCMIY    1          01F0,01F2,01F4,01F6
0342 0017 0091 0061            LDX      8
0343 002F 004D 0062            TCY      11
0344 005E 006E 0063            TCMIY    7          RETN#BCH FLAG
0345 003C 008A 0064            BL       TRY2       SAY LEAD-IN PHRASE     < 0836>
     0078 0178 0065
0346 0071 002F 0066  TEN1      TAM
0347 0063 0090 0067  SECOND    LDX      0
0348 0047 008C 0068            CALLL    ADD3                                 < 0534>
     000E 01FF 0069
0349 001D 0091 0070            LDX      8
0350 003B 0047 0071            TCY      14
0351 0076 0007 0072            DMAN
0352 006D 0171 0073            BRANCH   TEN1                                 < 0346>
0353 005B 0048 0074            TCY      1
0354 0036 0090 0075  NEAT      LDX      0
0355 006C 0006 0076            CLA
0356 0059 0003 0077            XMA
0357 0032 0098 0078            LDX      1
0358 0064 00BF 0079            RETN
0359 0049 0043 0080            TCY      12
0360 0012 002F 0081            TAM
0361 0025 0044 0082            TCY      2
0362 004A 01B6 0083            CALL     NEAT                                 < 0354>
0363 0014 004D 0084            TCY      11
0364 0029 002F 0085            TAM
0365 0052 004C 0086            TCY      3
0366 0024 01B6 0087            CALL     NEAT                                 < 0354>
0367 0048 0045 0088            TCY      10
0368 0010 002F 0089            TAM
0369 0021 008D 0090            BL       LNK/EDIT                             < 1490>
     0042 017F 0091
0370 0004 0046 0092  NUM-TRY   TCY      6
0371 0009 0032 0093            IMAC
0372 0013 008F 0094            CALLL    CLEAR                                < 2076>
     0027 0195 0095
0373 004E 0028 0096            TAY                 STORE # OF DGTS IN Y-PTR
0374 001C 009E 0097  TRANS     LDX      7          LOAD CORRECT ANSWER IN DISP
0375 0039 0029 0098            TMA
0376 0072 0098 0099            LDX      1
0377 0065 002C 0100            TAMDYN
0378 004B 011C 0101            BRANCH   TRANS                                < 0374>
0379 0016 0091 0102            LDX      8
0380 002D 0049 0103            TCY      9          # OF TRIES
0381 005A 0029 0104            TMA
0382 0034 0047 0105            TCY      14
0383 0068 0064 0106            TCMIY    2          CODE FOR AFTER LNK EDIT
0384 0051 0060 0107            TCMIY    0          LNK/EDIT PTR
0385 0022 0083 0108  BADDLNK   BL       ADDLINK                              < 1723>
     0044 0108 0109
0386 0008 006C 0110  NUM-TRY2  TCMIY    3          CODE FOR AFTER LNK/EDT
0387 0011 0064 0111            TCMIY    2          LINK/EDIT PTR
0388 0023 004F 0112  GET#      TCY      15         TEST FOR # OF DGT'S TO SPEAK
0389 0046 0029 0113            TMA
0390 000C 0077 0114            ACACC    14
0391 0019 0028 0115            TAY
```

```
STMT  PC   CODE FLOC
0392 0033 0090 0116           LDX        1          LAST # SPOKEN?
0393 0066 0032 0117           IMAC
0394 004D 016A 0118           BRANCH     GET#2                          < 0397>
0395 001A 0029 0119           TMA
0396 0035 0122 0120           BRANCH     BADDLNK                        < 0385>
0397 006A 0091 0121   GET#2   LDX        8
0398 0055 004D 0122           TCY        11         LNK CODE FLG
0399 002A 0060 0123           TCMIY      0
0400 0054 0080 0124           BL         RSTALNK                        < 1735>
     0028 012A 0125
0401                          ORGPG      2
0402 *                  KEY DECODE ROUTINE
0403 *
0404 * THIS ROUTINE DECIDES WHERE TO GO DEPENDING ON WHICH KEY IS PRESSED
0405 * X=0; R-LINE POINTER IS IN Y; K-LINE POINTER IS IN ACC
0406 *
0407 * R-LINE IS IN Y, K-LINE IS IN ACC
0408 0000 002A 0001   KEYEVAL TMY
0409 0001 0056 0002           YNEC       6          MODE?
0410 0003 013C 0003           BRANCH     KYEVL1     NO                  < 0463>
0411 0007 00E1 0004   MODE    ALEC       8
0412 000F 013F 0005           BRANCH     DSPMODE                        < 0414>
0413 001F 0006 0006   NEWMODE CLA
0414 003F 0042 0007   DSPMODE TCY        4          MODE
0415 007F 002F 0008           TAM
0416 007E 0020 0009           TBIT       0          NUMBER STUMPER
0417 007D 011A 0010           BRANCH     NSTUM      NUM STUMPER         < 0516>
0418 007B 004A 0011   NSTUM1  TCY        5
0419 0077 0068 0012           TCMIY      1
0420 006F 0060 0013           TCMIY      0
0421 005F 0045 0014           TCY        10
0422 003E 0060 0015           TCMIY      0
0423 007C 0060 0016           TCMIY      0
0424 0079 0062 0017           TCMIY      4
0425 0073 008F 0018           CALLL      CLEARROM                       < 2146>
     0067 01CD 0019
0426 004F 002D 0020           TAMIYC
0427 001E 006B 0021           TCMIY      13
0428 003D 0068 0022           TCMIY      1
0429 007A 0049 0023           TCY        9
0430 0075 0060 0024           TCMIY      0          CLEAR GO,ENTER,# OF TRIES,SA
0431 006B 008F 0025   SPELLING CALLL     CLEAR                          < 2076>
     0057 0195 0026
0432 002E 008F 0027           CALLL      MEMADDR                        < 2092>
     005C 01DE 0028
0433 0038 0083 0029           CALLL      LOADRESS                       < 1603>
     0070 0180 0030
0434 0061 008F 0031   SPEL1   CALLL      MEMADDR                        < 2092>
     0043 01DE 0032
0435 0006 0083 0033   NEW5    CALLL      OUTADDR    GET SPELLING        < 1614>
     000D 01FF 0034
0436 001B 0090 0035   NEW6    LDX        0
0437 0037 0049 0036           TCY        9
0438 006E 002A 0037           TMY
0439 005D 00BF 0038           RETN
0440 003A 0098 0039           LDX        1
0441 0074 002F 0040           TAM
0442 0069 0083 0041           CALLL      OUTADDR                        < 1614>
     0053 01FF 0042
0443 0026 019B 0043           CALL       NEW6                           < 0436>
0444 004C 002F 0044           TAM
0445 0018 0021 0045           TBIT       2
0446 0031 010C 0046           BRANCH     NEW8       END OF SPELLING     < 0511>
0447 0062 0090 0047   NEW9    LDX        0
0448 0045 0049 0048           TCY        9
0449 000A 0032 0049           IMAC
0450 0015 002F 0050           TAM
0451 002B 00E1 0051           ALEC       8
```

```
STMT  PC   CODE PLOC
0452 0056 0105 0052              BRANCH    NEW5
0453 002C 0049 0053  NEW7        TCY       9
0454 0058 0060 0054              TCMIY     0
0455 0030 0091 0055              LDX       8
0456 0060 0045 0056              TCY       10
0457 0041 008F 0057              LDP       7
0458 0002 0022 0058              TBIT      1          RANDOM RETURN
0459 0005 0159 0059              BRANCH    RARRANGE                         < 1076>
0460 000B 004D 0060              TCY       11
0461 0017 0068 0061              TCMIY     1          SAY ONE PHRASE, THEN SAY LEVE
0462 002F 008A 0062              BL        TRY3                             < 0837>
     005E 0163 0063
0463 003C 005A 0064  KYEVL1      YNEC      5          FUNCTION?  +, -, X, /, *
0464 0078 0147 0065              BRANCH    KYEVL2     NO                    < 0466>
0465 0071 0088 0066              BL        CHECKGO    YES                   < 0297>
     0063 0177 0067
0466 0047 0052 0068  KYEVL2      YNEC      4          C, <, >, "?
0467 000E 016C 0069              BRANCH    KYEVL3     NO                    < 0474>
0468 001D 0098 0070              LDX       1
0469 003B 0049 0071              TCY       9
0470 0076 008A 0072              LDP       5
0471 006D 0023 0073              TBIT      3          GO FLAG
0472 005B 0100 0074              BRANCH    RGLC2                            < 0773>
0473 0036 014A 0075              BRANCH    NOP                              < 0851>
0474 006C 005C 0076  KYEVL3      YNEC      3          ENTER, GO, OFF?
0475 0059 0152 0077              BRANCH    DECPTOR#   NO, SO NUMBER OR DECI< 0483>N
0476 0032 008A 0078              LDP       5          YES
0477 0064 00E4 0079              ALEC      2
0478 0049 0132 0080              BRANCH    ENTER      ENTER                 < 0846>
0479 0012 008E 0081              LDP       7
0480 0025 00E2 0082              ALEC      4
0481 004A 0100 0083              BRANCH    GO         GO                    < 1005>
0482 0014 0080 0084              BL        OFF        OFF                   < 0190>
     0029 0138 0085
0483 0052 004B 0086  DECPTOR#    TCY       13         X=8
0484 0024 0032 0087              IMAC
0485 0048 011C 0088              BRANCH    POINT      DECIMAL POINT         < 0494>
0486 0010 0006 0089              CLA
0487 0021 0020 0090              TBIT      0          0, 1, OR 2
0488 0042 014B 0091              BRANCH    KEY012                           < 0498>
0489 0004 0022 0092              TBIT      1          3, 4, OR 5
0490 0009 0165 0093              BRANCH    KEY345                           < 0497>
0491 0013 0021 0094              TBIT      2          6, 7, OR 8
0492 0027 0172 0095              BRANCH    KEY678                           < 0496>
0493 004E 0139 0096              BRANCH    KEY9       9                     < 0495>
0494 001C 007C 0097  POINT       ACACC     3
0495 0039 007C 0098  KEY9        ACACC     3
0496 0072 007C 0099  KEY678      ACACC     3
0497 0065 007C 0100  KEY345      ACACC     3
0498 004B 0060 0101  KEY012      TCMIY     0
0499 0016 0015 0102              AMAAC
0500 002D 002F 0103              TAM                  PUT NUMBER IN R-LINE; DECIMAL
0501 005A 0082 0104              LDP       4
0502 0034 00E9 0105              ALEC      9          0-9
0503 0068 0100 0106              BRANCH    NUMBER                           < 0651>
0504 0051 0088 0107              LDP       1
0505 0022 0042 0108              TCY       4
0506 0044 0023 0109              TBIT      3          WORD PROB
0507 0008 0126 0110              BRANCH    DECPT                            < 0327>
0508 0011 0022 0111              TBIT      1          WRITE IT
0509 0023 0126 0112              BRANCH    DECPT                            < 0327>
0510 0046 012B 0113              BRANCH    NOP1                             < 0335>
0511 000C 0091 0114  NEW8        LDX       8
0512 0019 0045 0115              TCY       10
0513 0033 0022 0116              TBIT      1
0514 0066 0162 0117              BRANCH    NEW9                             < 0447>
0515 004D 012C 0118              BRANCH    NEW7                             < 0453>
0516 001A 0003 0119  NSTUM       ACNAA     12
0517 0035 017B 0120              BRANCH    NSTUM1                           < 0418>
```

```
STMT  PC   CODE PLOC
0518 006A 004F 0121  SCORE2   TCY      15
0519 0055 006C 0122           TCMIY    3          LNK/EDIT PTR FOR # WRONG
0520 002A 004D 0123           TCY      11
0521 0054 0067 0124           TCMIY    14         RETN&BCH FLAG
0522 0028 0049 0125           TCY      9
0523 0050 0029 0126           TMA
0524 0020 0089 0127           BL       ONEDGT                              < 1321>
     0040 0149 0128
0525 ***********************************PAGE 2*******************************
0526                          ORGPG    3
0527 0000 01E6 0001  TRECOMG  CALL     TRE7COM    TRANSFER A IN 0 TO 7< 0639>
0528 0001 01D2 0002           CALL     EXCH       A IN 6 BUT NOT 7    < 0608>
0529 0003 01E6 0003           CALL     TRE7COM                        < 0639>
0530 0007 01DC 0004           CALL     FUNCTION                       < 0554>
0531 000F 0073 0005           ACACC    12
0532 001F 0127 0006           BRANCH   MULTIPLY                       < 0617>
0533 003F 009E 0007  ADDB     LDX      7
0534 007F 004C 0008  ADD3     TCY      3
0535 007E 00B4 0009  ADD      REAC
0536 007D 00B1 0010           SAL
0537 007B 0010 0011  ADDBEG   DMEA
0538 0077 00D6 0012           TAMACS   6
0539 006F 0018 0013           CTMDYN
0540 005F 017B 0014           BRANCH   ADDBEG                         < 0537>
0541 003E 00BF 0015           RETN
0542 007C 0096 0016  AFCLC    LDX      6
0543 0079 0041 0017           TCY      8
0544 0073 006B 0018           TCMIY    13         EQUAL SIGN
0545 0067 004C 0019           TCY      3
0546 004F 00B2 0020  TOPRB    COMX8               TRANSFER B IN 6
0547 001E 0029 0021           TMA
0548 003D 00B2 0022           COMX8
0549 007A 00FC 0023           YMCY     3
0550 0075 002F 0024           TAM
0551 006B 00F5 0025           YMCY     10
0552 0057 0050 0026           YNEC     0
0553 002E 014F 0027           BRANCH   TOPRB                          < 0546>
0554 005C 0091 0028  FUNCTION LDX      8
0555 0038 004A 0029           TCY      5
0556 0070 0029 0030           TMA
0557 0061 00BF 0031           RETN
0558 0043 0096 0032           LDX      6          FUNCTION IN 6
0559 0006 0042 0033           TCY      4
0560 000D 002D 0034           TAMIYC
0561 001B 0091 0035           LDX      8
0562 0037 0022 0036           TBIT     1          - EXCHANGE A & C
0563 006E 01D2 0037           CALL     EXCH                           < 0608>
0564 005D 0023 0038           TBIT     3
0565 003A 01D2 0039           CALL     EXCH       / EXCHANGE A & C    < 0608>
0566 0074 008F 0040  NOEXCH   CALLL    CLEAR      PROBLEM ON DISP     < 2076>
     0069 0195 0041
0567 0053 0091 0042           LDX      8
0568 0026 0042 0043           TCY      4
0569 004C 0033 0044           MNEZ
0570 0018 013B 0045           BRANCH   INSRT3                         < 0596>
0571 0031 0090 0046           LDX      0
0572 0062 0042 0047           TCY      4
0573 0045 0064 0048           TCMIY    2
0574 000A 0098 0049  SIXTOZIP LDX      1
0575 0015 0041 0050  STARTAT8 TCY      8
0576 002B 0000 0051  TRECOM   COMX
0577 0056 0029 0052           TMA
0578 002C 0000 0053           COMX
0579 0058 002C 0054           TAMDYN
0580 0030 012B 0055           BRANCH   TRECOM                         < 0576>
0581 0060 00BF 0056           RETN
0582 0041 0098 0057  INSRBLNK LDX      1
```

```
STMT  PC   CODE FLOC
0583 0002 0040 0058            TCY       0
0584 0005 0033 0059  INSRT2    MNEZ
0585 000B 013C 0060            BRANCH    INSRT1                            < 0589>
0586 0017 006F 0061            TCMIY     15       INSERT BLANK
0587 002F 005C 0062            YNEC      3
0588 005E 0105 0063            BRANCH    INSRT2                            < 0584>
0589 003C 00BF 0064  INSRT1    RETN
0590 0078 004A 0065            TCY       5
0591 0071 0033 0066  INSRT4    MNEZ
0592 0063 013B 0067            BRANCH    INSRT3                            < 0596>
0593 0047 006F 0068            TCMIY     15       INSERT BLANK
0594 000E 005E 0069            YNEC      7
0595 001D 0171 0070            BRANCH    INSRT4                            < 0591>
0596 003B 0091 0071  INSRT3    LDX       8
0597 0076 0045 0072            TCY       10
0598 006D 0085 0073            LDP       10
0599 005B 0023 0074            TBIT      3        TRY FLAG
0600 0036 0179 0075            BRANCH    WNGTRY   "WRONG,TRY AGAIN"THE< 1376>D
0601 006C 0080 0076            CALLL     FUNCTION                          < 0554>
     0059 01DC 0077
0602 0032 0015 0078            AMAAC
0603 0064 008F 0079            CALLL     CLEARROM                          < 2146>
     0049 01CD 0080
0604 0012 002D 0081            TAMIYC
0605 0025 0067 0082            TCMIY     14
0606 004A 0068 0083            TCMIY     1
0607 0014 008D 0084            BL        LNK/EDTA                          < 1485>
     0029 0100 0085
0608 0052 004C 0086  EXCH      TCY       3
0609 0024 0096 0087            LDX       6
0610 0048 0029 0088  EXCH1     TMA
0611 0010 009E 0089            LDX       7
0612 0021 0003 0090            XMA
0613 0042 0096 0091            LDX       6
0614 0004 002C 0092            TAMDYN
0615 0009 0148 0093            BRANCH    EXCH1                             < 0610>
0616 0013 00BF 0094            RETN
0617 0027 009E 0095  MULTIPLY  LDX       7
0618 004E 004C 0096  CLRDOWN3  TCY       3
0619 001C 0006 0097  CLRDOWN   CLA
0620 0039 002C 0098  CLR       TAMDYN
0621 0072 0139 0099            BRANCH    CLR                               < 0620>
0622 0065 00BF 0100            RETN
0623 004B 0090 0101  MULT1     LDX       0
0624 0016 004C 0102            TCY       3
0625 002D 0007 0103  CONTI     DMAN
0626 005A 0108 0104            BRANCH    MULT2                             < 0632>
0627 0034 0069 0105            TCMIY     9
0628 0068 0004 0106            DYN
0629 0051 0004 0107            DYN
0630 0022 012D 0108            BRANCH    CONTI                             < 0625>
0631 0044 017C 0109            BRANCH    AFCLC                             < 0542>
0632 0008 002F 0110  MULT2     TAM
0633 0011 01BF 0111            CALL      ADDB                              < 0533>
0634 0023 014B 0112            BRANCH    MULT1                             < 0623>
0635 0046 0003 0113  SHFL      XMA
0636 000C 0004 0114            DYN
0637 0019 0146 0115            BRANCH    SHFL                              < 0635>
0638 0033 00BF 0116            RETN
0639 0066 009E 0117  TRE7COM   LDX       7
0640 004D 004C 0118            TCY       3
0641 001A 012B 0119            BRANCH    TRECOM                            < 0576>
0642 0035 0090 0120  SENTER    LDX       0
0643 006A 0042 0121            TCY       4
0644 0055 002A 0122            TMY
0645 002A 008A 0123            LDP       5
0646 0054 0054 0124            YNEC      2
0647 0028 0157 0125            BRANCH    SVLTENTR                          < 0797>
0648 0050 014A 0126            BRANCH    NOP                               < 0851>
0649 ************************************PAGE 3********************************
```

```
STMT  PC   CODE FLOC
0650                              ORGPG     4
0651 0000 0093 0001  NUMBER       LDX       1          GO FLAG
0652 0001 0049 0002               TCY       9
0653 0003 0023 0003               TBIT      3          GO PRESSED?
0654 0007 017D 0004               BRANCH    NUMBER2    YES                    < 0660>
0655 000F 00E0 0005               ALEC      0          ZERO?
0656 001F 0123 0006               BRANCH    NOP4       YES                    < 0756>
0657 003F 00EC 0007               ALEC      3          1-3?
0658 007F 0167 0008               BRANCH    CHNGLVL    YES, CHANGE LEVELS     < 0669>
0659 007E 0123 0009               BRANCH    NOP4       4-9                    < 0756>
0660 007D 01E8 0010  NUMBER2      CALL      NOTFULL4   MODE                   < 0750>
0661 007B 0021 0011               TBIT      2          GREATER/LESS?
0662 0077 0123 0012               BRANCH    NOP4       YES                    < 0756>
0663 006F 0020 0013               TBIT      0          NUM-STUM
0664 005F 0145 0014               BRANCH    NUMS                              < 0696>
0665 003E 01AB 0015               CALL      NSAVE                             < 0699>
0666 007C 0059 0016               YNEC      9          DISPLAY FULL?
0667 0079 017A 0017               BRANCH    NOTFULL    NO                     < 0672>
0668 0073 0123 0018               BRANCH    NOP4                              < 0756>
0669 0067 0091 0019  CHNGLVL      LDX       8
0670 004F 0046 0020               TCY       6
0671 001E 008F 0021               BL        LOADLVL2   SAY LEVEL              < 2133>
     003D 015A 0022
0672 007A 0050 0023  NOTFULL      YNEC      0          FIRST ENTRY?
0673 0075 0106 0024               BRANCH    NOTFULL2   NO                     < 0681>
0674 006B 01E8 0025               CALL      NOTFULL4                          < 0750>
0675 0057 0020 0026               TBIT      0          NUM-STUM
0676 002E 0170 0027               BRANCH    C-CLR                             < 0679>
0677 005C 0033 0028               MNEZ
0678 0038 0143 0029               BRANCH    TO. HERE                          < 0680>
0679 0070 008F 0030  C-CLR        CALLL     CLEAR      YES, SO BLANK DISPLA< 2076>
     0061 0195 0031
0680 0043 0040 0032  TO. HERE     TCY       0
0681 0006 0098 0033  NOTFULL2     LDX       1
0682 000D 002F 0034               TAM                  PUT # IN DISPLAY
0683 001B 0033 0035               MNEZ                 =0?
0684 0037 0126 0036               BRANCH    NOTFULL3   NO                     < 0691>
0685 006E 0050 0037               YNEC      0          YES;   FIRST ENTRY?
0686 005D 0126 0038               BRANCH    NOTFULL3   NO                     < 0691>
0687 003A 0049 0039               TCY       9
0688 0074 0020 0040               TBIT      0
0689 0069 0126 0041               BRANCH    NOTFULL3                          < 0691>
0690 0053 0168 0042               BRANCH    NOTFULL4   YES, SO DON'T INCREM< 0750>N
0691 0026 0090 0043  NOTFULL3     LDX       0
0692 004C 0049 0044               TCY       9
0693 0018 0032 0045               IMAC                 INCREMENT DISPLAY POINTER
0694 0031 002F 0046               TAM                  STORE
0695 0062 0168 0047               BRANCH    NOTFULL4                          < 0750>
0696 0045 0046 0048  NUMS         TCY       6          LEVEL CTR
0697 000A 0032 0049               IMAC
0698 0015 0078 0050               ACACC     1          LEVL + 2
0699 002B 0090 0051  NSAVE        LDX       0
0700 0056 0049 0052               TCY       9
0701 002C 002A 0053               TMY                  GET DISPLAY PTR
0702 0058 00BF 0054               RETN
0703 0030 0002 0055               YNEA                 COMPARE DISP PTR WITH DGT
0704 0060 0102 0056               BRANCH    NOTFULL1   COUNT DEPENDING UPON< 0706>
0705 0041 0123 0057               BRANCH    NOP4                              < 0756>
0706 0002 0091 0058  NOTFULL1     LDX       8
0707 0005 0047 0059               TCY       14
0708 000B 0029 0060               TMA                  GET NUMBER VALUE
0709 0017 01AB 0061               CALL      NSAVE                             < 0699>
0710 002F 017A 0062               BRANCH    NOTFULL                           < 0672>
0711 005E 0042 0063  REPEAT1      TCY       4
0712 003C 008B 0064               LDP       13
0713 0078 0020 0065               TBIT      0          NUM-STUM
0714 0071 0166 0066               BRANCH    BITSET3                           < 1891>
0715 0063 0103 0067               BRANCH    SPEAK                             < 1762>
0716 0047 0096 0068  ANSWER       LDX       6          "THE CORRECT ANSWER IS"
```

```
STMT  PC   CODE PLOC
0717 000E 0049 0069              TCY      9
0718 001D 0064 0070              TCMIY    2
0719 003B 0098 0071              LDX      1
0720 0076 004B 0072              TCY      13         THIS LOADS AND SPEAKS THE AN
0721 006D 008C 0073              CALLL    TRECOM     FROM THE CORRECT ANS< 0576>
     005B 01AB 0074
0722 0036 0090 0075              LDX      0          REG 6(10->13)
0723 006C 008C 0076              CALLL    STARTATB                        < 0575>
     0059 0195 0077
0724 0032 0096 0078              LDX      6
0725 0064 0047 0079              TCY      14
0726 0049 006F 0080              TCMIY    15
0727 0012 008D 0081              BL       LNK/EDTC                        < 1487>
     0025 010F 0082
0728 004A 0098 0083    SOLVMODE  LDX      1
0729 0014 0049 0084              TCY      9
0730 0029 0022 0085              TBIT     1          MIX IT?
0731 0052 0110 0086              BRANCH   MIXIT      YES                  < 0733>
0732 0024 008E 0087    GETRNDMB  BL       GETRNDM#   PUT RANDOM NUMBERS I< 1062>3
     0048 012F 0088
0733 0010 004A 0089    MIXIT     TCY      5
0734 0021 0091 0090    TOGG4     LDX      8
0735 0042 0029 0091              TMA
0736 0004 0015 0092              AMAAC
0737 0009 0139 0093              BRANCH   MIXIT1                          < 0742>
0738 0013 002F 0094    MIXIT2    TAM
0739 0027 0015 0095              AMAAC
0740 004E 00BF 0096              RETN
0741 001C 0124 0097              BRANCH   GETRNDMB                        < 0732>
0742 0039 00C4 0098    MIXIT1    ACNAA    2
0743 0072 0113 0099              BRANCH   MIXIT2                          < 0738>
0744 *********************************************************************
0745 0065 0042 0100    CLEARKEY  TCY      4
0746 004B 0021 0101              TBIT     2          CLEAR NOT ALLOWED IN GTLT
0747 0016 0123 0102              BRANCH   NOP4                            < 0756>
0748 002D 008F 0103              CALLL    CLEAR                           < 2076>
     005A 0195 0104
0749 0034 00A4 0105              RBIT     0
0750 0068 0091 0106    NOTFULL4  LDX      8
0751 0051 0042 0107              TCY      4
0752 0022 00BF 0108              RETN
0753 0044 0081 0109              LDP      8
0754 0008 0020 0110              TBIT     0
0755 0011 01EC 0111              CALL     NS-SCORE                        < 1195>
0756 0023 0080 0112    NOP4      BL       DISP/KB                         < 0161>
     0046 0100 0113
0757 000C 01AB 0114    GTRLESS   CALL     NSAVE                           < 0699>
0758 0019 00A0 0115              SBIT     0          PUT 1 IN MSD
0759 0033 00A6 0116              RBIT     1
0760 0066 0098 0117              LDX      1
0761 004D 002F 0118              TAM                 PUT 2 OR 4 IN LSD (< OR >)
0762 001A 0123 0119              BRANCH   NOP4                            < 0756>
0763 0035 0041 0120    TRANDSP1  TCY      8
0764 006A 0006 0121              CLA
0765 0055 007F 0122              ACACC    15
0766 002A 009E 0123    TTTTTT    LDX      7
0767 0054 0086 0124              LDP      6
0768 0028 0021 0125              TBIT     2
0769 0050 0127 0126              BRANCH   TRANDISP                        < 0973>
0770 0020 0154 0127              BRANCH   TRANDSP2                        < 0999>
0771 ***********************************PAGE 4*******************************
0772                             ORGPG    5
0773 0000 0091 0001    RGLCR     LDX      8
0774 0001 004B 0002              TCY      13
0775 0003 0082 0003              LDP      4
0776 0007 0020 0004              TBIT     0          CLEAR?
0777 000F 0165 0005              BRANCH   CLEARKEY   YES                  < 0745>
0778 001F 0023 0006              TBIT     3          REPEAT?
```

```
STMT  PC   CODE FLOC
0779 003F 015E 0007              BRANCH    REPEAT1    YES                    < 0711>
0780 007F 0042 0008              TCY       4
0781 007E 0021 0009              TBIT      2          GREATER THAN,LESS THAN MODE?
0782 007D 010C 0010              BRANCH    GTRLESS    YES,< OR >             < 0757>
0783 007B 0123 0011              BRANCH    NOP4                              < 0756>
0784 0077 004F 0012    COMP      TCY       15
0785 006F 0087 0013              LDP       14
0786 005F 0022 0014              TBIT      1          TEST FOR SELF-TEST MODE
0787 003E 0156 0015              BRANCH    SUM350                            < 1953>
0788 007C 0091 0016              LDX       8
0789 0079 0042 0017              TCY       4          CHECK FOR NSTUM MODE
0790 0073 0081 0018              LDP       8
0791 0067 0020 0019              TBIT      0
0792 004F 0131 0020              BRANCH    NSTUMENT                          < 1165>
0793 001E 0085 0021              LDP       10
0794 003D 0033 0022              MNEZ
0795 007A 0175 0023              BRANCH    COMPARE                           < 1382>
0796 0075 008C 0024              BL        SENTER                            < 0642>
     006B 0135 0025
0797 0057 0049 0026    SVLTENTR  TCY       9       COMPARE IN SOLVE IT
0798 002E 0060 0027              TCMIY     0
0799 005C 0006 0028              CLA
0800 0038 009E 0029              LDX       7
0801 0070 0040 0030              TCY       0
0802 0061 0033 0031    SENTER3   MNEZ
0803 0043 016E 0032              BRANCH    SENTER2                           < 0808>
0804 0006 0078 0033              ACACC     1
0805 000D 0005 0034              IYC
0806 001B 005C 0035              YNEC      3
0807 0037 0161 0036              BRANCH    SENTER3                           < 0802>
0808 006E 0049 0037    SENTER2   TCY       9
0809 005D 002F 0038              TAM
0810 003A 0040 0039              TCY       0
0811 0074 0098 0040    SENTER4   LDX       1
0812 0069 0029 0041              TMA
0813 0053 009E 0042              LDX       7
0814 0026 0049 0043              TCY       9
0815 004C 002A 0044              TMY
0816 0018 0009 0045              MNEA
0817 0031 0129 0046              BRANCH    WRONG                             < 0852>
0818 0062 01F6 0047              CALL      S-SAVE                            < 0840>
0819 0045 00EC 0048              ALEC      3
0820 000A 013B 0049              BRANCH    AGA                               < 0839>
0821 0015 01BB 0050              CALL      AGA        TEST TO SEE IF EXTRA< 0839>
0822 002B 0098 0051              LDX       1          DIGIT ENTERED
0823 0056 0032 0052              IMAC
0824 002C 0130 0053              BRANCH    RIGHT                             < 0827>
0825 0058 0129 0054              BRANCH    WRONG                             < 0852>
0826 ****************************************************************************
0827 0030 0091 0055    RIGHT     LDX       8          SAY PRASE PHASE THEN BRANCH
0828 0060 0045 0056              TCY       10
0829 0041 0060 0057              TCMIY     0          TRY FLAG
0830 0002 006A 0058              TCMIY     5
0831 0005 0029 0059              TMA
0832 000B 0015 0060              AMAAC
0833 0017 008F 0061    TRY4      CALLL     CLEARROM                          < 2146>
     002F 01CD 0062
0834 005E 002D 0063              TAMIYC               PRAISE PHRASE
0835 003C 006D 0064              TCMIY     11         00B0,0032,00B4,00B8
0836 0078 008F 0065    TRY2      CALLL     MEMADDR                           < 2092>
     0071 01DE 0066
0837 0063 0083 0067    TRY3      CALLL     LOADRESS                          < 1603>
     0047 0180 0068
0838 000E 008B 0069              BL        SAY1PHRS                          < 1803>
     001D 014C 0070
0839 003B 0090 0071    AGA       LDX       0
0840 0076 0049 0072    S-SAVE    TCY       9
0841 006D 0032 0073              IMAC
```

```
STMT  PC   CODE PLOC
0842 005B 002F 0074          TAM
0843 0036 0028 0075          TAY
0844 006C 00BF 0076          RETN
0845 0059 0174 0077          BRANCH   SENTER4                         < 0811>
0846 0032 0098 0078 ENTER    LDX      1
0847 0064 0049 0079          TCY      9
0848 0049 00A4 0080          RBIT     0
0849 0012 0023 0081          TBIT     3        GO FLAG?
0850 0025 0177 0082          BRANCH   COMP     YES,CHECK ANSWER       < 0784>
0851 004A 0080 0083 NOP      BL       DISP/KB  NO                     < 0161>
     0014 0100 0084
0852 0029 0091 0085 WRONG    LDX      8
0853 0052 0045 0086          TCY      10
0854 0024 0023 0087          TBIT     3
0855 0048 0104 0088          BRANCH   INCORECT 2ND WRONG              < 0858>
0856 0010 00A3 0089          SBIT     3        TRY FLAG
0857 0021 008C 0090          BL       NOEXCH                          < 0566>
     0042 0174 0091
0858 0004 00A7 0092 INCORECT RBIT     3        RESET TRY FLAG
0859 0009 01F6 0093          CALL     S-SAVE   .INCREASE # OF WRONG   < 0840>
0860 0013 008F 0094          CALLL    CLEAR                           < 2076>
     0027 0195 0095
0861 004E 00A2 0096          SBIT     1        SECOND TRY FLAG
0862 001C 00A7 0097          RBIT     3        GOF
0863 0039 0082 0098          LDP      4
0864 0072 0091 0099          LDX      8
0865 0065 0042 0100          TCY      4
0866 004B 0033 0101          MNEZ
0867 0016 0147 0102          BRANCH   ANSWER                          < 0716>
0868 002D 008A 0103          LDP      5
0869 005A 004C 0104          TCY      3        PUT ANSER IN 7 TO REG1
0870 0034 009E 0105 TR7TO1   LDX      7
0871 0068 0029 0106          TMA
0872 0051 0098 0107          LDX      1
0873 0022 002C 0108          TAMDYN
0874 0044 0134 0109          BRANCH   TR7TO1                          < 0870>
0875 0008 008C 0110          CALLL    INSRBLNK                        < 0582>
     0011 01C1 0111
0876 0023 0089 0112 BLNK2    BL       ANS&OPN1                        < 1266>
     0046 011E 0113
0877 000C 0098 0114 BLNK1    LDX      1
0878 0019 0040 0115          TCY      0
0879 0033 0029 0116          TMA
0880 0066 0085 0117          LDP      10
0881 004D 00E9 0118          ALEC     9
0882 001A 015F 0119          BRANCH   INCRRT                          < 1373>
0883 0035 008A 0120          LDP      5
0884 006A 004C 0121          TCY      3
0885 0055 008C 0122          CALLL    SHFL                            < 0635>
     002A 01C6 0123
0886 0054 010C 0124          BRANCH   BLNK1                           < 0877>
0887 **********************************PAGE 5********************************
0888                         ORGPG    6
0889 0000 008F 0001 GO4      CALLL    CLEAR    CLEAR DISPLAY          < 2076>
     0001 0195 0002
0890 0003 008F 0003 CALLMODE CALLL    LOADLVL  LEVEL                  < 2135>
     0007 01E8 0004
0891 000F 008F 0005          CALLL    CLEARROM                        < 2146>
     001F 01CD 0006
0892 003F 002F 0007          TAM
0893 007F 0091 0008          LDX      8
0894 007E 0042 0009          TCY      4
0895 007D 0029 0010          TMA
0896 007B 0082 0011          LDP      4
0897 0077 00E0 0012          ALEC     0
0898 006F 014A 0013          BRANCH   SOLVMODE                        < 0728>
0899 005F 0086 0014          LDP      6
0900 003E 0071 0015          ACACC    8
```

```
STMT  PC   CODE PLOC
0901 007C 013A 0016            BRANCH    GOCARRY    ADDRESS OF #ENTRY OR< 0921>
0902 0079 0098 0017  GOCARRY1  LDX       1
0903 0073 004D 0018            TCY       11
0904 0067 002D 0019            TAMIYC
0905 004F 0064 0020            TCMIY     2          02(1)A(B,C)0; 02A2; 02A4
0906 001E 0091 0021            LDX       8
0907 003D 004D 0022            TCY       11
0908 007A 002A 0023            TMY
0909 0075 005E 0024            YNEC      7
0910 006B 0153 0025            BRANCH    ADDRPROB                        < 0924>
0911 0057 008F 0026  GO5       CALLL     MEMADDR     ADDRESS OF # ENTRY < 2092>
     002E 01DE 0027
0912 005C 0083 0028            CALLL     OUTADDR                         < 1614>
     0038 01FF 0029
0913 0070 0045 0030            TCY       10
0914 0061 002F 0031            TAM
0915 0043 0083 0032            CALLL     OUTADDR                         < 1614>
     0006 01FF 0033
0916 000D 004D 0034            TCY       11
0917 001B 002F 0035            TAM
0918 0037 0091 0036            LDX       8
0919 006E 0063 0037            TCMIY     12         FLAG FOR BRANCH ADDRPROB,ELS
0920 005D 0103 0038            BRANCH    CALLMODE                        < 0890>
0921 003A 007D 0039  GOCARRY   ACACC     11
0922 0074 0098 0040            LDX       1          SET STATUS
0923 0069 0179 0041            BRANCH    GOCARRY1   BAT                  < 0902>
0924 0053 0098 0042  ADDRPROB  LDX       1          ADDRESS OF BEGING OFPROBLEMS
0925 0026 0043 0043            TCY       12
0926 004C 0068 0044            TCMIY     1
0927 0018 008F 0045            CALLL     MEMADDR                         < 2092>
     0031 01DE 0046
0928 0062 0083 0047            CALLL     LOADRESS                        < 1603>
     0045 0180 0048
0929 000A 0090 0049            LDX       0
0930 0015 0043 0050            TCY       12
0931 002B 0060 0051            TCMIY     0
0932 0056 0045 0052  RANDOM-1  TCY       10
0933 002C 009E 0053  RANDOM    LDX       7
0934 0058 0029 0054            TMA
0935 0030 0090 0055            LDX       0
0936 0060 00BF 0056            RETN
0937 0041 0194 0057            CALL      ADDCARRY                        < 0963>
0938 0002 004D 0058            TCY       11
0939 0005 01AC 0059            CALL      RANDOM                          < 0933>
0940 000B 0194 0060            CALL      ADDCARRY                        < 0963>
0941 0017 0043 0061            TCY       12
0942 002F 0033 0062            MNEZ
0943 005E 0178 0063            BRANCH    GO7                             < 0945>
0944 003C 0156 0064            BRANCH    RANDOM-1                        < 0932>
0945 0078 0045 0065  GO7       TCY       10
0946 0071 0090 0066  GETA      LDX       0
0947 0063 0029 0067            TMA
0948 0047 0098 0068            LDX       1
0949 000E 00BF 0069            RETN
0950 001D 0194 0070            CALL      ADDCARRY                        < 0963>
0951 003B 01F8 0071            CALL      GO7                             < 0945>
0952 0076 0194 0072            CALL      ADDCARRY                        < 0963>
0953 006D 004D 0073            TCY       11
0954 005B 01F1 0074            CALL      GETA                            < 0946>
0955 0036 0194 0075            CALL      ADDCARRY                        < 0963>
0956 006C 004D 0076            TCY       11
0957 0059 01F1 0077            CALL      GETA                            < 0946>
0958 0032 0194 0078            CALL      ADDCARRY                        < 0963>
0959 0064 0096 0079            LDX       6
0960 0049 0047 0080            TCY       14         FLAG TO GET PROBLEM,
0961 0012 0060 0081            TCMIY     0          NOT LOAD ANSWER
0962 0025 008B 0082            BL        CLRANS                          < 1892>
     004A 011A 0083
```

```
STMT  PC   CODE PLOC
0963 0014 0015 0084  ADDCARRY AMAAC                  ADDS ACC AND MEMORY
0964 0029 0124 0085           BRANCH   CARRY                             < 0966>
0965 0052 0142 0086           BRANCH   NOCARRY                           < 0970>
0966 0024 002D 0087  CARRY    TAMIYC
0967 0048 0142 0088           BRANCH   NOCARRY                           < 0970>
0968 0010 0032 0089  CARRYON  IMAC
0969 0021 0124 0090           BRANCH   CARRY                             < 0966>
0970 0042 002F 0091  NOCARRY  TAM
0971 0004 00BF 0092  ARNDCARY RETN
0972 0009 0080 0093           BL       DISP/KB2                          < 0187>
     0013 012E 0094
0973 0027 0091 0095  TRANDISP LDX      8
0974 004E 0042 0096           TCY      4
0975 001C 0021 0097           TBIT     2
0976 0039 0165 0098           BRANCH   I=>                               < 0978>
0977 0072 016A 0099           BRANCH   I->                               < 0997>
0978 0065 008C 0100  I=>      CALLL    SIXTOZIP  TRANS ANS TO DISP       < 0574>
     004B 018A 0101
0979 0016 0090 0102           LDX      0
0980 002D 008C 0103           CALLL    STARTATB                          < 0575>
     005A 0195 0104
0981 0034 0041 0105           TCY      8
0982 0068 0020 0106  CK><     TBIT     0
0983 0051 0108 0107           BRANCH   GOT><                             < 0986>
0984 0022 0004 0108           DYN
0985 0044 0168 0109           BRANCH   CK><                              < 0982>
0986 0008 002B 0110  GOT><    TYA
0987 0011 0049 0111           TCY      9         SAVE Y
0988 0023 002F 0112           TAM
0989 0046 0028 0113           TAY
0990 000C 0064 0114           TCMIY    2         PUT IN CURSOR
0991 0019 0098 0115           LDX      1
0992 0033 0028 0116           TAY
0993 0066 006F 0117           TCMIY    15
0994 004D 0091 0118           LDX      8         ONLY ONE TRY
0995 001A 0045 0119           TCY      10        IN GTLT MODE
0996 0035 00A3 0120           SBIT     3
0997 006A 004D 0121  I->      TCY      11
0998 0055 0085 0122           BL       BSPK1                             < 1371>
     002A 017B 0123
0999 0054 0082 0124  TRANDSP2 LDP      4
1000 0028 0096 0125           LDX      6
1001 0050 002C 0126           TAMDYN
1002 0020 012A 0127           BRANCH   TTTTTT                            < 0766>
1003 **********************************PAGE 6*********************************
1004                          ORGPG    7
1005 0000 008F 0001  GO       CALLL    CLEAR                             < 2076>
     0001 0195 0002
1006 0003 004F 0003           TCY      15
1007 0007 0083 0004           LDP      12
1008 000F 0022 0005           TBIT     1         SELF-TEST FLAG
1009 001F 0148 0006           BRANCH   SETDSP                            < 1697>
1010 003F 008E 0007           LDP      7
1011 007F 0049 0008           TCY      9
1012 007E 00A3 0009           SBIT     3         GOF=1
1013 007D 0022 0010           TBIT     1         SECOND TRY
1014 007B 010B 0011           BRANCH   GO6                               < 1060>
1015 0077 0091 0012           LDX      8
1016 006F 004E 0013           TCY      7         X=8
1017 005F 0060 0014           TCMIY    0         CLEAR # WRONG
1018 003E 0060 0015           TCMIY    0         CLEAR # OF PROBLEMS
1019 007C 0060 0016           TCMIY    0         SCORE
1020 0079 0060 0017           TCMIY    0
1021 0073 0042 0018           TCY      4
1022 0067 0081 0019           LDP      8
1023 004F 0020 0020           TBIT     0         TEST FOR NUM STUM MODE
1024 001E 0100 0021           BRANCH   NSTUM-GO                          < 1126>
1025 003D 0043 0022           TCY      12
1026 007A 0062 0023           TCMIY    4         START OVER ON LEAD-IN PHRASE
```

```
STMT  PC   CODE PLOC
1027 0075 0091 0024  GO2       LDX      8          CLEAR DISPLAY
1028 006B 004E 0025            TCY      7          SET GO FLAG
1029 0057 0068 0026            TCMIY    1
1030 002E 0032 0027            IMAC                INCREMENT PROBLEM #
1031 005C 002F 0028            TAM
1032 0038 0088 0029            LDP      1
1033 0070 00EA 0030            ALEC     5          1ST-5TH PROBLEM?
1034 0061 012C 0031            BRANCH   LEAD-IN    YES                  < 0336>
1035 0043 008F 0032  SCORE     CALLL    CLEAR      SCORE ROUTINE FOR AL< 2076>S
     0006 0195 0033
1036 000D 00A4 0034            RBIT     0
1037 001B 00A7 0035            RBIT     3          GOF
1038 0037 00A6 0036            RBIT     1          SECOND TRY FLAG
1039 006E 0091 0037            LDX      8
1040 005D 0029 0038            TMA                 #WRONG
1041 003A 0090 0039            LDX      0        * 0 1 2 3 4 5 6 7 8 *
1042 0074 0048 0040            TCY      1        *   + 2     - 3     *SCORE FOR
1043 0069 0064 0041            TCMIY    2
1044 0053 004A 0042            TCY      5
1045 0026 0064 0043            TCMIY    2
1046 004C 0098 0044            LDX      1
1047 0018 002C 0045            TAMDYN              "#WRONG"ON DISP
1048 0031 0064 0046            TCMIY    2          "-"
1049 0062 00C6 0047            ACNAA    6          #RIGHT=5-#WRONG
1050 0045 0044 0048            TCY      2
1051 000A 002C 0049            TAMDYN              "#RIGHT" ON DISP
1052 0015 0068 0050            TCMIY    1          "+"
1053 002B 008F 0051            CALLL    CLEARROM   00F4                 < 2146>
     0056 01CD 0052
1054 002C 0062 0053            TCMIY    4
1055 0058 006F 0054            TCMIY    15
1056 0030 0091 0055            LDX      8
1057 0060 004E 0056            TCY      7
1058 0041 0060 0057            TCMIY    0
1059 0002 008D 0058            BL       LNK/EDTC   "YOUR SCORE IS SOS R< 1487>S
     0005 010F 0059
1060 000B 00A6 0060  GO6       RBIT     1          SECOND TRY FLAG RESET
1061 0017 0175 0061            BRANCH   GO2                             < 1027>
1062 002F 0045 0062  GETRNDM#  TCY      10         ADDRESS OF RANDOM NUMBER TAB
1063 005E 0090 0063  AAA       LDX      0
1064 003C 0029 0064            TMA
1065 0078 0098 0065            LDX      1
1066 0071 002D 0066            TAMIYC
1067 0063 0053 0067            YNEC     12
1068 0047 015E 0068            BRANCH   AAA                             < 1063>
1069 000E 0062 0069            TCMIY    4
1070 001D 0060 0070            TCMIY    0
1071 003B 00BF 0071            RETN
1072 0076 0091 0072            LDX      8          GET RANDOM NUMBERS
1073 006D 0045 0073            TCY      10         FOR SECOND OPRND & FIRST OPR
1074 005B 00A2 0074            SBIT     1          FLAG FOR BRANCHING RARRANGE
1075 0036 0084 0075  BSPEL1    BL       SPEL1                           < 0434>
     006C 0161 0076
1076 0059 0021 0077  RARRANGE  TBIT     2
1077 0032 012D 0078            BRANCH   TRANDOM                         < 1100>
1078 0064 00A1 0079            SBIT     2          GOT SECOND OPRND ONLY
1079 0049 004C 0080            TCY      3          STORE B IN DAM
1080 0012 0098 0081            LDX      1
1081 0025 0114 0082            BRANCH   TREGDAM                         < 1083>
1082 004A 00B2 0083  TREGDAM1  COMX8
1083 0014 0029 0084  TREGDAM   TMA
1084 0029 00B2 0085            COMX8
1085 0052 002C 0086            TAMDYN
1086 0024 014A 0087            BRANCH   TREGDAM1                        < 1082>
1087 0048 00BF 0088            RETN
1088 0010 0045 0089            TCY      10
1089 0021 009E 0090  TR-SAVE   LDX      7          ADDRESS FOR RANDOM NUMBER FO
1090 0042 0029 0091  TR-SAV2   TMA
1091 0004 0098 0092            LDX      1
```

```
STMT  PC   CODE PLOC
1092 0009 00BF 0093          RETN
1093 0013 0086 0094          CALLL     ADDCARRY  .                     < 0963>
     0027 0194 0095
1094 004E 004D 0096          TCY       11
1095 001C 01A1 0097          CALL      TR-SAVE                         < 1089>
1096 0039 0086 0098          CALLL     ADDCARRY                        < 0963>
     0072 0194 0099
1097 0065 0043 0100          TCY       12
1098 004B 0062 0101          TCMIY     4
1099 0016 0136 0102          BRANCH    BSPEL1                          < 1075>
1100 002D 00A5 0103 TRANDOM  RBIT      2         GOT TWO RANDOM NUMS IN 0 & 8
1101 005A 0046 0104          TCY       6         NUMBER OF DIGITS FOR LEVELS
1102 0034 0029 0105          TMA
1103 0068 00CC 0106          ACNAA     3
1104 0051 0028 0107          TAY
1105 0022 0006 0108 CLREGDAM CLA
1106 0044 0090 0109 CLREG1   LDX       0
1107 0008 002F 0110          TAM
1108 0011 00B2 0111          COMX8
1109 0023 002C 0112          TAMDYN
1110 0046 0144 0113          BRANCH    CLREG1                          < 1106>
1111 000C 00BF 0114          RETN
1112 0019 0046 0115          TCY       6
1113 0033 0029 0116          TMA
1114 0066 004A 0117          TCY       5
1115 004D 0015 0118          AMAAC
1116 001A 0048 0119          TCY       1
1117 0035 0075 0120          ACACC     10
1118 006A 01A2 0121          CALL      CLREGDAM  X, / IN LEVEL 3       < 1105>
1119 0055 008C 0122          BL        TRECOMO                         < 0527>
     002A 0100 0123
1120 0054 002F 0124 INCRRT2  TAM
1121 0028 009C 0125          LDX       3
1122 0050 0068 0126          TCMIY     1
1123 0020 008A 0127          BL        BLNK1                           < 0877>
     0040 010C 0128
1124 ***********************************************************************
1125                         ORGPG     8
1126 0000 008E 0001 NSTUM-GO CALLL     GETRNDM#  GET RANDOM # LOCATIO< 1062>
     0001 01AF 0002
1127 0003 008F 0003          CALLL     MEMADDR                         < 2092>
     0007 01DE 0004
1128 000F 0046 0005          TCY       6
1129 001F 0060 0006          TCMIY     0         LOAD '0 0' INTO DISPLAY
1130 003F 0005 0007          IYC                 *
1131 007F 0060 0008          TCMIY     0         *
1132 007E 008C 0009          CALLL     MULTIPLY  CLEAR OLD RANDOM #   < 0617>
     007D 01A7 0010
1133 007B 0083 0011 NSTUMDGT CALLL     OUTADDR   LOOK FOR ZEROES AND < 1614>
     0077 01FF 0012
1134 006F 0040 0013          TCY       0
1135 005F 0033 0014 CHK-ZERO MNEZ
1136 003E 0173 0015          BRANCH    GT-ZERO                         < 1139>
1137 007C 002F 0016          TAM
1138 0079 017B 0017          BRANCH    NSTUMDGT                        < 1133>
1139 0073 0005 0018 GT-ZERO  IYC
1140 0067 0052 0019          YNEC      4
1141 004F 015F 0020          BRANCH    CHK-ZERO                        < 1135>
1142 001E 0049 0021 REDUN-1  TCY       9
1143 003D 0060 0022          TCMIY     0         ZERO DGT CTR
1144 007A 0049 0023 REDUN    TCY       9         CHK FOR REDUNDANT #'S
1145 0075 002A 0024          TMY
1146 006B 00BF 0025          RETN
1147 0057 0029 0026          TMA
1148 002E 0005 0027 REDUN-#  IYC
1149 005C 0009 0028          MNEA
1150 0038 016E 0029          BRANCH    REDUN-OK                        < 1157>
1151 0070 0083 0030 REDUN2   CALLL     OUTADDR   INSERT NEW #          < 1614>
     0061 01FF 0031
```

```
STMT  PC   CODE PLOC
1152 0043 00E0 0032             ALEC       0          CHK FOR ZERO VALUE
1153 0006 0170 0033             BRANCH     REDUN2                          < 1151>
1154 000D 01FA 0034             CALL       REDUN                           < 1144>
1155 001B 002F 0035             TAM
1156 0037 011E 0036             BRANCH     REDUN-1    RECHECK FOR REDUNDAN< 1142>
1157 006E 005C 0037  REDUN-OK   YNEC       3          CHECKED ALL DGT'S?
1158 005D 012E 0038             BRANCH     REDUN-#                         < 1148>
1159 003A 0049 0039             TCY        9
1160 0074 0032 0040             IMAC                  INCREMENT DGT PTR
1161 0069 002F 0041             TAM
1162 0053 00E4 0042             ALEC       2          CHECKED ALL #'S?
1163 0026 017A 0043             BRANCH     REDUN                           < 1144>
1164 004C 0080 0044  BDK        BL         DISP/KB                         < 0161>
     0018 0100 0045
1165 0031 004E 0046  NSTUMENT   TCY        7          CLEAR DISPLAY DGT PTR
1166 0062 0060 0047             TCMIY      0
1167 0045 0060 0048             TCMIY      0
1168 000A 0046 0049  NS3        TCY        6          GET LEVEL COUNT
1169 0015 0032 0050             IMAC                  INC=Y-PTR
1170 002B 0078 0051             ACACC      1
1171 0056 00BF 0052             RETN
1172 002C 004D 0053             TCY        11
1173 0058 0060 0054             TCMIY      0          CLEAR RETN$BCH
1174 0030 0090 0055             LDX        0          TEST FOR BLANK IN DGT
1175 0060 0049 0056             TCY        9          DISP PTR
1176 0041 0009 0057             MNEA
1177 0002 014C 0058             BRANCH     BDK                             < 1164>
1178 0005 007F 0059             ACACC      15
1179 000B 002F 0060  NSTUM3     TAM
1180 0017 0028 0061             TAY
1181 002F 009E 0062             LDX        7          GET RIGHT MOST DGT FIRST
1182 005E 0029 0063             TMA
1183 003C 0098 0064             LDX        1
1184 0078 0009 0065             MNEA                  CORECT DGT IN CORRECT POSITI
1185 0071 015A 0066             BRANCH     NSTUM2                          < 1221>
1186 0063 004E 0067             TCY        7
1187 0047 0091 0068  NSTUM7     LDX        8
1188 000E 0032 0069             IMAC                  INC CORRECT POSITION CTR
1189 001D 002F 0070             TAM
1190 003B 0090 0071  NSTUM5     LDX        0
1191 0076 0049 0072             TCY        9
1192 006D 0007 0073             DMAN                  ALL DGT'S CHECKED?
1193 005B 010B 0074             BRANCH     NSTUM3                          < 1179>
1194 0036 0091 0075             LDX        8
1195 006C 0041 0076  NS-SCORE   TCY        8          STORE # CORRECT IN DISPLAY R
1196 0059 0029 0077             TMA
1197 0032 0098 0078             LDX        1
1198 0064 002C 0079             TAMDYN
1199 0049 0091 0080             LDX        8          STORE # WRONG POSITION IN DI
1200 0012 0029 0081             TMA
1201 0025 0098 0082             LDX        1
1202 004A 0046 0083             TCY        6
1203 0014 002F 0084             TAM
1204 0029 00BF 0085             RETN
1205 0052 0091 0086             LDX        8
1206 0024 0049 0087             TCY        9
1207 0048 0032 0088             IMAC
1208 0010 002F 0089             TAM
1209 0021 018A 0090             CALL       NS3        # OF DGTS ACCORDING < 1168>L
1210 0042 004E 0091             TCY        7          IS ANSWER CORRECT?
1211 0004 0009 0092             MNEA
1212 0009 0133 0093             BRANCH     NS1                             < 1233>
1213 0013 004D 0094             TCY        11
1214 0027 0061 0095             TCMIY      8          FOR NEXT PHRASE
1215 004E 008F 0096             CALLL      CLEARROM   "YOU'VE GOT MY #"    < 2146>
     001C 01CD 0097
1216 0039 0049 0098             TCY        9
1217 0072 0060 0099             TCMIY      0          CLEAR  GOF
1218 0065 0060 0100             TCMIY      0
```

```
STMT  PC   CODE PLOC
1219 004B 0069 0101            TCMIY      9
1220 0016 008A 0102            BL         TRY2                                  < 0836>
     002D 0178 0103
1221 005A 0091 0104  NSTUM2    LDX        8          CHECK FOR DIGIT PRESENT BUT
1222 0034 0046 0105            TCY        6          IN WRONG POSITION
1223 0068 002A 0106            TMY
1224 0051 00F8 0107            YMCY       1          Y-PTR + 2
1225 0022 0098 0108            LDX        1
1226 0044 0004 0109  NSTUM6    DYN
1227 0008 0123 0110            BRANCH     NSTUM4                                < 1229>
1228 0011 013B 0111            BRANCH     NSTUM5                                < 1190>
1229 0023 0009 0112  NSTUM4    MNEA
1230 0046 0144 0113            BRANCH     NSTUM6                                < 1226>
1231 000C 0041 0114            TCY        8          INCREMENT # IN WRONG POSITIO
1232 0019 0147 0115            BRANCH     NSTUM7                                < 1187>
1233 0033 0006 0116  NS1       CLA
1234 0066 0046 0117            TCY        6
1235 004D 0071 0118            ACACC      8          PUT MAX TRIES INTO ACC
1236 001A 0087 0119            LDP        14
1237 0035 0033 0120            MNEZ                  MAX TRIES LVL 1?
1238 006A 0127 0121            BRANCH     NS-L2-3                               < 1989>
1239 0055 0152 0122            BRANCH     NS2                                   < 1980>
1240 002A 0029 0123  RO        TMA
1241 0054 0004 0124            DYN
1242 0028 012A 0125            BRANCH     RO                                    < 1240>
1243 ***********************************PAGE 08*********************************
1244                           ORGPG      9
1245 *********LINK*OF*SPEECH*FOR*NUMBERS*IN*SOLVEIT**************************
1246 0000 004D 0001  NUMSPCH1 TCY        11
1247 0001 0063 0002           TCMIY      12
1248 0003 004F 0003           TCY        15
1249 0007 006E 0004           TCMIY      7
1250 000F 0098 0005           LDX        1
1251 001F 004A 0006  ZEROPN2  TCY        5          SECOND OPRND ZERRO ?
1252 003F 0029 0007  ZERO3    TMA
1253 007F 0078 0008           ACACC      1
1254 007E 0115 0009           BRANCH     ZERO4                                 < 1294>
1255 007D 004A 0010  NONZERO2 TCY        5
1256 007B 0029 0011           TMA
1257 0077 00E9 0012           ALEC       9
1258 006F 014D 0013           BRANCH     HOPN2                                 < 1354>
1259 005F 0098 0014  NOS4     LDX        1
1260 003E 004E 0015           TCY        7
1261 007C 0033 0016           MNEZ
1262 0079 0139 0017           BRANCH     TENTEN                                < 1335>
1263 0073 0046 0018           TCY        6
1264 0067 0033 0019           MNEZ
1265 004F 0139 0020           BRANCH     TENTEN                                < 1335>
1266 001E 0091 0021  ANS&OPN1 LDX        8
1267 003D 004F 0022           TCY        15
1268 007A 0060 0023           TCMIY      0          LNK/EDIT PTR
1269 0075 0045 0024  ANS2     TCY        10
1270 006B 00A1 0025           SBIT       2          SET FLAG FOR LNK/EDIT
1271 0057 004D 0026           TCY        11
1272 002E 0066 0027           TCMIY      6          FLAG UPDATE
1273 005C 0040 0028  ZEROPN1  TCY        0
1274 0038 0098 0029           LDX        1
1275 0070 0029 0030  ZERO2    TMA
1276 0061 0078 0031           ACACC      1
1277 0043 0102 0032           BRANCH     ZERO1                                 < 1301>
1278 0006 0040 0033  NONZERO1 TCY        0
1279 000D 0029 0034           TMA
1280 001B 00E9 0035           ALEC       9
1281 0037 013C 0036           BRANCH     THOUSAND                              < 1307>
1282 006E 0098 0037  NO2      LDX        1
1283 005D 0048 0038           TCY        1
1284 003A 0033 0039           MNEZ
1285 0074 016D 0040           BRANCH     HOPN1                                 < 1314>
1286 0069 0098 0041  NO4      LDX        1
1287 0053 004C 0042           TCY        3
```

```
STMT  PC   CODE PLOC
1288 0026 0033 0043                  MNEZ
1289 004C 0113 0044                  BRANCH    TEN                               < 1332>
1290 0018 0044 0045                  TCY       2
1291 0031 0033 0046                  MNEZ
1292 0062 0113 0047                  BRANCH    TEN                               < 1332>
1293 0045 0085 0048   FINISH         BL        FINISH1                           < 1362>
     000A 0100 0049
1294 0015 0005 0050   ZERO4          IYC
1295 002B 005E 0051                  YNEC      7
1296 0056 013F 0052                  BRANCH    ZERO3                             < 1252>
1297 002C 0033 0053                  MNEZ
1298 0058 017D 0054                  BRANCH    NONZERO2                          < 1255>
1299 0030 008F 0055   ZERO           CALLL     CLEARROM                          < 2146>
     0060 01CD 0056
1300 0041 013B 0057                  BRANCH    BLNK/EDT                          < 1313>
1301 0002 0005 0058   ZERO1          IYC
1302 0005 005C 0059                  YNEC      3
1303 000B 0170 0060                  BRANCH    ZERO2                             < 1275>
1304 0017 0033 0061                  MNEZ
1305 002F 0106 0062                  BRANCH    NONZERO1                          < 1278>
1306 005E 0130 0063                  BRANCH    ZERO                              < 1299>
1307 003C 0091 0064   THOUSAND       LDX       8
1308 0078 004D 0065                  TCY       11
1309 0071 0068 0066                  TCMIY     1
1310 0063 0149 0067                  BRANCH    ONEDGT                            < 1321>
1311 0047 008F 0068   NO1            CALLL     CLEARROM                          < 2146>
     000E 01CD 0069
1312 001D 0067 0070                  TCMIY     14        THOUSAND
1313 003B 008D 0071   BLNK/EDT       BL        LNK/EDIT                          < 1490>
     0076 017F 0072
1314 006D 0029 0073   HOPN1          TMA
1315 005B 00E9 0074                  ALEC      9
1316 0036 0159 0075                  BRANCH    HUNDRED                           < 1318>
1317 006C 0169 0076                  BRANCH    NO4                               < 1286>
1318 0059 0091 0077   HUNDRED        LDX       8
1319 0032 004D 0078                  TCY       11
1320 0064 006C 0079                  TCMIY     3
1321 0049 008F 0080   ONEDGT         CALLL     CLEARROM                          < 2146>
     0012 01CD 0081
1322 0025 004D 0082                  TCY       11
1323 004A 0065 0083                  TCMIY     10
1324 0014 006C 0084                  TCMIY     3
1325 0029 0045 0085                  TCY       10
1326 0052 002F 0086                  TAM
1327 0024 0086 0087                  CALLL     ADDCARRY                          < 0963>
     0048 0194 0088
1328 0010 013B 0089                  BRANCH    BLNK/EDT                          < 1313>
1329 0021 008F 0090   NO3            CALLL     CLEARROM                          < 2146>
     0042 01CD 0091
1330 0004 0063 0092                  TCMIY     12        HUNDRED
1331 0009 013B 0093                  BRANCH    BLNK/EDT                          < 1313>
1332 0013 0098 0094   TEN            LDX       1
1333 0027 004C 0095                  TCY       3
1334 004E 008E 0096                  CALLL     TREGDAM                           < 1083>
     001C 0194 0097
1335 0039 0091 0098   TENTEN         LDX       8
1336 0072 0040 0099                  TCY       0
1337 0065 0060 0100                  TCMIY     0
1338 004B 0060 0101                  TCMIY     0
1339 0016 0029 0102                  TMA
1340 002D 00E9 0103                  ALEC      9
1341 005A 0168 0104                  BRANCH    TENTEN4                           < 1343>
1342 0034 0060 0105                  TCMIY     0
1343 0068 004D 0106   TENTEN4        TCY       11
1344 0051 0029 0107                  TMA
1345 0022 00EE 0108                  ALEC      7
1346 0044 0133 0109                  BRANCH    FIRST                             < 1352>
1347 0008 006D 0110                  TCMIY     11
1348 0011 0091 0111   TEN4           LDX       8
1349 0023 0047 0112                  TCY       14
1350 0046 006C 0113                  TCMIY     3         ADD 4 TIMES
1351 000C 0088 0114                  BL        SECOND                            < 0347>
```

```
STMT  PC   CODE PLOC
      0019 0163 0115
1352 0033 006A 0116  FIRST     TCMIY     5
1353 0066 0111 0117            BRANCH    TEN4                              < 1348>
1354 004D 0091 0118  HOPN2     LDX       8
1355 001A 004D 0119            TCY       11
1356 0035 0069 0120            TCMIY     9
1357 006A 0149 0121            BRANCH    ONEDOT                            < 1321>
1358 0055 008D 0122  LNKPTRB   BL        LNK/EDT1                          < 1491>
     002A 017D 0123
1359 ********************89 LEFT*******PAGE 09********************************
1360                           ORGPG     10
1361 ***********************************************************************
1362 0000 0098 0001  FINISH1   LDX       1
1363 0001 0049 0002            TCY       9
1364 0003 0022 0003            TBIT      1
1365 0007 0166 0004            BRANCH    INCRRT1                           < 1472>
1366 000F 0090 0005            LDX       0
1367 001F 008C 0006            CALLL     CLRDOWN3                          < 0618>
     003F 01CE 0007
1368 007F 0091 0008            LDX       8
1369 007E 0045 0009            TCY       10
1370 007D 0060 0010            TCMIY     0         TRY, UPDATE
1371 007B 0060 0011  BSPK1     TCMIY     0
1372 0077 008B 0012            BL        SPEAK                             < 1762>
     006F 0103 0013
1373 005F 0006 0014  INCRRT    CLA                 "THAT'S INCORRECT, THE CORREC
1374 003E 00CB 0015            ACNAA     13        IS", THEN SAY ANSWER
1375 007C 0167 0016            BRANCH    ONE-SPCH  006C                    < 1378>
1376 0079 0006 0017  WNGTRY    CLA
1377 0073 0077 0018            ACACC     14
1378 0067 0091 0019  ONE-SPCH  LDX       8
1379 004F 004D 0020            TCY       11
1380 001E 0064 0021            TCMIY     2         RETN&BCH A PHRASE THEN SPEEC
1381 003D 008A 0022            BL        TRY4      00BC, 00BE              < 0833>
     007A 0117 0023
1382 0075 0090 0024  COMPARE   LDX       0
1383 006B 0041 0025            TCY       8
1384 0057 0023 0026  FIND. DP  TBIT      3
1385 002E 0143 0027            BRANCH    SAVE. DP                          < 1390>
1386 005C 0004 0028            DYN
1387 0038 0157 0029            BRANCH    FIND. DP                          < 1384>
1388 0070 01C3 0030            CALL      SAVE. DP                          < 1390>
1389 0061 010B 0031            BRANCH    COMP. LSD                         < 1418>
1390 0043 002B 0032  SAVE. DP  TYA
1391 0006 0049 0033            TCY       9
1392 000D 002F 0034            TAM
1393 001B 00BF 0035            RETN
1394 0037 0041 0036            TCY       8
1395 006E 0098 0037            LDX       1
1396 005D 0003 0038  NEXTDIS   XMA
1397 003A 00E0 0039            ALEC      0
1398 0074 0162 0040            BRANCH    SEEIF. YO                         < 1405>
1399 0069 0078 0041            ACACC     1
1400 0053 012C 0042            BRANCH    MAKEBLK                           < 1411>
1401 0026 007F 0043  ZIPTO15   ACACC     15
1402 004C 0003 0044            XMA
1403 0018 00BF 0045            RETN
1404 0031 010B 0046            BRANCH    COMP. LSD                         < 1418>
1405 0062 0032 0047  SEEIF. YO IMAC
1406 0045 0160 0048            BRANCH    ERS. DP                           < 1414>
1407 000A 0006 0049            CLA
1408 0015 012C 0050            BRANCH    MAKEBLK                           < 1411>
1409 002B 0004 0051  NEXTDS    DYN
1410 0056 015D 0052            BRANCH    NEXTDIS                           < 1396>
1411 002C 01A6 0053  MAKEBLK   CALL      ZIPTO15                           < 1401>
1412 0058 0002 0054            YNEA
1413 0030 012B 0055            BRANCH    NEXTDS                            < 1409>
1414 0060 0090 0056  ERS. DP   LDX       0
1415 0041 00A7 0057            RBIT      3
1416 0002 0049 0058            TCY       9
1417 0005 006F 0059            TCMIY     15
```

```
STMT  PC   CODE PLOC
1418 000B 0098 0060  COMP.LSD LDX      1
1419 0017 0041 0061           TCY      8
1420 002F 0029 0062  COMPLSD1 TMA
1421 005E 0000 0063           COMX
1422 003C 0009 0064           MNEA
1423 0078 0132 0065           BRANCH   MISS                                  < 1436>
1424 0071 0000 0066           COMX
1425 0063 0004 0067           DYN
1426 0047 012F 0068           BRANCH   COMPLSD1                              < 1420>
1427 000E 009E 0069           LDX      7
1428 001D 0041 0070           TCY      8
1429 003B 0023 0071  CKFRACC  TBIT     3
1430 0076 0136 0072           BRANCH   SEEWHERE                              < 1433>
1431 006D 0004 0073           DYN
1432 005B 013B 0074           BRANCH   CKFRACC                               < 1429>
1433 0036 002B 0075  SEEWHERE TYA
1434 006C 0090 0076           LDX      0
1435 0059 0049 0077           TCY      9
1436 0032 008A 0078  MISS     LDP      5
1437 0064 0009 0079           MNEA
1438 0049 0129 0080           BRANCH   WRONG                                 < 0852>
1439 0012 0130 0081           BRANCH   RIGHT                                 < 0827>
1440 0025 0091 0082  ENDLINK1 LDX      8
1441 004A 0042 0083           TCY      4
1442 0014 0087 0084           LDP      14
1443 0029 0020 0085           TBIT     0
1444 0052 014B 0086           BRANCH   NS-TRY3                               < 1995>
1445 0024 0085 0087           LDP      10
1446 0048 0029 0088           TMA
1447 0010 0091 0089           LDX      8
1448 0021 004E 0090           TCY      7
1449 0042 0033 0091           MNEZ              5 TRIES, TIME FOR SCORE
1450 0004 0168 0092           BRANCH   LNKMODE                               < 1463>
1451 0009 0091 0093  SCORE1   LDX      8
1452 0013 0045 0094           TCY      10
1453 0027 00A1 0095           SBIT     2        UPDATE
1454 004E 00BF 0096           RETN
1455 001C 004F 0097           TCY      15
1456 0039 0068 0098           TCMIY    1        LNK/EDIT PTR FOR #RIGHT
1457 0072 004D 0099           TCY      11
1458 0065 006B 0100           TCMIY    13       RETN&BCH FLAG
1459 004B 0044 0101           TCY      2
1460 0016 0098 0102           LDX      1
1461 002D 0029 0103           TMA               #RIGHT IN ACC
1462 005A 0089 0104           BL       ONEDGT                                < 1321>
     0034 0149 0105
1463 0068 00E0 0106  LNKMODE  ALEC     0
1464 0051 010C 0107           BRANCH   NUMSPCH                               < 1470>
1465 0022 0096 0108           LDX      6
1466 0044 0047 0109           TCY      14
1467 0008 0033 0110           MNEZ
1468 0011 015F 0111           BRANCH   INCRRT                                < 1373>
1469 0023 008D 0112           BL       ANS&ADDR                              < 1567>
     0046 0104 0113
1470 000C 0189 0114  NUMSPCH  CALL     SCORE1                                < 1451>
1471 0019 0089 0115           BL       NUMSPCH1                              < 1246>
     0033 0100 0116
1472 0066 0006 0117  INCRRT1  CLA
1473 004D 0091 0118           LDX      8
1474 001A 004F 0119           TCY      15
1475 0035 002A 0120           TMY
1476 006A 009A 0121           LDX      5
1477 0055 002F 0122           TAM
1478 002A 0094 0123           LDX      2
1479 0054 002F 0124           TAM
1480 0028 0092 0125           LDX      4
1481 0050 008E 0126           BL       INCRRT2                               < 1120>
     0020 0154 0127
1482 *************************************************************************
```

```
STMT  PC   CODE PLOC
1483                                ORGPG      11
1484  ***********************************************************************
1485 0000 008F 0001  LNK/EDTA CALLL      MEMADDR                        < 2092>
     0001 01DE 0002
1486 0003 0083 0003           CALLL      LOADRESS                       < 1603>
     0007 0180 0004
1487 000F 0091 0005  LNK/EDTC LDX        8
1488 001F 004F 0006           TCY        15
1489 003F 0060 0007           TCMIY      0
1490 007F 008F 0008  LNK/EDIT CALLL      MEMADDR                        < 2092>
     007E 01DE 0009
1491 007D 0083 0010  LNK/EDT1 CALLL      OUTADDR                        < 1614>
     007B 01FF 0011
1492 0077 009C 0012  LNKPTR   LDX        3
1493 006F 00B2 0013  LNKPTR2  COMX8
1494 005F 004F 0014           TCY        15
1495 003E 002A 0015           TMY
1496 007C 00B2 0016           COMX8
1497 0079 002E 0017           TAMZA
1498 0073 00BF 0018           RETN
1499 0067 0083 0019           CALLL      OUTADDR                        < 1614>
     004F 01FF 0020
1500 001E 0094 0021           LDX        2
1501 003D 01EF 0022           CALL       LNKPTR2                        < 1493>
1502 007A 0083 0023           CALLL      OUTADDR                        < 1614>
     0075 01FF 0024
1503 006B 009A 0025           LDX        5
1504 0057 01EF 0026           CALL       LNKPTR2                        < 1493>
1505 002E 0083 0027           CALLL      OUTADDR                        < 1614>
     005C 01FF 0028
1506 0038 0092 0029           LDX        4
1507 0070 01EF 0030           CALL       LNKPTR2                        < 1493>
1508 0061 0015 0031           AMAAC
1509 0043 0169 0032           BRANCH     LNK1                           < 1518>
1510 0006 0094 0033           LDX        2
1511 000D 0015 0034           AMAAC
1512 001B 0169 0035           BRANCH     LNK1                           < 1518>
1513 0037 009A 0036           LDX        5
1514 006E 0015 0037           AMAAC
1515 005D 0169 0038           BRANCH     LNK1                           < 1518>
1516 003A 00E0 0039           ALEC       0
1517 0074 0115 0040           BRANCH     LNK2                           < 1527>
1518 0069 0091 0041  LNK1     LDX        8
1519 0053 004F 0042           TCY        15
1520 0026 0032 0043           IMAC
1521 004C 0158 0044           BRANCH     ENDLINK                        < 1531>
1522 0018 002F 0045           TAM
1523 0031 0045 0046           TCY        10
1524 0062 0021 0047           TBIT       2
1525 0045 0160 0048           BRANCH     UPDATE                         < 1532>
1526 000A 017D 0049           BRANCH     LNK/EDT1                       < 1491>
1527 0015 009C 0050  LNK2     LDX        3
1528 002B 002A 0051           TMY
1529 0056 0058 0052           YNEC       1
1530 002C 0169 0053           BRANCH     LNK1                           < 1518>
1531 0058 0085 0054  ENDLINK  BL         ENDLINK1                       < 1440>
     0030 0125 0055
1532 0060 0042 0056  UPDATE   TCY        4
1533 0041 0083 0057           LDP        12
1534 0002 0020 0058           TBIT       0          NUM--STUM
1535 0005 010C 0059           BRANCH     ADDLNK2                        < 1726>
1536 000B 004D 0060  UPDATE2  TCY        11
1537 0017 0032 0061           IMAC
1538 002F 0003 0062           XMA
1539 005E 0089 0063           LDP        9
1540 003C 00E8 0064           ALEC       1
1541 0078 0147 0065           BRANCH     NO1                            < 1311>
1542 0071 00E4 0066           ALEC       2
1543 0063 016E 0067           BRANCH     NO2                            < 1282>
1544 0047 00EC 0068           ALEC       3
1545 000E 0121 0069           BRANCH     NO3                            < 1329>
```

```
STMT  PC   CODE FLOC
1546 001D 00E2 0070              ALEC        4                                                 < 1286>
1547 003B 0169 0071              BRANCH      NO4
1548 0076 00EA 0072              ALEC        5                                                 < 1358>
1549 006D 0155 0073              BRANCH      LNKPTRB
1550 005B 00E6 0074              ALEC        6                                                 < 1293>
1551 0036 0145 0075              BRANCH      FINISH
1552 006C 00E9 0076              ALEC        9                                                 < 1329>
1553 0059 0121 0077              BRANCH      NO3
1554 0032 00E5 0078              ALEC        10                                                < 1259>
1555 0064 015F 0079              BRANCH      NOS4
1556 0049 00ED 0080              ALEC        11                                                < 1358>
1557 0012 0155 0081              BRANCH      LNKPTRB
1558 0025 00E3 0082              ALEC        12                                                < 1266>
1559 004A 011E 0083              BRANCH      ANS&OPN1
1560 0014 0084 0084              LDP         2
1561 0029 00EB 0085              ALEC        13                                                < 0518>
1562 0052 016A 0086              BRANCH      SCORE2
1563 0024 0060 0087              TCMIY       0
1564 0048 0045 0088              TCY         10
1565 0010 00A5 0089              RBIT        2          UPDATE FLAG
1566 0021 008B 0090  BSPK        BL          SPEAK      SAY SCORE                              < 1762>
     0042 0103 0091
1567 0004 0096 0092  ANS&ADDR    LDX         6
1568 0009 0047 0093              TCY         14
1569 0013 00BF 0094              RETN                   USING 6,14 AS SAVE
1570 0027 0029 0095              TMA
1571 004E 00E7 0096              ALEC        14
1572 001C 0172 0097              BRANCH      H-->>      LOADING PROBLEM        < 1574>
1573 0039 0121 0098              BRANCH      BSPK       LOADED  ANSWER  SPEE< 1566>
1574 0072 0060 0099  H-->>       TCMIY       0          Y POINTER
1575 0065 0060 0100              TCMIY       0          SPELLING=0,ANSWER=15
1576 004B 0083 0101  ANS         CALLL       OUTADDR    GET ANS DISP DATA      < 1614>
     0016 01FF 0102
1577 002D 0184 0103              CALL        ANS&ADDR                          < 1567>
1578 005A 002A 0104              TMY
1579 0034 002F 0105              TAM
1580 0068 004F 0106              TCY         15
1581 0051 0023 0107              TBIT        3
1582 0022 0166 0108              BRANCH      IANSPTR                           < 1590>
1583 0044 0083 0109              CALLL       OUTADDR                           < 1614>
     0008 01FF 0110
1584 0011 0184 0111              CALL        ANS&ADDR                          < 1567>
1585 0023 002A 0112              TMY
1586 0046 009E 0113              LDX         7
1587 000C 002F 0114              TAM
1588 0019 0021 0115              TBIT        2
1589 0033 0128 0116              BRANCH      ADDR       GOT SPELLING, GET AD< 1597>
1590 0066 0096 0117  IANSPTR     LDX         6          TO SPEECH LINKS
1591 004D 0047 0118              TCY         14
1592 001A 0032 0119              IMAC
1593 0035 002F 0120              TAM
1594 006A 00EB 0121              ALEC        13
1595 0055 014B 0122              BRANCH      ANS                               < 1576>
1596 002A 0082 0123              BL          TRANDSP1                          < 0763>
     0054 0135 0124
1597 0028 0184 0125  ADDR        CALL        ANS&ADDR                          < 1567>
1598 0050 0065 0126              TCMIY       10
1599 0020 006F 0127              TCMIY       15
1600 0040 014B 0128              BRANCH      ANS                               < 1576>
1601 ************************************PAGE 11**********************************
1602                             ORGPG       12
1603 0000 009E 0001  LOADRESS    LDX         7          GET 16 BITS OF DATA
1604 0001 0047 0002              TCY         14
1605 0003 0061 0003              TCMIY       8          COUNTER FOR LOOP
1606 0007 0006 0004              CLA
1607 000F 007C 0005              ACACC       3          BIT 3 SET
1608 001F 002E 0006  LOADR1      TAMZA
1609 003F 0098 0007              LDX         1
1610 *
1611 *    OUTADDR:
1612 *    LOADS 4 BITS INTO K-LINES USING PDC AND OUTPUT 4 BITS
```

```
STMT  PC   CODE PLOC
1613 *
1614 007F 0043 0008  OUTADDR  TCY      12         CHIP SELECT
1615 007E 000D 0009            SETR
1616 007D 004D 0010            TCY      11         L/R = 0
1617 007B 000D 0011            SETR
1618 0077 0045 0012            TCY      10
1619 006F 0006 0013            CLA                 ACC=OUTPUT 4 BITS COMMAND
1620 005F 0071 0014            ACACC    8          READ    ACC=8
1621 003E 000D 0015            SETR
1622 007C 0036 0016            RSTR
1623 0079 000D 0017            SETR
1624 0073 0036 0018            RSTR
1625 0067 000D 0019            SETR
1626 004F 0036 0020            RSTR
1627 001E 000D 0021            SETR
1628 003D 0036 0022            RSTR
1629 007A 0045 0023            TCY      10         ***DUMMY INST FOR RSTR***
1630 0075 0045 0024            TCY      10
1631 006B 0073 0025            ACACC    12         OUTPUT   ACC=4
1632 0057 000D 0026            SETR                1ST PDC LOADS COMMAND
1633 002E 0036 0027            RSTR
1634 005C 004D 0028            TCY      11
1635 0038 0036 0029            RSTR
1636 0070 0045 0030            TCY      10
1637 0061 000D 0031            SETR                2ND PDC APPLIES SR TO K-LINE
1638 0043 0036 0032            RSTR
1639 0006 0045 0033            TCY      10         ***DUMMY INST FOR RSTR***
1640 000D 009E 0034            LDX      7
1641 001B 0008 0035            TKA                 LOAD INTO ACC
1642 0037 000D 0036            SETR                3RD PDC DISCONNECTS SR
1643 006E 0036 0037            RSTR
1644 005D 004D 0038            TCY      11
1645 003A 000D 0039            SETR
1646 0074 0047 0040            TCY      14
1647 0069 0023 0041            TBIT     3
1648 0053 014C 0042            BRANCH   LSHIFT-1                    < 1654>
1649 0026 00BF 0043            RETN
1650 *
1651 *  END OF OUTADDR2 SUBROUTINE
1652 *
1653 *
1654 004C 0098 0044  LSHIFT-1  LDX      1
1655 0018 004B 0045            TCY      13
1656 0031 0003 0046  LSHIFT    XMA                 SHIFT ROUTINE
1657 0062 0004 0047            DYN
1658 0045 0059 0048            YNEC     9
1659 000A 0131 0049            BRANCH   LSHIFT                      < 1656>
1660 0015 009E 0050            LDX      7
1661 002B 004F 0051            TCY      15         TEST LOOP COUNT
1662 0056 0007 0052            DMAN
1663 002C 011F 0053            BRANCH   LOADR1                      < 1608>
1664 0058 0047 0054            TCY      14
1665 0030 00A7 0055            RBIT     3
1666 0060 00BF 0056            RETN
1667 0041 0040 0057  DISPINC   TCY      0          CHECK FOR BLANKS IN DISPLAY
1668 0002 002A 0058            TMY
1669 0005 005F 0059            YNEC     15
1670 000B 011D 0060            BRANCH   DISPINC2                    < 1679>
1671 0017 0112 0061            BRANCH   PART1                       < 1690>
1672 002F 004F 0062  PREGO     TCY      15         RESET DISPINC-BIT FLAG
1673 005E 0098 0063            LDX      1
1674 003C 00A5 0064            RBIT     2          RESET TWO-SCAN DISP FLG
1675 0078 0091 0065            LDX      8
1676 0071 004D 0066            TCY      11         RETN$BCH
1677 0063 006E 0067            TCMIY    7
1678 0047 0086 0068            BL       G04        BRANCH TO WRITE-IT G< 0889>
     000E 0100 0069
1679 001D 0033 0070  DISPINC2  MNEZ
1680 003B 015B 0071            BRANCH   PART2                       < 1683>
1681 0076 00CD 0072            ACNAA    11         ACC=2 FROM DISP/KB
1682 006D 0125 0073            BRANCH   NXTDSP                      < 1691>
```

```
STMT  PC   CODE PLOC
1683 005B 0090 0074  PART2    LDX      0         CHECK FOR PLA CARRY
1684 0036 0033 0075           MNEZ
1685 006C 012F 0076           BRANCH   PREGO     AFTER '1F', PROCESS < 1672>
1686 0059 0040 0077           TCY      0
1687 0032 0068 0078  PART3    TCMIY    1
1688 0064 0059 0079           YNEC     9
1689 0049 0132 0080           BRANCH   PART3                        < 1687>
1690 0012 0006 0081  PART1    CLA
1691 0025 0098 0082  NXTDSP   LDX      1
1692 004A 0040 0083           TCY      0
1693 0014 002D 0084  DSPLETR  TAMIYC
1694 0029 0078 0085           ACACC    1
1695 0052 0051 0086           YNEC     8
1696 0024 0114 0087           BRANCH   DSPLETR                      < 1693>
1697 0048 004F 0088  SETDSP   TCY      15
1698 0010 00A1 0089           SBIT     2
1699 0021 0080 0090  BDK1     BL       DISP/KB                      < 0161>
     0042 0100 0091
1700 0004 0088 0092  NS-TRY4  LDP      1
1701 0009 0050 0093           YNEC     0
1702 0013 0104 0094           BRANCH   NUM-TRY   "# TRIES, THE NUMBER< 0370>
1703 0027 0098 0095           LDX      1
1704 004E 0046 0096           TCY      6         GET NUMBER IN WRONG POSITION
1705 001C 0029 0097           TMA                TO SPEAK
1706 0039 0091 0098           LDX      8
1707 0072 0047 0099           TCY      14
1708 0065 0068 0100           TCMIY    1         CODE FOR NUMBER LINK
1709 004B 0068 0101           TCMIY    1         LINK/EDIT POINTER
1710 0016 0122 0102           BRANCH   BADDLNK                      < 0385>
1711 002D 0098 0103  NS-TRY5  LDX      1         GET # IN CORRECT POSITION
1712 005A 0041 0104           TCY      8         TO SPEAK
1713 0034 0029 0105           TMA
1714 0068 0091 0106           LDX      8
1715 0051 0047 0107           TCY      14
1716 0022 006A 0108           TCMIY    5         CODE FOR NUMBER LINK
1717 0044 006C 0109           TCMIY    3         LINK/EDIT POINTER
1718 *                  ADDLINK--ASSUMES
1719 *                            1)  NUMBER TO BE SPOKEN IS IN
1720 *                                ACC
1721 *                            2)  LINK/EDIT POINTER IS LOADED
1722 *                                WITH CORRECT POINTER
1723 0008 0045 0110  ADDLINK  TCY      10
1724 0011 00A1 0111           SBIT     2         LNK/EDT BIT FOR UPDATE
1725 0023 0089 0112           BL       ONEDGT    LOAD SPEECH ADDR FOR< 1321>
     0046 0149 0113
1726 000C 0047 0114  ADDLNK2  TCY      14
1727 0019 0029 0115           TMA
1728 0033 00E8 0116           ALEC     1
1729 0066 012D 0117           BRANCH   NS-TRY5                      < 1711>
1730 004D 0088 0118           LDP      1
1731 001A 00E4 0119           ALEC     2
1732 0035 0108 0120           BRANCH   NUM-TRY2                     < 0386>
1733 006A 00EC 0121           ALEC     3
1734 0055 0123 0122           BRANCH   GET#                         < 0388>
1735 002A 008B 0123  RSTALNK  LDP      13
1736 0054 0045 0124           TCY      10
1737 0028 00A5 0125           RBIT     2         LNK/EDIT BIT FOR UPDATE
1738 0050 0020 0126           TBIT     0         MAX TRY FLAG
1739 0020 0100 0127           BRANCH   NS-MAX2                      < 1760>
1740 0040 0103 0128           BRANCH   SPEAK                        < 1762>
1741 ********************************************************************
1742                          ORGPG    13
1743 ******************************************************************
1744 * SPEAK                                                      *
1745 * ROUTINE TO CONTROL SPEECH TO AND FROM SYNTHESIZER              *
1746 *                                                            *
1747 * IF SS--SET, SPEAK WAS CALLED                                   *
1748 * IF SS--RESET, MEMADDR WAS CALLED                               *
1749 *                                                            *
1750 * IF SS=1, ADDRESSES ARE TRANSFERED FROM FILES 2,5,3,AND 4 TO FILE 1 *
1751 * WORDS 10-13, ELSE IF SS=0, ADDRESS IS IN FILE 1 PRIOR TO CALL      *
```

```
STMT  PC   CODE PLOC
1752 *                                                                         *
1753 * 2 POINTERS USED                                                         *
1754 *     1) LINK/EDIT POINTER FOR WORDS IN FILES 6 AND 7                     *
1755 *        X=1, Y=15                                                        *
1756 *     2) ROM ADDR POINTER FOR WORDS IN FILE 1.                            *
1757 *        X=1, Y=14                                                        *
1758 *                                                                         *
1759 ***************************************************************************
1760 0000 0060 0001  NS-MAX2  TCMIY    0         CLR FLAGS
1761 0001 0069 0002           TCMIY    9         RETN$BCH FOR MAX TRIES IN NU
1762 0003 00B5 0003  SPEAK    SEAC
1763 0007 0098 0004  SPEAK+1  LDX      1
1764 000F 0047 0005           TCY      14
1765 001F 0065 0006           TCMIY    10        INITIALIZE ROM ADDRESS POINT
1766 003F 0091 0007           LDX      8
1767 007F 0060 0008           TCMIY    0         INITIALIZE LINK/EDIT POINTER
1768 007E 004F 0009  SPKLOP-1 TCY      15
1769 007D 002A 0010  SPKLOOP  TMY                PUT LINK/EDIT POINTER IN Y
1770 007B 009C 0011           LDX      3         GET WORD FROM LNK/EDT
1771 0077 0029 0012  SPKLOOP2 TMA                LOAD WORD IN ACC
1772 006F 0098 0013           LDX      1
1773 005F 0047 0014           TCY      14
1774 003E 002A 0015           TMY                PUT ROM ADDRESS POINTER IN Y
1775 007C 002F 0016           TAM                STORE WORD
1776 0079 0047 0017           TCY      14        BUMP POINTER
1777 0073 0032 0018           IMAC
1778 0067 002D 0019           TAMIYC
1779 004F 0091 0020           LDX      8         GET FILE FOR NEXT WORD
1780 001E 002A 0021           TMY
1781 003D 00BF 0022           RETN
1782 007A 0094 0023           LDX      2
1783 0075 01F7 0024           CALL     SPKLOOP2                  < 1771>
1784 006B 009A 0025           LDX      5
1785 0057 01F7 0026           CALL     SPKLOOP2                  < 1771>
1786 002E 0092 0027           LDX      4
1787 005C 01F7 0028           CALL     SPKLOOP2                  < 1771>
1788 0038 004F 0029           TCY      15        BUMP LINK/EDIT POINTER
1789 0070 0032 0030           IMAC               IF > 15, RETURN
1790 0061 0114 0031           BRANCH   RETURN                    < 1851>
1791 0043 002E 0032           TAMZA
1792 0006 0098 0033           LDX      1
1793 000D 0045 0034           TCY      10
1794 001B 0015 0035  ADDROM   AMAAC              ADD FIRST THREE ROM ADDRESSE
1795 0037 014C 0036           BRANCH   SAY1PHRS                  < 1803>
1796 006E 0005 0037           IYC                LOOP COUNT
1797 005D 0057 0038           YNEC     14
1798 003A 011B 0039           BRANCH   ADDROM                    < 1794>
1799 0074 00E0 0040           ALEC     0         ALL=0?
1800 0069 0164 0041           BRANCH   SPKLOP-2                  < 1846>
1801 0053 00E8 0042           ALEC     1         END OF LINK?
1802 0026 0114 0043           BRANCH   RETURN                    < 1851>
1803 004C 008F 0044  SAY1PHRS CALLL    MEMADDR                   < 2092>
     0018 01DE 0045
1804 *                                                                 *
1805 *         ROM ADDRESSING SUBROUTINE:                                   *
1806 *         ASSUMES X AND Y HAVE BEEN DEFINED PRIOR TO CALLING           *
1807 *                                                                 *
1808 *                                                                 *
1809 *         LOADS ADDRESS INTO ROM ADDRESS AREA                          *
1810 *         ALL R LINES, ETC,... REMAIN THE SAME AS WHEN                 *
1811 *         ENTERING SUBROUTINE.                                    *
1812 *                                                                 *
1813 0031 0043 0046  MEMADDR2 TCY      12        CS , GIVING SYN. COMMANDS
1814 0062 000D 0047           SETR               R12 = 1
1815 0045 0006 0048           CLA
1816 000A 0075 0049  SPKREG   ACACC    10
1817 0015 0045 0050           TCY      10
1818 002B 000D 0051           SETR               SPEAK
1819 0056 0036 0052           RSTR
1820 002C 0043 0053  SPKREG+1 TCY      12
1821 0058 000D 0054           SETR
```

```
STMT  PC   CODE PLOC
1822 0030 0045 0055                TCY      10
1823 0060 0006 0056                CLA
1824 0041 0077 0057                ACACC    14         TEST TALK
1825 0002 000D 0058                SETR                1ST PDC LOADS COMMAND
1826 0005 0036 0059                RSTR
1827 000B 004D 0060                TCY      11
1828 0017 0036 0061                RSTR
1829 002F 0045 0062                TCY      10
1830 005E 000D 0063                SETR                2ND PDC APPLIES TALK TO CTL8
1831 003C 0036 0064                RSTR
1832 0078 0045 0065                TCY      10
1833 0071 009E 0066                LDX      7
1834 0063 0008 0067                TKA
1835 0047 000D 0068                SETR                3RD PDC RELEASES OUTPUT
1836 000E 0036 0069                RSTR
1837 001D 004D 0070                TCY      11
1838 003B 000D 0071                SETR
1839 0076 0049 0072                TCY      9          TEST TALK
1840 006D 002F 0073                TAM
1841 005B 0020 0074                TBIT     0
1842 0036 0166 0075                BRANCH   BITSET3                         < 1891>
1843 006C 0012 0076                CCLA                IF SS=0, ACC=0; IF SS=1, ACC=1
1844 0059 00E0 0077                ALEC     0
1845 0032 0114 0078                BRANCH   RETURN                          < 1851>
1846 0064 0098 0079   SPKLOP-2     LDX      1
1847 0049 0047 0080                TCY      14
1848 0012 0065 0081                TCMIY    10
1849 0025 0091 0082                LDX      8
1850 004A 017E 0083                BRANCH   SPKLOP-1                        < 1768>
1851 0014 0098 0084   RETURN       LDX      1
1852 0029 0047 0085                TCY      14
1853 0052 0065 0086                TCMIY    10         ROM ADDRESS POINTER = 10
1854 0024 0006 0087                CLA
1855 0048 00B4 0088                REAC                RESET SPECIAL STATUS
1856 *
1857 *          END OF SPEECH CONTROL SUBROUTINE
1858 *
1859 0010 0091 0089   RETN$BCH     LDX      8
1860 0021 004D 0090                TCY      11         PUT RETN$BCH FLAG IN ACC
1861 0042 0029 0091                TMA
1862 0004 00E0 0092                ALEC     0
1863 0009 0166 0093                BRANCH   BITSET3    GO TO DISP/KB        < 1891>
1864 0013 008F 0094                LDP      15
1865 0027 00E8 0095                ALEC     1
1866 004E 0168 0096                BRANCH   LOADLVL    SAY LEVEL            < 2135>
1867 001C 008B 0097                LDP      13
1868 0039 00E4 0098                ALEC     2          OUT TILL NEEDED
1869 0072 010C 0099                BRANCH   RETNBCH2   SAY PROBLEM AGAIN    < 1888>
1870 0065 0084 0100                LDP      2
1871 004B 00EC 0101                ALEC     3          THE CORRECT ANSWER IS; NUMBER
1872 0016 0147 0102                BRANCH   ANSWER                          < 0716>
1873 *              SEAC                 OUT TILL NEEDED
1874 *              ALEC      4          OUT TILL NEEDED
1875 *              BRANCH    SPKLOP-1   OUT TILL NEEDED
1876 *              REAC                 OUT TILL NEEDED
1877 002D 008E 0103                LDP      7
1878 005A 00EA 0104                ALEC     5
1879 0034 0175 0105                BRANCH   GO2                             < 1027>
1880 0068 0086 0106                LDP      6
1881 0051 00EE 0107                ALEC     7
1882 0022 0100 0108                BRANCH   GO4                             < 0889>
1883 0044 008F 0109                LDP      15
1884 0008 00E1 0110                ALEC     8
1885 0011 014D 0111                BRANCH   CLEARROM   YOUR SCORE IS...     < 2146>
1886 0023 0087 0112                LDP      14
1887 0046 0119 0113                BRANCH   NS-MAX#                         < 2009>
1888 000C 0077 0114   RETNBCH2     ACACC    14         ACC=0
1889 0019 002F 0115                TAM
1890 0033 0103 0116                BRANCH   SPEAK                           < 1762>
1891 0066 0080 0117   BITSET3      BL       DISP/KB                         < 0161>
     004D 0100 0118
```

```
STMT  PC   CODE PLOC
1892 001A 0040 0119  CLRANS   TCY      0
1893 0035 0096 0120  0000H    LDX      6
1894 006A 006F 0121           TCMIY    15
1895 0055 0004 0122           DYN
1896 002A 009E 0123           LDX      7
1897 0054 0060 0124           TCMIY    0
1898 0028 0059 0125           YNEC     9
1899 0050 0135 0126           BRANCH   0000H                                   < 1893>
1900 0020 008D 0127           BL       LNK/EDTA ------------------------------ <-1485>
     0040 0100 0128
1901 ***************          ------*****PAGE 13*********************************
1902                          ORGPG    14
1903 **** RESERVED FOR SELF-TEST ****
1904 0000 0003 0001  TESTJAM1 TKA
1905 0001 0028 0002           TAY                CHECK FOR K-LINES
1906 0003 005B 0003           YNEC     13        1, 4, AND 8 ONLY
1907 0007 0174 0004           BRANCH   TESTJAM                              < 1941>
1908 000F 0091 0005           LDX      8         CHECK FOR R-LINE 5
1909 001F 0047 0006           TCY      14        +, X, / KEYS
1910 003F 002A 0007           TMY
1911 007F 005A 0008           YNEC     5         ELSE,
1912 007E 0174 0009           BRANCH   TESTJAM                              < 1941>
1913 007D 0098 0010           LDX      1         SET TESTMODE FLAG
1914 007B 004F 0011           TCY      15
1915 0077 0022 0012           TBIT     1
1916 006F 0174 0013           BRANCH   TESTJAM                              < 1941>
1917 005F 00A2 0014           SBIT     1
1918 003E 0040 0015  BLNKDISP TCY      0         FROM DISPLAY INTO
1919 007C 0029 0016           TMA                RANDOM REG CONTENTS
1920 0079 009E 0017           LDX      7         FOR FUTURE 'SEED' VALUE.
1921 0073 0049 0018           TCY      9         RESET TESTTALK BIT
1922 0067 0060 0019           TCMIY    0
1923 004F 0090 0020           LDX      0
1924 001E 002F 0021           TAM
1925 003D 0098 0022           LDX      1
1926 007A 0048 0023           TCY      1
1927 0075 0029 0024           TMA                LOAD SECOND DIGIT INTO
1928 006B 0090 0025           LDX      0         RANDOM SEED LOC.
1929 0057 004D 0026           TCY      11
1930 002E 002E 0027           TAMZA
1931 005C 0098 0028           LDX      1
1932 0038 0049 0029           TCY      9
1933 0070 00A4 0030           RBIT     0         RESET PREV 'GO FLAG
1934 0061 008F 0031           CALLL    CLEAR     TURN ALL SEGMENTS ON< 2076>
     0043 0195 0032
1935 0006 0090 0033           LDX      0
1936 000D 0041 0034           TCY      8
1937 001B 0078 0035           ACACC    1         PUTS 1 IN ACC
1938 0037 002C 0036  ALLSEG   TAMDYN
1939 006E 0137 0037           BRANCH   ALLSEG                               < 1938>
1940 005D 0080 0038  ALLSEG1  BL       DISP/KB                              < 0161>
     003A 0100 0039
1941 0074 0098 0040  TESTJAM  LDX      1         PTR FOR JAMCODE
1942 0069 004F 0041           TCY      15
1943 0053 0080 0042           LDP      0
1944 0026 0023 0043           TBIT     3         JAMCODE BIT TO BYPASS DEBOUN
1945 004C 011C 0044           BRANCH   KEYDON1                              < 0257>
1946 0018 0090 0045           LDX      0
1947 0031 0029 0046           TMA
1948 0062 0047 0047           TCY      14
1949 0045 0023 0048           TBIT     3         TEST DEBOUNCE COUNTER
1950 000A 0113 0049           BRANCH   KDWN      ACCEPT KEY IF COUNTE< 0254>
1951 0015 0060 0050           TCMIY    0         RESET DEBOUNCE COUNTER
1952 002B 0161 0051           BRANCH   DISP/KB1                             < 0192>
1953 0056 008F 0052  SUM350   CALLL    CLEARROM  ZERO FOR CHECKSUM      < 2146>
     002C 01CD 0053
1954 0058 0096 0054           LDX      6
1955 0030 008C 0055           CALLL    TRECOM    LOAD ZEROS IN REG 6-< 0576>
     0060 01AB 0056
```

```
STMT  PC   CODE PLOC
1956 0041 008F 0057               CALLL    MEMADDR    LOAD ADDR 0000        < 2092>
     0002 01DE 0058
1957 0005 0083 0059 MAINLOOP CALLL    OUTADDR    OUTPUT 4-BITS AT A T< 1614>
     000B 01FF 0060
1958 0017 0096 0061               LDX      6
1959 002F 0045 0062               TCY      10
1960 005E 0086 0063               CALLL    ADDCARRY   ADD DGT TO REG-6      < 0963>
     003C 0194 0064
1961 0078 0047 0065               TCY      14
1962 0071 0060 0066               TCMIY    0          TRUNCATE MSD'S
1963 0063 0098 0067               LDX      1
1964 0047 0045 0068               TCY      10
1965 000E 0086 0069               CALLL    CARRYON    INC REG-1/COUNTER     < 0968>
     001D 0190 0070
1966 003B 0057 0071               YNEC     14         TEST IF CHKSUM COMPLETE
1967 0076 0105 0072               BRANCH   MAINLOOP                         < 1957>
1968 006D 008F 0073               CALLL    CLEAR      CLR DISP TO LOAD RES< 2076>
     005B 0195 0074
1969 0036 004B 0075               TCY      13
1970 006C 0132 0076               BRANCH   QUIT                             < 1972>
1971 0059 00F9 0077 FINLDISP YMCY     9          PUT REG-6(10-13)-->REG-1(0-3
1972 0032 0096 0078 QUIT     LDX      6
1973 0064 0029 0079               TMA
1974 0049 0098 0080               LDX      1
1975 0012 00FA 0081               YMCY     5
1976 0025 002C 0082               TAMDYN
1977 004A 0159 0083               BRANCH   FINLDISP                         < 1971>
1978 0014 00A6 0084               RBIT     1          RESET SELF-TEST FLAG
1979 0029 015D 0085               BRANCH   ALLSEG1                          < 1940>
1980 0052 0049 0086 NS2      TCY      9          MAX TRIES?
1981 0024 0009 0087               MNEA
1982 0048 0142 0088               BRANCH   NS-TRY                           < 1985>
1983 0010 0045 0089 NS-WRG1  TCY      10
1984 0021 00A0 0090               SBIT     0          TEST FOR MAX TRIES
1985 0042 0090 0091 NS-TRY   LDX      0
1986 0004 0049 0092               TCY      9
1987 0009 0060 0093               TCMIY    0
1988 0013 012A 0094               BRANCH   NS-TRY2                          < 2016>
1989 0027 0020 0095 NS-L2-3  TBIT     0          LEVEL 2?
1990 004E 0172 0096               BRANCH   NS-L2                            < 1993>
1991 001C 00C1 0097               ACNAA    8          ACC=15 FOR LVL 3
1992 0039 0152 0098               BRANCH   NS2                              < 1980>
1993 0072 00CA 0099 NS-L2    ACNAA    5          ACC=12 FOR LVL2
1994 0065 0152 0100               BRANCH   NS2                              < 1980>
1995 004B 004D 0101 NS-TRY3  TCY      11
1996 0016 002A 0102               TMY                 CHECK WHICH PHRASE LAST SPOK
1997 002D 0083 0103               LDP      12
1998 005A 0051 0104               YNEC     8
1999 0034 0104 0105               BRANCH   NS-TRY4                          < 1700>
2000 0068 004D 0106               TCY      11
2001 0051 0060 0107               TCMIY    0          ZERO RETN#BCH
2002 0022 0049 0108               TCY      9
2003 0044 0029 0109               TMA                 GET SCORE TO BE LOADED
2004 0008 0091 0110               LDX      8
2005 0011 0047 0111               TCY      14
2006 0023 006A 0112               TCMIY    5          CODE FOR LNK/EDIT UPDATE
2007 0046 0068 0113               TCMIY    1          LINK EDIT POINTER
2008 000C 0108 0114               BRANCH   ADDLINK                          < 1723>
2009 0019 008F 0115 NS-MAX#  CALLL    CLEARROM                         < 2146>
     0033 01CD 0116
2010 0066 0049 0117               TCY      9
2011 004D 0060 0118               TCMIY    0
2012 001A 0060 0119               TCMIY    0
2013 0035 0063 0120               TCMIY    12
2014 006A 006C 0121               TCMIY    3
2015 0055 0120 0122               BRANCH   BLE                              < 2019>
2016 002A 008F 0123 NS-TRY2  CALLL    CLEARROM                         < 2146>
     0054 01CD 0124
2017 0028 0066 0125               TCMIY    6
2018 0050 0065 0126               TCMIY    10         LOAD LINK PHRASE FOR NUMBER-
2019 0020 008D 0127 BLE      BL       LNK/EDTC                         < 1487>
     0040 010F 0128
2020 ****************************************************************************
```

```
STMT  PC   CODE PLOC
2021                          ORGPG     15
2022 *
2023 *                  POWER UP / CLEAR ROUTINE
2024 *
2025 *        THIS ROUTINE SETS UP INITIAL CONDITIONS IN RAM
2026 *
2027 *
2028 0000 009E 0001  PUC      LDX       7          CLEAR REGISTERS 7 AND 0
2029 0001 004F 0002           TCY       15
2030 0003 0006 0003           CLA
2031 0007 0031 0004  LOOP     CPAIZ
2032 000F 0000 0005           COMX
2033 001F 002F 0006           TAM
2034 003F 002F 0007           TAM
2035 007F 002F 0008           TAM
2036 007E 002F 0009           TAM
2037 007D 002F 0010           TAM
2038 007B 002E 0011           TAMZA
2039 0077 0036 0012           RSTR
2040 006F 0000 0013           COMX
2041 005F 002C 0014           TAMDYN
2042 003E 0107 0015           BRANCH    LOOP                               < 2031>
2043 007C 00BF 0016           RETN
2044 0079 0006 0017           CLA
2045 0073 0096 0018           LDX       6          CLEAR 6 AND 1
2046 0067 0187 0019           CALL      LOOP                               < 2031>
2047 004F 009A 0020           LDX       5          CLEAR 5 AND 2
2048 001E 0187 0021           CALL      LOOP                               < 2031>
2049 003D 0092 0022           LDX       4          CLEAR 4 AND 3
2050 007A 0187 0023           CALL      LOOP                               < 2031>
2051 0075 0091 0024           LDX       8          CLEAR 8
2052 006B 0187 0025           CALL      LOOP                               < 2031>
2053 0057 0180 0026           CALL      PUC        CLEAR 7 AND 0 AGAIN < 2028>
2054 002E 004B 0027           TCY       13         TURN POWER ON
2055 005C 000D 0028           SETR
2056 0038 0195 0029           CALL      CLEAR      CLEAR DISPLAY           < 2076>
2057 0070 0006 0030           CLA
2058 0061 004D 0031           TCY       11
2059 0043 0036 0032           RSTR
2060 0006 0043 0033           TCY       12
2061 000D 000D 0034           SETR
2062 001B 0045 0035           TCY       10
2063 0037 000D 0036           SETR
2064 006E 0036 0037           RSTR
2065 005D 000D 0038           SETR
2066 003A 0036 0039           RSTR
2067 0074 004D 0040           TCY       11
2068 0069 000D 0041           SETR
2069 0053 0045 0042           TCY       10
2070 0026 000D 0043           SETR
2071 004C 0036 0044           RSTR
2072 0018 01B9 0045           CALL      MEMDRED    DUMMY READ TO SYNC C< 2127>
2073 0031 00B4 0046           REAC                 RESET SPECIAL STATUS
2074 0062 0091 0047           LDX       8
2075 0045 0084 0048           BL        NEWMODE                            < 0413>
     000A 011F 0049
2076 0015 0040 0050  CLEAR    TCY       0          CLEARS DISPLAY
2077 002B 0090 0051  HERE     LDX       0          OF=BLANK
2078 0056 0060 0052           TCMIY     0
2079 002C 0004 0053           DYN
2080 0058 0099 0054           LDX       1
2081 0030 006F 0055           TCMIY     15
2082 0060 0059 0056           YNEC      9
2083 0041 012B 0057           BRANCH    HERE                               < 2077>
2084 0002 0090 0058           LDX       0
2085 0005 0060 0059           TCMIY     0          CLEAR OUT DISPLAY POINTER
2086 000B 0098 0060           LDX       1
2087 0017 0049 0061           TCY       9
2088 002F 00BF 0062           RETN
2089 *
2090 * MEMLOOP- LOADS ADDRESS INTO ROM ADDRESS, 4 BITS AT A TIME
```

```
STMT  PC   CODE FLOC
2091  *
2092  005E 0043 0063  MEMADDR   TCY       12          CHIP SELECT
2093  003C 000D 0064            SETR
2094  0078 004D 0065            TCY       11          L/R = 1 (INPUT)
2095  0071 000D 0066            SETR                  R11 = 1
2096  0063 004F 0067            TCY       15
2097  0047 0006 0068            CLA
2098  000E 007C 0069            ACACC     3           FOR LOOP COUNT, ACC = 3
2099  001D 009E 0070            LDX       7           MEMORY FOR LOOP (SAVE ADDR)
2100  003B 002E 0071  MEMLOOP   TAMZA
2101  0076 0045 0072            TCY       10
2102  006D 0074 0073            ACACC     2
2103  005B 000D 0074            SETR                  LOADS COMMAND
2104  0036 0036 0075            RSTR
2105  006C 0045 0076            TCY       10
2106  0059 0098 0077            LDX       1
2107  0032 0029 0078            TMA                   4 BITS OF ADDR -->ACC
2108  0064 000D 0079            SETR                  LOADS DATA
2109  0049 0036 0080            RSTR
2110  0012 004B 0081            TCY       13
2111  0025 0003 0082  SHIFTUP   XMA                   *   SHIFT ROUTINE   *
2112  004A 0004 0083            DYN                   *    SHIFT UP IN    *
2113  0014 0059 0084            YNEC      9           *   SAME REGISTER   *
2114  0029 0125 0085            BRANCH    SHIFTUP     * * * * * * * * * * < 2111>
2115  0052 004F 0086            TCY       15          ORIGINAL WORD
2116  0024 009E 0087            LDX       7           REG-6
2117  0048 0007 0088            DMAN                  MEM-1, --> ACC  LOOP
2118  0010 013B 0089            BRANCH    MEMLOOP                       < 2100>
2119  0021 0045 0090            TCY       10
2120  0042 007C 0091            ACACC     3
2121  0004 000D 0092            SETR
2122  0009 0036 0093            RSTR
2123  0013 0045 0094            TCY       10          ***DUMMY INST FOR RSTR***
2124  0027 0006 0095            CLA
2125  004E 000D 0096            SETR
2126  001C 0036 0097            RSTR
2127  0039 0098 0098  MEMDRED   LDX       1           DUMMY READ TO SETUP MEMORY A
2128  0072 0045 0099            TCY       10
2129  0065 0071 0100            ACACC     8
2130  004B 000D 0101            SETR
2131  0016 0036 0102            RSTR
2132  002D 00BF 0103            RETN
2133  005A 007F 0104  LOADLVL2  ACACC     15
2134  0034 002F 0105            TAM
2135  0068 0091 0106  LOADLVL   LDX       8
2136  0051 0046 0107            TCY       6
2137  0022 0029 0108            TMA
2138  0044 0015 0109            AMAAC                 DOUBLE LEVEL
2139  0008 00BF 0110            RETN
2140  0011 004D 0111            TCY       11
2141  0023 0060 0112            TCMIY     0
2142  0046 01CD 0113            CALL      CLEARROM                      < 2146>
2143  000C 002D 0114            TAMIYC
2144  0019 0065 0115            TCMIY     10          00A0, 00A2, 00A4
2145  0033 008A 0116            BL        TRY2        SAY LEVEL, THEN DISP/< 0836>
      0066 0178 0117
2146  004D 0098 0118  CLEARROM  LDX       1
2147  001A 0045 0119            TCY       10
2148  0035 0060 0120  CLRROM2   TCMIY     0
2149  006A 0057 0121            YNEC      14
2150  0055 0135 0122            BRANCH    CLRROM2                       < 2148>
2151  002A 0045 0123            TCY       10
2152  0054 00BF 0124            RETN
2153  0028 0065 0125            TCMIY     10          ADDR FOR "YOUR SCORE IS. . . #
2154  0050 0069 0126            TCMIY     9
2155  0020 008D 0127            BL        LNK/EDTC                      < 1487>
      0040 010F 0128
2156  *******************00 LEFT********PAGE 15*******************************
2157                            END
```

TABLE XII

TB8 READ SEQUENCE

| STEP | COUNTER 623 CONTENTS (BINARY) | COUNTER 624 CONTENTS (HEX) | SIGNALS GENERATED |
|---|---|---|---|
| 1 | 10 | F | SAD, INC |
| 2 | 10 | E | DC, INC |
| 3 | 10 | C | DC, INC |
| 4 | 10 | 8 | DC, INC |
| 5 | 10 | 0 | DC, INC |
| 6 | 10 | 1 | DC, INC |
| 7 | 10 | 3 | SAM, DC, INC |
| 8 | 10 | 7 | PC, $\overline{\text{ZERO}}$ |

TABLE XIII

RB READ SEQUENCE

| STEP | COUNTER 623 CONTENTS (BINARY) | COUNTER 624 CONTENTS (HEX) | SIGNALS GENERATED |
|---|---|---|---|
| 1 | 11 | F | SAD, INC |
| 2 | 11 | E | DC, INC |
| 3 | 11 | C | DC, INC |
| 4 | 11 | 8 | DC, INC |
| 5 | 11 | 0 | DC, INC |
| 6 | 11 | 1 | DC, INC |
| 7 | 11 | 3 | SAM, DC, INC |
| 8 | 11 | 7 | PC |
| 9 | 01 | F | SAD, TF |
| 10 | 01 | E | BR, PC |
| 11 | 01 | C | BR, DC |
| 12 | 01 | 8 | BR, DC |
| 13 | 01 | 0 | BR, DC |
| 14 | 01 | 1 | DC |
| 15 | 01 | 3 | SAM, DC |
| 16 | 01 | 7 | PC |
| 17 | 00 | F | SAD, TF |
| 18 | 00 | E | BR |
| 19 | 00 | C | BR |
| 20 | 00 | 8 | BR |
| 21 | 00 | 0 | |
| 22 | 00 | 1 | |
| 23 | 00 | 3 | |
| 24 | 00 | 7 | PC |
| 25 | 10 | F | SAD, INC |
| 26 | 10 | E | DC, INC |
| 27 | 10 | C | DC, INC |
| 28 | 10 | 8 | DC, INC |
| 29 | 10 | 0 | DC, INC |
| 30 | 10 | 1 | DC, INC |
| 31 | 10 | 3 | SAM, DC, INC |
| 32 | 10 | 7 | PC, $\overline{\text{ZERO}}$ |

TABLE XIV $I_0/I_1$ COMMANDS

| $I_0$ | $I_1$ | |
|---|---|---|
| 0 | 0 | No Operation |
| 0 | 1 | Load Address (LA) |
| 1 | 0 | Transfer Bit (TB) |
| 1 | 1 | Read and Branch (RB) |

TABLE XV

Counter 619/PLA 620 Timing Sequence

| STEP | COUNTER CONTENTS (HEX) | SIGNALS GENERATED |
|---|---|---|
| 1 | 0 | $\overline{\text{LA1}}$, TB8 |
| 2 | 8 | $\overline{\text{LA2}}$ |
| 3 | C | $\overline{\text{LA3}}$ |
| 4 | E | $\overline{\text{LA4}}$ |
| 5 | F | |
| 6 | 7 | |
| 7 | 3 | |
| 8 | 1 | |

What is claimed is:

1. An electronic arithmetic learning aid comprising:

memory means having digital data stored therein from which a plurality of mathematical problems may be derived for presentation to an operator for solution, wherein at least some of the mathematical problems comprise respective sets of at least first and second numbers from which the operator is expected to determine the relative magnitude of one number with respect to the other number as the solution to the respective mathematical problem;

means for randomly selecting a plurality of numbers as a set including at least said first and second numbers corresponding to digital data as stored in said memory means to derive a particular mathematical problem;

presentation means operably associated with said random selection means and responsive to the random selection of said plurality of numbers for posing a particular mathematical relationship between at least said first and second numbers of said set from which the operator is expected to determine the relative magnitude of one number with respect to the other number as the solution to the respective mathematical problem;

operator input means for receiving an input from an operator of the learning aid indicative of a choice of one of two possible answers as a proposed solution to said mathematical problem as presented by said presentation means;

digital logic means including comparator means operably associated with said random selection means, said operator input means and said presentation means for determining the appropriateness of the input received by said operator input means from the operator with respect to said mathematical problem as presented by said presentation means; and means coupled to said comparator means for producing an indication of the accuracy of the input from the operator received by said operator input means in relation to the correct solution to the presented mathematical problem.

2. An electronic arithmetic learning aid as set forth in claim 1, wherein said presentation means comprises audible announcing means for presenting the mathematical problem to the operator for solution as an audibly voiced verbal presentation in a human language asking the operator to solve a particular mathematical relationship involving the relative magnitude of one number with respect to the other number as randomly selected by said random selection means.

3. An electronic arithmetic learning aid as set forth in claim 2, wherein said audible announcing means comprises speech synthesizer means coupled to said random selection means and to said memory means for generating analog signals representative of human speech, and audio means coupled to said speech synthesizer means for converting said analog signals into audible human speech for audibly announcing the randomly selected mathematical problem to the operator for solution.

4. An electronic arithmetic learning aid as set forth in claim 1, wherein said presentation means includes visual display means for displaying said set including at least said first and second numbers as randomly selected by said random selection means, and audible announcing means for providing an audible presentation in a human language asking the operator to solve a particular mathematical relationship involving the relative magnitude of one number with respect to the other number as displayed by said visual display means in presenting the randomly selected mathematical problem to the operator for solution.

5. An electronic arithmetic learning aid as set forth in claim 4, wherein said audible announcing means comprises speech synthesizer means coupled to said random selection means and to said memory means for generating analog signals representative of human speech, and audio means coupled to said speech synthesizer means for converting said analog signals into audible human speech for audibly announcing the randomly selected mathematical problem to the operator for solution.

6. An electronic arithmetic learning aid as set forth in any one of claims 3 and 5, wherein said at least some of the mathematical problems derived from said digital data stored in said memory means comprise respective sets of number groups, each number group including at least one individual number as a member thereof and having an arithmetic operation taken from the group consisting of addition, subtraction, multiplication, and division coupling successive numbers if members of the same number group, as a posed mathematical relationship from which the operator is expected to determine the relative magnitude of one number group with respect to another number group as the solution to the respective mathematical problem.

7. An electronic arithmetic learning aid as set forth in any one of claims 2, 3, 4 and 5, wherein said accuracy indicating means comprises means for causing said audible announcing means to audibly announce in a human language the results of the comparison between the input from the operator received by said operator input means and the correct solution to the presented mathematical problem.

8. An electronic arithmetic learning aid as set forth in any one of claims 4 and 5, wherein said accuracy indicating means comprises means for causing said audible announcing means to audibly announce in a human language the results of the comparison between the input from the operator received by said operator input means and the correct solution to the presented mathematical problem and means for causing said visual display means to visually present the results of the comparison between the input from the operator received by said operator input means and the correct solution to the presented mathematical problem.

9. An electronic arithmetic learning aid as set forth in claim 4, wherein only said number set is displayed by said visual display means of said presentation means in response to the random selection of said plurality of numbers by said random selection means, said audible announcing means of said presentation means being responsive to the display of said number set by said visual display means in providing the audible presentation in a human language asking the operator to solve the particular mathematical relationship involving the displayed number set.

10. An electronic arithmetic learning aid comprising:

memory means having digital data including digital speech data stored therein from which a plurality of mathematical problems may be derived for presentation to an operator for solution, wherein at least some of the mathematical problems involve respective sets of at least two individual numbers from which the operator is expected to determine the relative magnitude of one number with respect to the other number as the solution to the corresponding mathematical problem;

speech synthesizer means operably associated with said memory means for generating analog signals representative of human speech at least stating respective mathematical problems from selectively accessed digital speech data stored in said memory means;

audio means coupled to said speech synthesizer means for converting said analog signals into audible human speech for audibly voicing respective mathematical problems in human speech to the operator for solution;

operator input means for receiving an input from the operator of the learning said indicative of a choice of one of two possible answers as a proposed solution to a corresponding mathematical problem as audibly voiced by said audio means;

controller means operably associated with said memory means, said speech synthesizer means and said operator input means, said controller means comprising means for randomly selecting a plurality of numbers as a set including at least first and second numbers corresponding to digital data as stored in said memory means to derive a mathematical problem, comparator means coupled to said random selection means and to said operator input means for determining the appropriateness of the input received by said operator input means from the operator with respect to a mathematical problem as audibly voiced by said audio means, and means coupled to said comparator means for producing an indication of the accuracy of the input from the operator received by said operator input means in relation to the correct solution to the corresponding mathematical problem; and said speech synthesizer means being responsive to said random selection means of said controller means in selectively accessing digital speech data corresponding to said plurality of numbers as randomly selected by said random selection means for posing a particular mathematical relationship involving the relative magnitude of at least said first number with respect to at least said second number in presenting said plurality of numbers as an audibly voiced mathematical problem via said audio means to the operator for solution.

11. An electronic arithmetic learning aid as set forth in claim 10, further including visual display means operably associated with said controller means and said random selection means thereof for displaying said set including at least said randomly selected first and second numbers in presenting the mathematical problem to the operator for solution in addition to the audible voicing of the mathematical problem by said audio means.

12. An electronic arithmetic learning aid as set forth in claim 11, wherein only said number set is displayed by said visual display means in response to the random selection of said plurality of numbers by said random selection means, said speech synthesizer means being responsive to said controller means and to the display of said number set by said visual display means in providing via said audio means the audible voicing of the mathematical problem in a human language asking the operator to solve the particular mathematical relationship involving the displayed number set.

13. An electronic arithmetic learning aid as set forth in claim 11, wherein said accuracy indicating means comprises means for causing said speech synthesizer means to selectively access digital speech data stored in said memory means for generating analog signals representative of human speech stating the results of the comparison between the input from the operator received by said operator input means and the correct solution to the corresponding mathematical problem, said audio means being responsive to said aforementioned analog signals generated by said speed synthesizer means for converting said analog signals into audible human speech announching in a human language the results of the comparison.

14. An electronic arithmetic learning aid as set forth in claim 13, wherein said accuracy indicating means further includes means for causing said visual display means to visually present the results of the comparison between the input from the operator received by said operator input means and the correct solution to the corresponding mathematical problem.

15. An electronic arithmetic learning aid as set forth in any one of claims 10, 11, 13 and 14, wherein said at least some of the mathematical problems derived from said digital data stored in said memory means comprise respective sets of number groups, each number group including at least one individual number as a member thereof and having an arithmetic operation taken from the group consisting of addition, subtraction, multiplication and division coupling successive numbers if members of the same number group, as a posed mathematical relationship from which the operator is expected to determine the relative magnitude of one number group with respect to another number group as the solution to the respective mathematical problem.

16. An electronic arithmetic learning aid as set forth in claim 10, wherein said accuracy indicating means comprises means for causing said speech synthesizer means to audibly announce via said audio means in a human language the results of the comparison between the input from the operator received by said operator input means and the correct solution to the presented mathematical problem.

17. An electronic arithmetic learning aid comprising:

memory means having digital data stored therein from which a plurality of mathematical problems may be derived for presentation to an operator for solution, wherein at least some of the mathematical problems comprise respective sets of at least first and second numbers from which the operator is expected to determine the relative magnitude of one number with respect to the other number as the solution to the respective mathematical problem;

means for randomly selecting a plurality of numbers as a set including at least said first and second numbers corresponding to digital data as stored in said memory means to derive a particular mathematical problem;

presentation means operably associated with said random selection means and responsive to the random selection of said plurality of numbers for posing a particular mathematical relationship between at least said first and second numbers of said set from which the operator is expected to determine the relative magnitude of one number with respect to the other number as the solution to the respective mathematical problem;

said presentation means comprising audible announcing means for presenting the mathematical problem to the operator for solution as an audibly voiced verbal presentation in a human language asking the operator to solve a particular mathematical relationship involving the relative magnitude of one number with respect to the other number as randomly selected by said random selection means;

said audible announcing means comprising speech synthesizer means coupled to said random selection means and to said memory means for generating analog signals representative of human speech, and audio means coupled to said speech synthesizer means for converting said analog signals into audible human speech for audibly announcing the randomly selected mathematical problem to the operator for solution;

said random selection means accessing digital data as stored in said memory means for input to said speech synthesizer means to generate analog signals representative of human speech stating the randomly selected mathematical problem as a posed mathematical relationship concerning whether the first randomly selected number is greater than or less than the second randomly selected number;

operator input means for receiving an input from an operator of the learning aid indicative of a choice of one of two possible answers as a proposed solution to said mathematical problem as presented by said presentation means;

digital logic means including comparator means operably associated with said random selection means, said operator input means and said presentation means for determining the appropriateness of the input received by said operator input means from the operator with respect to said mathematical problem as presented by said presentation means; and means coupled to said comparator means for producing an indication of the accuracy of the input from the operator received by said operator input means in relation to the correct solution to the presented mathematical problem.

18. An electronic arithmetic learning aid as set forth in claim 17, wherein said operator input means includes at least first and second manually operable switching means, said first switching means when actuated being indicative of the first randomly selected number being greater than the second randomly selected number, and said second switching means when actuated being indicative of the first randomly selected number being less than the second randomly selected number.

19. An electronic arithmetic learning aid comprising:

memory means having digital data stored therein from which a plurality of mathematical problems may be derived for presentation to an operator for solution, wherein at least some of the mathematical problems comprise respective sets of at least first and second numbers from which the operator is expected to determine the relative magnitude of one number with respect to the other number as the solution to the respective mathematical problem;

means for randomly selecting a plurality of numbers as a set including at least said first and second numbers corresponding to digital data as stored in said memory means to derive a particular mathematical problem;

presentation means operably associated with said random selection means and responsive to the random selection of said plurality of numbers for posing a particular mathematical relationship between at least said first and second numbers of said set from which the operator is expected to determine the relative magnitude of one number with respect to the other number as the solution to the respective mathematical problem;

said presentation means including visual display means for displaying said set including at least said first and second numbers as randomly selected by said random selection means, and audible announcing means for providing an audible presentation in a human language asking the operator to solve a particular mathematical relationship involving the relative magnitude of one number with respect to the other number as displayed by said visual display means in presenting the randomly selected mathematical problem to the operator for solution;

said audible announcing means comprising speech synthesizer means coupled to said random selection means and to said memory means for generating analog signals representative of human speech, and audio means coupled to said speech synthesizer means for converting said analog signals into audible human speech for audibly announcing the randomly selected mathematical problem to the operator for solution;

said random selection means accessing digital data as stored in said memory means for input to said speech synthesizer means to generate analog signals representative of human speech stating the randomly selected mathematical problem as a posed mathematical relationship concerning whether the first randomly selected number is greater than or less than the second randomly selected number;

operator input means for receiving an input from an operator of the learning aid indicative of a choice of one of two possible answers as a proposed solution to said mathematical problem as presented by said presentation means;

digital logic means including comparator means operably associated with said random selection means, said operator input means and said presentation means for determining the appropriateness of the input received by said operator input means from the operator with respect to said mathematical problem as presented by said presentation means; and means coupled to said comparator means for producing an indication of the accuracy of the input from the operator received by said operator input means in relation to the correct solution to the presented mathematical problem.

20. An electronic arithmetic learning aid as set forth in claim 19, wherein said operator input means include at least first and second manually operable switching means, said first switching means when actuated being indicative of the first randomly selected number being greater than the second randomly selected number, and said second switching means when actuated being indicative of the first randomly selected number being less than the second randomly selected number.

21. An electronic arithmetic learning aid comprising:

memory means having digital data including digital speech data stored therein from which a plurality of mathematical problems may be derived for presentation to an operator for solution, wherein at least some of the mathematical problems involve respective sets of at least two individual numbers from which the operator is expected to determine the relative magnitude of one number with respect to the other number as the solution to the corresponding mathematical problem;

speech synthesizer means operably associated with said memory means for generating analog signals representative of human speech at least stating respective mathematical problems from selectively accessed digital speech data stored in said memory means;

audio means coupled to said speech synthesizer means for converting said analog signals into audible human speech for audibly voicing respective mathematical problems in human speech to the operator for solution;

operator input means for receiving an input from the operator of the learning aid indicative of a choice of one of two possible answers as a proposed solution to a corresponding mathematical problem as audibly voiced by said audio means;

controller means operably associated with said memory means, said speech synthesizer means and said operator input means, said controller means comprising means for randomly selecting a plurality of numbers as a set including at least first and second numbers corresponding to digital data as stored in said memory means to derive a mathematical problem, said random selection means accessing digital speech data as stored in said memory means for input to said speech synthesizer means to generate analog signals representative of human speech stating the randomly selected mathematical problem as a posed mathematical relationship concerning whether the first randomly selected number is greater than or less than the second randomly selected number, comparator means coupled to said random selection means and to said operator input means for determining the appropriateness of the input received by said operator input means from the operator with respect to a mathematical problem as audibly voiced by said audio means, and means coupled to said comparator means for producing an indication of the accuracy of the input from the operator received by said operator input means in relation to the correct solution to the corresponding mathematical problem; and said speech synthesizer means being responsive to said random selection means of said controller means in selectively accessing digital speech data corresponding to said plurality of numbers as randomly selected by said random selection means for posing a particular mathematical relationship involving the relative magnitude of at least said first number with respect to at least said second number in presenting said plurality of numbers as an audibly voiced mathematical problem via said audio means to the operator for solution.

22. An electronic arithmetic learning aid as set forth in claim 21, wherein said operator input means includes at least first and second manually operable switching means, said first switching means when actuated being indicative of the first randomly selected number being greater than the second randomly selected number, and said second switching means when actuated being indicative of the first randomly selected number being less than the randomly selected number.

23. An electronic arithmetic learning aid as set forth in claim 22, wherein said at least some of the mathematical problems derived from said digital data stored in said memory means comprise respective sets of number groups, each number group including at least one individual number as a member thereof and having an arithmetic operation taken from the group consisting of addition, subtraction, multiplication, and division coupling successive numbers if members of the same number group, as a posed mathematical relationship from which the operator is expected to determine the relative magnitude of one number group with respect to another number group as the solution to the respective mathematical problem.

24. An electronic arithmetic learning aid as set forth in claim 21, further including visual display means operably associated with said controller means and said random selection means thereof for displaying said set including at least said randomly selected first and second numbers in presenting the mathematical problem to the operator for solution in addition to the audible voicing of the mathematical problem by said audio means.

25. An electronic arithmetic learning aid as set forth in claim 24, wherein said accuracy indicating means comprises means for causing said speech synthesizer means to selectively access digital speech data stored in said memory means for generating analog signals representative of human speech stating the results of the comparison between the input from the operator received by said operator input means and the correct solution to the corresponding mathematical problem, said audio means being responsive to said aforementioned analog signals generated by said speech synthesizer means for converting said analog signals into audible human speech announcing in a human language the results of the comparison.

26. An electronic arithmetic learning aid as set forth in claim 25, wherein said accuracy indicating means further includes means for causing said visual display means to visually present the results of the comparison between the input from the operator received by said operator input means and the correct solution to the corresponding mathematical problem.

27. An electronic arithmetic learning aid as set forth in claim 26, wherein said operator input means includes at least first and second manually operable switching means, said first switching means when actuated being indicative of the first randomly selected number being greater than the second randomly selected number, and said second switching means when actuated being indicative of the first randomly selected number being less than the second randomly selected number.

28. An electronic arithmetic learning aid as set forth in claim 27, wherein said at least some of the mathematical problems derived from said digital data stored in said memory means comprise respective sets of number groups, each number group including at least one individual number as a member thereof and having an arithmetic operation taken from the group consisting of addition, subtraction, multiplication, and division coupling successive numbers if members of the same number group, as a posed mathematical relationship from which the operator is expected to determine the relative magnitude of one number group with respect to another number group as the solution to the respective mathematical problem.

29. An electronic arithmetic learning aid as set forth in claim 25, wherein said operator input means includes at least first and second manually operable switching means, said first switching means when actuated being indicative of the first randomly selected number being greater than the second randomly selected number, and said second switching means when actuated being indicative of the first randomly selected number being less than the second randomly selected number.

30. An electronic arithmetic learning aid as set forth in claim 29, wherein said at least some of the mathematical problems derived from said digital data stored in said memory means comprise respective sets of number groups, each number group including at least one individual number as a member thereof and having an arithmetic operation taken from the group consisting of addition, subtraction, multiplication, and division coupling successive numbers if members of the same number group, as a posed mathematical relationship from which the operator is expected to determine the relative magnitude of one number group with respect to another number group as the solution to the respective mathematical problem.

31. An electronic arithmetic learning aid as set forth in claim 24, wherein said operator input means includes at least first and second manually operable switching means, said first switching means when actuated being indicative of the first randomly selected number being greater than the second randomly selected number, and said second switching means when actuated being indicative of the first randomly selected number being less than the second randomly selected number.

32. An electronic arithmetic learning aid as set forth in claim 31, wherein said at least some of the mathematical problems derived from said digital data stored in said memory means comprise respective sets of number groups, each number group including at least one individual number as a member thereof and having an arithmetic operation taken from the group consisting of addition, subtraction, multiplication, and division coupling successive numbers if members of the same number group, as a posed mathematical relationship from which the operator is expected to determine the relative magnitude of one number group with respect to another number group as the solution to the respective mathematical problem.

* * * * *

UNITED STATES PATENT AND TRADEMARK OFFICE

CERTIFICATE OF CORRECTION

PATENT NO. : 4,946,391

DATED : August 7, 1990

INVENTOR(S) : William R. Hawkins and Steve Weinstein

It is certified that error appears in the above-identified patent and that said Letters Patent is hereby corrected as shown below:

The title page should be deleted and substitute therefor the attached title page, showing the illustrative figure and number of Drawing Sheets.

The Drawing Sheets, consisting of Figs. 1-3, 4a, 4b, 5, 6, 7a-7d, 8a-8f, 9a-9d, 10a-10c, 11a-11d, 12a, 12b, 13a-13c, 14a, 14b, 15a, 15b, 16a-16c, 17-19, 20a-20f, 21a-21d, 22 and 23a-23c, should be added as shown on the attached pages.

Signed and Sealed this

Thirteenth Day of October, 1992

*Attest:*

DOUGLAS B. COMER

*Attesting Officer*

*Acting Commissioner of Patents and Trademarks*

United States Patent [19]
Hawkins et al.

[11] Patent Number: 4,946,391
[45] Date of Patent: Aug. 7, 1990

[54] ELECTRONIC ARITHMETIC LEARNING AID WITH SYNTHETIC SPEECH

[75] Inventors: William R. Hawkins; Steve Weinstein, both of Lubbock, Tex.

[73] Assignee: Texas Instruments Incorporated, Dallas, Tex.

[21] Appl. No.: 154,722

[22] Filed: May 30, 1980

[51] Int. Cl.[5] .............................................. G09B 19/02
[52] U.S. Cl. .................................... 434/201; 434/327; 434/308; 434/322; 364/718; 273/237
[58] Field of Search .............. 434/188, 201, 202, 169, 434/157, 176, 335; 364/410, 718, 723, 513, 710, 717; 179/15 M, 15 G

[56] References Cited

U.S. PATENT DOCUMENTS

| | | | |
|---|---|---|---|
| 3,371,321 | 2/1968 | Adams | 434/157 |
| 3,584,398 | 6/1971 | Meyer et al. | 434/201 |
| 3,925,909 | 12/1975 | Duncan | 434/201 |
| 3,947,976 | 4/1976 | Hafel | 434/201 |
| 3,974,575 | 8/1976 | Duncan | 434/201 |
| 4,010,556 | 3/1977 | Ellsworth et al. | 434/201 |
| 4,026,555 | 5/1977 | Kirschner et al. | 273/85 G |
| 4,047,008 | 9/1977 | Perkins | 364/717 |
| 4,051,605 | 10/1977 | Toal et al. | 434/201 |
| 4,060,848 | 11/1977 | Hyatt | 364/200 |
| 4,117,607 | 10/1978 | Gill | 434/201 |
| 4,179,584 | 12/1979 | Tanimoto et al. | 179/1 SM |
| 4,189,779 | 2/1980 | Brautingham | 364/718 |
| 4,247,895 | 1/1981 | Weber | 434/201 |
| 4,259,668 | 3/1981 | Nishimura et al. | 434/201 |
| 4,340,374 | 7/1982 | Culley | 434/201 |

OTHER PUBLICATIONS

*IEEE Spectrum:* "Voice Signals Bit-By-Bit"; Oct. 1973; pp. 28-34.
*The Journal of the Acustical Society of America;* Apr. 1971; pp. 637-650.
*Products That Think;* Available as of Nov. 1978; p. 41.

*Primary Examiner*—Edward M. Coven
*Assistant Examiner*—Jessica J. Harrison
*Attorney, Agent, or Firm*—William E. Hiller; N. Rhys Merrett; Mel Sharp

[57] ABSTRACT

An electronic handheld arithmetic learning aid which includes a speech synthesis device, a speaker driven by the speech synthesis device, a memory having digital data stored therein from which a plurality of mathematical problems may be derived for presentation to an operator for solution, and a controller for accessing selected portions of the digital data from the memory for input to the speech synthesizer device in presenting the mathematical problems to the operator in an audibly voiced manner via the speaker. In one aspect, at least some of the mathematical problems derivable from the memory involve respective sets of at least two individual numbers from which the operator is expected to determine a particular mathematical relation in providing a solution to the corresponding mathematical problem. In another aspect, the mathematical problems derivable from the digital data of the memory respectively involve the random selection of an unknown number which the operator is expected to identify by proposing a trial number. The memory further includes the solutions to these problems and digital speech data for enabling the speech synthesizer device to provide speech signals from which words posing the mathematical problems, the correct solutions thereto, and comments on operator inputs may be audibly voiced in human speech via the speaker as driven by the speech synthesizer device. The talking electronic arithmetic learning aid presents the mathematical problems in words and phrases as audibly voiced in synthesized speech to enhance the ability of the operator in perceiving mathematical problems in an audibly verbalized form.

32 Claims, 53 Drawing Sheets

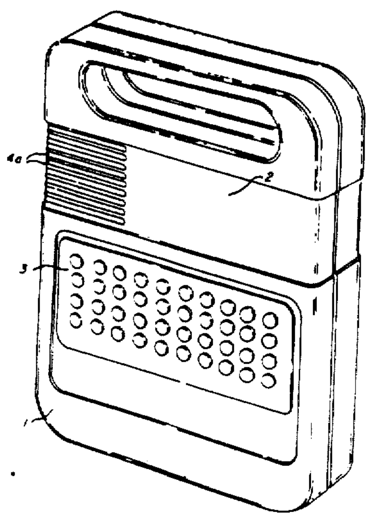

Fig. 1

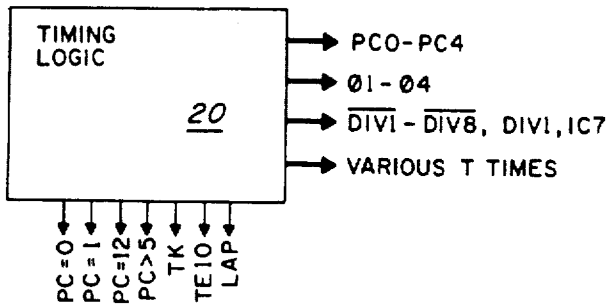
10
Fig. 4a
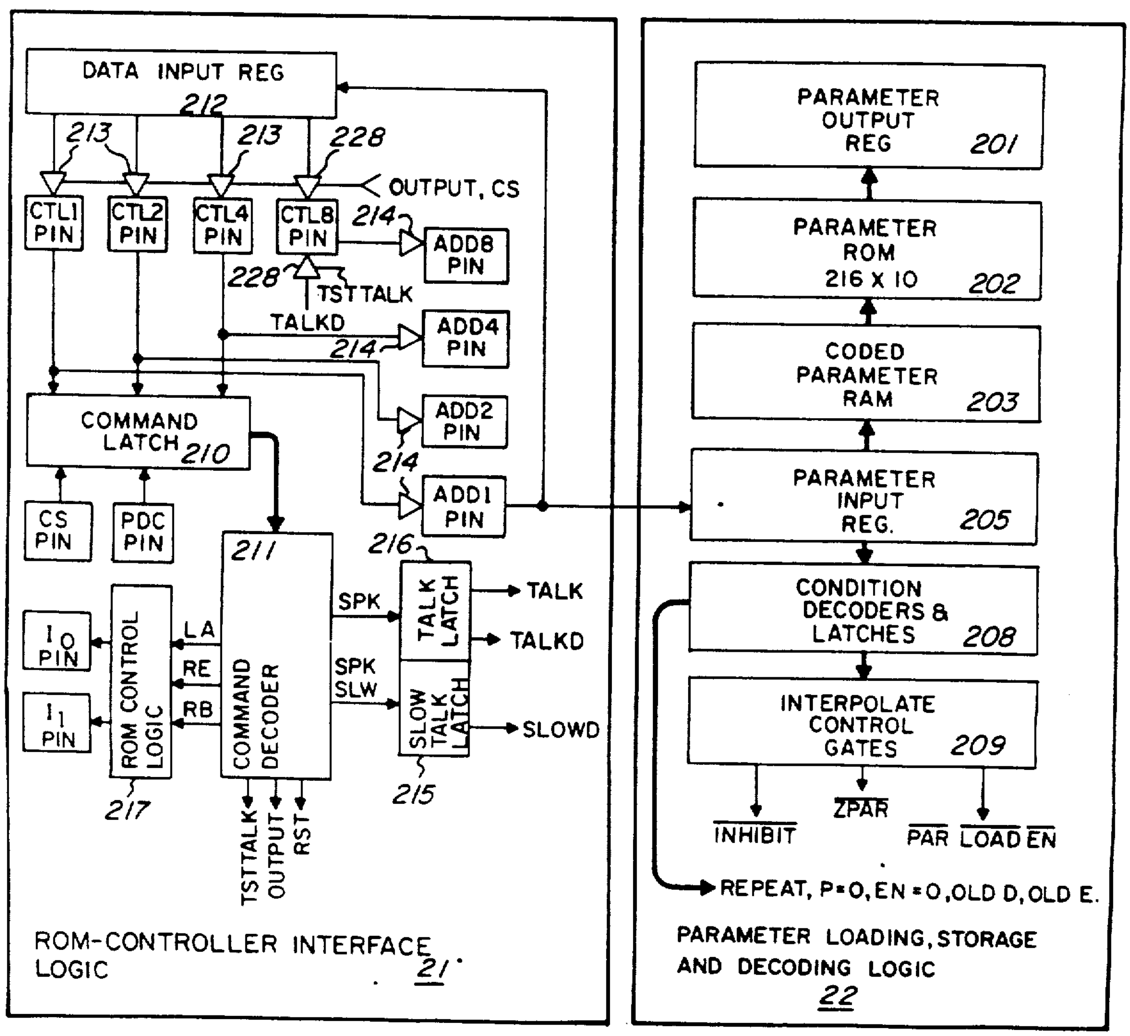

10

RAM DECODE PLA
PRECHARGE Ø4
DISCHARGE Ø1

KC
R12
Ø1
R11
S
ACC1
ACC2
ACC4
ACC8
R10
SA
KC
PCB
Ø5
Ø6
Ø2
PAD
G
B
C
D
E
A
F
H
I
J
K
L
M
N
DRT
AR